(12) United States Patent
Christie et al.

(10) Patent No.: US 6,411,624 B1
(45) Date of Patent: *Jun. 25, 2002

(54) TELECOMMUNICATIONS SYSTEM

(75) Inventors: Joseph Michael Christie, deceased, late of San Bruno, CA (US); by Joseph S. Christie, legal representative; by Jean M. Christie, legal representative, both of Mt. Pleasant, PA (US); William Lyle Wiley, Olathe, KS (US); Royal Dean Howell, Trimble, MO (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/243,203

(22) Filed: Feb. 2, 1999

(Under 37 CFR 1.47)

Related U.S. Application Data

(63) Continuation of application No. 08/754,349, filed on Nov. 22, 1996, now Pat. No. 6,031,840, which is a continuation-in-part of application No. 08/568,551, filed on Dec. 7, 1995, now Pat. No. 5,825,780, which is a continuation of application No. 08/238,605, filed on May 5, 1994, now abandoned.

(51) Int. Cl.[7] ............................................. H04L 12/56
(52) U.S. Cl. .................. 370/395.31; 370/410; 370/524; 370/905; 379/230
(58) Field of Search .............................. 370/389, 384, 370/395–399, 400, 409, 410, 426, 522, 524, 904, 905, 351–360; 379/230

(56) References Cited

U.S. PATENT DOCUMENTS

| 4,201,889 A | 5/1980 | Lawrence et al. |
|---|---|---|
| 4,720,850 A | 1/1988 | Oberlander et al. |
| 4,736,364 A | 4/1988 | Basso et al. |
| 4,748,658 A | 5/1988 | Gopal et al. |
| 4,763,317 A | 8/1988 | Lehman et al. |
| 4,979,118 A | 12/1990 | Kheradpir |
| 4,991,204 A | 2/1991 | Yamamoto et al. |
| 5,018,191 A | 5/1991 | Catron et al. |
| 5,067,123 A | 11/1991 | Hyodo et al. |
| 5,218,602 A | 6/1993 | Grant et al. |
| 5,239,539 A | 8/1993 | Uchida et al. |
| 5,251,255 A | 10/1993 | Epley |
| 5,291,479 A | 3/1994 | Vaziri et al. |
| 5,291,492 A | 3/1994 | Andrews et al. |
| 5,339,318 A | 8/1994 | Tanaka et al. |
| 5,377,186 A | 12/1994 | Wegner et al. |
| 5,384,771 A | 1/1995 | Isidoro et al. |
| 5,392,402 A | 2/1995 | Robrock, II |
| 5,422,882 A | 6/1995 | Hiller et al. |
| 5,434,852 A | 7/1995 | La Porta et al. |
| 5,461,669 A | 10/1995 | Vilain |
| 5,483,527 A | 1/1996 | Doshi et al. |
| 5,509,010 A | 4/1996 | LaPorta et al. |
| 5,509,123 A | 4/1996 | Dobbins et al. |
| 5,513,355 A | 4/1996 | Doellinger et al. |
| 5,521,910 A | 5/1996 | Matthews |

(List continued on next page.)

OTHER PUBLICATIONS

ANSI–TI.113–1992, American National Standard for Telecommunications, "Signaling System No. 7 (SS7)—Integrated Services Digital Network (ISDN) User Part," New York, NY.

(List continued on next page.)

Primary Examiner—Seema S. Rao
(74) Attorney, Agent, or Firm—Harley R. Ball; Steven J. Funk; Kevin D. Robb

(57) ABSTRACT

The invention comprises a telecommunications signaling processor that processes Signaling System #7 (SS7) telecommunications signaling messages to select Asynchronous Transfer Mode (ATM) virtual connections and provide control messages indicating the selected ATM virtual connections.

86 Claims, 129 Drawing Sheets

U.S. PATENT DOCUMENTS

| | | | |
|---|---|---|---|
| 5,522,042 A | | 5/1996 | Fee et al. |
| 5,539,815 A | | 7/1996 | Samba |
| 5,568,475 A | * | 10/1996 | Doshi et al. ................. 370/352 |
| 5,600,640 A | | 2/1997 | Blair et al. |
| 5,627,836 A | | 5/1997 | Conoscenti et al. |
| 5,629,930 A | | 5/1997 | Beshai et al. |
| 5,673,262 A | * | 9/1997 | Shimuzu ..................... 370/395 |
| 5,703,876 A | | 12/1997 | Christie |
| 5,751,706 A | | 5/1998 | Land et al. |
| 5,802,045 A | | 9/1998 | Kos et al. |
| 5,825,780 A | | 10/1998 | Christie |
| 5,835,584 A | | 11/1998 | Penttonen |
| 5,867,562 A | | 2/1999 | Scherer |
| 5,940,487 A | | 8/1999 | Bunch et al. |
| 5,940,491 A | | 8/1999 | Anderson et al. |
| 5,991,301 A | | 11/1999 | Christie |
| 6,016,343 A | | 1/2000 | Hogan et al. |
| 6,031,840 A | | 2/2000 | Christie et al. |
| 6,181,703 B1 | | 1/2001 | Christie et al. |

OTHER PUBLICATIONS

ANSI–TI.113a–1993, American National Standard for Telecommunications, "Signaling System No. 7 (SS7)—Integrated Services Digital Network (ISDN) User Part (Nxdso Multi–Rate Connection)," Washington, D.C.

ANSI–TI.113–1995, American National Standard for Telecommunications, "Signaling System No. 7 (SS7)—Integrated Services Digital Network (ISDN) User Part," New York, NY.

Atoui, M., "Virtual Private Network Call Processing In The Intelligent Network," pp. 561–565, Chicago, IL, International Conference on Communications, vol. II., 1992.

"Revised Q.2931 User Side SDL Diagrams," Study Group 11, ITU—Telecommunication Standardization Sector, Nov. 29–Dec. 17, 1993.

"Final B–ISUP SDLS," Study Group 11, Geneva, ITU—Telecommunication Standardization Sector, Nov. 29–Dec. 17, 1993.

McKinney, Scott, "ATM for Narrowband Services" IEEE Communications Magazine, Apr., 1994, New York, US, pp. 64–72.

* cited by examiner

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 7

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 8

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |

FIG. 11

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |

FIG. 12

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |

FIG. 13

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE NUMBER | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |
| | | | | |

*FIG. 14*

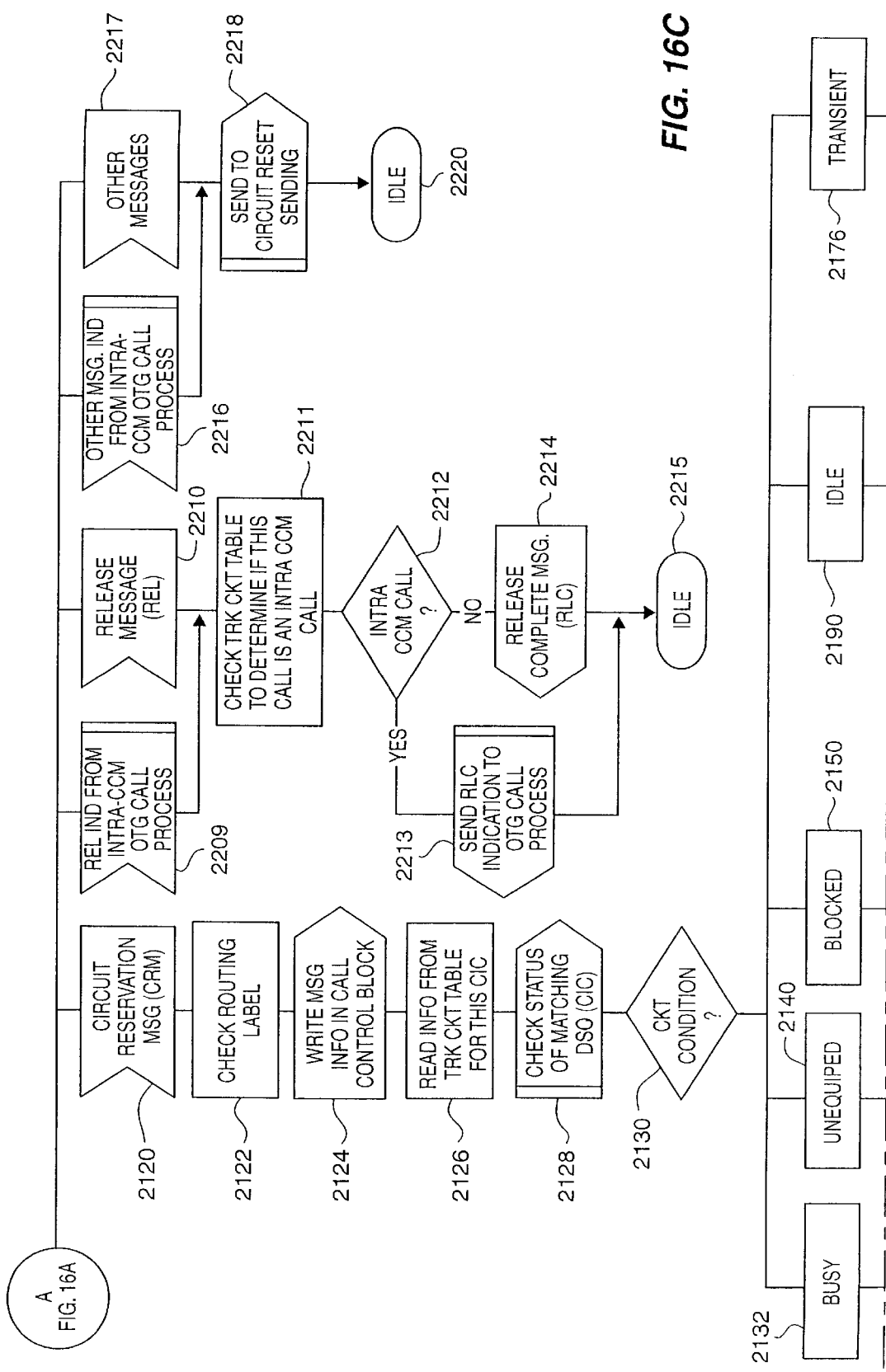

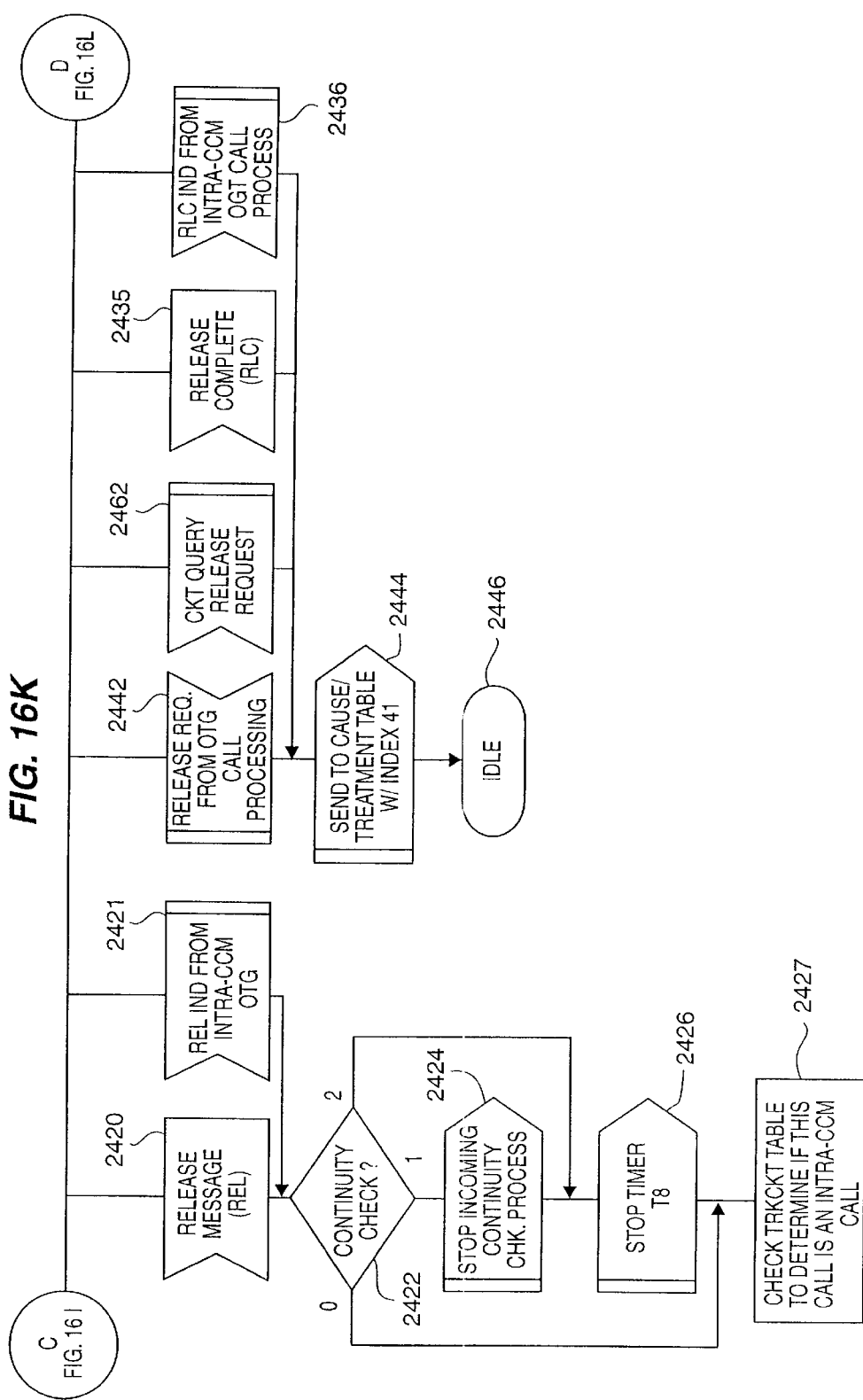

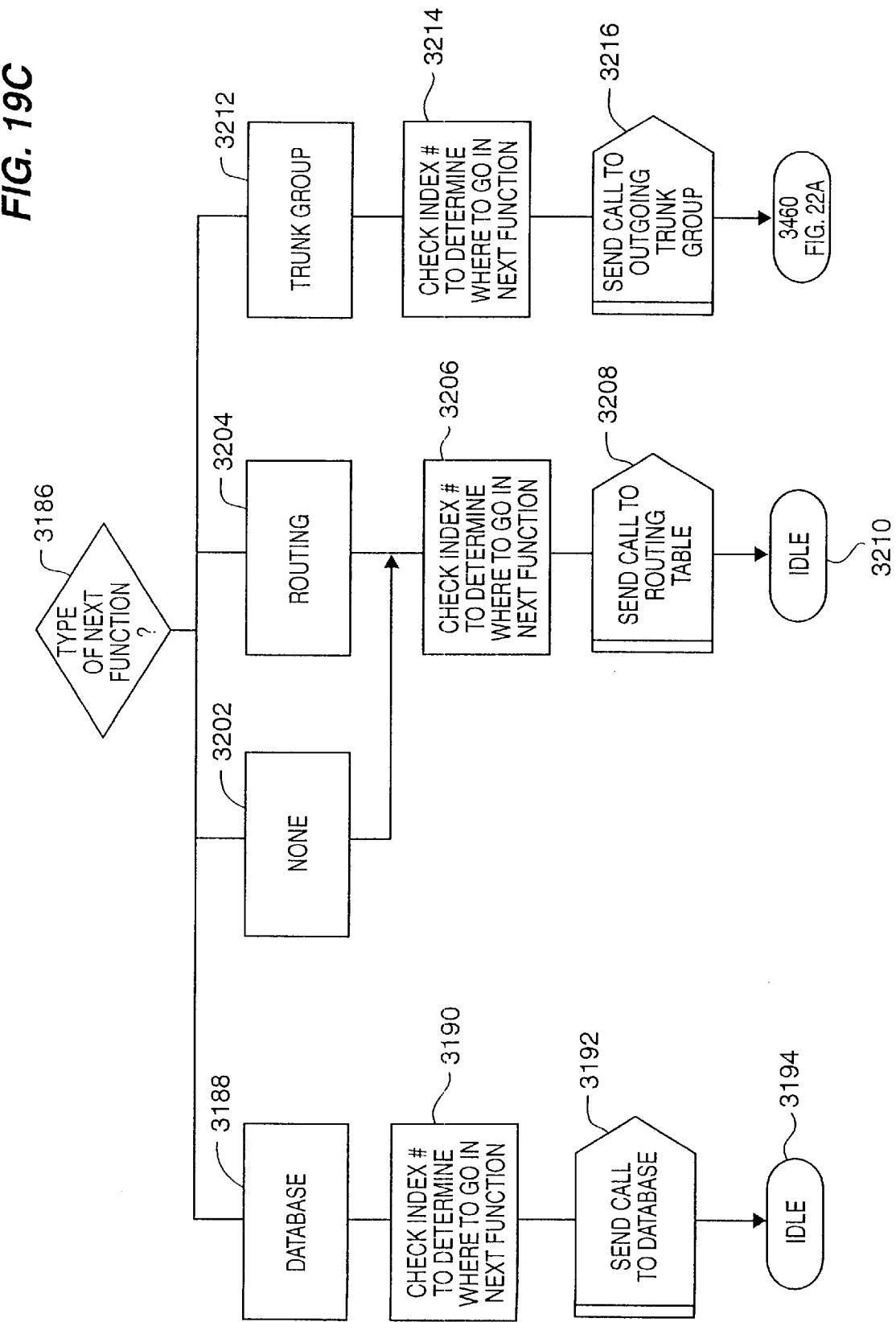

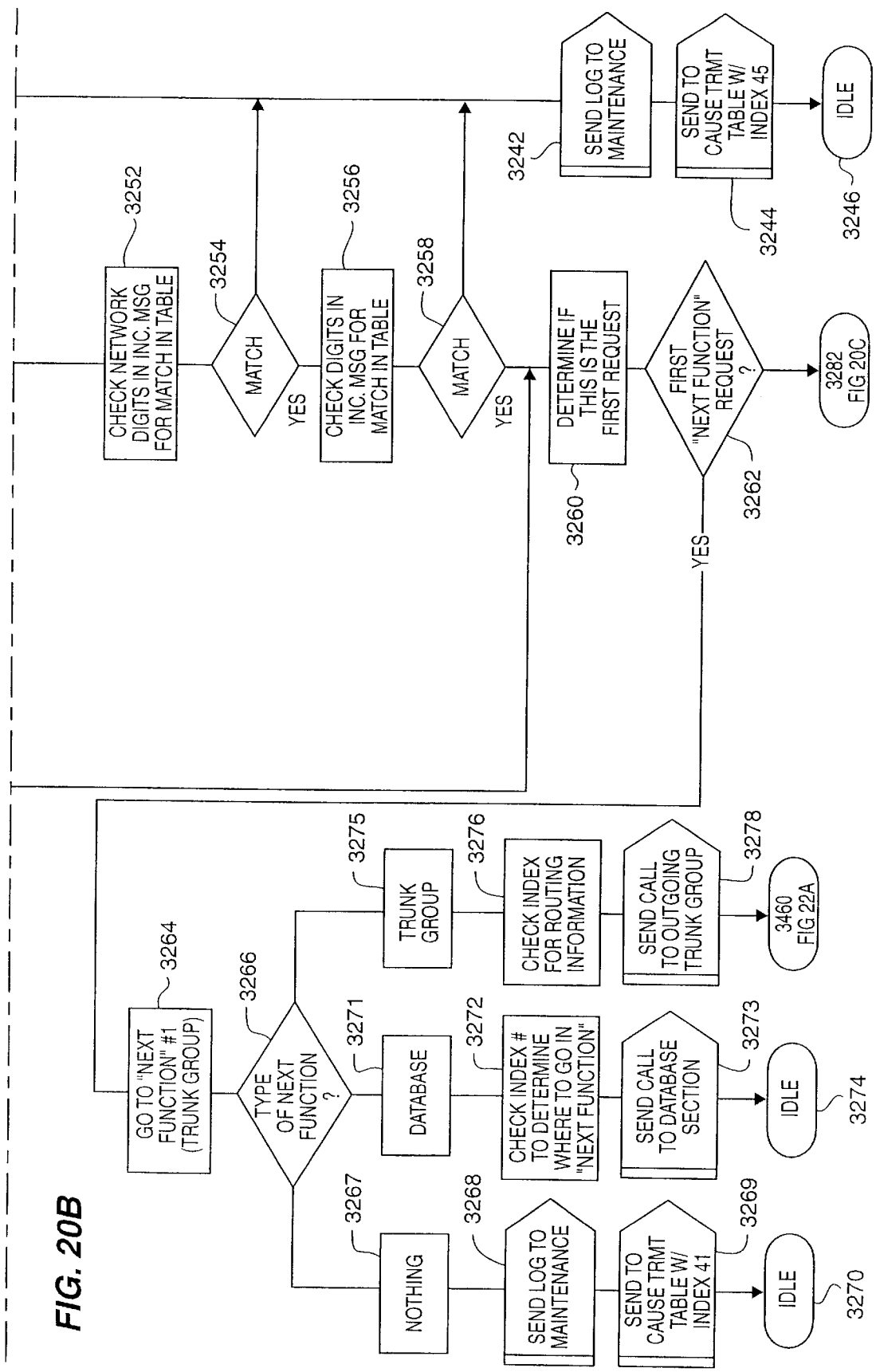

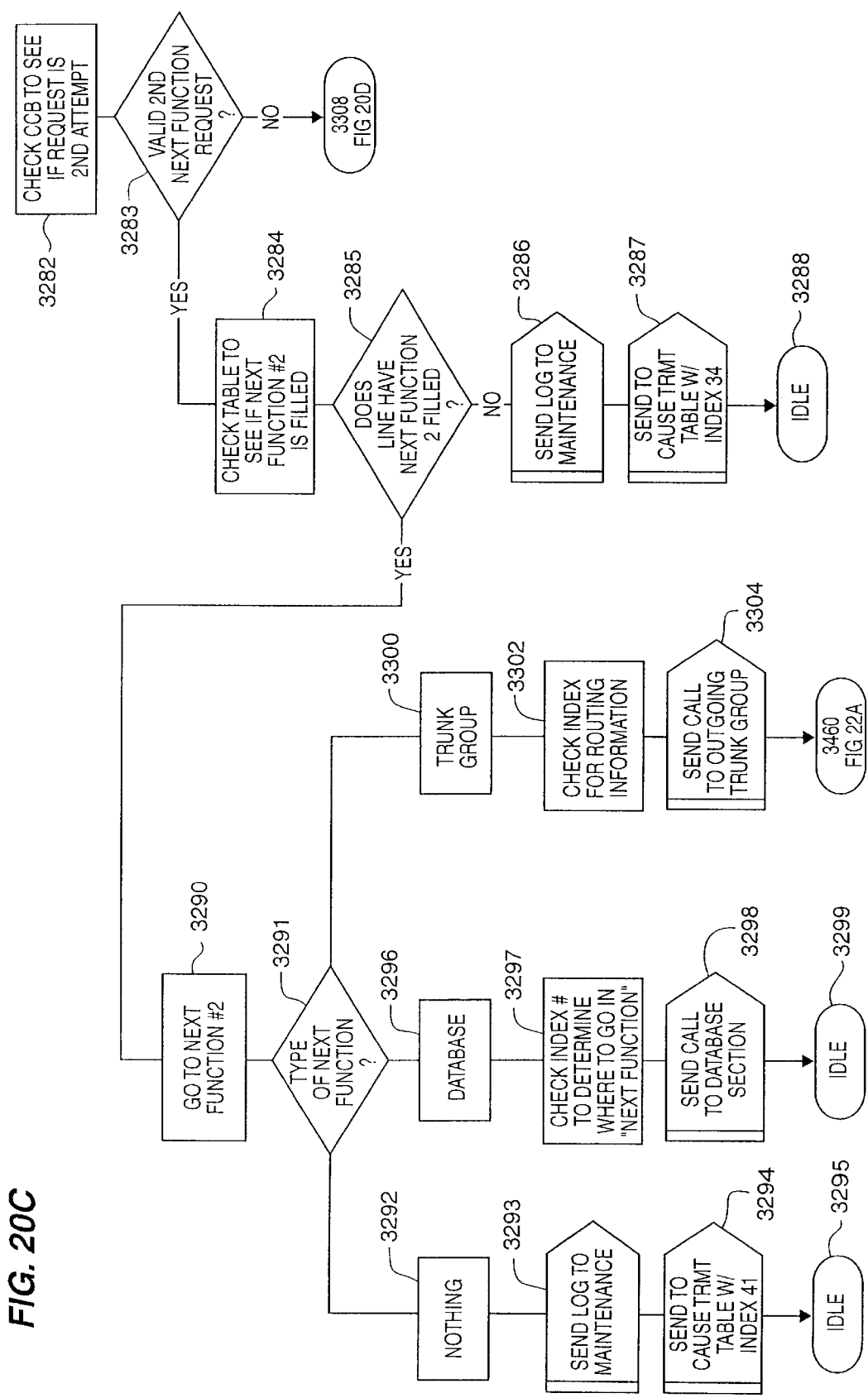

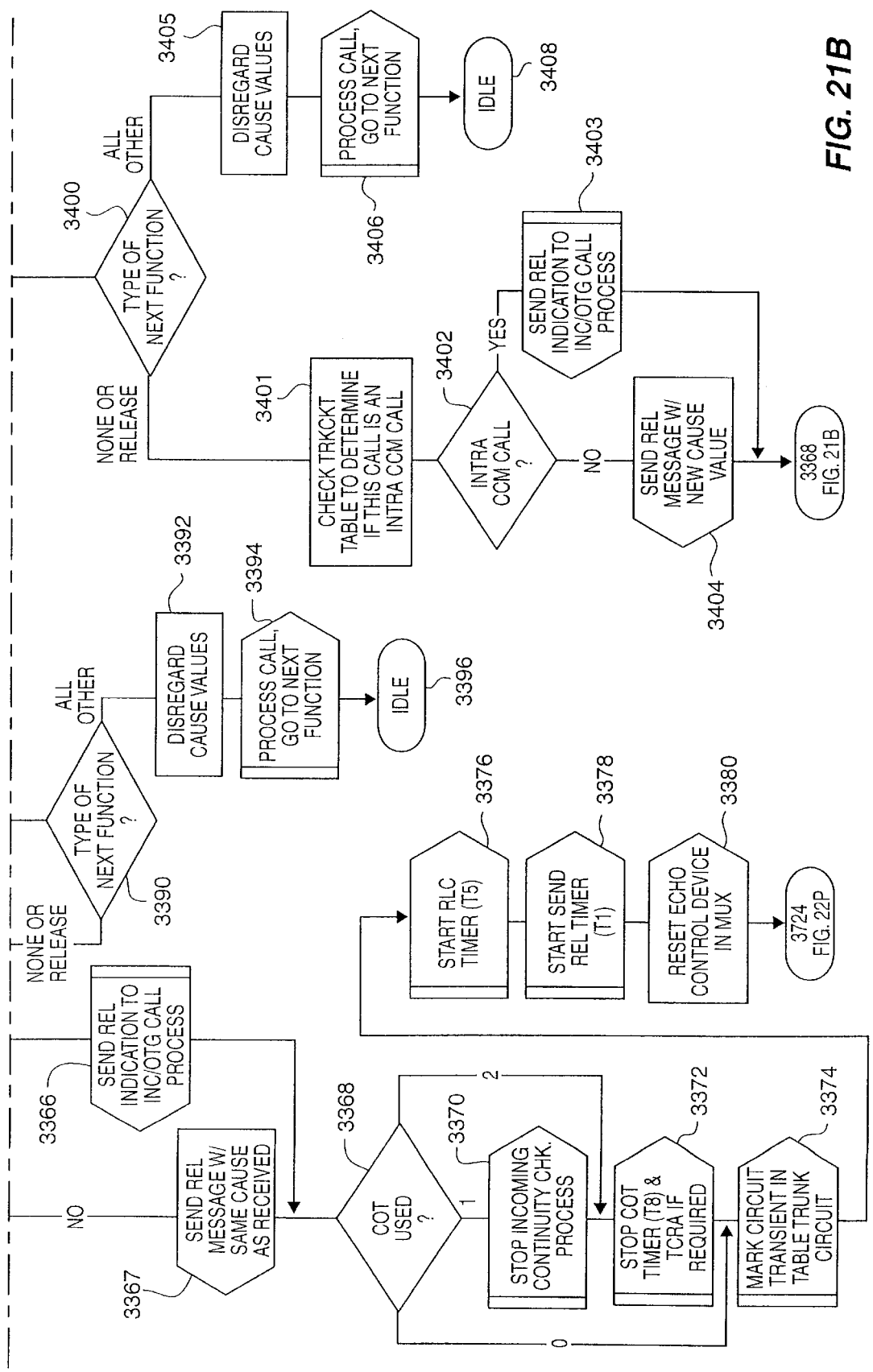

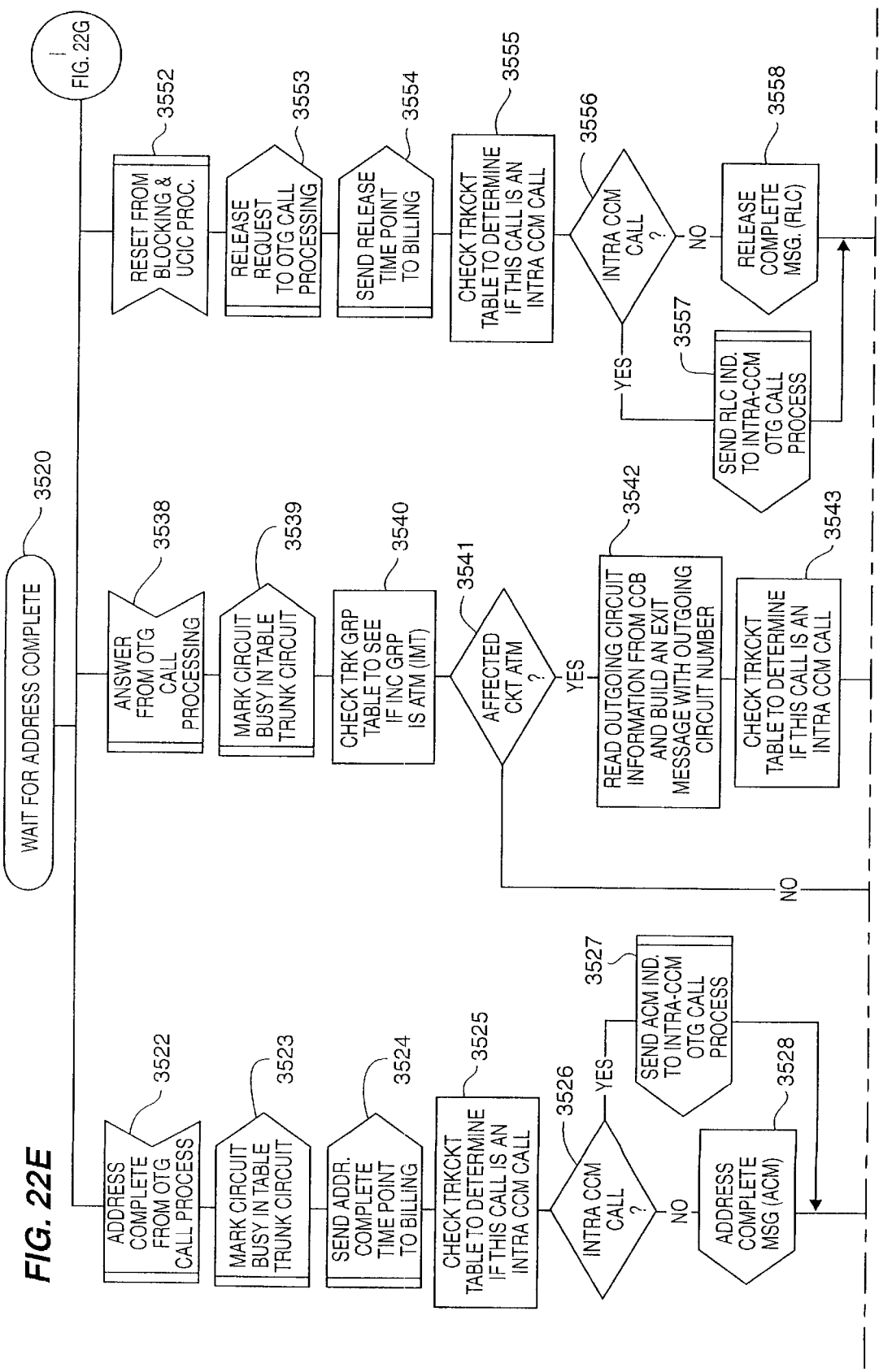

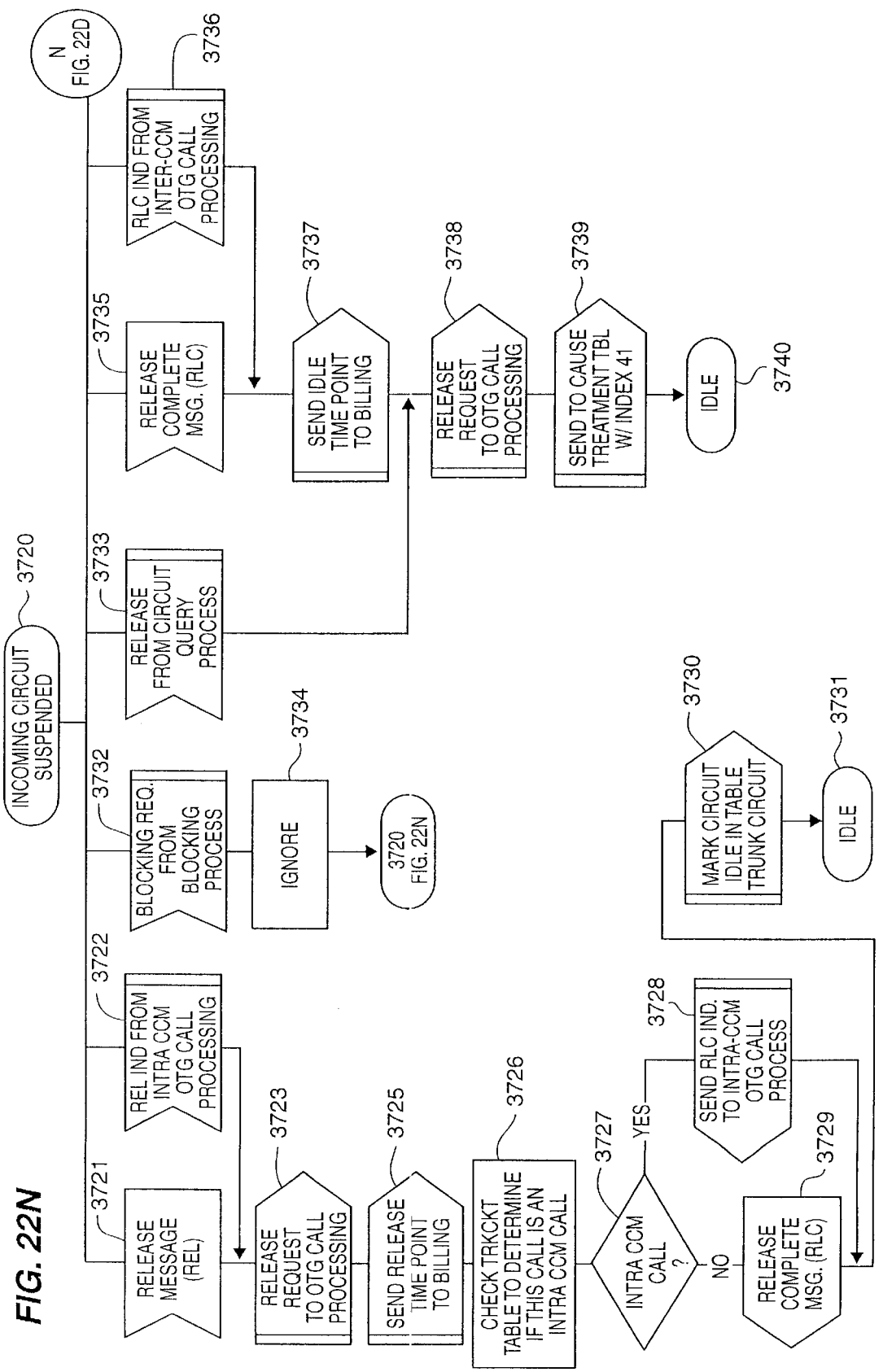

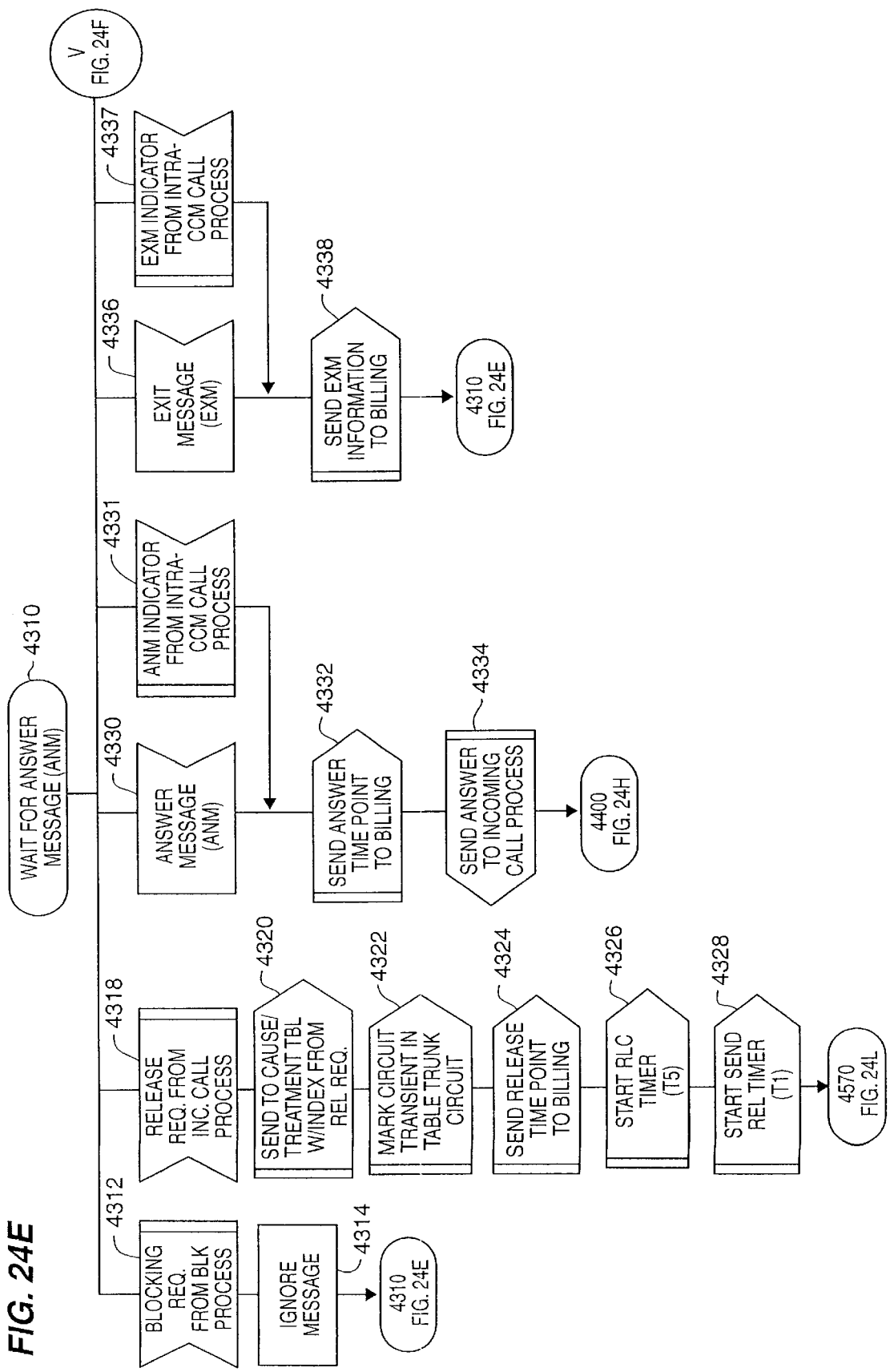

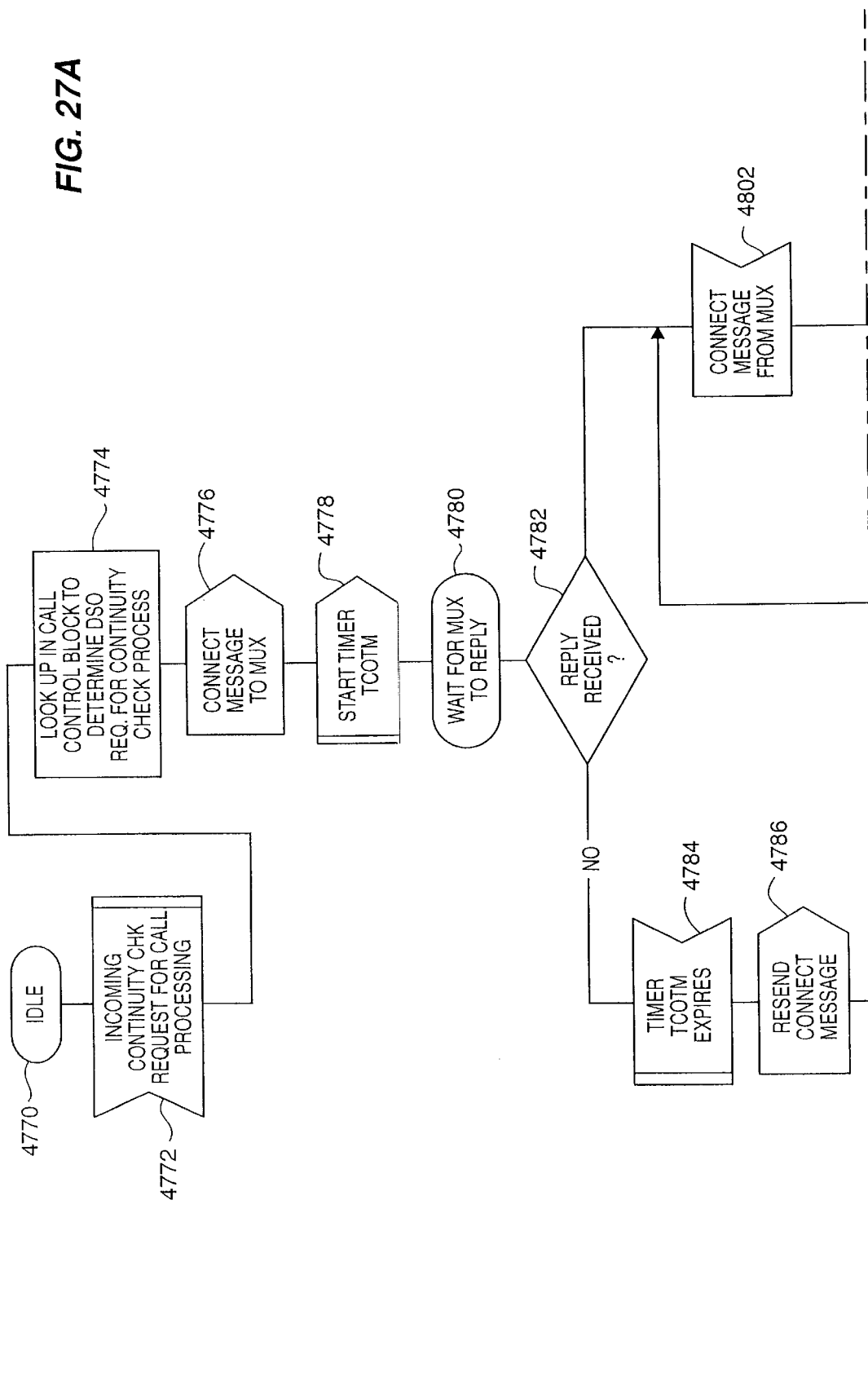

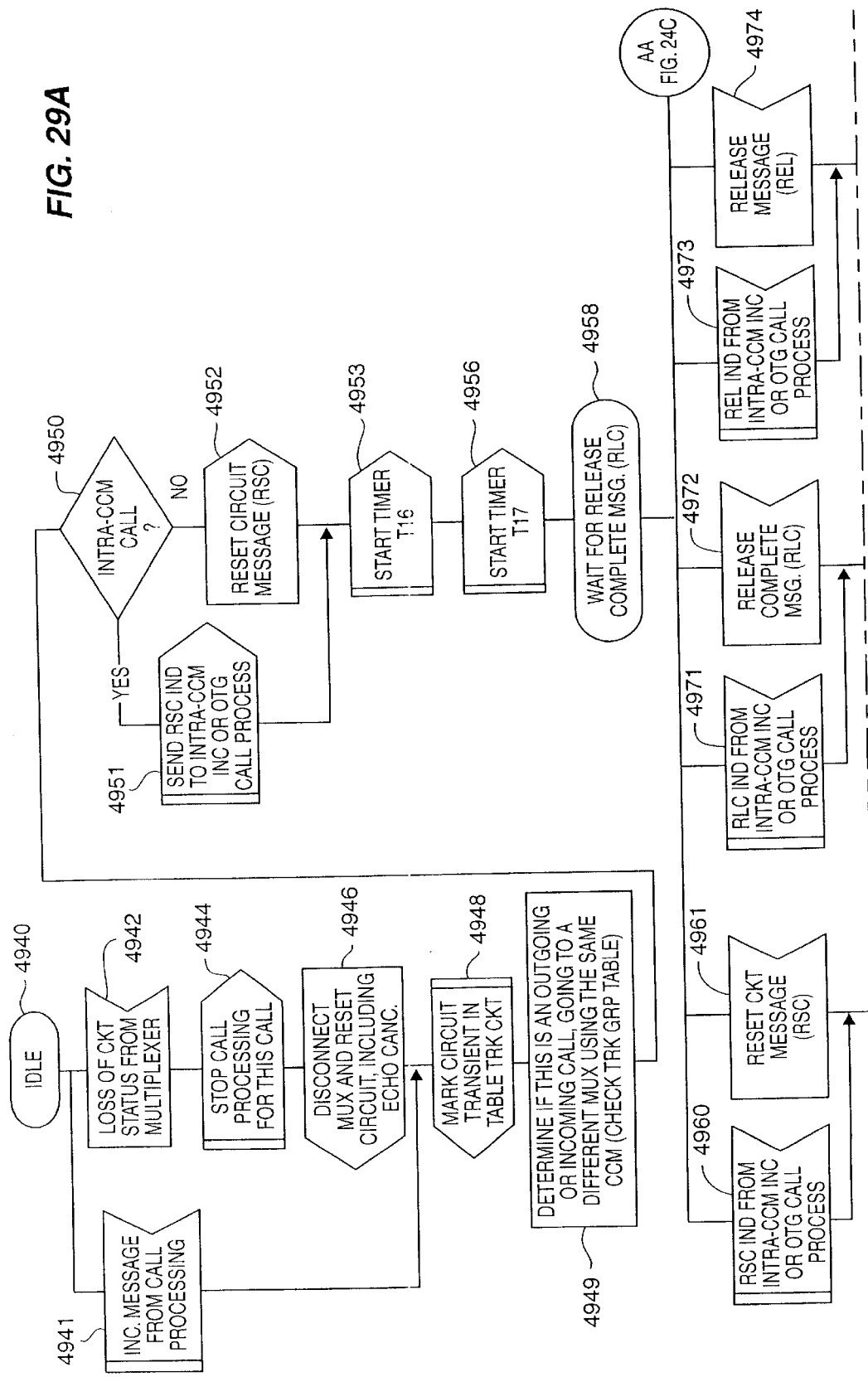

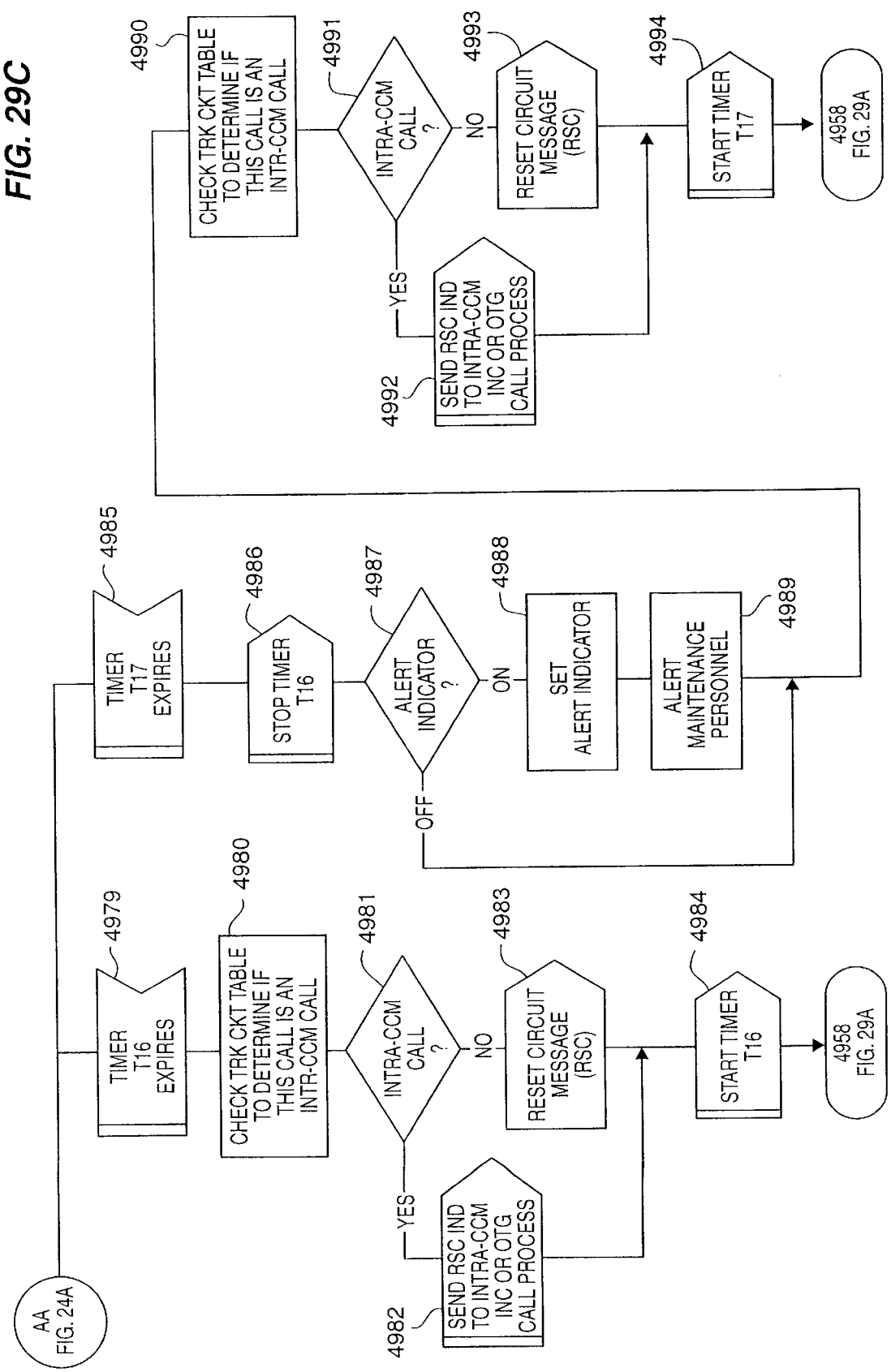

TELECOMMUNICATIONS SYSTEM

RELATED APPLICATIONS

This application is a continuation of U.S. patent application Ser. No. 08/754,349 filed Nov. 22, 1996 now U.S. Pat. No. 6,031,840, which is a CIP of Ser. No. 08/568,551 filed Dec. 7, 1995 now U.S. Pat. No. 5,823,780 which is a continuation of Ser. No. 08/238,605 filed May 5, 1994, abandoned

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the processing of telecommunications signaling in order to establish communications paths, and in particular, to processing Signaling System #7 (SS7) signaling messages to establish communications paths.

2. Background of the Prior Art

A telephone call typically comprises both call signaling and caller information. Call signaling is typically data (i.e. the called number) that is used by the switches to establish call connections. The call connections carry the caller information (i.e. voice). A telecommunications switch contains a processor that can process telecommunications signaling in order to select call connections. These switches also contain a switching matrix that can establish the selected connections. The combination of the signaling processor and the switching matrix in the switch is problematic. Additional cost and complexity are added by the matrix. Signaling processors are needed that are not combined with the switching matrix.

In the United States, the predominant form of telecommunications signaling is Signaling System #7 (SS7). In addition, Asynchronous Transfer Mode (ATM) equipment is being developed to transport all types of traffic at high speeds over Synchronous Optical Network (SONET) connections. Signaling processors are needed that can process SS7 signaling and select ATM connections.

SUMMARY OF THE INVENTION

The present invention comprises a telecommunications signaling processor that processes Signaling System #7 (SS7) telecommunications signaling messages to select Asynchronous Transfer Mode (ATM) virtual connections and provide control messages indicating the selected ATM virtual connections. The signaling processor comprises: a computer system, data structures, originating process logic, and terminating process logic. The computer system stores data structures and executes stored logic. A call control data structure contains information pertinent to individual calls. A circuit data structure contains information pertinent to telecommunications connections. An exception data structure contains information pertinent to call route exceptions. A caller number data structure contains information pertinent to caller numbers. A called number data structure contains information pertinent to called numbers. A routing data structure contains information pertinent to route selections. Originating process logic is stored in the computer system and processes information from SS7 signaling messages that relates to an originating circuit and accesses the data structures to request a terminating ATM virtual connection. Terminating process logic is stored in the computer system and processes information from SS7 signaling messages to select the terminating ATM virtual connection in response to the request from the originating process.

BRIEF DESCRIPTION OF THE DRAWINGS

FIG. 7 is a logic table used in a version of the invention.
FIG. 8 is a logic table used in a version of the invention
FIG. 9 is a logic table used in a version of the invention.
FIG. 10 is a logic table used in a version of the invention.
FIG. 11 is a logic table used in a version of the invention.
FIG. 12 is a logic table used in a version of the invention.
FIG. 13 is a logic table used in a version of the invention.
FIG. 14 is a logic table used in a version of the invention.
FIGS. 19A–19C are SDL diagrams of logic used in a version of the invention.
FIGS. 20A–20D are SDL diagrams of logic used in a version of the invention.
FIGS. 21A–2D are SDL diagrams of logic used in a version of the invention.
FIGS. 24A–24M are SDL diagrams of logic used in a version of the invention.
FIGS. 27A–27D are SDL diagrams of logic used in a version of the invention.
FIGS. 29A–29C are SDL diagrams of logic used in a version of the invention.

DETAILED DESCRIPTION OF THE PREFERRED EMBODIMENT

Figure 1:
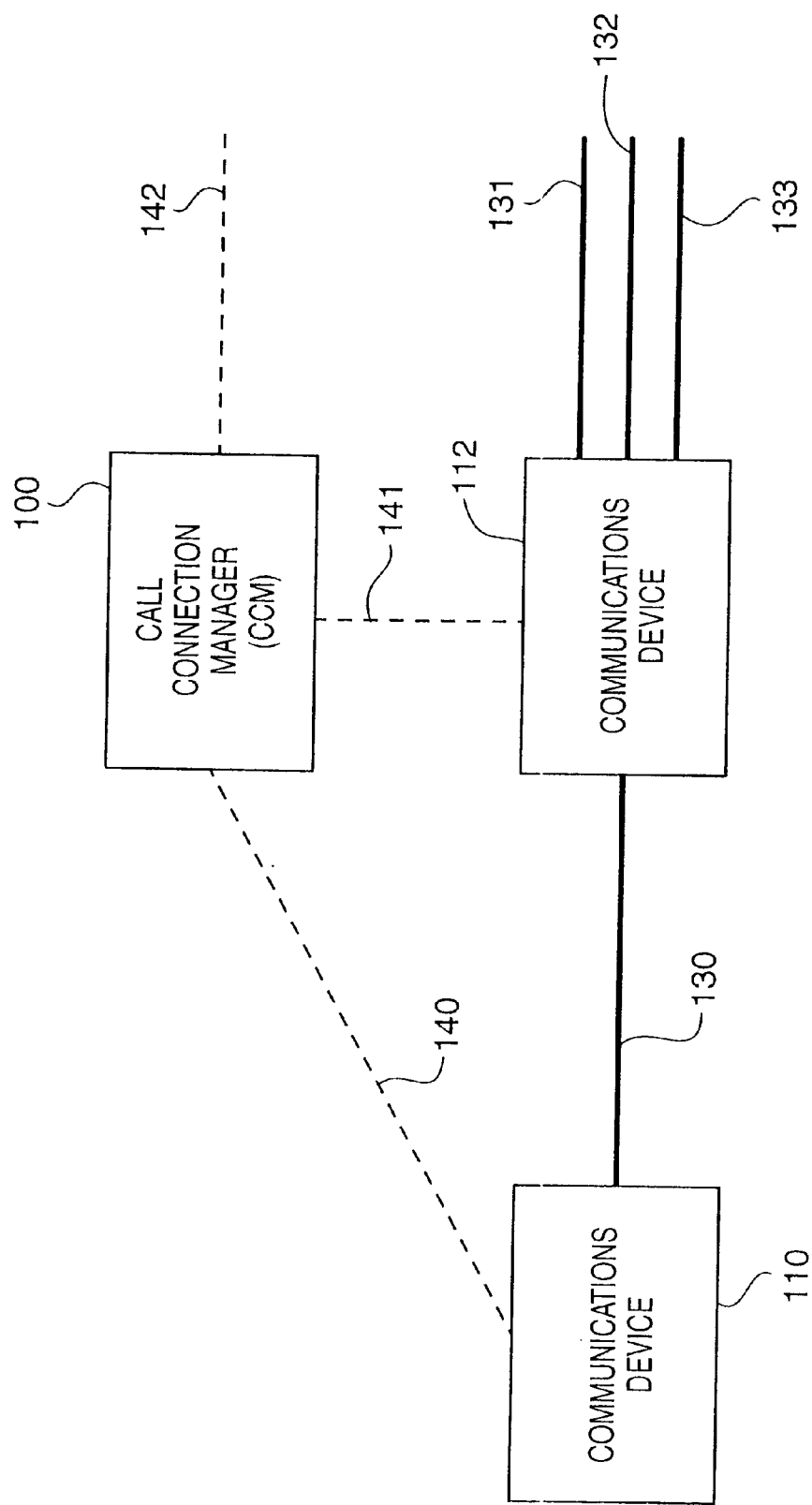
FIG. 1 is a block diagram of a version of the invention.

FIG. 1 depicts a version of the invention. Shown are Call/Connection Manager (CCM) 100, communications device 110, and communications device 112. Communications device 110 is connected to communications device 112 over connection 130. Communications device 112 is connected to other communications devices (not shown) over connections 131, 132, and 133. CCM 100 is linked to communications device 110 over link 140 and is linked to communications device 112 over link 141. CCM 100 is linked to other communications devices (not shown) over link 142.

Communications device 110 could be any device that facilitates communications through telecommunications signaling. Examples would include switches, service platforms, and customer premises equipment (CPE). Examples of switches are the Nortel DMS-250 and the Lucent 5ESS. Examples of service platforms are voice response units and host computers that deliver services, such as voice messaging or the use of calling cards. Examples of CPE are PBX devices, LAN devices, computers, telephones, and switches. All of these devices are known in the art.

Communications device 112 could be any device that can establish communications paths a in response to control instructions. Examples would be switches and ATM interworking multiplexers. Connection 130 could be any connection that supports communications between communications devices 110 and 112. Examples include Time Division Multiplex (TDM) connections such as DS3, DS1, DS0, E3, E1, and E0. Other examples include SONET, SDH, ATM, CDMA, GSM, PCS, and cellular connections. Connections 131–133 are similar, although they need not be the same as connection 130. All of these connections are known in the art.

CCM 100 is a telecommunications signaling processor. Signaling System #7 (SS7) is a well known form of telecommunications signaling. SS7 signaling includes information exchanged among the communications devices that facilitates the establishment of communications paths for users. The communications paths are typically comprised of a set of connections between communications devices. The signaling processor receives signaling, processes the signaling to select the connections, and sends control instructions to at least one communications device to implement the connections. A detailed description of CCM 100 follows further below.

Links 140–142 are any links capable of transferring signaling or control messages among the CCM and the communications devices. Examples include SS7, ISDN, or UDP/IP (or TCP/IP) over ethernet. A bus structure could also be used in some instances. Although not shown for reasons of clarity, several intermediary devices might be used to route the signaling over the links, such as routers, STPs, or signaling converters. These devices and links are known in the art.

The invention operates as follows. Communications device 110 requests a communications path by sending signaling over link 140. The signaling is received by CCM 100, and if required, it is converted into SS7. CCM 100 processes the signaling and selects a connection, for example connection 132. CCM 100 generates a control instruction identifying connections 130 and 132 and sends it to communications device 112 over link 141.

Communications device 110 typically seizes a connection to communications device 112 (this connection is represented by connection 130). CCM 100 could also select this connection and instruct communications device 112 to use connection 130. Communications device 112 extends the communications path from connection 130 to connection 132 in response to the control instruction from CCM 100. CCM 100 may also send additional signaling over link 142 to facilitate further extension of the communications path. As a result of CCM 100 processing, a communications path is established from communications device 110 through communications device 112 over connections 130 and 132.

Figure 2:
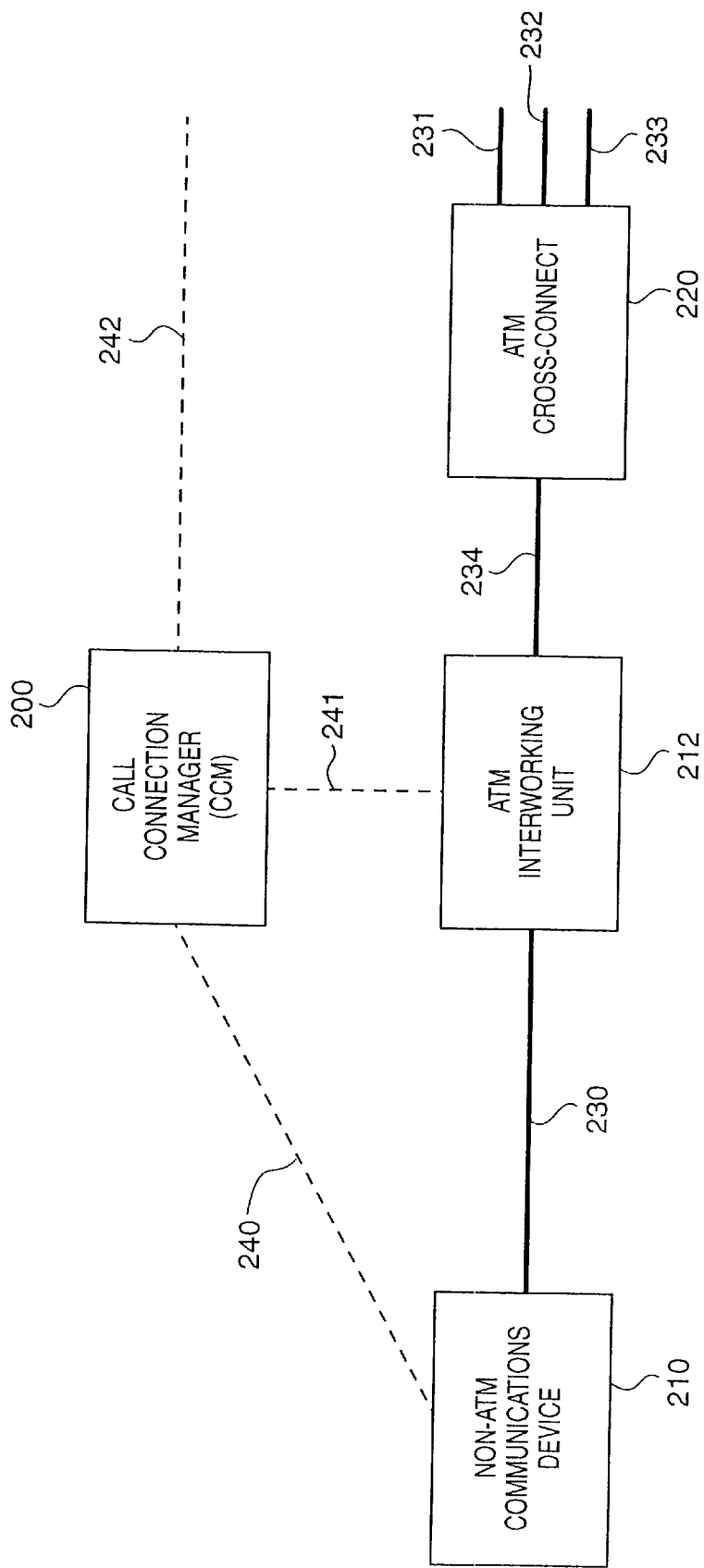
FIG. 2 is a block diagram of a version of the invention.

FIG. 2 depicts a particular version of the invention—although other versions are also contemplated. Shown are CCM 200, communications device 210, ATM Interworking Unit (IWU) 212, and ATM cross-connect 220. Communications device 210 is connected to ATM IWU 212 by connection 230. ATM IWU 212 is connected to ATM cross-connect 220 by connection 234. ATM cross-connect 220 is connected to other devices (not shown) over connections 231, 232, and 233. CCM 200 is linked to communications device 210 by link 240, to ATM IWU by link 241, and to other devices by link 242.

These elements are similar to those described above for the corresponding reference numbers of FIG. 1, except that communications device 112 has been replaced by ATM IWU 212, ATM cross-connect 220, and connection 234. Additionally, communications device 210 and connection 230 do not use ATM. ATM IWU 212 is a device that interworks (converts) non-ATM communications and ATM communications in response to control instructions from CCM 200. ATM cross-connect 220 is a device that provides a plurality of pre-provisioned ATM virtual connections to ATM IWU 212. Connections 231–233 each carry virtual connections. An example of ATM cross-connect 220 would be the NEC model 20. Connection 234 is an ATM connection.

In operation, non-ATM communications device 210 will request a communications path by sending signaling over link 240. CCM 200 will receive and process the signaling to select an ATM virtual connection. This ATM virtual connection would have already been provisioned through ATM cross-connect 220 to the appropriate destination. For example, virtual connection "A" might comprise a path within connections 234 and 232 interconnected by ATM cross-connect 220, and virtual connection "B" might comprise a path within connections 234 and 233 interconnected by ATM cross-connect 220. CCM 200 might select virtual connection "B" and provide a control instruction to ATM IWU 212 identifying connection 230 and virtual connection "B". ATM IWU 212 would interwork the non-ATM communications on connection 230 with the ATM communications on virtual connection "B". CCM 200 may also send additional signaling over link 242 to facilitate further extension of the call. As a result, a communications path is established from communications device 210 through ATM IWU 212 and ATM cross-connect 220 within connections 230, 234, and 233.

CCM 200, ATM IWU 212, and ATM cross-connect 220 are able to provide ATM virtual connections to multiple destinations. It is significant to point out that the invention can select and implement connections to multiple destinations on a call-by-call basis. CCM 200 can do this without controlling an ATM cross-connect or switch on a call-by-call basis. ATM cross-connect 220 is already configured to provide ATM connections to multiple destinations. CCM 200 can route a call by selecting an ATM connection and having ATM IWU 212 interwork the non-ATM and ATM connections.

In one embodiment, communications device 210 is a conventional circuit switch and connection 230 is a DS0 seized by the switch for a call. The switch (device 210)

would send an SS7 Initial Address Message (IAM) over link 240 to CCM 200. CCM 200 would process the IAM, for example, by examining the called number. CCM 200 would then select an ATM Virtual Path Identifier/Virtual Channel Identifier (VPI/VCI) representing a virtual connection provisioned through ATM cross-connect 220 to the appropriate destination. CCM 200 would send a control message to ATM IWU 212 over link 241 that identified the DS0 and the selected VPI/VCI. CCM 200 would also send another IAM to the destination over link 242. ATM IWU 212 would interwork the DS0 and the selected VPI/VCI in response to the control instruction. Interworking entails converting the DS0 into ATM cells and placing the VPI/VCI in the cell headers. As a result, a communications path is established from the switch (device 210) through ATM IWU 212 and ATM cross-connect 220 over the DS0 and selected VPI/VCI (connections 230, 234, and 232).

For a call in the reverse direction, CCM 200 would receive the IAM over link 242 and would select a DS0 to communications device 210. The VPI/VCI used on the call and the selected DS0 would be provided to ATM IWU 212 over link 241. ATM IWU 212 will interwork the VPI/VCI and the selected DS0 in response to the control instruction. As a result, a communications path is established to the switch (device 210) through ATM cross-connect 220 and ATM IWU 212 over the VPI/VCI and the selected DS0 (connections 232, 234, and 230). When combined with the above paragraph, it can be seen how end-to-end ATM connections could be provided between two switches through two ATM IWUs and the ATM cross-connect. CCMs would select the VPI/VCI and the outbound DS0. The first ATM IWU would interwork the incoming DS0 and the VPI/VCI. The second ATM IWU would interwork the VPI/VCI and the outbound DS0.

It is significant to point out that the switches could be provided with ATM virtual connections to appropriate destinations that are selected on a call-by-call basis. This can be accomplished without the need to control an ATM switching matrix or cross-connect on a call-by-call basis.

The ATM Interworking Unit

Figure 3:
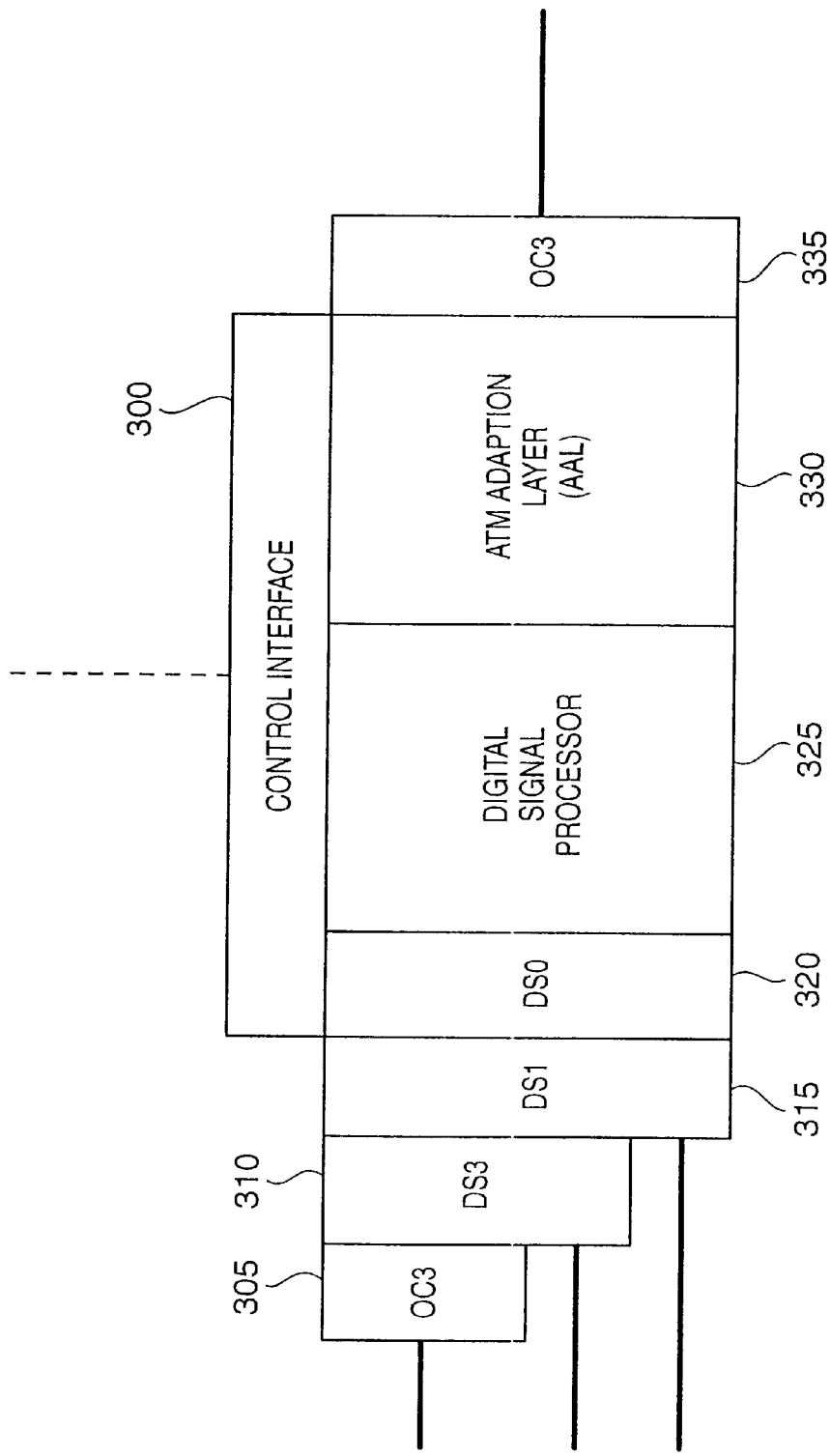
FIG. 3 is a block diagram of a version of the invention.

A preferred embodiment of the ATM IWU follows below. FIG. 3 shows one embodiment of an ATM interworking multiplexer (mux) that is a suitable ATM IWU for the present invention. Other versions of ATM IWU and muxes that support the requirements of the invention are also applicable. Shown are control interface 300, OC-3 interface 305, DS3 interface 310, DS1 interface 315, DS0 interface 320, digital signal processor 325, ATM adaption Layer (AAL) 330, and OC-3 interface 335.

Control interface 300 accepts messages from the CCM. In particular, control interface 300 provides DS0/virtual connection assignments to AAL 330 for implementation. Control interface 300 may accept control messages from the CCM with instructions for DS0 320. These instructions could be to connect DS0s to: 1) other DS0s, 2) digital signal processor 325, or 3) AAL 330 (bypassing digital signal processor 325). Control interface 300 may accept control messages from the CCM with instructions for digital signal processing 325. An example of such an instruction would be to disable an echo canceller on a particular connection.

OC-3 interface 305 accepts the OC-3 format and makes the conversion to DS3. DS3 interface 310 accepts the DS3 format and makes the conversion to DS1. DS3 interface 310 can accept DS3s from OC-3 interface 305 or from an external connection. DS1 interface 315 accepts the DS1 format and makes the conversion to DS0. DS1 interface 315 can accept DS1s from DS3 interface 310 or from an external connection. DS0 interface 320 accepts the DS0 format and provides an interface to digital signal processor 325 or AAL 330. In some embodiments, DS0 interface 320 could be capable of directly interconnecting particular DS0s. This could be the case for call entering and egressing from the same mux. This would also be useful to facilitate continuity testing by a switch. OC-3 interface 335 is operational to accept ATM cells from AAL 330 and transmit them, typically over the connection to a cross-connect.

Digital signal processor 325 is operational to apply various digital processes to particular DS0s in response to control instructions received through control interface 300. Examples of digital processing include: tone detection, tone transmission, loopbacks, voice detection, voice messaging, echo cancellation, compression, and encryption. In some embodiments, digital signal processing 325 could handle continuity testing. For example, the CCM may instruct the mux to provide a loopback for a continuity test and apply echo cancellation for a call. Digital signal processor 325 is connected to AAL 330. As discussed, DS0s from DS0 interface 320 may bypass digital signal processing 325 and be directly coupled to AAL 330.

AAL 330 comprises both a convergence sublayer and a segmentation and reassembly (SAR) layer. AAL 330 is operational to accept the user information in DS0 format from DS0 interface 320 or digital signal processor 325 and convert the information into ATM cells. AALs are known in the art and information about AALs is provided by International Telecommunications Union (ITU) document I.363. An AAL for voice is also described in patent application Ser. No. 08/395,745, filed on Feb. 28, 1995, entitled "Cell Processing for Voice Transmission", and hereby incorporated by reference into this application. AAL 330 obtains the virtual path identifier (VPI) and virtual channel identifier (VCI) for each call from control interface 300. AAL 330 also obtains the identity of the DS0 for each call (or the DS0s for an N×64 call). AAL 330 then converts user information between the identified DS0 and the identified ATM virtual connection. Acknowledgments that the assignments have been implemented may be sent back to the CCM if desired. Calls with a bit rate that are a multiple of 64 kbit/second are known as N×64 calls. If desired, AAL 330 can be capable of accepting control messages through control interface 300 for N×64 calls.

As discussed above, the mux also handles calls in the opposite direction—from OC-3 interface 335 to DS0 interface 320. This traffic would have been converted to ATM by another mux and routed to OC-3 335 by the cross-connect over the selected VPI/VCI. Control interface 300 will provide AAL 330 with the assignment of the selected VPI/VCI to the selected outbound DS0. The mux will convert the ATM cells with the selected VPI/VCI in the cell headers into the DS0 format and provide it to the selected outbound DS0 connection.

A technique for processing VPI/VCIs is disclosed in patent application Ser. No. 08/653,852, filed on May 28,1996, entitled "Telecommunications System with a Connection Processing System", and hereby incorporated by reference into this application.

DS0 connections are bi-directional and ATM connections are typically uni-directional. As a result, two virtual connections in opposing directions will typically be required for each DS0. As discussed, this can be accomplished by provisioning the cross-connect with companion VPI/VCIs in the opposite direction as the original VPI/VCIs. On each call, the muxes would be configured to automatically invoke the particular companion VPI/VCI to provide a bi-directional virtual connection to match the bi-directional DS0 on the call.

The Signaling Processor

The signaling processor is referred to as a call/connection manager (CCM), and it receives and processes telecommunications call signaling and control messages to select connections that establish communication paths for calls. In the preferred embodiment, the CCM processes SS7 signaling to select connections for a call.

In addition to selecting connections, the CCM performs many other functions in the context of call processing. It not only can control routing and select the actual connections, but it can also validate callers, control echo cancellers, generate billing information, invoke intelligent network functions, access remote databases, manage traffic, and balance network loads. One skilled in the art will appreciate how the CCM described below can be adapted to operate in the above embodiments.

Figure 4:
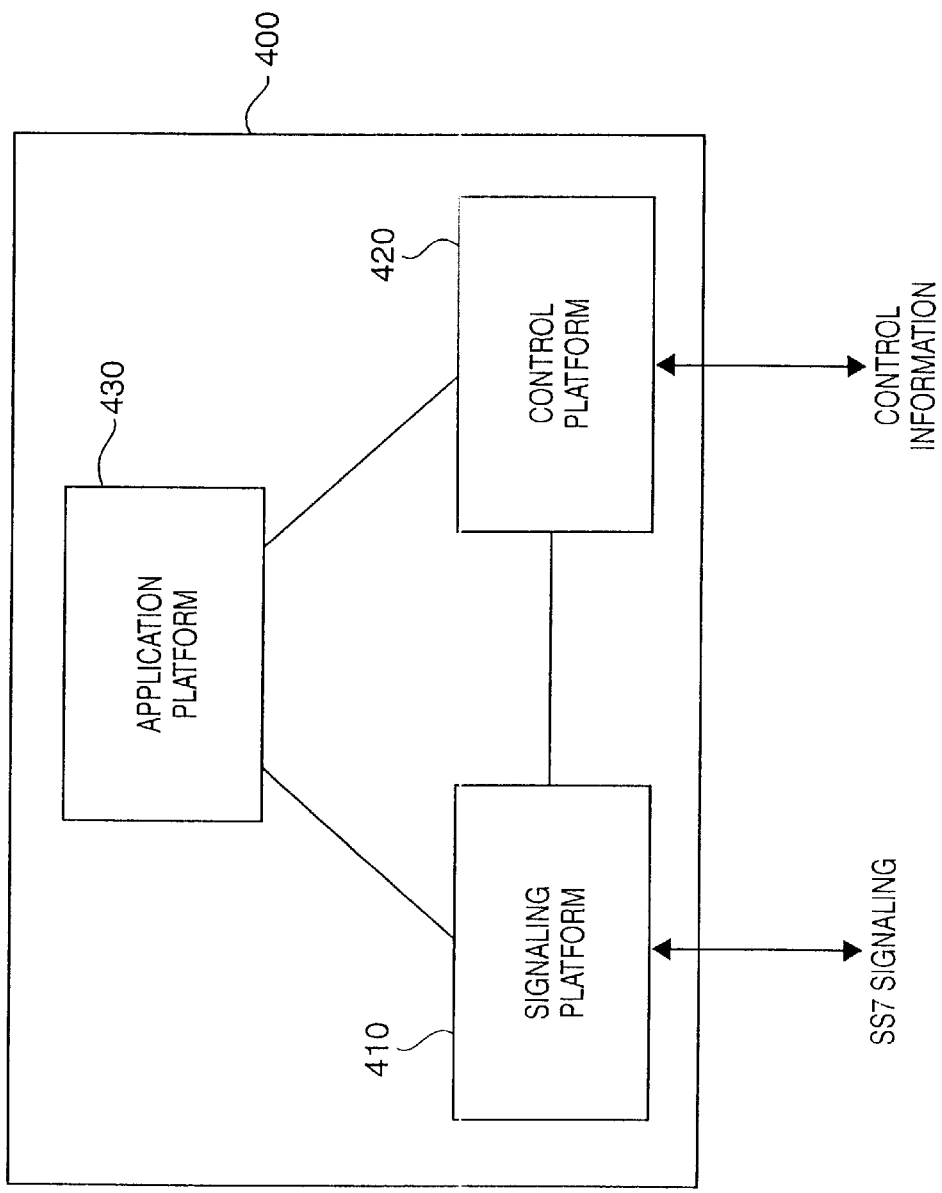
FIG. 4 is a block diagram of a version of the invention.

FIG. 4 depicts a version of the CCM. Other versions are also contemplated. In the embodiment of FIG. 4, CCM 400 controls an ATM interworking multiplexer (mux) that performs interworking of DS0s and VPI/VCIs. However, the CCM may control other communications devices and connections in other embodiments.

CCM 400 comprises signaling platform 410, control platform 420, and application platform 430. Each of the platforms 410, 420, and 430 is coupled to the other platforms.

Signaling platform 410 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 420 is externally coupled to a mux control, an echo control, a resource control, billing, and operations.

Signaling platform 410 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 420 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of CCM 400. One skilled in the art will appreciate how to produce the software for the interfaces in control platform 420.

Application platform 430 is functional to process signaling information from signaling platform 410 in order to select connections. The identity of the selected connections are provided to control platform 420 for the mux interface. Application platform 430 is responsible for validation, translation, routing, call control, exceptions, screening, and error handling. In addition to providing the control requirements for the mux, application platform 430 also provides requirements for echo control and resource control to the appropriate interface of control platform 420. In addition, application platform 430 generates signaling information for transmission by signaling platform 410. The signaling information might be ISUP, INAP, or TCAP messages to external network elements. Pertinent information for each call is stored in a call control block (CCB) for the call. The CCB can be used for tracking and billing the call.

Application platform 430 operates in general accord with the Basic Call Model (BCM) defined by the ITU. An instance of the BCM is created to handle each call. The BCM includes an originating process and a terminating process. Application platform 430 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for application platform 430 can be produced in specification and description language (SDL) defined in ITU-T Z.100. The SDL can be converted into C code. Additional C and C++ code can be added as required to establish the environment.

CCM 400 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 4, it can be seen that application platform 430 processes signaling information to control numerous systems and facilitate call connections and services. The SS7 signaling is exchanged with external components through signaling platform 410, and control information is exchanged with external systems through control platform 420. Advantageously, CCM 400 is not integrated into a switch CPU that is coupled to a switching matrix. Unlike an SCP, CCM 400 is capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
LAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 5:
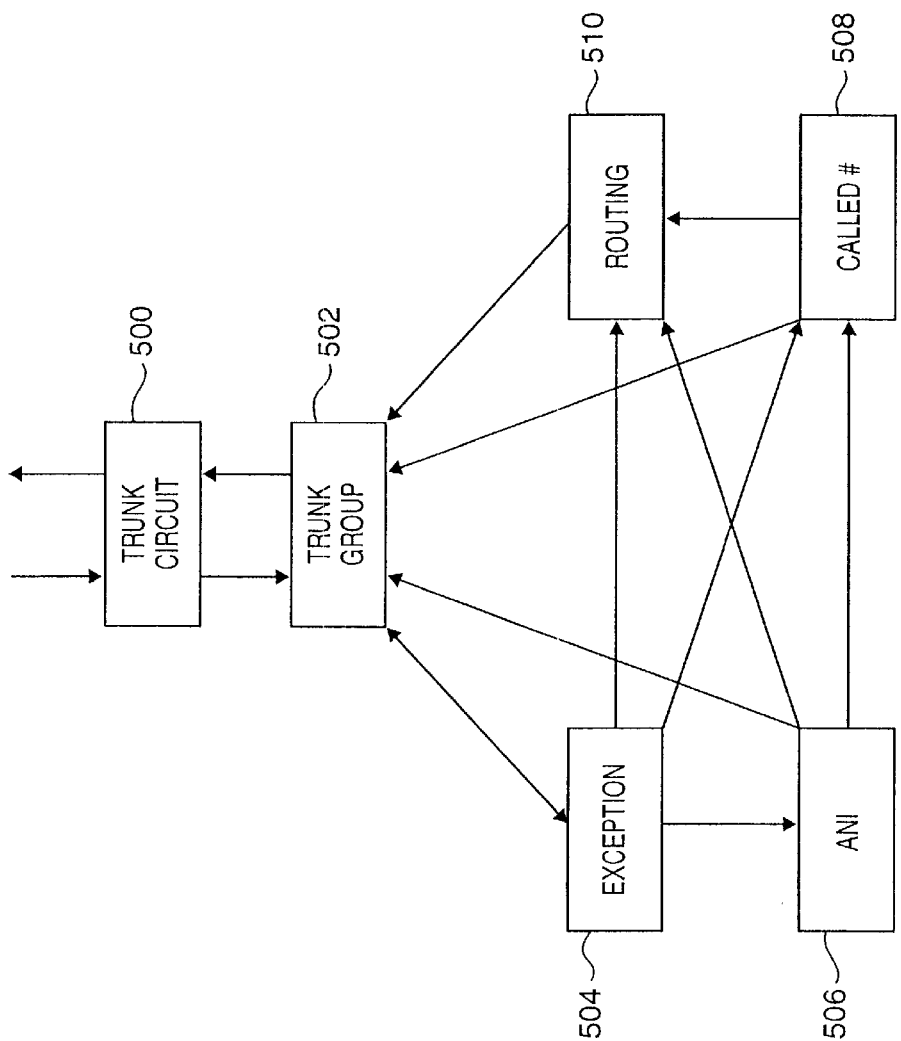
FIG. 5 is a logic diagram of a version of the invention.

FIG. 5 depicts a data structure used by application platform 430 to execute the BCM. This is accomplished through a series of tables that point to one another in various ways. The pointers are typically comprised of next function and next index designations. The next function points to the subsequent table, and the next index points to an entry or a range of entries in that table. The data structure has trunk circuit (TRK CKT) table 500, trunk group table 502, exception table 504, ANI table 506, called number table 508, and routing table 510.

Trunk circuit table 500 contains information related to the connections. Typically, the connections are DS0 or ATM connections. Initially, trunk circuit table 500 is used to retrieve information about the originating connection. Later, the table is used to retrieve information about the terminating connection. When the originating connection is being processed, the trunk group number in trunk circuit table 500 points to the applicable trunk group for the originating connection in trunk group table 502.

Trunk group table 502 contains information related to the originating and terminating trunk groups. When the originating connection is being processed, trunk group table 502 provides information relevant to the trunk group for the originating connection and typically points to exception table 504.

Exception table 504 is used to identify various exception conditions related to the call that may influence the routing or other handling of the call. Typically, exception table 504 points to ANI table 506. Although, exception table 504 may point directly to trunk group table 502, called number table 508, or routing table 510.

ANI table 506 is used to identify any special characteristics related to the caller's number. The caller's number is commonly known as automatic number identification (ANI). In an SS7 message, ANI information is carried in the calling party number field or the charge number field. ANI table 506 typically points to called number table 508. Although, ANI table 506 may point directly to trunk group table 502 or routing table 510.

Called number table 508 is used to identify routing requirements based on the called number. This will be the case for standard telephone calls. Called number table 508 typically points to routing table 510. Although, it may point to trunk group table 502.

Routing table 510 has information relating to the routing of the call for the various connections. Routing table 510 is entered from a pointer in either exception table 504, ANI table 506, or called number table 508. Routing table 510 typically points to a trunk group in trunk group table 502.

When exception table 504, ANI table 506, called number table 508, or routing table 510 point to trunk group table 502, they effectively select the terminating trunk group. When the terminating connection is being processed, the trunk group number in trunk group table 502 points to the trunk group that contains the applicable terminating connection in trunk circuit table 500.

The terminating trunk circuit is used to extend the call. The trunk circuit is typically a VPI/VCI or a DS0. Thus it can be seen that by migrating through the tables, a terminating connection can be selected for a call.

Figure 6:
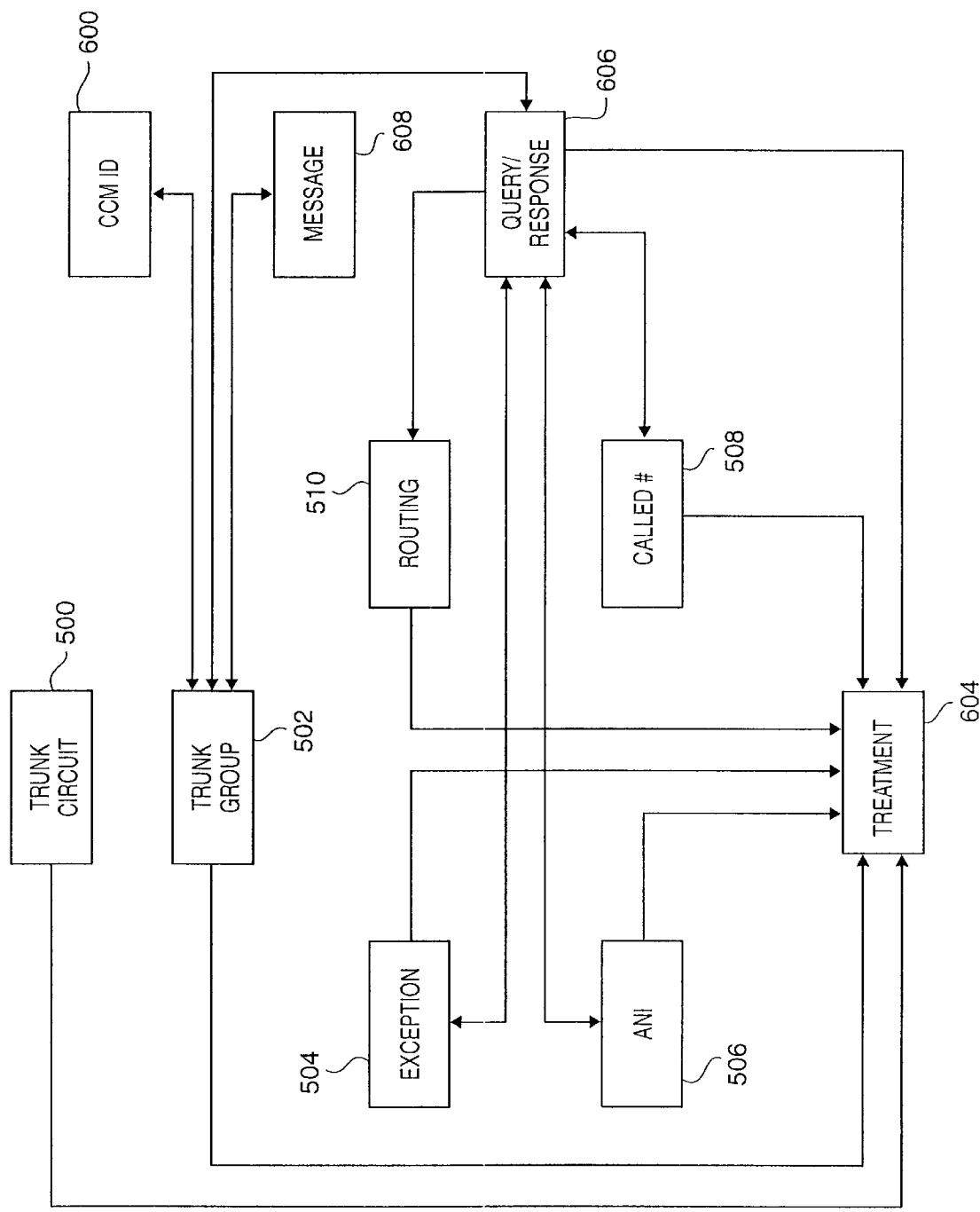
FIG. 6 is a logic diagram of a version of the invention.

FIG. 6 is an overlay of FIG. 5. The tables from FIG. 5 are present, but for clarity, their pointers have been omitted. FIG. 6 illustrates additional tables that can be accessed from the tables of FIG. 5. These include CCM ID table 600, treatment table 604, query/response table 606, and message table 608.

CCM ID table 600 contains various CCM SS7 point codes. It can be accessed from trunk group table 502, and it points back to trunk group table 502.

Treatment table 604 identifies various special actions to be taken in the course of call processing. This will typically result in the transmission of a release message (REL) and a cause value. Treatment table 604 can be accessed from trunk circuit table 500, trunk group table 502, exception table 504, ANI table 506, called number table 508, routing table 510, and query/response table 606.

Query/response table 606 has information used to invoke the SCF. It can be accessed by trunk group table 502, exception table 504, ANI table 506, called number table 508, and routing table 510. It points to trunk group table 502, exception table 504, ANI table 506, called number table 508, routing table 510, and treatment table 604.

Message table 608 is used to provide instructions for messages from the termination side of the call. It can be accessed by trunk group table 502 and points to trunk group table 502.

FIGS. 7–14 depict examples of the various tables described above. FIG. 7 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceller (EC) identification (ID) entry identifies the echo canceller for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 8 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 9 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+calls, 1+calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 10 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 11 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 9. The next function and next index point to the next table which is typically the routing table.

FIG. 12 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 7–12 that the tables can be configured and relate to one another in such a way that call processes can enter the trunk circuit table and can traverse through the tables by keying on information and using pointers. The yield of the tables is typically a terminating connection identified by the trunk circuit table. Typically, this connection is a voice path. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 13 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 14 depicts an example of the message table. This table allows the CCM to alter information in outgoing messages. Message type is used to enter the table, and it represents the outgoing standard SS7 message type. The field is the pertinent parameter within the outgoing SS7 message. The indexes point to various entries in the trunk group table and determine if parameters can be unchanged, omitted, or modified in the outgoing messages.

Initial Call Processing

The above-described tables essentially select a connection or treatment for a call during call set-up. The remaining figures detail the processing of the various SS7 signaling messages by the CCM. These figures use the well known SDL nomenclature. In SDL, rectangles indicate processes and diamonds represent decisions. Pointed rectangles represent messages sent and indented rectangles represent messages received. If a vertical line is included in the rectangle, the message is internal to the CCM. If no line is present, the message is external to the CCM. If the point or indent is on the left, the message is related to the origination side of the call. If the point or indent is on the right, the message is related to the termination side of the call. In the following discussion, a transition from one figure to another will be indicated by placing the new figure in parentheses.

Figure 15:
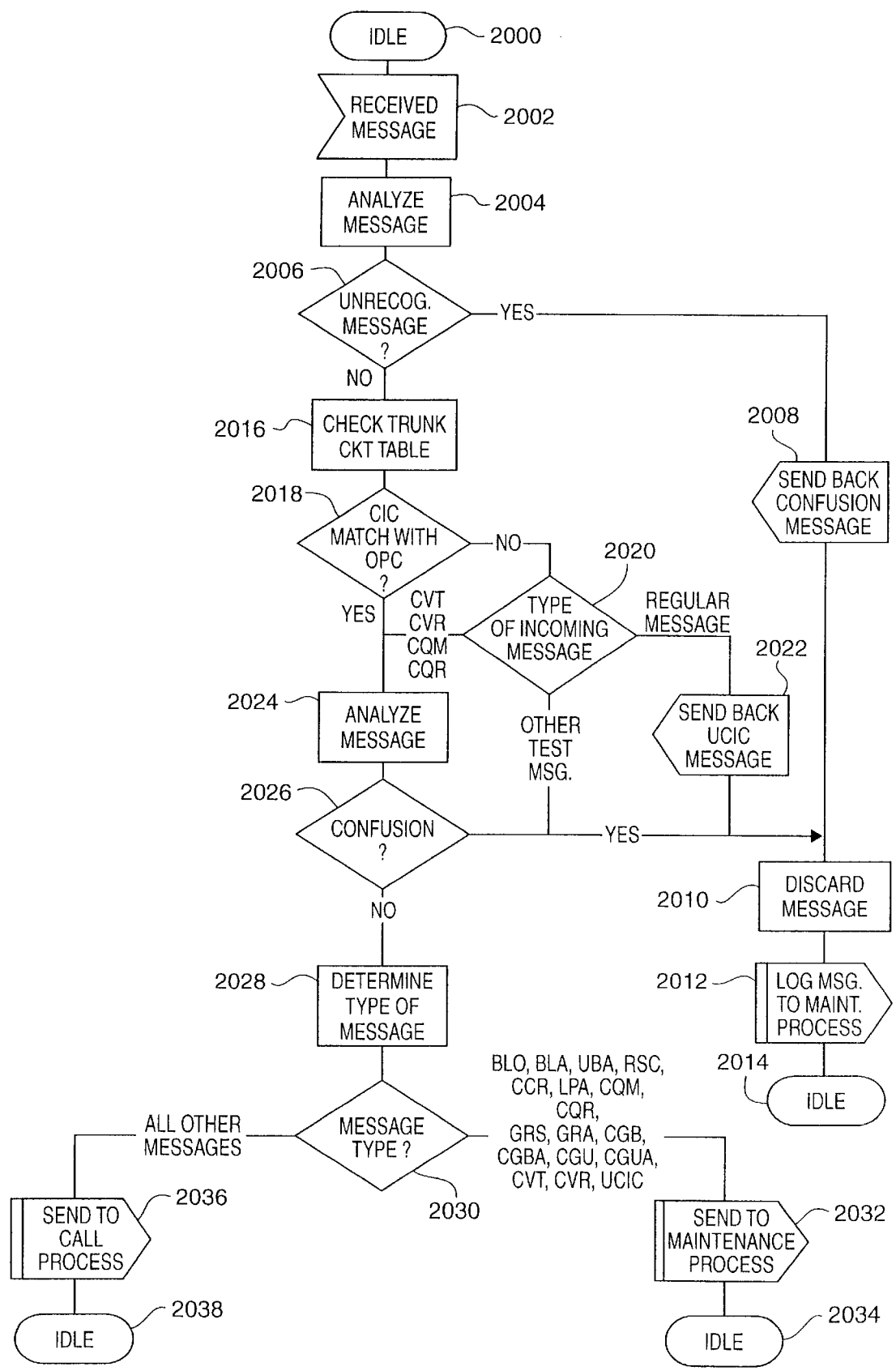
FIG. 15 is an SDL diagram of logic used in a version of the invention.

FIG. 15 entails the initial handling of all messages by the CCM. The process begins with step 2000 in the idle state. At 2002, a message is received and analyzed in 2004. If the message is unrecognized in 2006, then a confusion message is sent back in 2008, the message is discarded at 2010, maintenance process (maintenance) is informed with a message (msg) at 2012, and idle is attained at 2014. If the message is recognized at 2006, the trunk circuit (ckt) table is checked at 2016. If a CIC match is not found in 2018, then the message type is checked at 2020. If the message is regular, a UCIC message is sent back at 2022, and the message is discarded at 2010. If the message is a test message at 2020, it is discarded at 2010. If the message is a CVT, CVR, CQM, or CQR at 2020, or if a CIC match is found at 2018, then it is analyzed at 2024. If the process is confused by the message (i.e., it is garbled) at 2026, it is discarded at 2010. If it is not, message type is determined at 2028 and 2030. The following messages are sent to maintenance at 2032 before idle is attained at 2034: BLO, BLA, UBA, RSC, CCR, LPA, CQM, CQR, GRS, GRA, CGB, CGBA, CGU, CGUA, CVT, CVR, and UCIC. All other messages are sent to call processing at 2036 before the idle state is attained at 2038. Step 2036 also means that an instance of a BCM is created to process the call.

The BCM is comprised of a process that handles the incoming side of the call. This known as an originating call process. The originating process receives messages and processes information related to the incoming side of the call. The BCM is also comprised of a process that handles the outgoing side of the call—the terminating process. The terminating process receives messages and processes information related to the outgoing side of the call.

Calls may be referred to as "intra-CCM" calls. This is where the same CCM is controlling both ends of a call connection. The call messages for intra-CCM calls may be referred to as "internal" messages. If the call is not an intra-CCM call, the call messages are referred in their normal fashion or as "external" messages.

Trunk Circuit and Group Table Processing for Incoming Calls

Figure 16A:
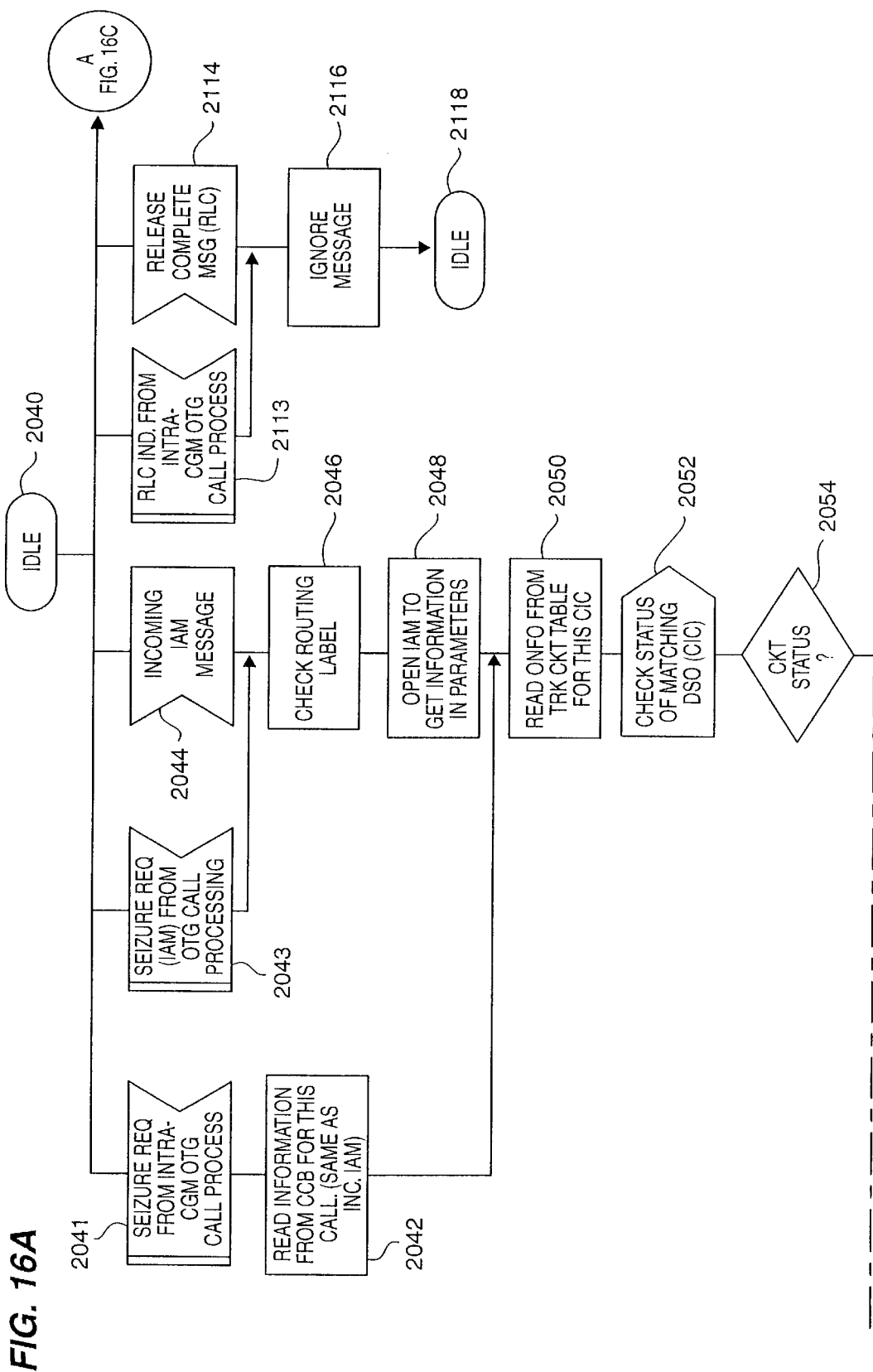
FIGS. 16A–16P are SDL diagrams of logic used in a version of the invention.
Figure 16B:
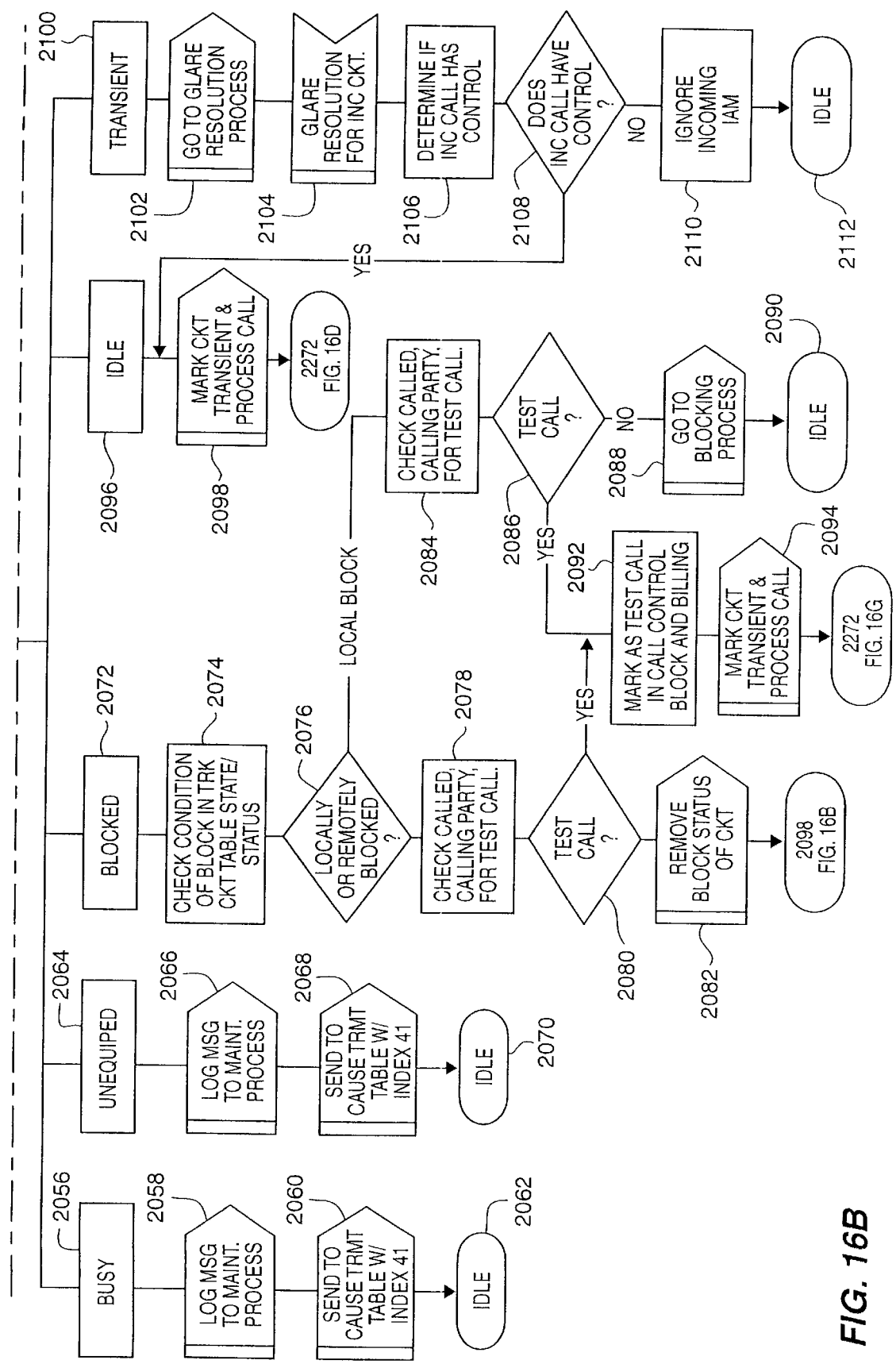
Figure 16D:
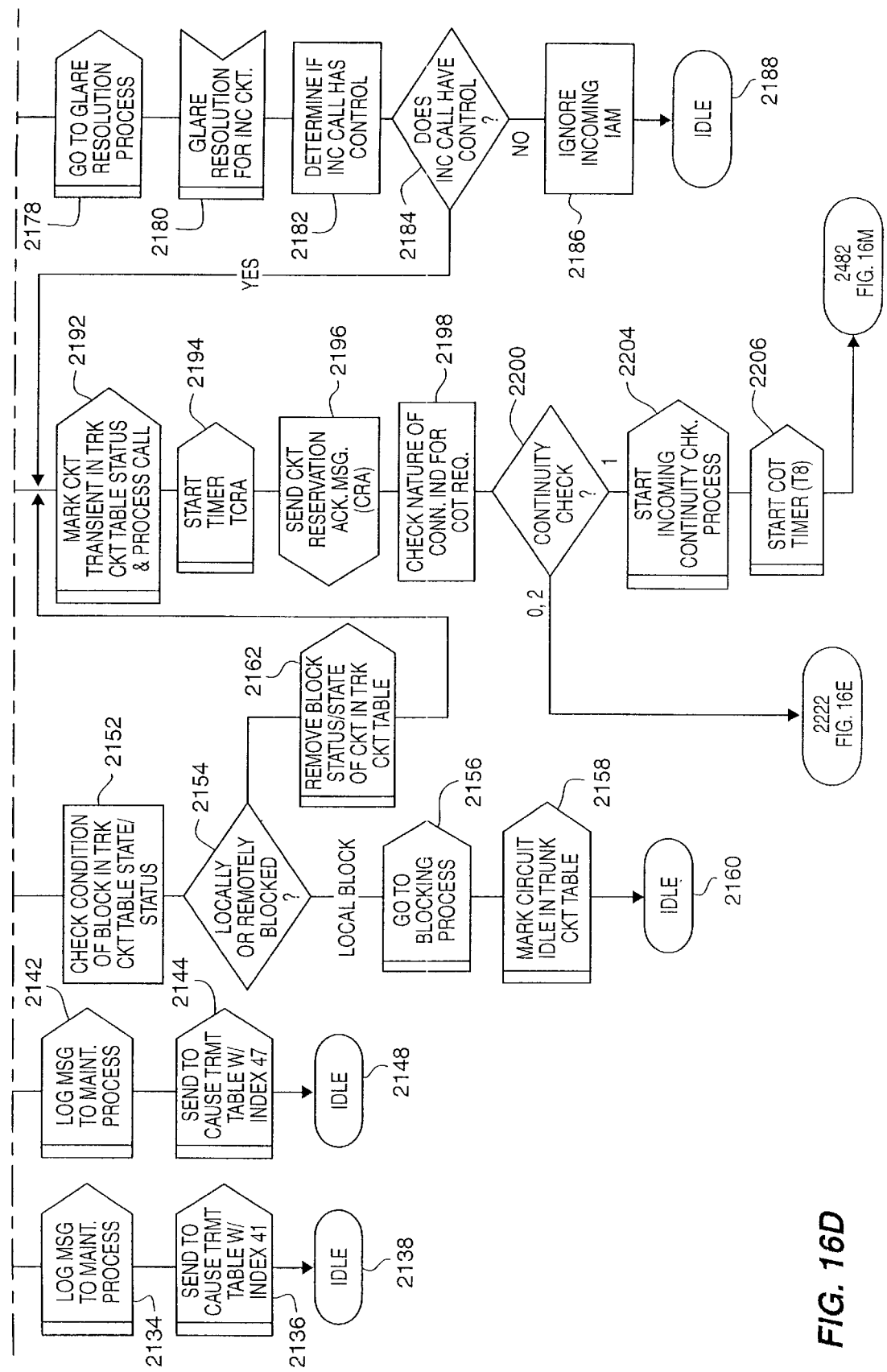
Figure 16E:
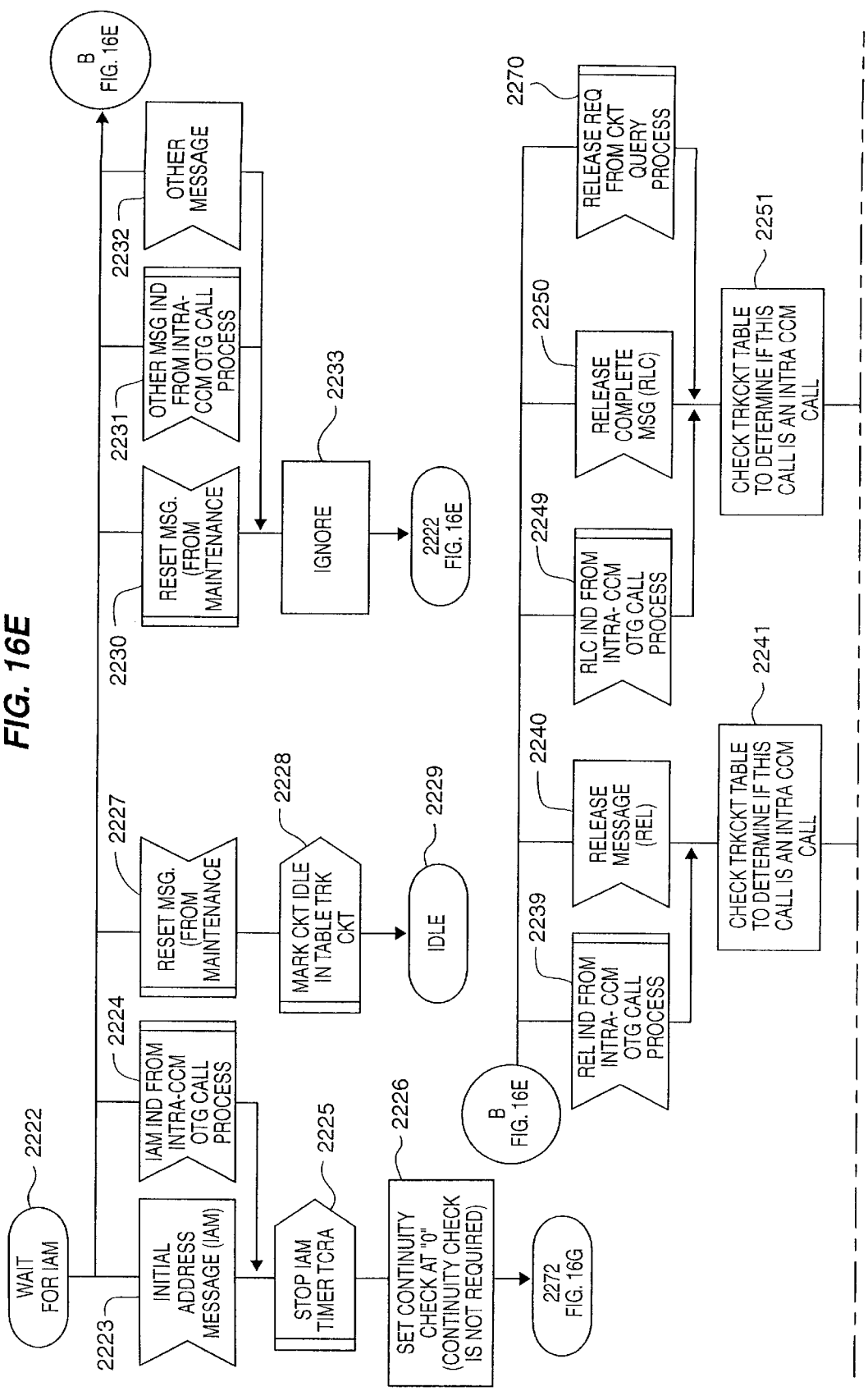
Figure 16F:
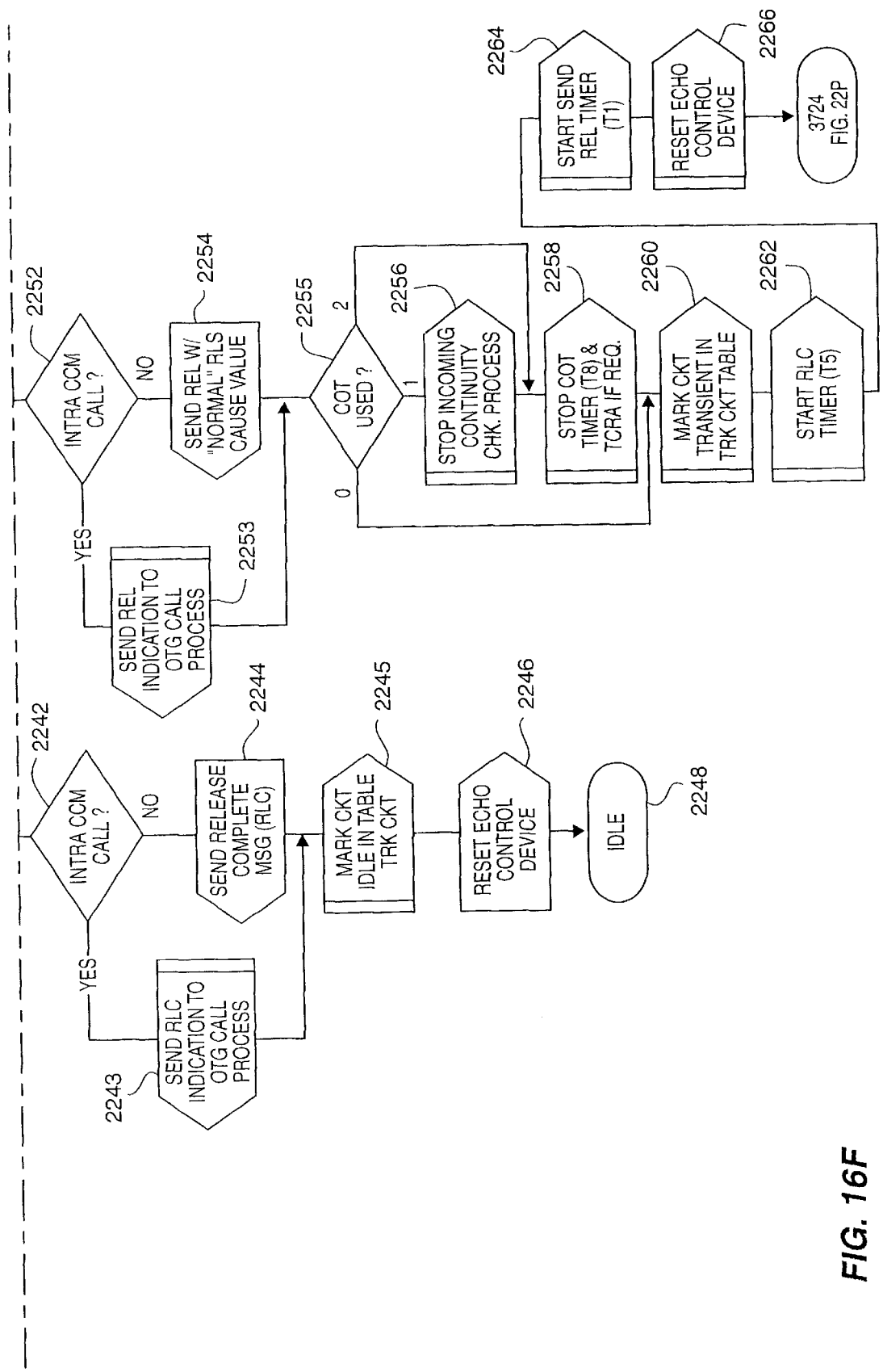
Figure 16G:
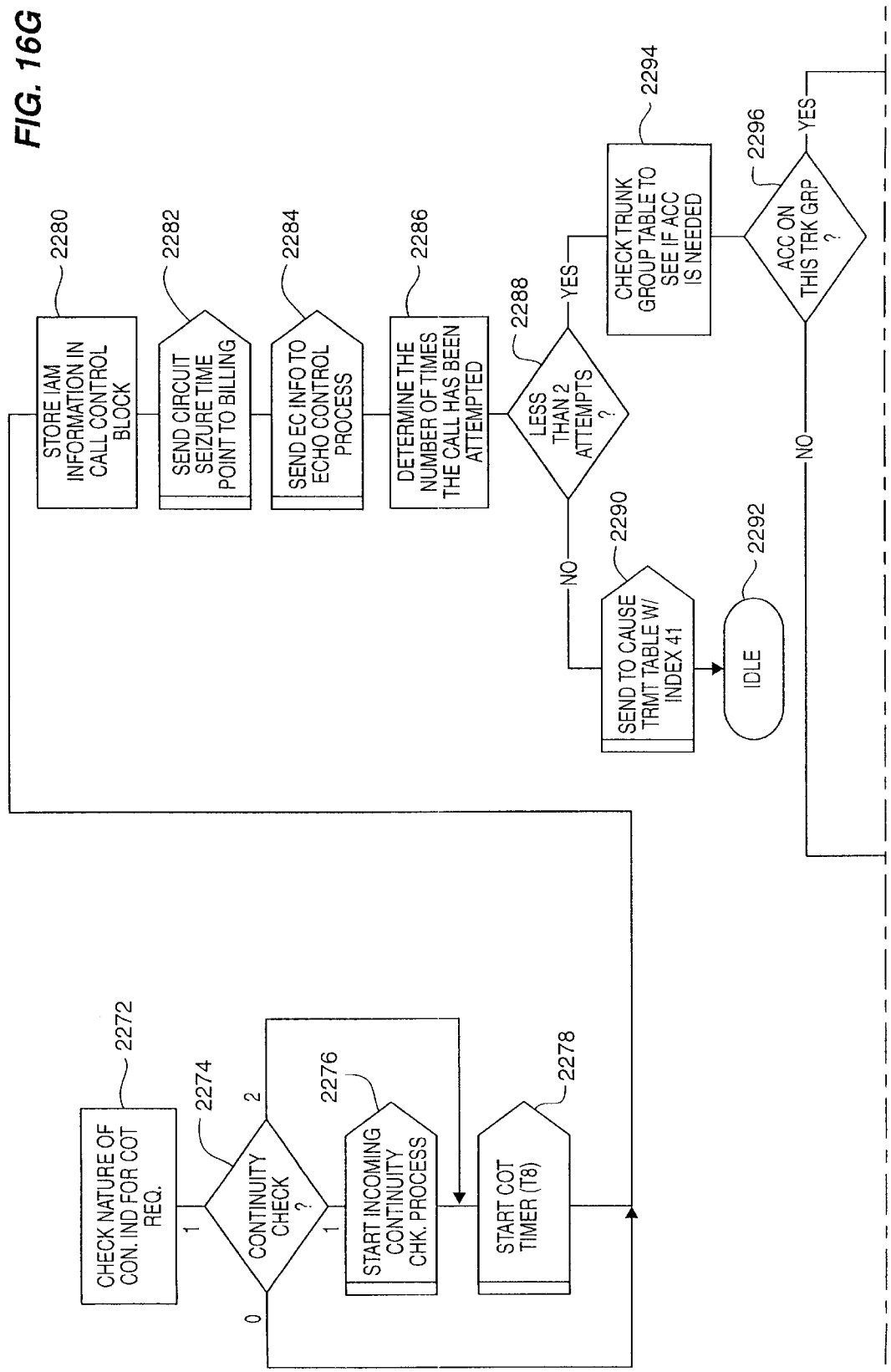
Figure 16H:
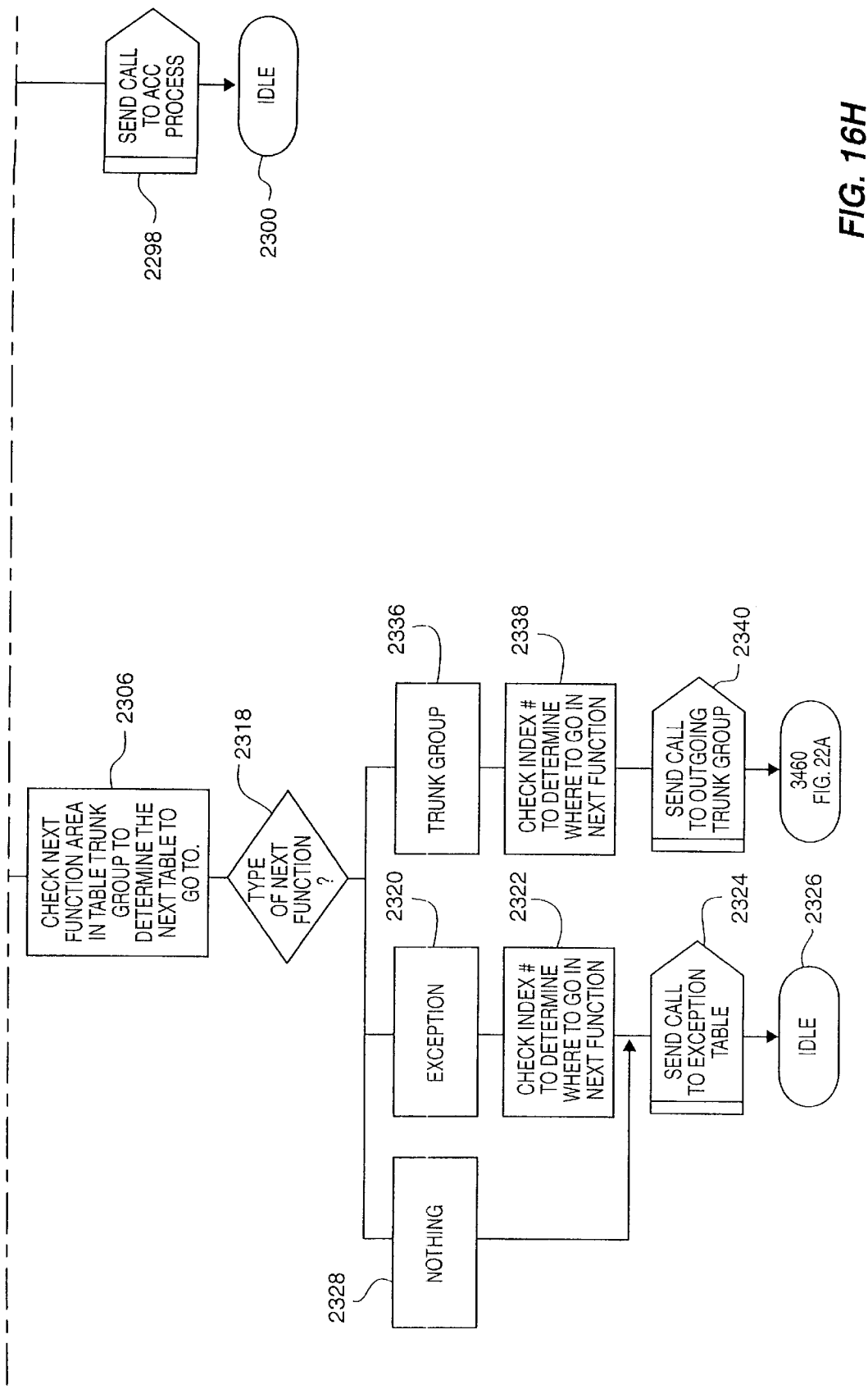
Figure 16I:
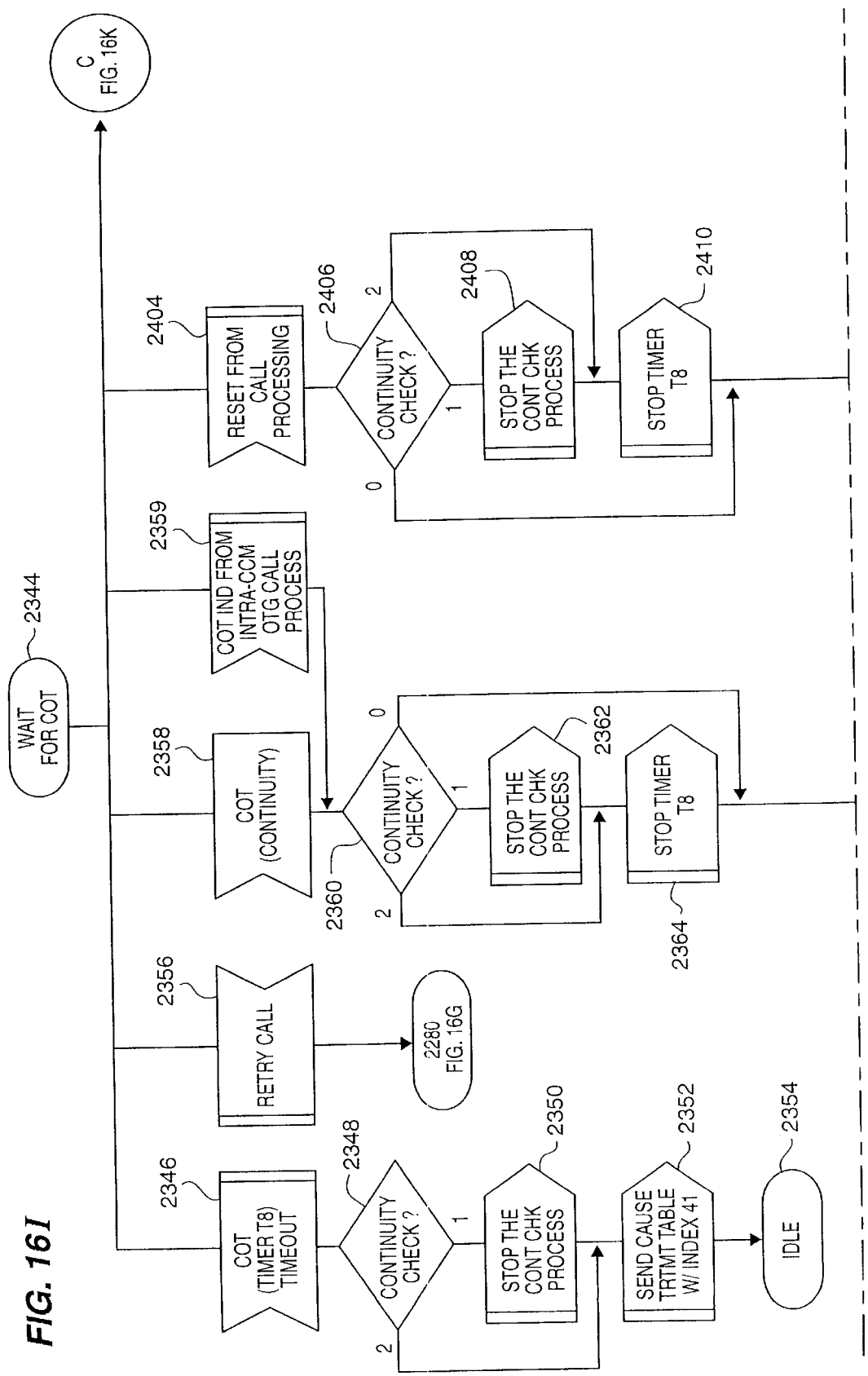
Figure 16J:
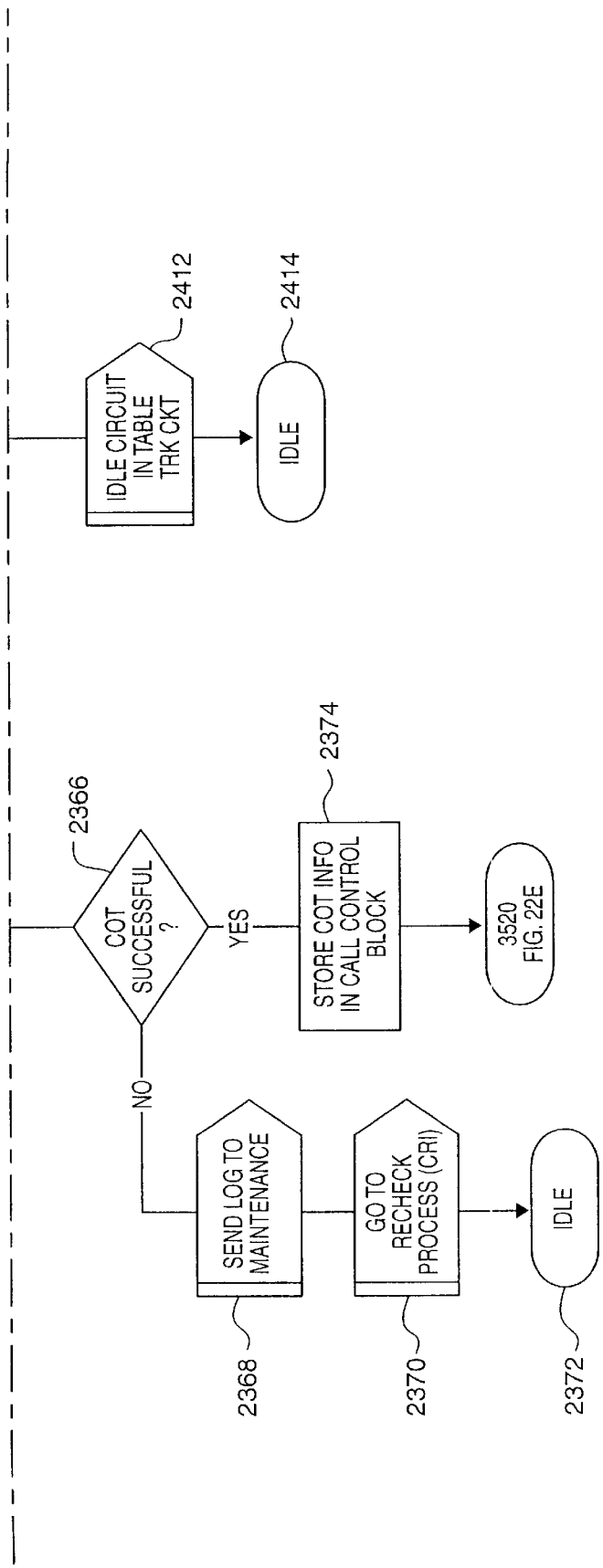
Figure 16L:
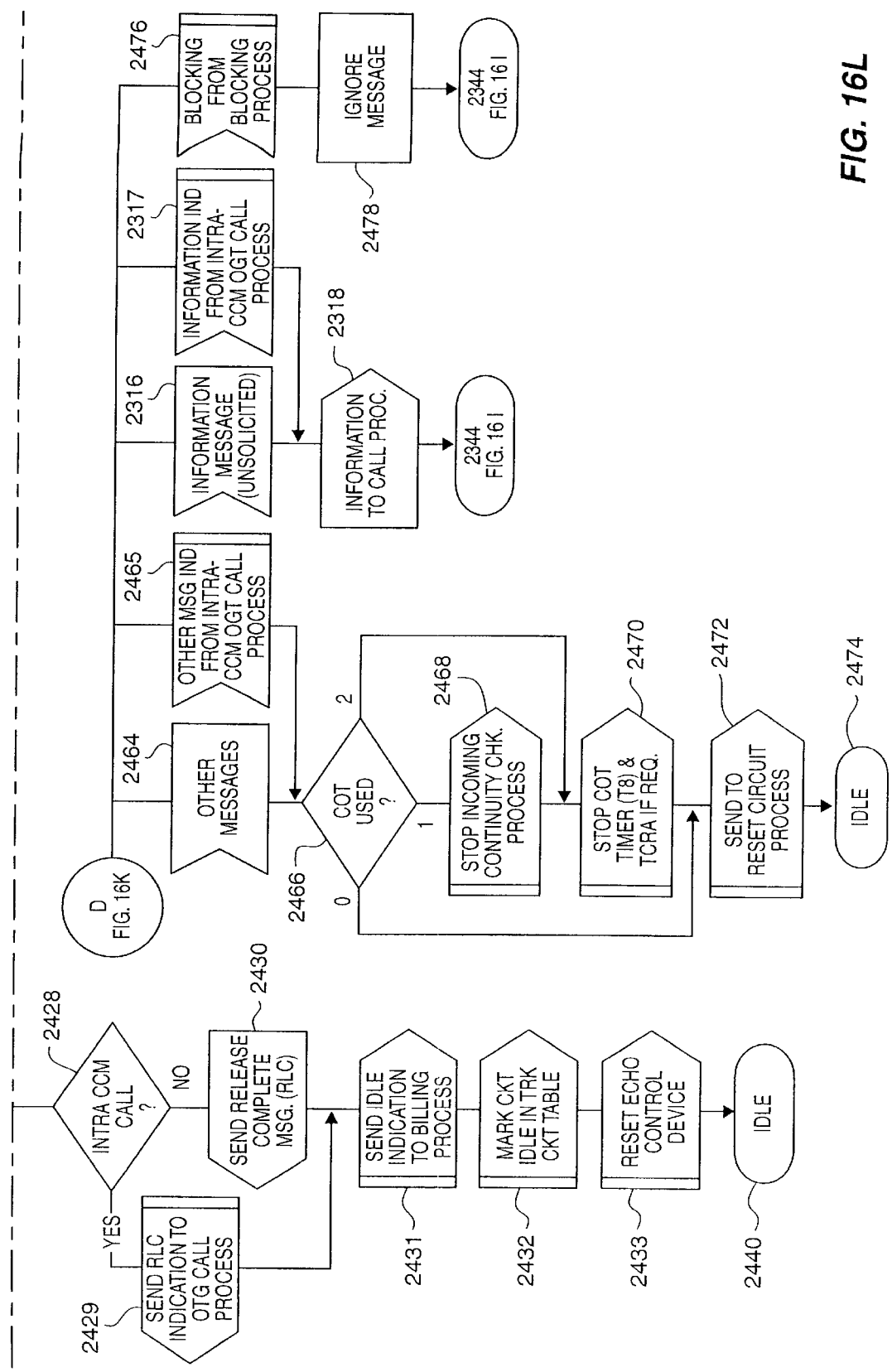
Figure 16M:
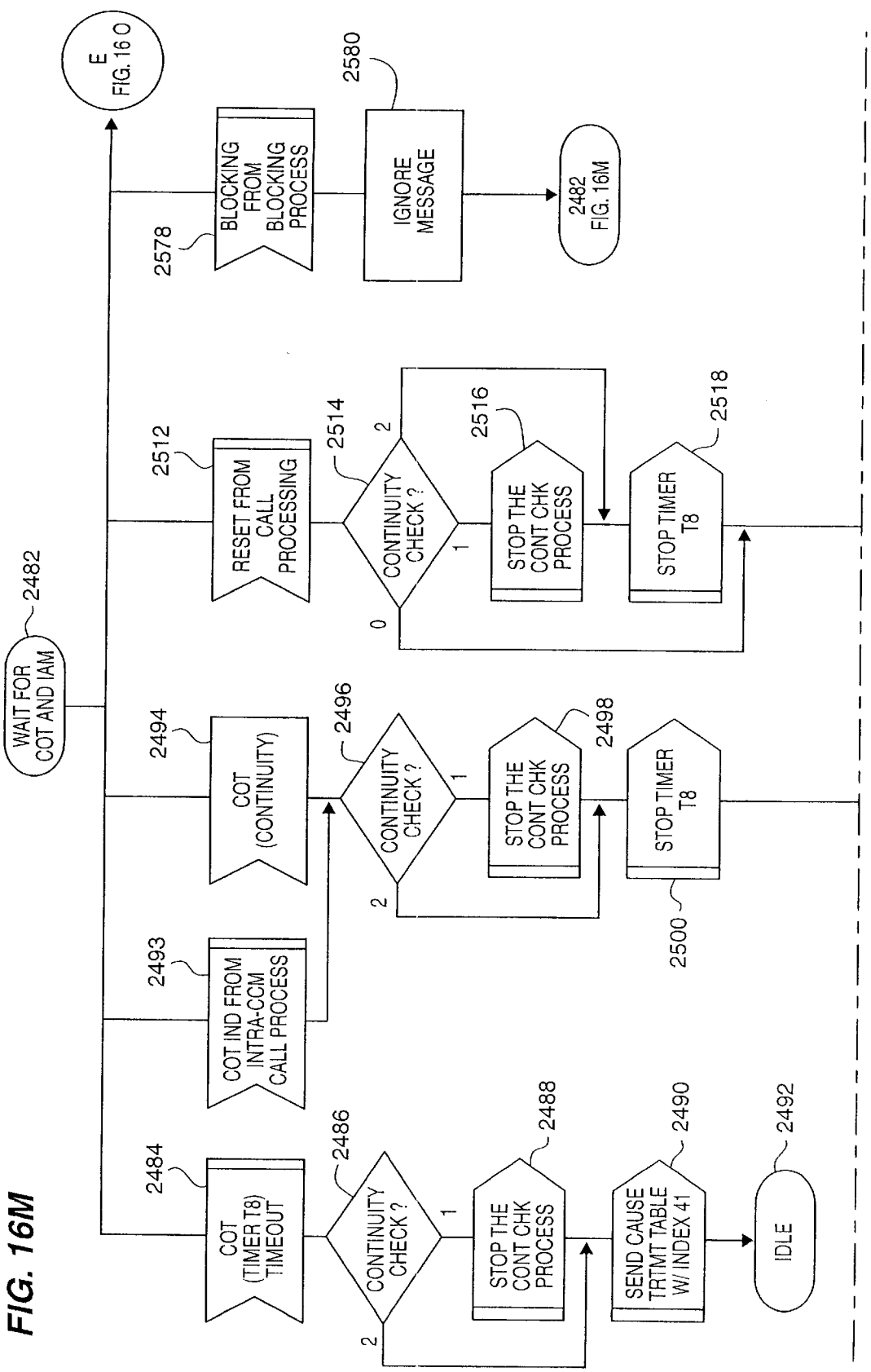
Figure 16N:
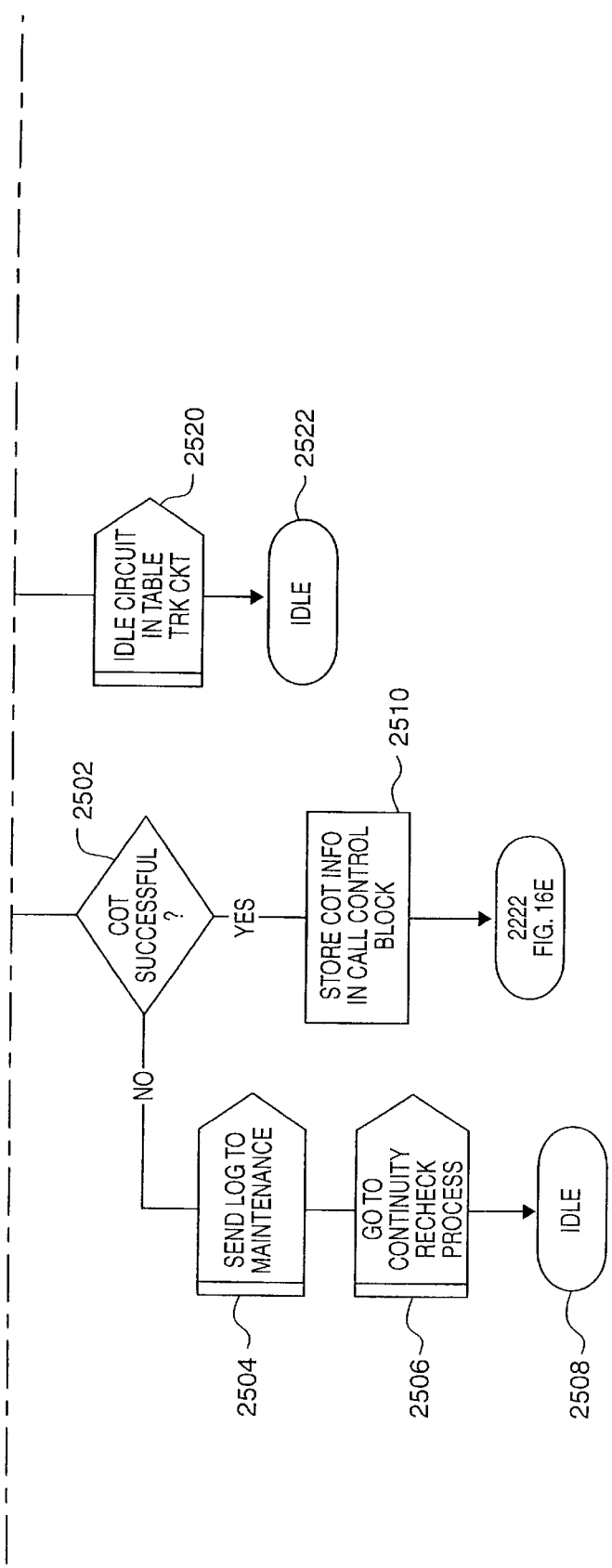
Figure 16:
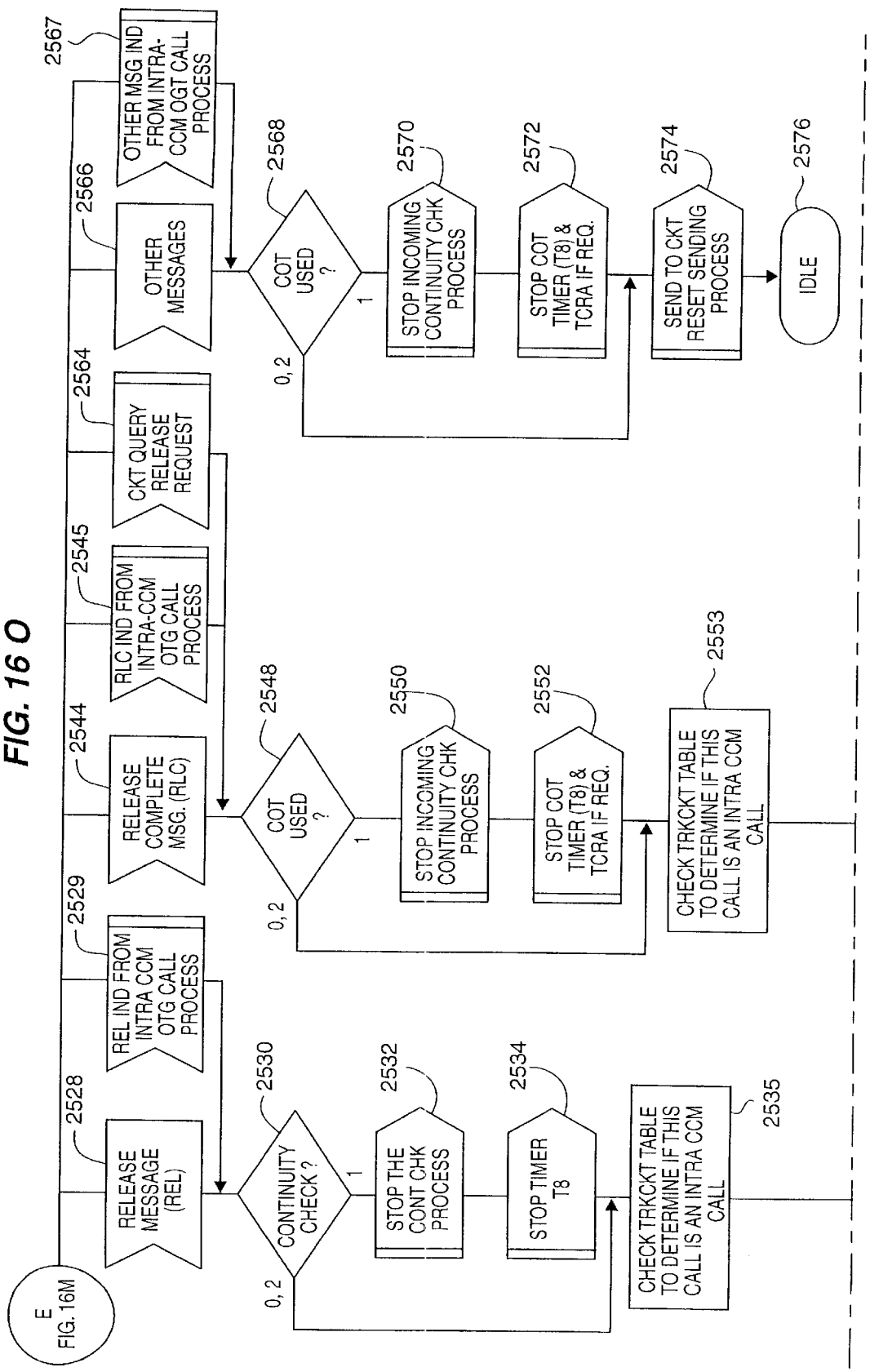
Figure 16P:
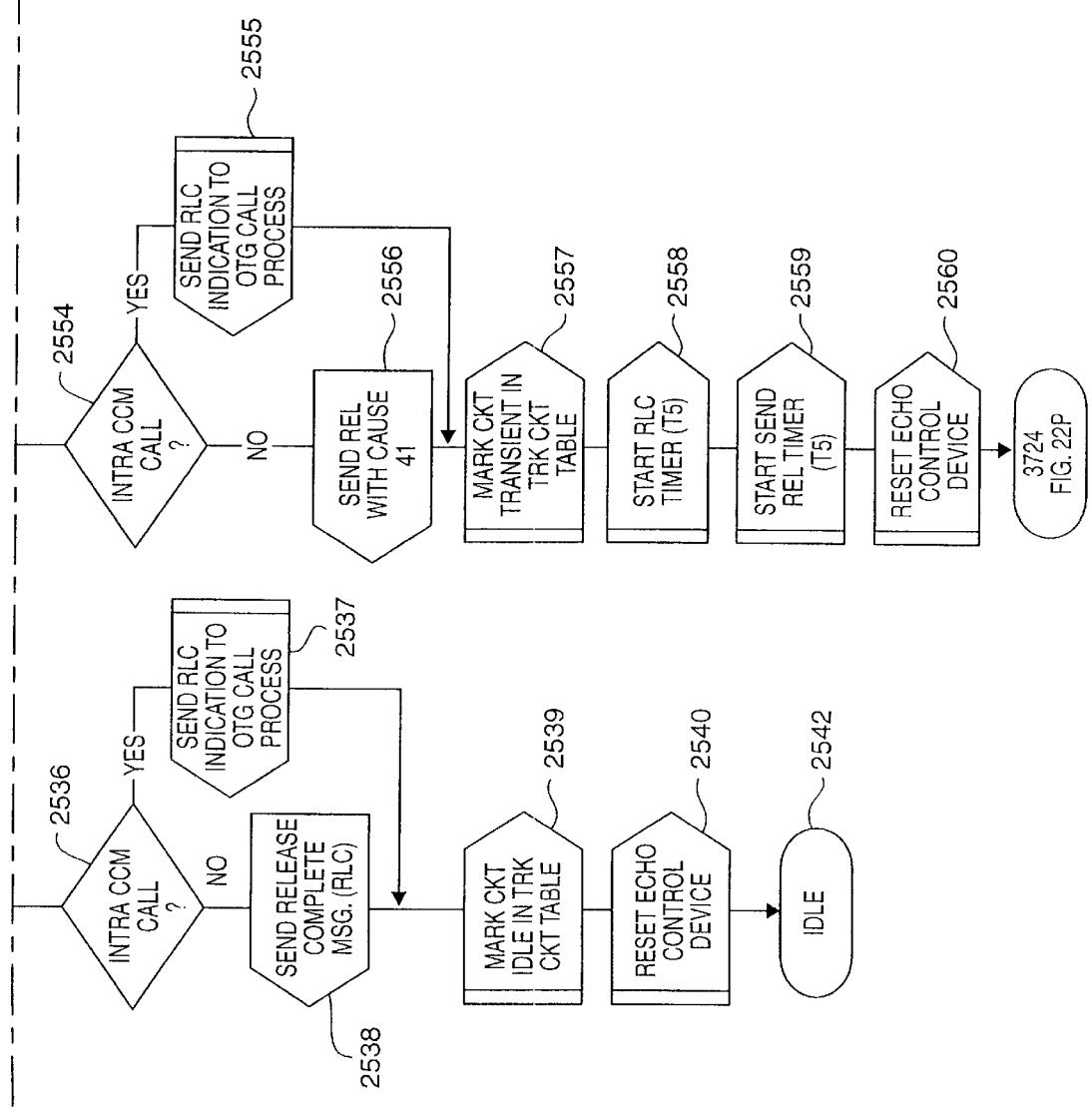

FIGS. 16A–16P entail the use of the trunk circuit and trunk group tables by the origination process. At FIG. 16A, the BCM is in the idle state at 2040. If an internal seizure request is received from the outgoing (OTG—the outgoing process is also referenced as terminating process) call process at 2041, the IAM information is read from the CCB at 2042 and processing proceeds to 2050. If the terminating (OTG) process requests seizure at 2043 or if an IAM is received at 2044, then the routing label of the IAM is checked at 2046. The IAM is opened at 2048 and information is retrieved for the CIC at 2050. Circuit status for the CIC is checked at 2052 and 2054. If status is busy at 2056 (FIG. 16B), then maintenance is informed at 2058, a cause with index 41 is sent to the treatment table at 2060, and idle is attained at 2062. If status is unequipped at 2064, then maintenance is informed at 2066, a cause with index 41 is sent to the treatment table at 2068, and idle is attained at 2070. If status is blocked at 2072, the condition is checked at 2074. If a remote block is found at 2076, then a called/calling party test call is checked for at 2078. If it is not a test call at 2080, then block status is removed at 2082 and the process proceeds to 2098. If a local block is found at 2076, then a called/calling party test call is checked for at 2084. If it is not a test call at 2086, then a blocking process is invoked at 2088 and idle is attained at 2090. If a test call is found at either 2080 or 2086, then the call is marked as a test call at 2092. The circuit is marked as transient at 2094 and processing proceeds to 2272. After 2082, or if idle status is found at 2096, then the circuit is marked as transient at 2098. If status is transient at 2100, then glare resolution is invoked at 2102 and a resolution is obtained at 2104. Glare control for the incoming (inc) call is determined at 2106 and 2108. If the CCM has control, then the circuit is marked transient at 2098. If the origination process does not have control, then the IAM is ignored at 2110 and idle is attained at 2112. If the received message is an internal RLC 2113 or an external RLC at 2114, the message is ignored at 2116 and idle is attained at 2118.

If a CRM is received at 2120 (FIG. 16C), then the routing label is checked at 2122 and message information is recorded to the CCB at 2124. The CIC is checked in the trunk circuit table at 2126, and the status of the CIC is checked at 2128 and 2130. If status is busy at 2132, then maintenance is informed at 2134 (FIG. 16D), a cause with index 41 is sent to the treatment table at 2136, and idle is attained at 2138. If status is unequipped at 2140, then maintenance is informed at 2142, a cause with index 47 is sent to the treatment table at 2144, and idle is attained at 2148. If status is blocked at 2150, the condition is checked at 2152. If a remote block is found at 2154, then block status is removed at 2162 and processing proceeds to 2192. If a local block is found at 2154, then a blocking process is invoked at 2156, the circuit is marked transient at 2158, and idle is attained at 2160. If status is transient at 2176, then glare resolution is invoked at 2178 and a resolution is obtained at 2180. Glare control for the call is determined at 2182 and 2184. If the CCM does not have control, then the IAM is ignored at 2186 and idle is attained at 2188. If the origination process does have control at 2184, processing proceeds to 2192. After 2162, 2184, or if idle status is found at 2190, the circuit is marked as transient at 2192. At 2194, timer TCRA is started and a CRA is sent out at 2196. At 2198, the nature of connection indicator is checked for COT requirements. If a COT is required at 2200 (1), then the COT process is invoked at 2204, the COT timer is started at 2206, and the process proceeds to 2482. If an internal REL is received at 2209 or an external REL is received at 2210, the trunk circuit table is checked to determine if the call is an intra-CCM call at 2211 and 2212. If it is an intra-CCM call at 2212, an internal RLC is sent at 2213. If it is not an intra-CCM call at 2212, an external RLC is sent at 2214. Idle is attained at 2215. If other internal messages are received at 2216 or other external messages are received at 2217, they are sent to circuit reset at 2218 and idle is attained at 2220. If a COT is not required at 2200 (0 or 2), then processing proceeds to 2222.

The wait for an IAM begins at 2222 (FIG. 16E). If an external IAM is received at 2223 or an internal IAM is received at 2224, IAM timer TCRA is stopped at 2225 and continuity check is set at 0 at 2226. The process proceeds to 2272. If a reset is received at 2227 (from circuit reset, circuit group reset, circuit query send, or circuit group block send), then the circuit is marked idle at 2228 and idle is attained at 2229. If a reset message is received at 2230 (from circuit group block/unblock receipt), other internal messages are received at 2231, or other external messages are received at 2232, the messages are ignored at 2233 and the process proceeds to 2222. If an internal REL is received at 2239 or an external REL is received at 2240, then it is determined if the call is intra-CCM at 2241 and 2242 (FIG. 16F). If the call is intra-CCM at 2242, then an internal RLC is sent at 2243. If the call is not intra-CCM at 2242, an external RLC is sent at 2244 and the circuit is marked idle at 2245. Echo control is reset at 2246 and idle is attained at 2248. If an internal RLC is received at 2249, an external RLC is received at 2250, or a release is requested by the circuit query process at 2270, then it is determined if the call is intra-CCM at 2251 and 2252. If the call is intra-CCM at 2252, then an internal REL is sent at 2253. If the call is not intra-CCM at 2252, an external RLC is sent at with cause normal at 2254. After 2253 or 2254, COT is checked at 2255. If a 1 is present, the incoming continuity process is stopped at 2256 and the COT timer is stopped at 2258. If a 2 is present at 2255, the COT timer is stopped at 2258. After 2258 or if a 0 is present at 2255, the circuit is marked as transient at 2260. The RLC timer is started at 2262 and the send REL timer is started at 2264. Echo control is reset at 2266, and the process proceeds to 3724.

After 2094, 2098, or 2226, the nature of connection indicator is checked for COT requirements at 2272 (FIG. 16G) and 2274. If a 1 is present, the incoming continuity process is started at 2276 and the COT timer is started at 2278. If a 2 is present, the COT timer is started at 2278. If a 0 is present, then processing proceeds to 2280 where the IAM information is stored in the CCB. The circuit seizure time point is sent to billing at 2282. Echo control information from the USI parameter is sent to echo control at 2284. Call attempts are counted at 2286. If attempts are 2 or more, then a cause is sent to the treatment table with an index of 41 at 2290 and idle is attained at 2292. If less than 2 attempts are made at 2288, then the trunk group is checked to see if Automatic Congestion Control (ACC) is needed at 2294. If it is, then the call is sent to the ACC process at 2298 (FIG. 16H) and idle is attained at 2300. If ACC is not required at 2296, then the next function in the trunk group table is obtained at 2306 and 2318. If the next function is the exception table at 2320, then the index is checked at 2322 and the call is sent to the exception table at 2324 and idle is attained at 2326. If there is no next function at 2328, then the call is sent to the exception table at 2324. If the next function is the trunk group table at 2336, then the index is checked at 2338 and the call is sent to the outgoing section of the trunk group table at 2340. The originating process awaits outgoing circuit selection by the terminating process at 3460.

The wait for the COT begins at 2344 (FIG. 16I). If the COT timer times out at 2346, then continuity requirements are checked at 2348. If continuity testing is required, the incoming continuity check process is stopped at 2350. Cause is sent to the treatment table with an index of 41 at 2352 and idle is attained at 2354. If continuity checking is not required at 2348, then cause is sent to the treatment table with an index of 41 at 2352 and idle is attained at 2354. If a retry call message is received at 2356, then the process proceeds to step 2280. If an external COT is received at 2258 or an internal COT is received at 2359, then continuity requirements are checked at 2360. If continuity testing is required, the incoming continuity check process is stopped at 2362 and the COT timer is stopped at 2364. If continuity checking is not required at 2360, then the COT timer is stopped at 2364. After 2364 or if continuity is 0 at 2360, continuity test success is checked at 2366 (FIG. 16J). If not, maintenance is informed at 2368, the continuity recheck process is invoked at 2370, and idle is attained at 2372. If the continuity test is successful at 2366, then the COT is stored in the CCB at 2374. The process proceeds to 3520. If a reset is received at 2404, then continuity requirements are checked at 2406. If continuity testing is required, the incoming continuity check process is stopped at 2408 and the COT timer is stopped at 2410. If continuity checking is not required at 2406, then the COT timer is stopped at 2410. After 2410 or if continuity is 0 at 2406, the circuit is set at idle at 2412 and idle is attained at 2414.

If an external REL is received at 2420 (FIG. 16K) or an internal REL is received at 2421, then requirements for continuity testing are checked at 2422. If continuity testing is required (1), the incoming continuity check process is stopped at 2424 and the COT timer is stopped at 2426. If continuity checking is required on the previous circuit (2), the T8 timer is stopped at 2426. After 2426 or if continuity is not required at 2422 (0), then it is determined if the call is an intra-CCM call at 2427 and 2428 (FIG. 16L). If it is an intra-CCM call at 2428, then an internal RLC is sent at 2429. If it is not an intra-CCM call at 2428, an external RLC is sent out at 2430. An idle indication is sent to billing at 2431 and circuit is set to idle at 2432. Echo control is reset at 2433 and idle is attained at 2440. If a release request is received from call processing at 2442, then a message is sent to the treatment table with cause 41 at 2444 and idle is attained at 2446. If a circuit query release is received at 2462, an external RLC is received at 2435, or an internal RLC is received at 2436, then the processing proceeds to 2444. If other external messages are received at 2464 or other internal messages are received at 2465, then requirements for continuity testing are checked at 2466. If continuity testing is required (1), the incoming continuity check process is stopped at 2468 and the COT timer is stopped at 2470. If continuity checking is required on the previous circuit (2), the COT timer is stopped at 2470. If continuity is not required (0), then the circuit reset process is invoked at 2472 and idle is attained at 2474. If an external information message is received at 2316, or an internal information message is received at 2317, then the information is provided to call processing at 2318 and the wait for the COT continues at 2344. If a blocking message is received at 2476, then the message is ignored at 2478 and the process proceeds to 2344.

The wait for the COT and IAM begins at 2482 (FIG. 16M). If the COT timer times out at 2484, then continuity requirements are checked at 2486. If continuity testing is required (1), the incoming continuity check process is stopped at 2488. Cause is sent to the treatment table with an index of 41 at 2490 and idle is attained at 2492. If continuity checking is not required at 2486 (2), then cause is sent to the treatment table with an index of 41 at 2490 and idle is attained at 2492. If an internal COT is received at 2493 or an external COT is received at 2494, then continuity requirements are checked at 2496. If continuity testing is required, the incoming continuity check process is stopped at 2498 and the COT timer is stopped at 2500. If continuity checking is not required at 2496, then the COT timer is stopped at 2500. At 2502 (FIG. 16N), continuity test success is checked. If not, maintenance is informed at 2504, the continuity recheck process is invoked at 2506, and idle is attained at 2508. If the continuity test is successful at 2502, then the COT is stored in the CCB at 2510, and processing proceeds to 2222. If a reset is received at 2512, then continuity requirements are checked at 2514. If continuity testing is required, the incoming continuity check process is stopped at 2516 and the COT timer is stopped at 2518. If continuity checking is required on the previous circuit (2) at 2514, then the COT timer is stopped at 2518. If continuity checking is not required (0) at 2514, then the circuit is set at idle at 2520 and idle is attained at 2522. If a blocking message is received at 2578, then the message is ignored at 2580 and the process proceeds to 2482.

If an external REL is received at 2528 (FIG. 16O) or an internal REL is received at 2529, then requirements for continuity testing are checked at 2530. If continuity testing is required (1), the incoming continuity check process is stopped at 2532 and the COT timer is stopped at 2534. If continuity checking is required on the previous circuit (2), or if continuity is not required (0), then it is determined if the call is an intra-CCM call at 2535 and 2536 (FIG. 16P). If is an intra-CCM call at 2536, then an internal RLC is sent at 2537. If it is not an intra-CCM call at 2536, an external RLC is sent out at 2538. After 2537 or 2538, the circuit is set to idle at 2539. Echo control is reset at 2540 and idle is attained at 2542. If an external RLC is received at 2544 or an internal RLC is received at 2545, then requirements for continuity testing are checked at 2548. If continuity testing is required (1), the incoming continuity check process is stopped at 2550 and the COT timer is stopped at 2552. If continuity checking is required on the previous circuit (2) or if continuity is not required (0), then it is determined if the call is an intra-CCM call at 2553 and 2554. If is an intra-CCM call at 2554, then an internal RLC is sent at 2555. If it is not an intra-CCM call at 2554, an external RLC with cause 41 is sent out at 2556. After 2555 or 2556, the circuit is marked transient at 2557. At 2558, the RLC timer is started and at 2559 the send REL timer is started. Echo control is reset at 2560, and the originating process awaits an RLC at 3724. If a circuit query release is received at 2564, the processing proceeds to 2548. If other external messages are received at 2566 or other internal messages are sent at 2567, then requirements for continuity testing are checked at 2568. If continuity testing is required (1), the incoming continuity check process is stopped at 2570 and the COT timer is stopped at 2572. If continuity checking is required on the previous circuit (2) or if continuity is not required (0), then the circuit reset process is invoked at 2574 and idle is attained at 2576.

Exception Table Processing

Figure 17A:
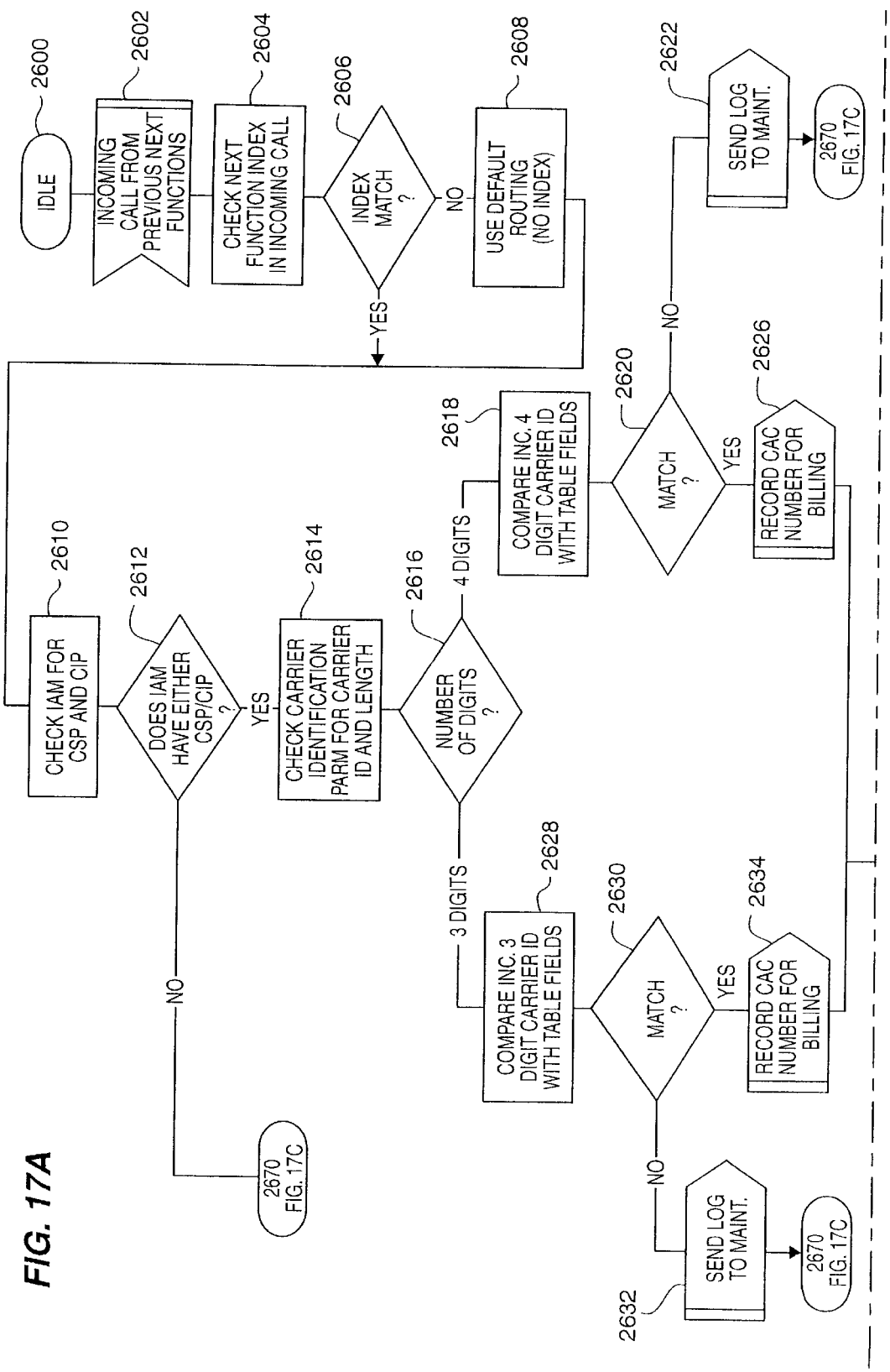
FIGS. 17A–17E are SDL diagrams of logic used in a version of the invention.
Figure 17B:
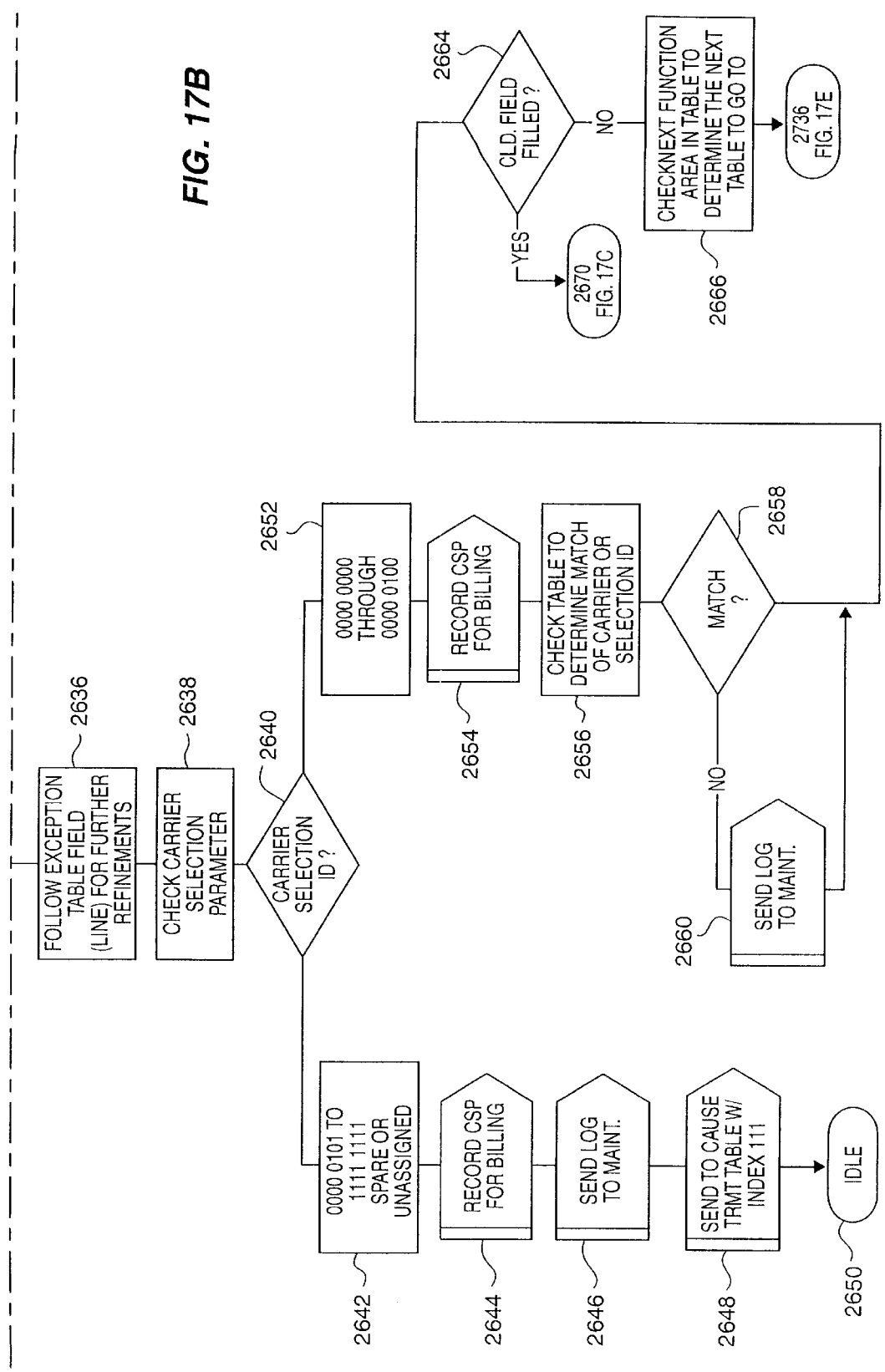
Figure 17C:
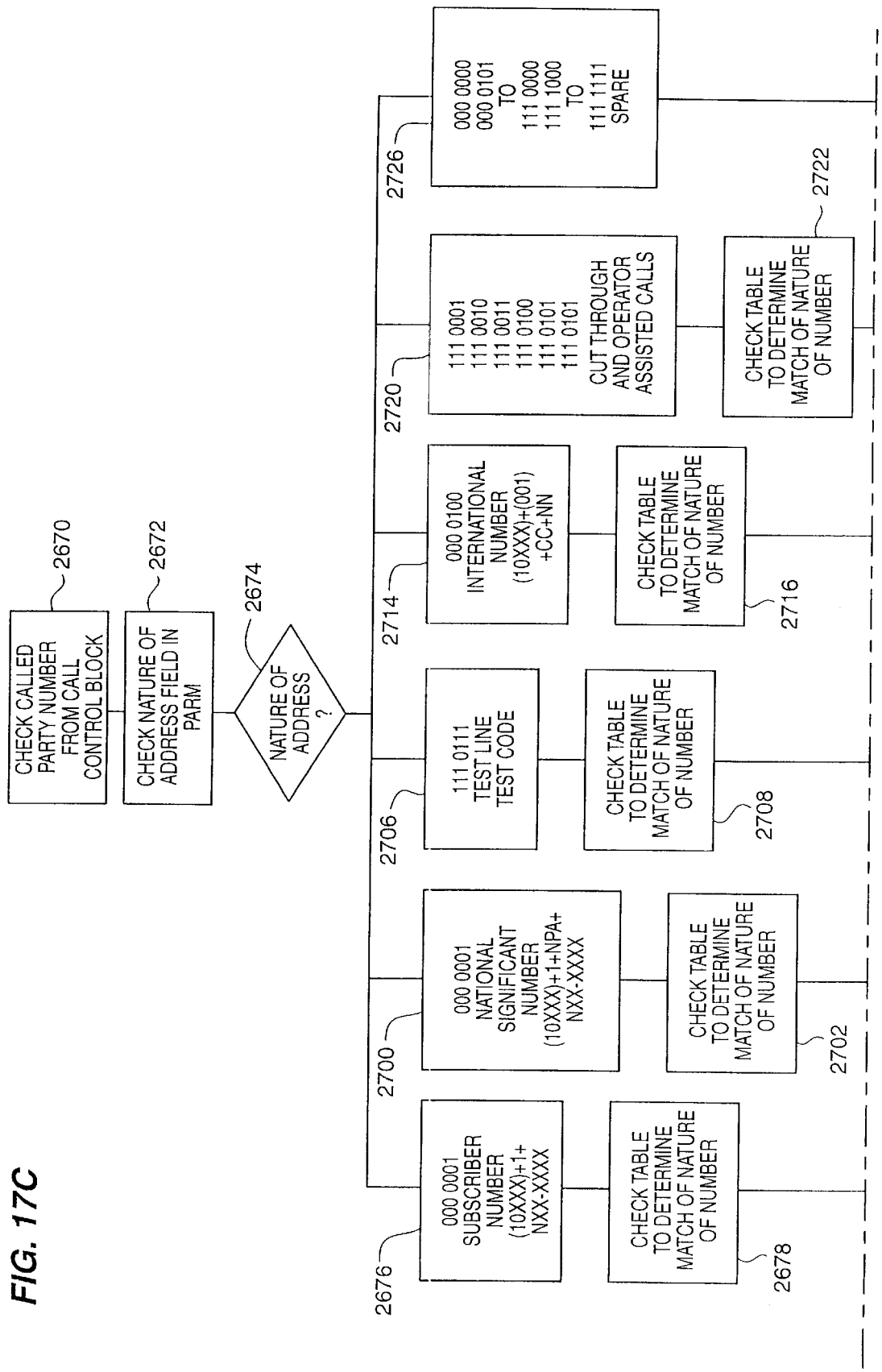

FIGS. 17A–17E entail the use of the exception table. On FIG. 17A at 2600, use of the exception table is idle At 2602, the BCM can access the exception table based on the next function of another table. At 2604, the index from the previous table is matched to the indexes of the exception table. If no match is found, default routing is used at 2608. If an index is found, the IAM is checked for the Carrier Selection Parameter (CSP) and the Carrier Identification Parameter (CIP) at 2610 and 2612. If no CSP or CIP is found, then processing proceeds to 2670. If a CSP or CIP is found, at 2612, the CIP is checked for carrier identification and length at 2614 and 2616. If the length is four digits, then the carrier identification is compared to other four digit carrier codes at 2618. If a match is not found at 2620, then maintenance is informed at 2622 and processing proceeds to 2670. If a match is found at 2620, then the CAC is recorded for billing at 2626 and processing proceeds to 2636 (FIG. 17B). If the number of digits at 2616 is three, then the carrier identification is compared to other three digit carrier codes at 2628. If a match is not found at 2630, then maintenance is informed at 2632 and processing proceeds to 2670. If a match is found at 2630, then the CAC is recorded for billing at 2632 and the exception table field line is checked for further information at 2636. At 2638 and 2640, the CSP is checked for carrier selection identification. If the code is spare or unassigned at 2642, then the CSP is recorded for billing at 2644, and maintenance is informed at 2646. A message is then sent to the treatment table at 2648 with a cause of 111 and the process goes idle at 2650. If the check at 2640 is matches an entry at 2652 (0000 0000 to 0000 0100), then the CSP is recorded for billing at 2654 and the table is checked to match the carrier selection identification at 2656 and 2658. If a match is not found, maintenance is informed at 2660. If a match is found the called number field is checked at 2664. If it is not filled at 2666, then processing proceeds to 2736.

Figure 17D:
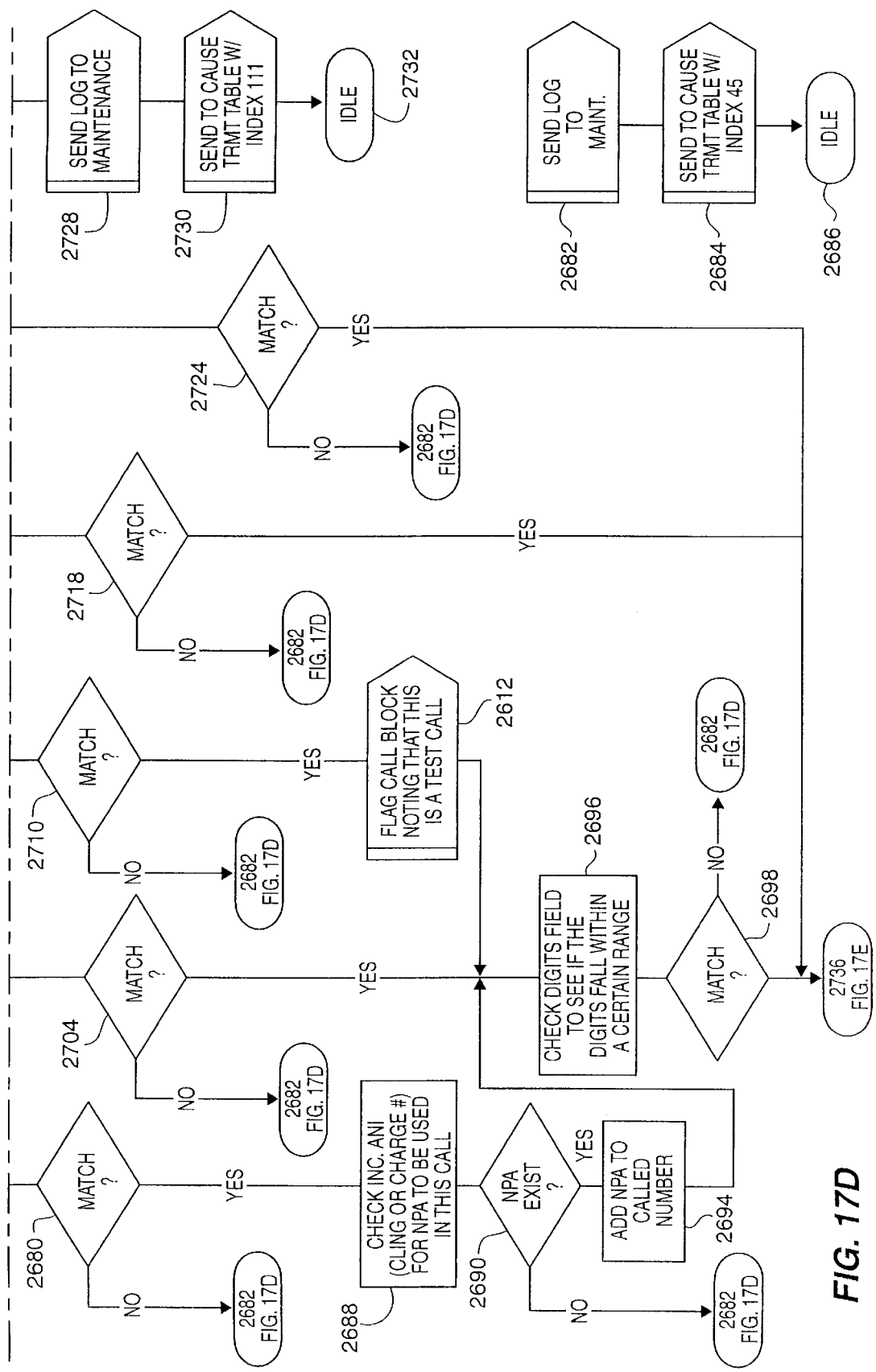
Figure 17E:
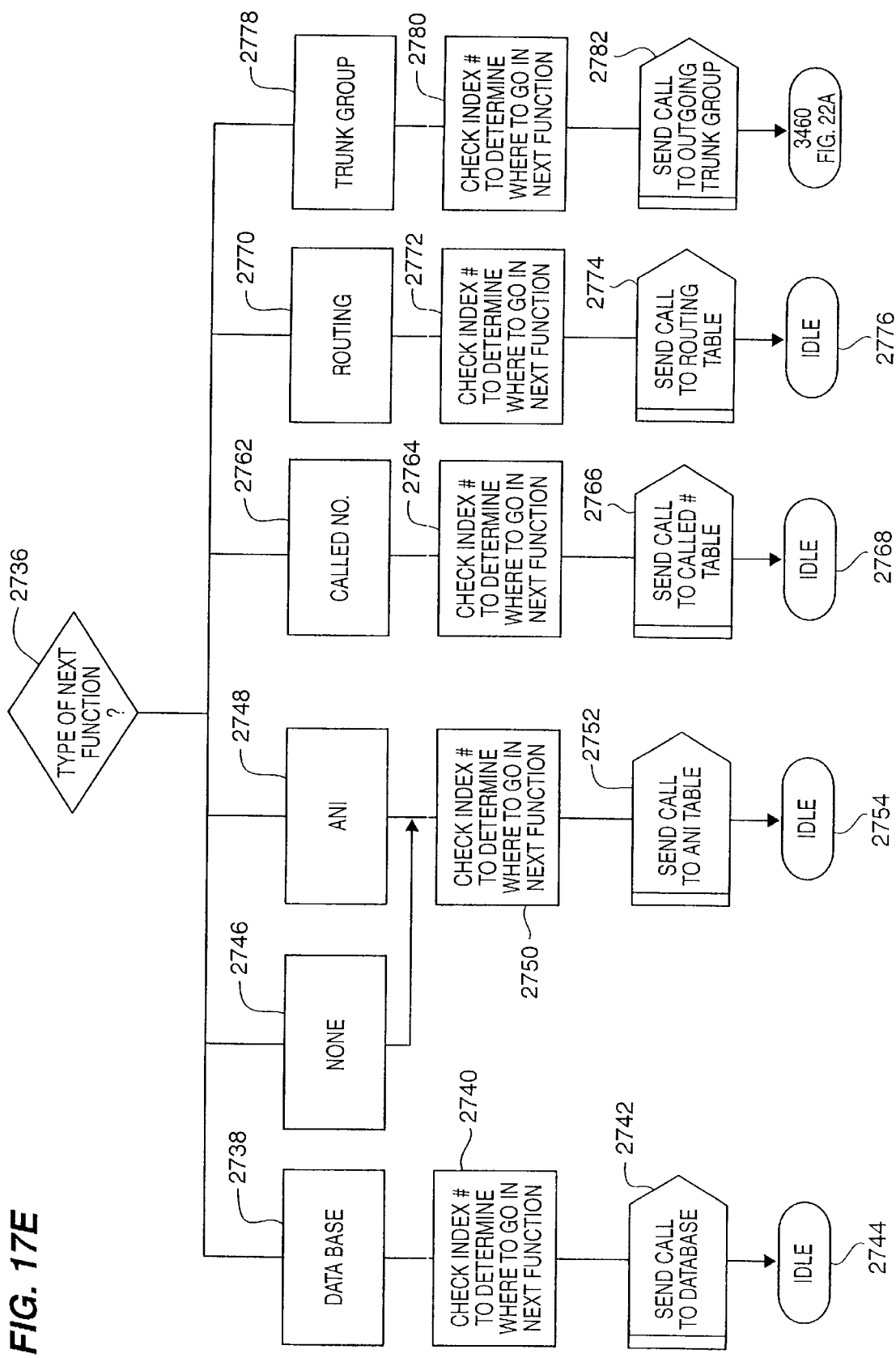

If a match is found at 2664, then the called party number is checked in the CCB at 2670 (FIG. 17C) and the nature of address is checked at 2672 and 2674. If a subscriber number is found at 2676, then remaining entries on that line are checked for a match at 2678 and 2680 (FIG. 17D). If no matches are found at 2680, then maintenance is informed at 2682, a message is sent to the treatment table with an index of 45 at 2684, and the process goes idle at 2686. If a match is found at 2680, ANI is checked for an NPA to use for the call at 2688. If no NPA exists at 2690, then processing proceeds to 2682. If an NPA does exist at 2690, the NPA is added to the called number at 2694 and the digits are checked at 2696. If the digits do not match a certain range at 2698, processing proceeds to 2682. If the digits do match a certain range at 2698, then processing proceeds to 2736. If a national significant number is found at 2700, then remaining entries on that line are checked for a match at 2702 and 2704. If no matches are found at 2704, then processing proceeds to 2682. If a match is found at 2704, processing proceeds to 2696. If a test line or code is found at 2706, then remaining entries on that line are checked for a match at 2708 and 2710. If no matches are found at 2710, then processing proceeds to 2682. If a match is found at 2710, the call block is flagged to indicate a test call at 2712 and processing proceeds to 2696. If an international number is found at 2714, then remaining entries on that line are checked for a match at 2716 and 2718. If no matches are found at 2718, then processing proceeds to 2682. If a match is found at 2718, processing proceeds to 2736. Typically, this call goes directly the trunk group associated with the international carrier. If cut-through or operator assisted number is found at 2720, then remaining entries on that line are checked for a match at 2722 and 2724. If no matches are found at 2724, then processing proceeds to 2682. If a match is found at 2724, processing proceeds to 2736. Typically, this call would go directly to the trunk group associated with operator services. If a spare number is found at 2726, then maintenance is informed at 2728, a message is sent to the treatment table with an index of 111 at 2730, and idle is attained at 2732.

At 2736 (FIG. 17E), the next function is checked. If the query/response table is next at 2738, then the index is obtained at 2740. The call is sent to the query/response table at 2742, and idle is attained at 2744. If the no table is listed at 2746 or the ANI table is next at 2748, then the index is obtained at 2750. The call is sent to the ANI table at 2752, and idle is attained at 2754. If the called number table is next at 2762, then the index is obtained at 2764. The call is sent to the called number table at 2766, and idle is attained at 2768. If the routing table is next at 2770, then the index is obtained at 2772. The call is sent to the routing table at 2774, and idle is attained at 2776. If the trunk group table is next at 2778, then the index is obtained at 2780. The call is sent to the outgoing section of the trunk table at 2782. The originating process awaits outgoing circuit selection by the terminating process at 3460.

ANI Table Processing

FIGS. 18A–18F entail the use of the AM table. On FIG. 18A at 2800, the ANI table is idle until the BCM enters the table from a next function at 2801. At 2802, the index is checked and a match is searched at 2803. If a match is not found, default routing is used at 2804. If the index matches at 2803, the index is used to key into the ANI table at 2805. After 2804 or 2805, the originating line information (OLI) parameter is checked at 2806. If the originating line information does not exist at 2807, maintenance is informed at 2808 (FIG. 18B), a message is sent to the treatment with index 111 at 2809, and idle is attained at 2810. If originating line information is found at 2807, OLI digits are sent to billing at 2811 and the table is checked for an OLI match at 2812 and 2813. If no match is found at 2813, maintenance is informed at 2814 and an OLI of 2 is used at 2815. After 2815 or if a match is found at 2813, the calling party category is checked in the IAM at 2816. If a calling party category does not exist at 2817, processing goes to 2808. If a calling party category does exist at 2817, it is matched to the table at 2818 and 2819. If it is an ordinary subscriber at 2820, this is marked in the CCB at 2821, and the table is checked for a data caller at 2822 and 2823. If the call is a data call, the echo canceller for the call is turned off at 2824 and the call is marked as a data call for billing at 2825. After 2825 or if the call is not a data call, at 2823, processing proceeds to 2834. If the category is other datafill at 2826, maintenance is informed at 2827 and processing proceeds to 2821. If the category indicates an emergency call at 2828, a high priority call at 2830, or a national security call at 2831, the priority of the IAM is set to 1 and processing proceeds to 2821. If the category indicates a test call at 2832, the call is marked as a test call at 2833 and processing proceeds to 2821.

Figure 18A:
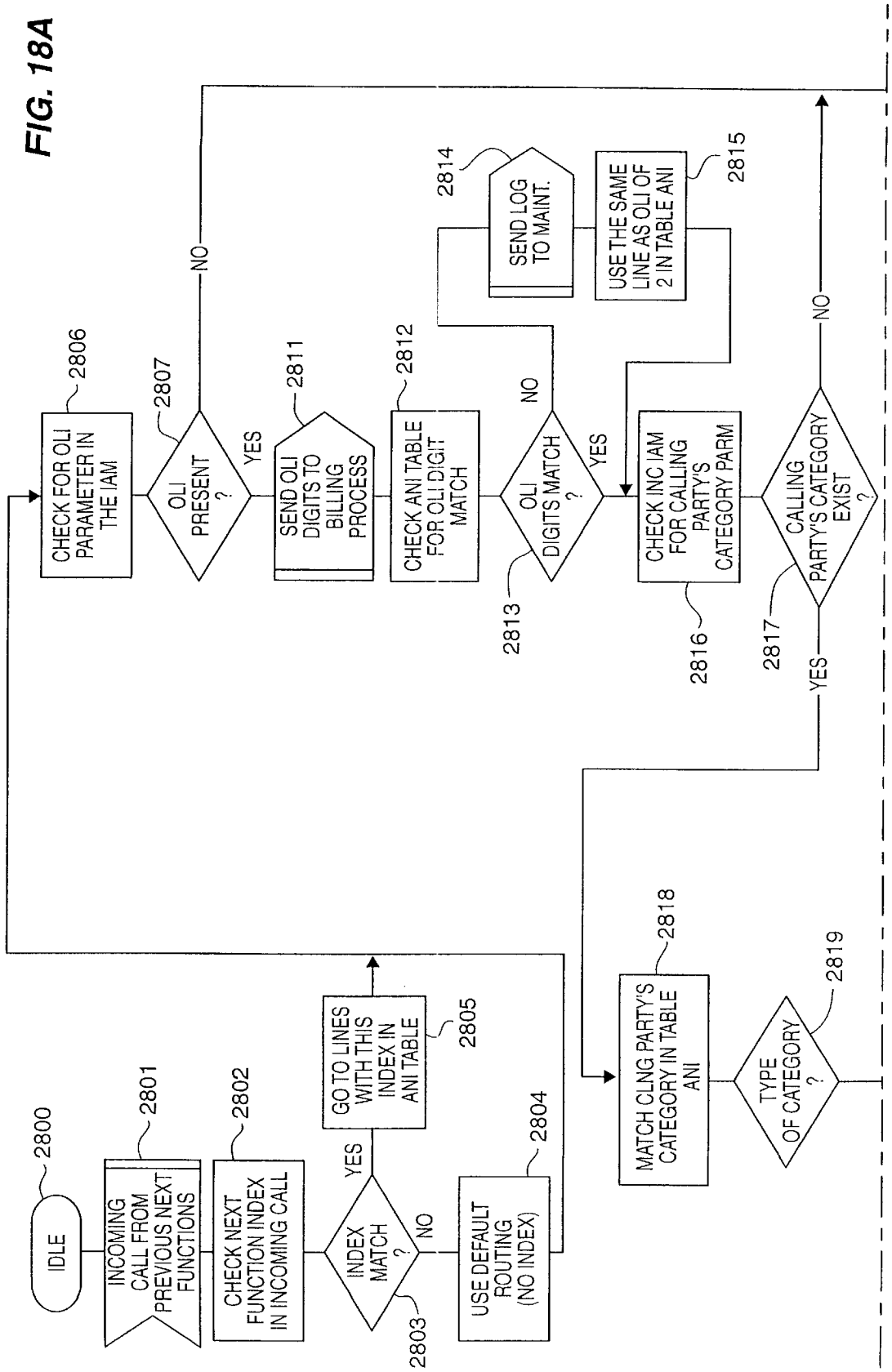
FIGS. 18A–18F are SDL diagrams of logic used in a version of the invention.
Figure 18B:
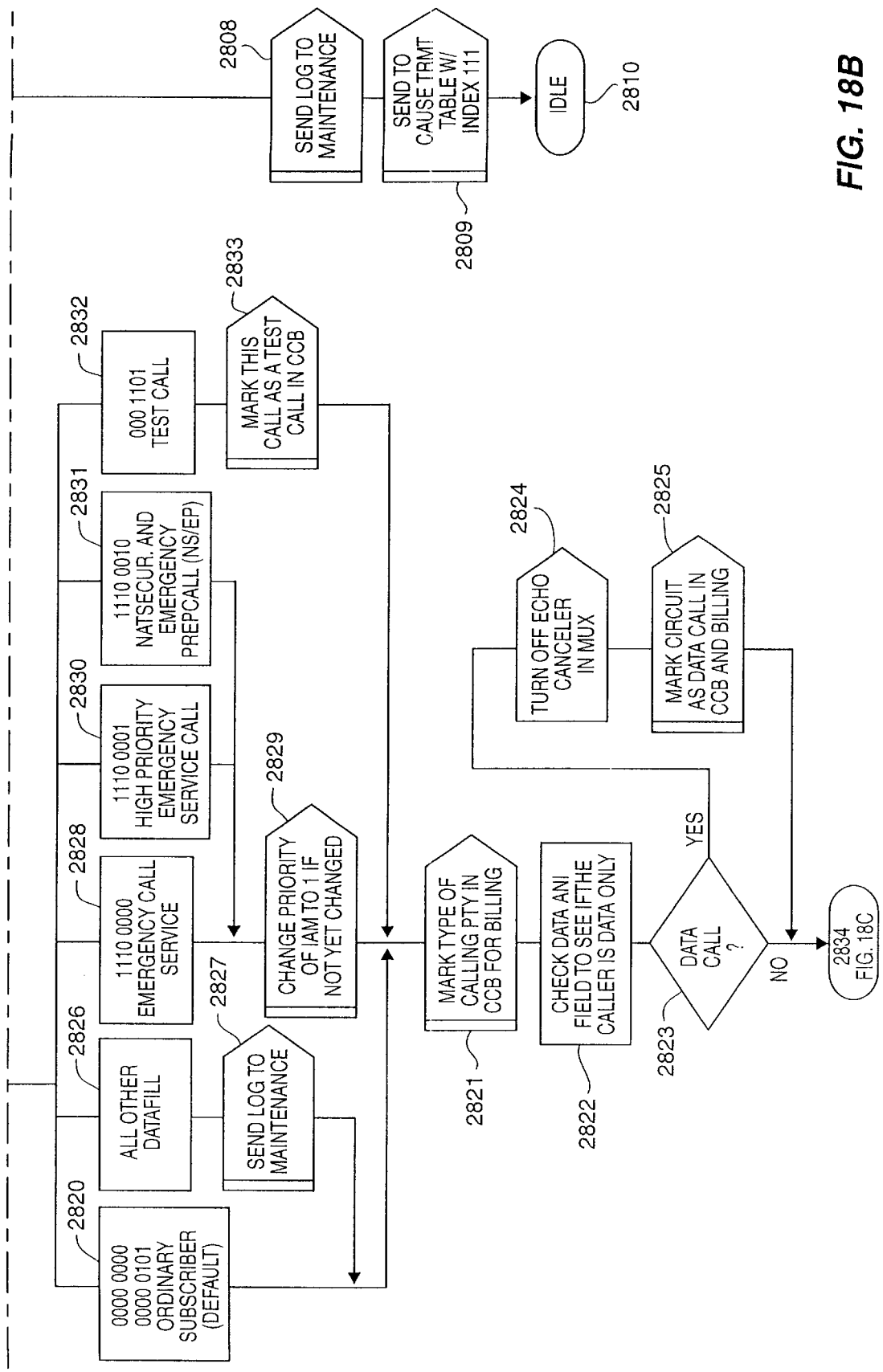
Figure 18C:
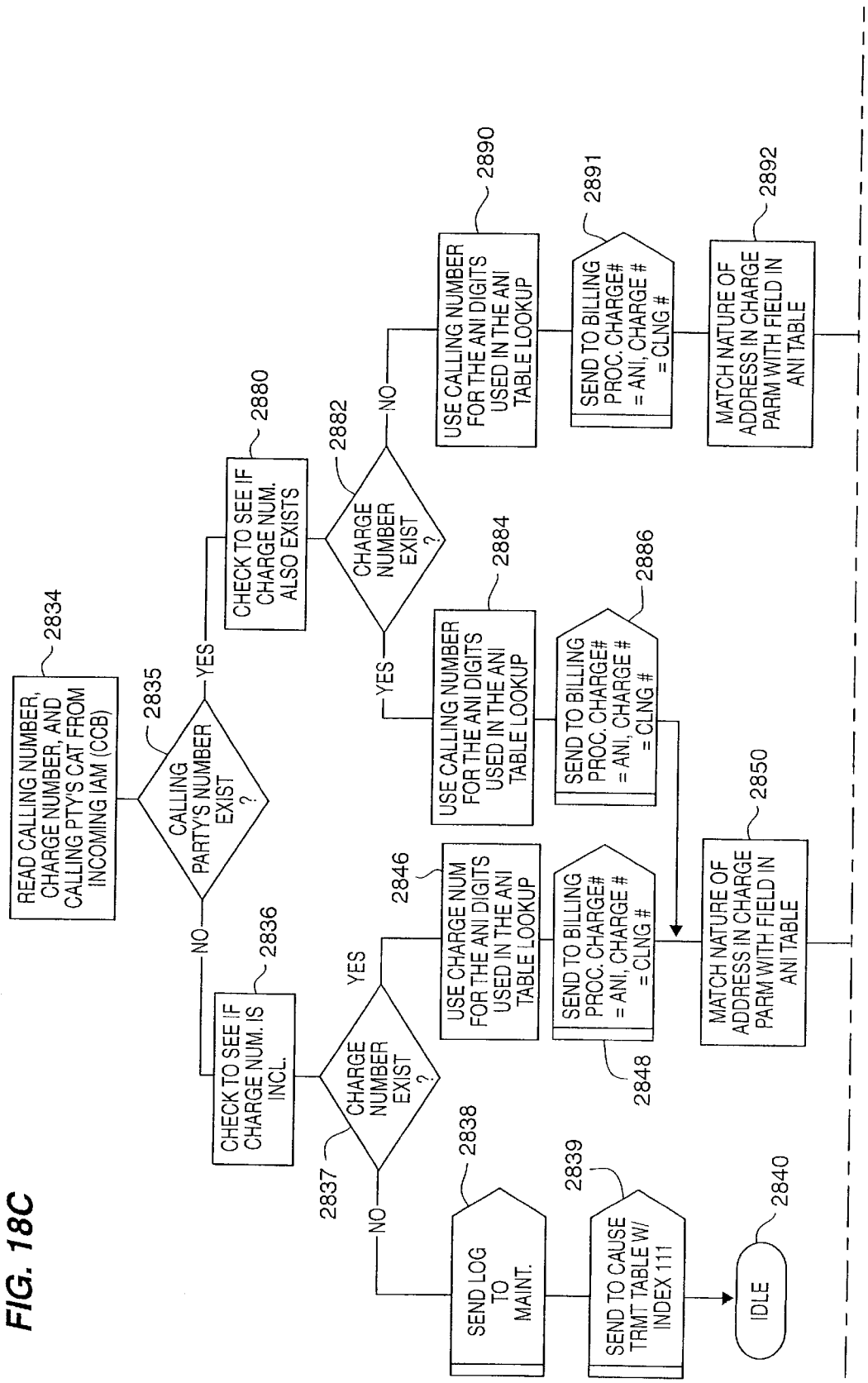
Figure 18D:
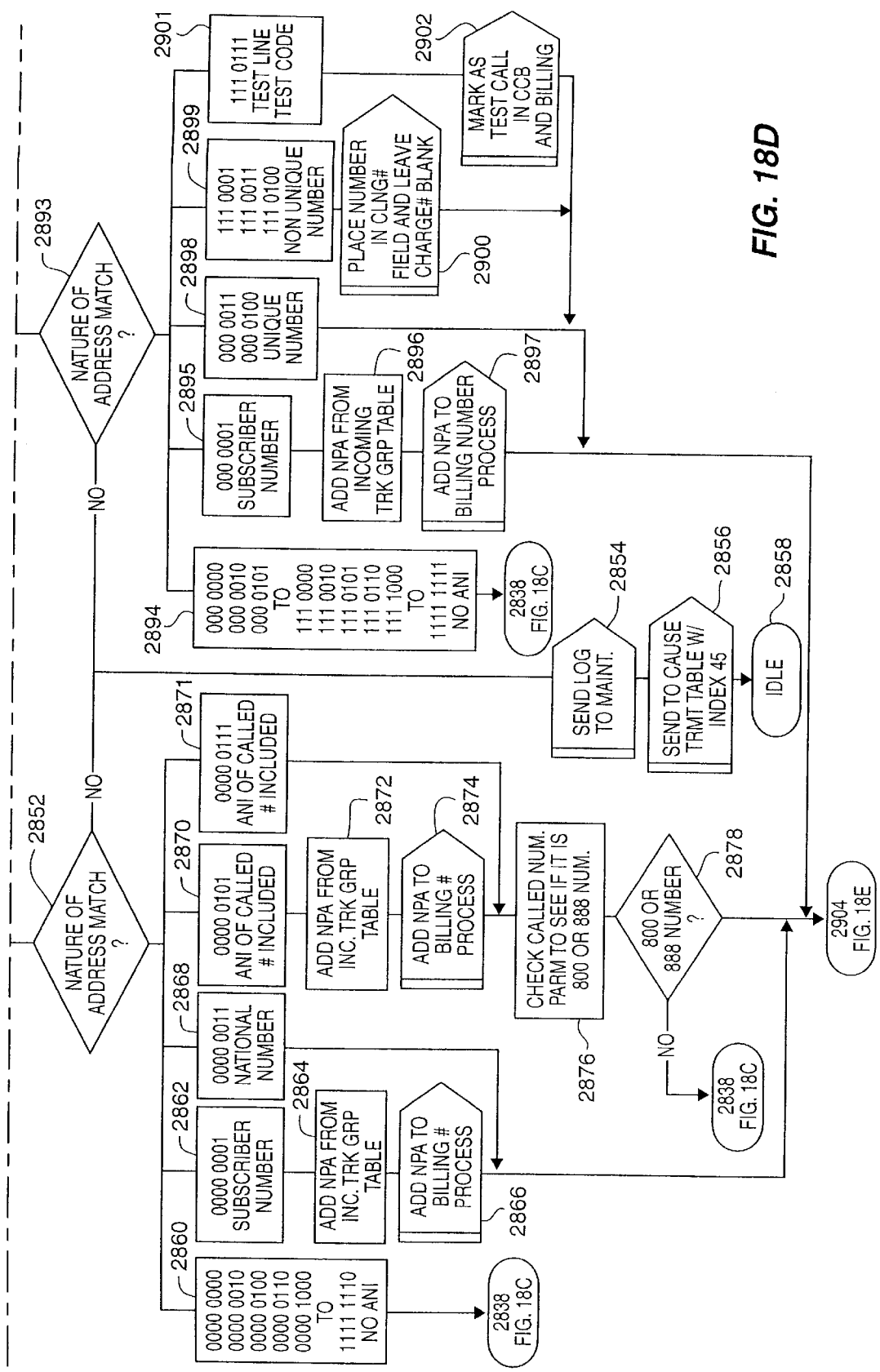
Figure 18E:
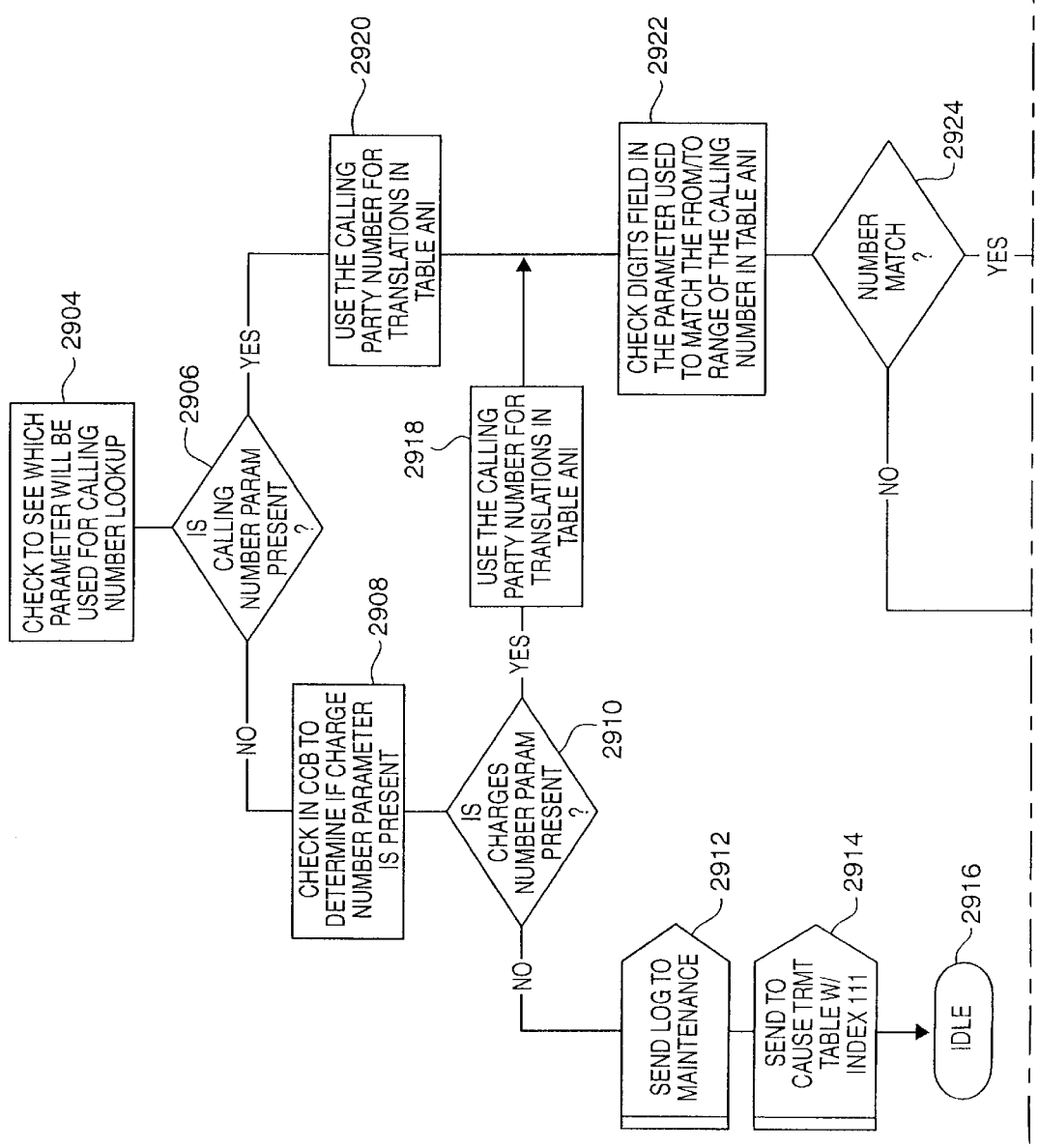
Figure 18F:
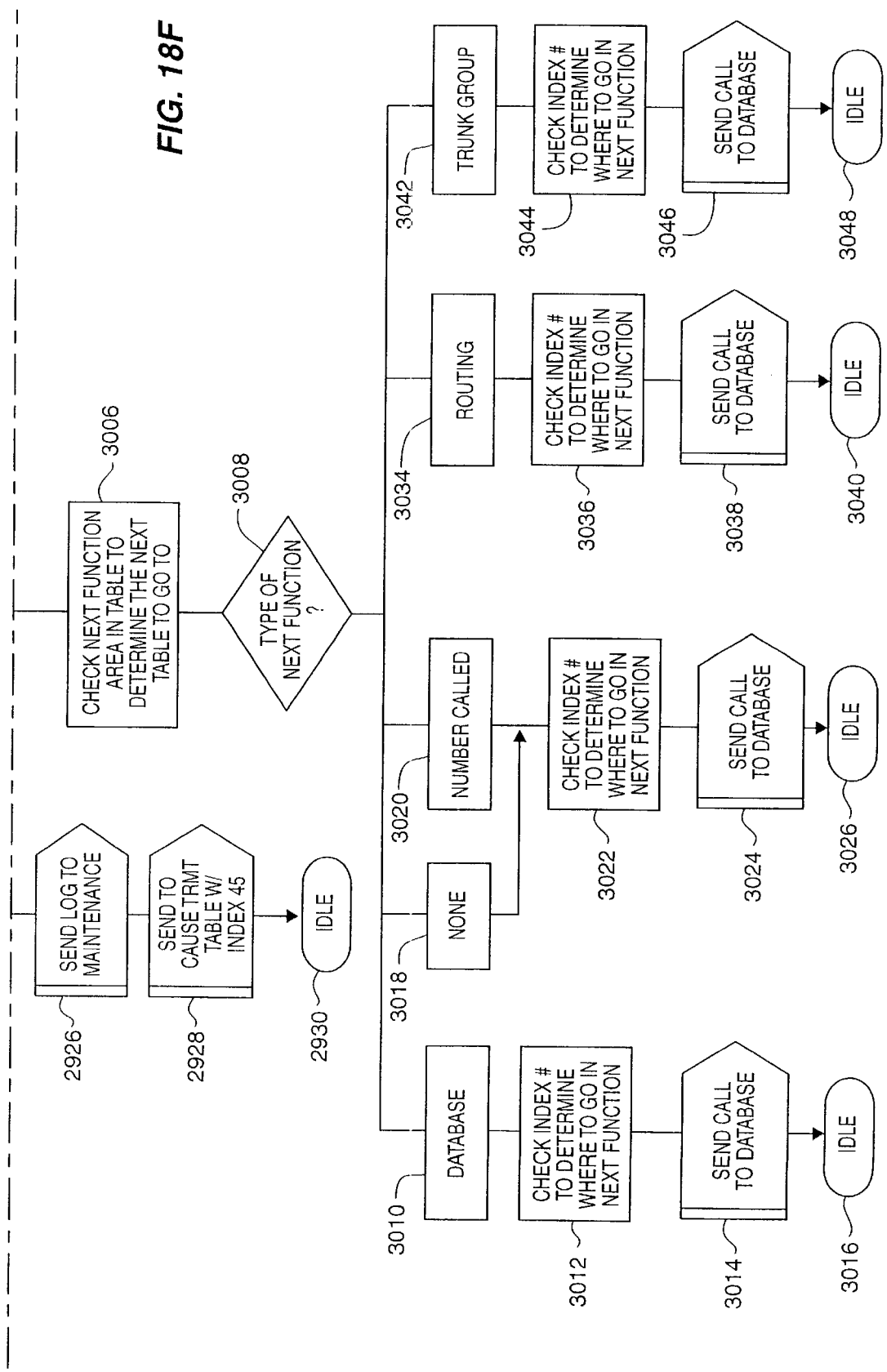

At 2834 (FIG. 18C), the calling number, charge number, and calling party category from the IAM are read from the call control block. If the calling party's number does not exist at 2835, the charge number is checked at 2836. If the charge number does not exist at 2837, maintenance is informed at 2838, a message is sent to the treatment with index 111 at 2839, and idle is attained at 2840. If the charge number exists at 2837, the charge number is used as the ANI at 2846. Information that the charge number is the ANI and the charge number is the calling number is sent to billing at 2848. The nature of number of the charge parameter is matched at 2850 and 2852 (FIG. 18D). If there is no match, maintenance is informed at 2854, a message is sent to the treatment table with a cause of 45 at 2856, and idle is attained at 2858. If the match at 2860 is a no ANI indication at 2860, the process proceeds to 2838. If the match at 2862 is a subscriber number, the NPA from the trunk table is added at 2864, and the NPA is added to the billing number process at 2866. The process then proceeds to 2904. If the match at 2852 is a national number a 2868, the process proceeds to 2904. If the match at 2852 is a ANI with called number at 2870 (0000 0101), the NPA from the trunk table is added at 2872, and the NPA is added to the billing number process at 2874. After 2874 or if the match at 2852 is a ANI with called number at 2871 (000 0111) the called number parameter is checked for 800 or 888 at 2876 and 2878. If it is not 800 or 888, the process proceeds to 2838. If it is 800 or 888, the process proceeds to 2904. If the calling party's number exists at 2835, then a check for the charge number is made at 2880 and 2882. If a charge number exists at 2882, the charge number is used as the ANI at 2884. Information that the charge number is the ANI and the calling number is the calling number is sent to billing at 2886. Processing proceeds to 2850. If a charge number does not exist at 2882, the calling party number is used as the ANI at 2890. Information that the calling number is the ANI and the calling number is the calling number is sent to billing at 2891. The nature of address of the charge parameter is matched at 2892 and 2893. If there is no match, maintenance is informed at 2854. If the match at 2893 is a no ANI, processing proceeds to 2838. If the match at 2893 is a subscriber number at 2895, the NPA from the trunk table is added at 2896, and the NPA is added to the billing number process at 2897. The process then proceeds to 2904. If the match at 2893 is a unique number at 2898, the process proceeds to 2904. If the match at 2893 is a non-unique number at 2899, the number is placed in the calling number field and the charge number is left blank at 2900 and the process proceeds to 2904. If the match at 2893 is a test line or test code at 2901, then the call is marked as a test call for billing at 2902 and the processing proceeds to 2904.

At 2904 (FIG. 18E), the parameter is determined for calling number look-up. If a parameter is not present at 2906, a charge number is determined at 2908. If a charge number is not present at 2910, maintenance is informed at 2912, a cause with index 111 is sent to the treatment table at 2914, and idle is attained at 2916. If a charge number is found at 2910, the calling party number is used for translations at 2918. After 2918 or if a calling number parameter is found at 2906, the calling number is matched to the range in the table at 2922. If a number does not match at 2924, maintenance is informed at 2926 (FIG. 18F), a cause with index 45 is sent to the treatment table at 2928, and idle is attained at 2930. If a match is found at 2924, next function is checked at 3006 and 3008. If the query/response table is next at 3010, then the index is obtained at 3012. The call is sent to the query/response table at 3014, and idle is attained at 3016. If the no table is listed at 3018 or the called number table is next at 3020, then the index is obtained at 3022. The call is sent to the called number table at 3024, and idle is attained at 3026. If the routing table is next at 3034, then the index is obtained at 3036. The call is sent to the routing table at 3038, and idle is attained at 3040. If the trunk group table is next at 3042, then the index is obtained at 3044. The call is sent to the outgoing section of the trunk table at 3046 and idle is attained at 3048.

Called Number Table Processing

Figure 19A:
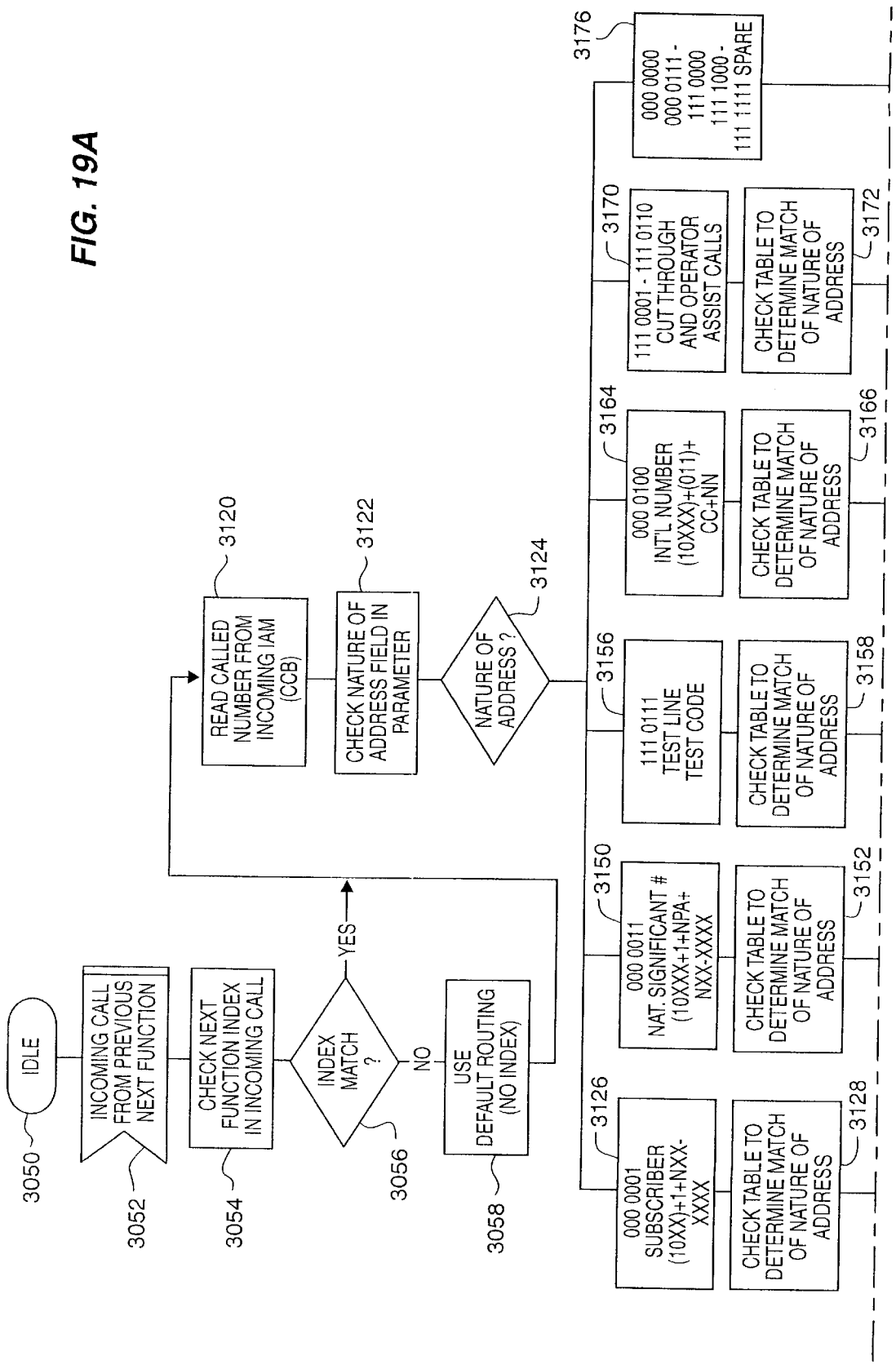
Figure 19B:
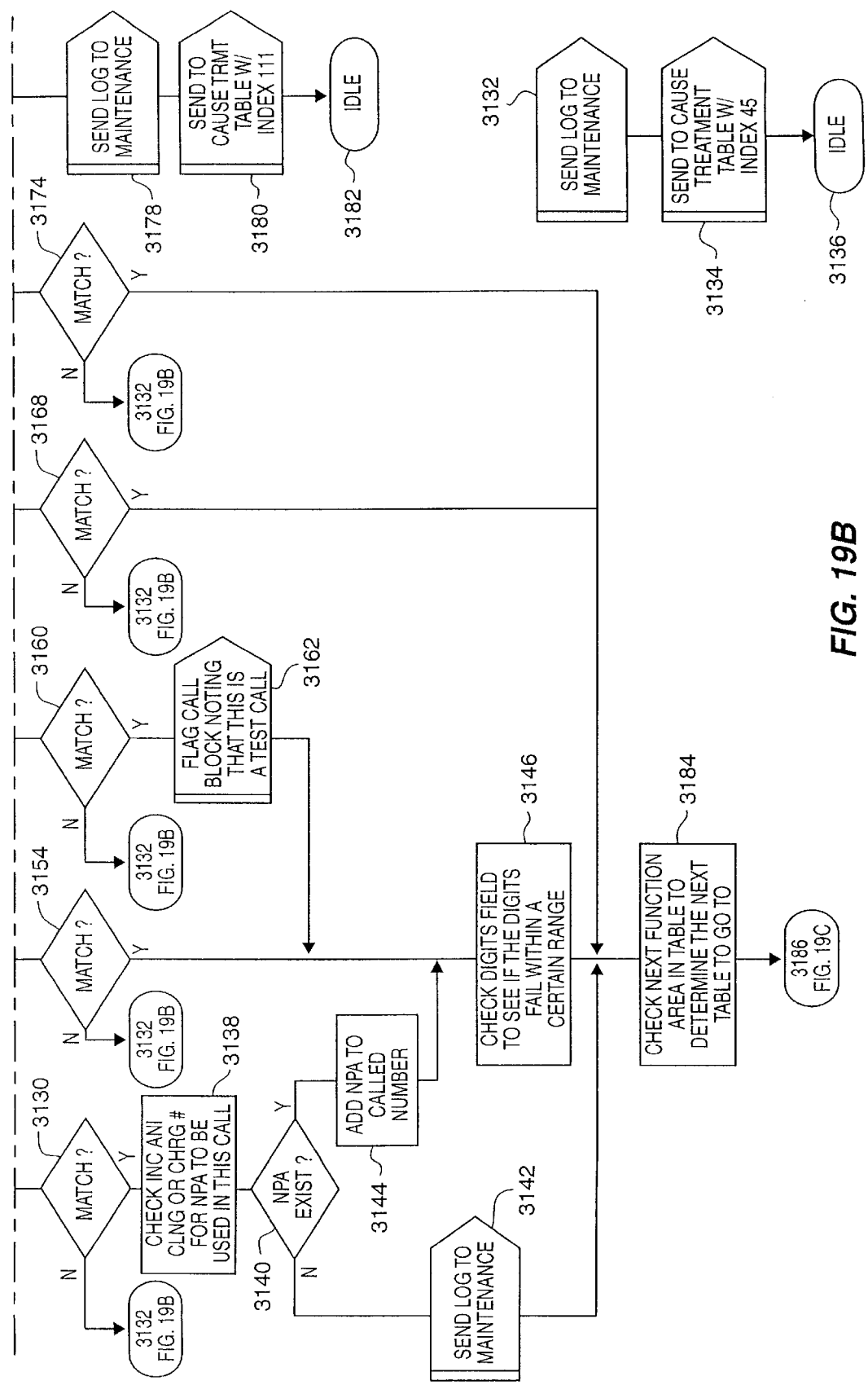
Figure 20A:
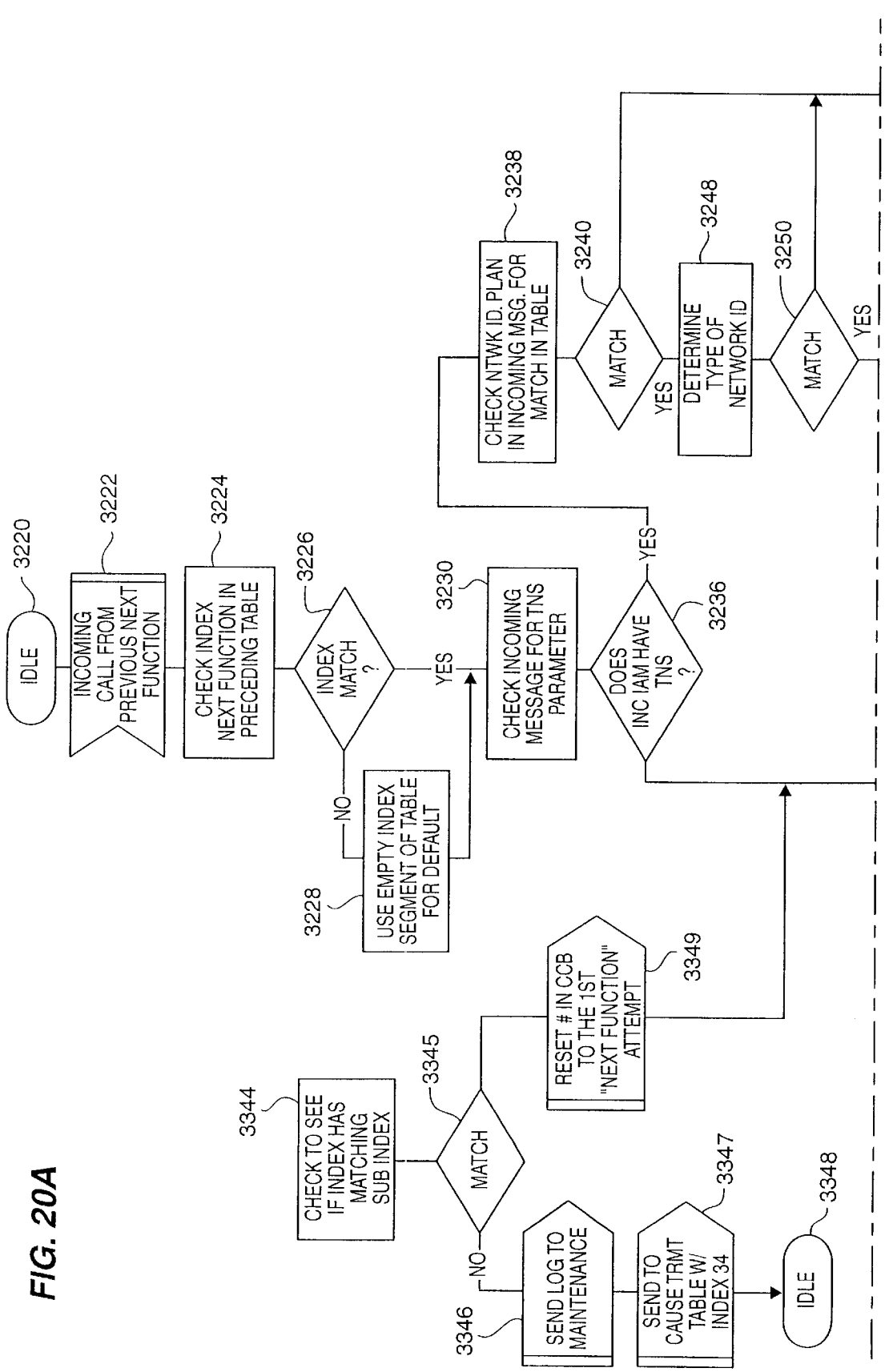
Figure 20D:
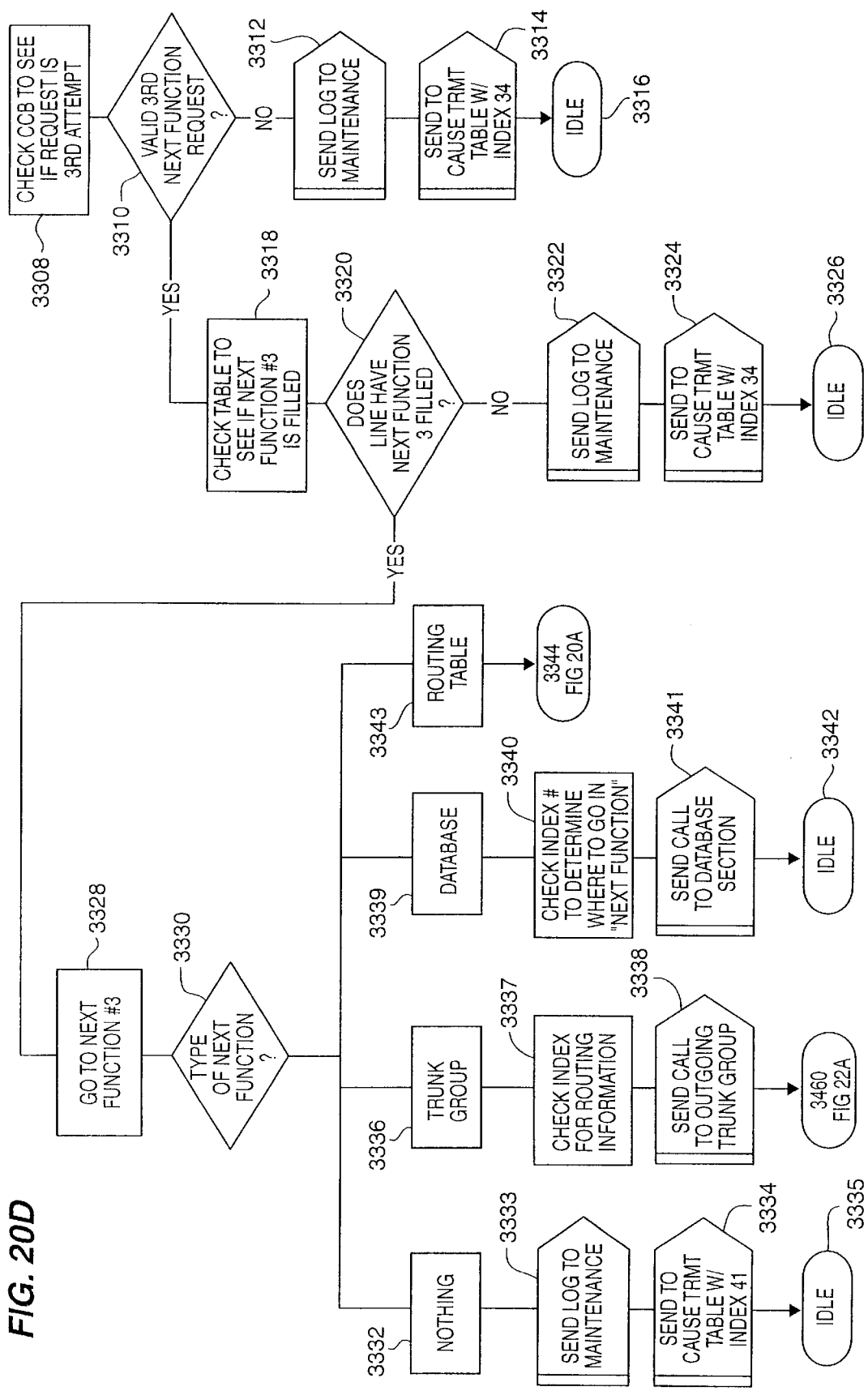

FIGS. 19A–19C entail the use of the called number table. On FIG. 19A, called number table processing is idle at 3050 and is entered by the BCM at 3052 when a call is transferred from a previous next function. At 3054, the index is checked and matched with the table at 3056. If no match is found, the default routing is used at 3058. After 3058 or if the index matches at 3056, then the called party number from the IAM is checked in the CCB at 3120 and the nature of address is checked at 3122 and 3124. If a subscriber number is found at 3126, then remaining entries on that line are checked for a match at 3128 and 3130 (FIG. 19B). If no matches are found at 3130, then maintenance is informed at 3132, a message is sent to the treatment table with an index of 45 at 3134, and the process goes idle at 3136. If a match is found at 3130, ANI is checked for an NPA to use for the call at 3138. If no NPA exists at 3140, then maintenance is informed at 3142 and processing proceeds to 3184. If an NPA does exist at 3140, the NPA is added to the called number at 3144 and the digits are checked at 3146. Processing proceeds to 3184. If a national significant number is found at 3150, then remaining entries on that line are checked for a match at 3152 and 3154. If no matches are found at 3154, then processing proceeds to 3132. If a match is found at 3154, processing proceeds to 3146. If a test line or code is found at 3156, then remaining entries on that line are checked for a match at 3158 and 3160. If no matches are found at 3160, then processing proceeds to 3132. If a match is found at 3160, the call block is flagged to indicate a test call at 3162 and processing proceeds to 3146. If an international number is found at 3164, then remaining entries on that line are checked for a match at 3166 and 3168. If no matches are found at 3168, then processing proceeds to 3132. If a match is found at 3168, processing proceeds to 3184. Typically, this call goes directly the trunk group associated with the international carrier. If cut-through or operator assisted number is found at 3170, then remaining entries on that line are checked for a match at 3172 and 3174. If no matches are found at 3174, then processing proceeds to 3132. If a match is found at 3174, processing proceeds to 3184. Typically, this call would go directly to the trunk group associated with operator services. If a spare number is found at 3176, then maintenance is informed at 3178, a message is sent to the treatment table with an index of 111 at 3180, and idle is attained at 3182.

At 3184 and 3186 (FIG. 19C), the next function is checked. If the query/response is next at 3188, then the index is obtained at 3190. The call is sent to the query/response table at 3192, and idle is attained at 3194. If the no table is listed at 3202 or the routing table is next at 3204, then the index is obtained at 3206. The call is sent to the routing table at 3208, and idle is attained at 3210. If the trunk group table is next at 3212, then the index is obtained at 3214. The call is sent to the outgoing section of the trunk table at 3216. The originating process awaits outgoing circuit selection by the terminating process at 3460.

Routing Table Processing

FIGS. 20A–20D entail the use of the routing table. On FIG. 20A, the routing table is idle at 3220. At 3222, the BCM enters the table with a call that was transferred from a previous next function. The index is checked at 3224 and 3226. If the index does not match at 3226, default routing is used at 3228. If the index match is found, the IAM is checked for Transit Network Selection (TNS) at 3230. If TNS is found 3236, the network identification plan is matched to the table at 3238 and 3240. If a match is not found at 3240, maintenance is informed at 3242 (FIG. 20B), a message is sent to the treatment table with index 45 at 3244, and idle is attained at 3246. If a match is found at 3240, network identification type is determined at 3248 and 3250. If the type is not a national network, processing proceeds to 3242. If the type is a national network, then the network digits are matched in the table at 3252 and 3254. If no match is found, processing proceeds to 3242. If a match is found, the digits in the incoming message are matched to the table at 3256 and 3258. If no match is found, processing proceeds to 3242. If there is no TNS at 3236 or if a match is found at 3258, a first request is determined at 3260 and 3262. If this is a first request at 3262, then the next function is used at 3264 and 3266. If the next function is nothing at 3267, maintenance is informed at 3268, a cause with index 41 is sent to the treatment table at 3269, and idle is attained at 3270. If the next function is a database at 3271, the index is checked at 3272. The call is sent to the query response table at 3273 and idle is attained at 3274. If the next function is trunk group at 3275, the index is checked at 3276, and the call is sent to outgoing trunk selection at 3278. The originating process awaits outgoing circuit selection by the terminating process at 3460.

If the next function is not a first request at 3262, a second request is determined at 3282 (FIG. 20C) and 3283. If a valid second request is found at 3283, the table is checked to see if the second next function is filled at 3284 and 3285. If the second next function is not filled at 3285, maintenance is informed at 3286, a message is sent to the treatment table with cause 34 at 3287, and idle is attained at 3288. If the second next function is filled at 3285, then the second next function is used at 3290 and 3291. If the next function is nothing at 3292, maintenance is informed at 3293, a cause with index 41 is sent to the treatment table at 3294, and idle is attained at 3295. If the next function is a database at 3296, the index is checked 3297. The call is sent to the query response table at 3298 and idle is attained at 3299. If the next function is trunk group at 3300, the index is checked at 3302, and the call is sent to outgoing trunk selection at 3304. The originating process awaits outgoing circuit selection by the terminating process at 3460.

If a valid second request is not found at 3283, the table is checked to see if the request is a third attempt at 3308 (FIG. 20D) and 3310. If the third request is not valid at 3310, maintenance is informed at 3312, a message is sent to the treatment table with cause 34 at 3314, and idle is attained at 3316. If the request is valid at 3310, the table is checked to see if the third next function is filled at 3318 and 3320. If the third next function is not filled at 3320, maintenance is informed at 3322, a message is sent to the treatment table with cause 34 at 3324, and idle is attained at 3326. If the third next function is filled at 3320, then the third next function is used at 3328 and 3330. If the next function is nothing at 3332, maintenance is informed at 3333, a cause with index 41 is sent to the treatment table at 3334, and idle is attained at 3335. If the next function is trunk group at 3336, the index is checked at 3337, and the call is sent to outgoing trunk selection at 3338. The originating process awaits outgoing circuit selection by the terminating process at 3460. If the next function is a database at 3339, the index is checked at 3340. The call is sent to the query response table at 3341 and idle is attained at 3342. If the next function is the routing table at 3343, a matching sub-index is checked at 3344. If no match is found at 3345, maintenance is informed at 3346, a cause with index 41 is sent to the treatment table at 3347, and idle is attained at 3348. If a match is found at 3345, the CCB is reset to first next function at 3349 and processing proceeds to 3260.

Treatment Table Processing

Figure 21A:
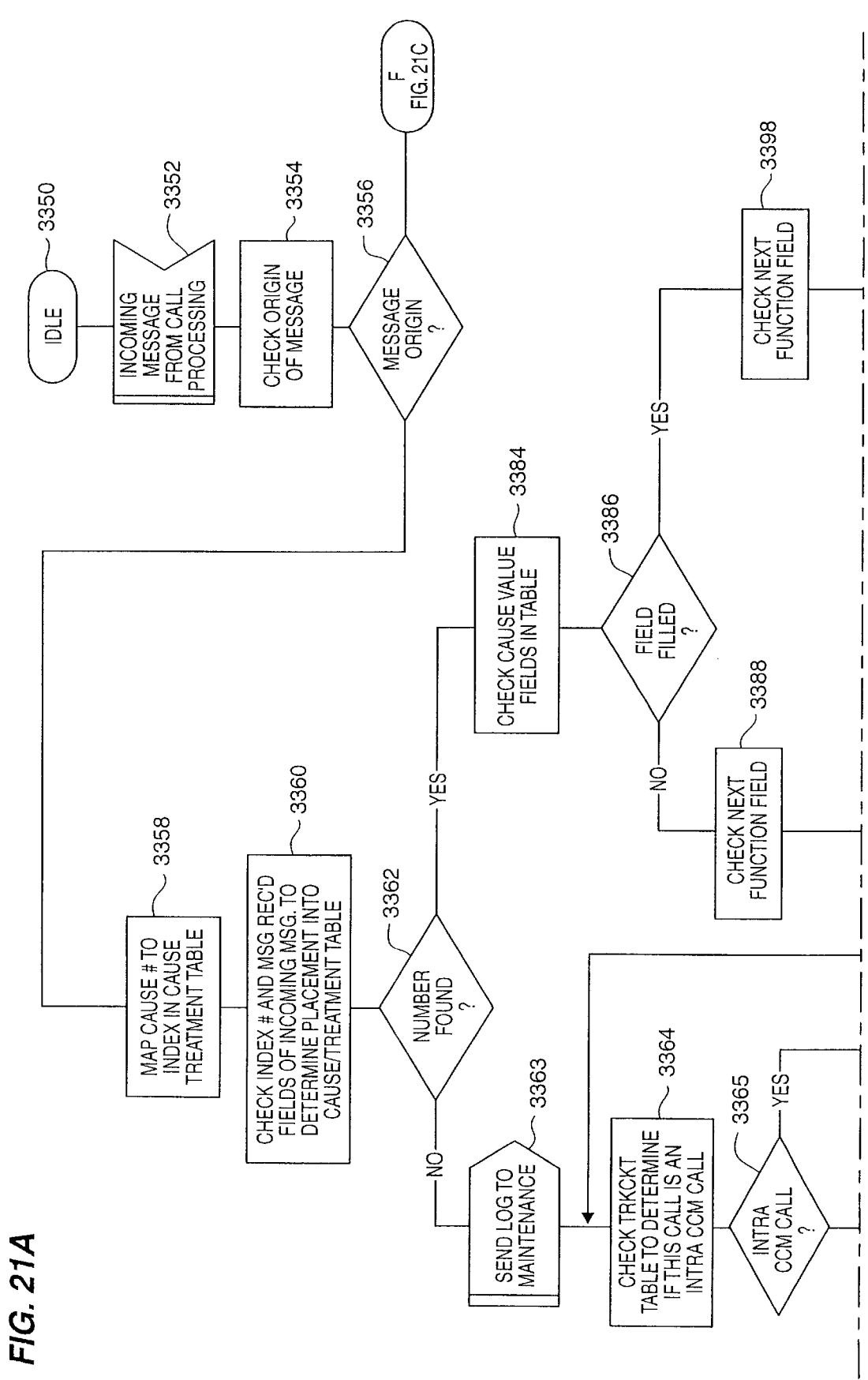

FIGS. 21A–21D entail the use of the treatment table. On FIG. 21A, the treatment table is idle at 3350 and the BCM enters the table at 3352 when a message is received. At 3354 and 3456, the origin of the message is checked. If the message is an incoming REL message, the cause number is mapped to an index in the treatment table at 3358. The index and message received fields are used to key into the table at 3360. If a number is not found at 3362, then maintenance is informed at 3363 and it is determined if the call is intra-CCM at 3364 and 3365. If the call is intra-CCM at 3365, an internal REL is sent at 3366 (FIG. 21B). If the call is not intra-CCM at 3365, an external REL with the same cause as was received is sent at 3367. After 3366 or 3367, it is determined if a COT is used at 3368. If a 1 is present, the incoming continuity process is stopped at 3370 and the COT timer is stopped at 3372. If a 2 is present at 3368, the COT timer is stopped at 3372. After 3372 or if a 0 is present at 3368, the circuit is marked as transient at 3374. The RLC timer is started at 3376 and the send REL timer is started at 3378. Echo control is reset at 3380, and the originating process awaits an RLC at 3724. If a number is found at 3362, then cause values are checked in the table at 3384 and 3386. If the field is not filled at 3386, then next function is checked at 3388 and 3390. If the type of next function is nothing or release at 3390, then processing proceeds to 3364. All other types of next functions at 3390 have their cause values disregarded at 3392. Next function is used at 3394 and idle is attained at 3396. If the field is filled at 3386, then next function is checked at 3398 and 3400. If the next function at 3400 is none or release, then it is determined if the call is intra-CCM at 3401 and 3402. If the call is intra-CCM at 3402, an internal REL is sent at 3403. If the call is not intra-CCM at 3402, an external REL with a new cause is sent at 3404. After 3403 or 3404 and processing proceeds to 3368. All other types of next functions at 3400 have their cause values disregarded at 3405. Next function is used at 3406 and idle is attained at 3408.

Figure 21C:
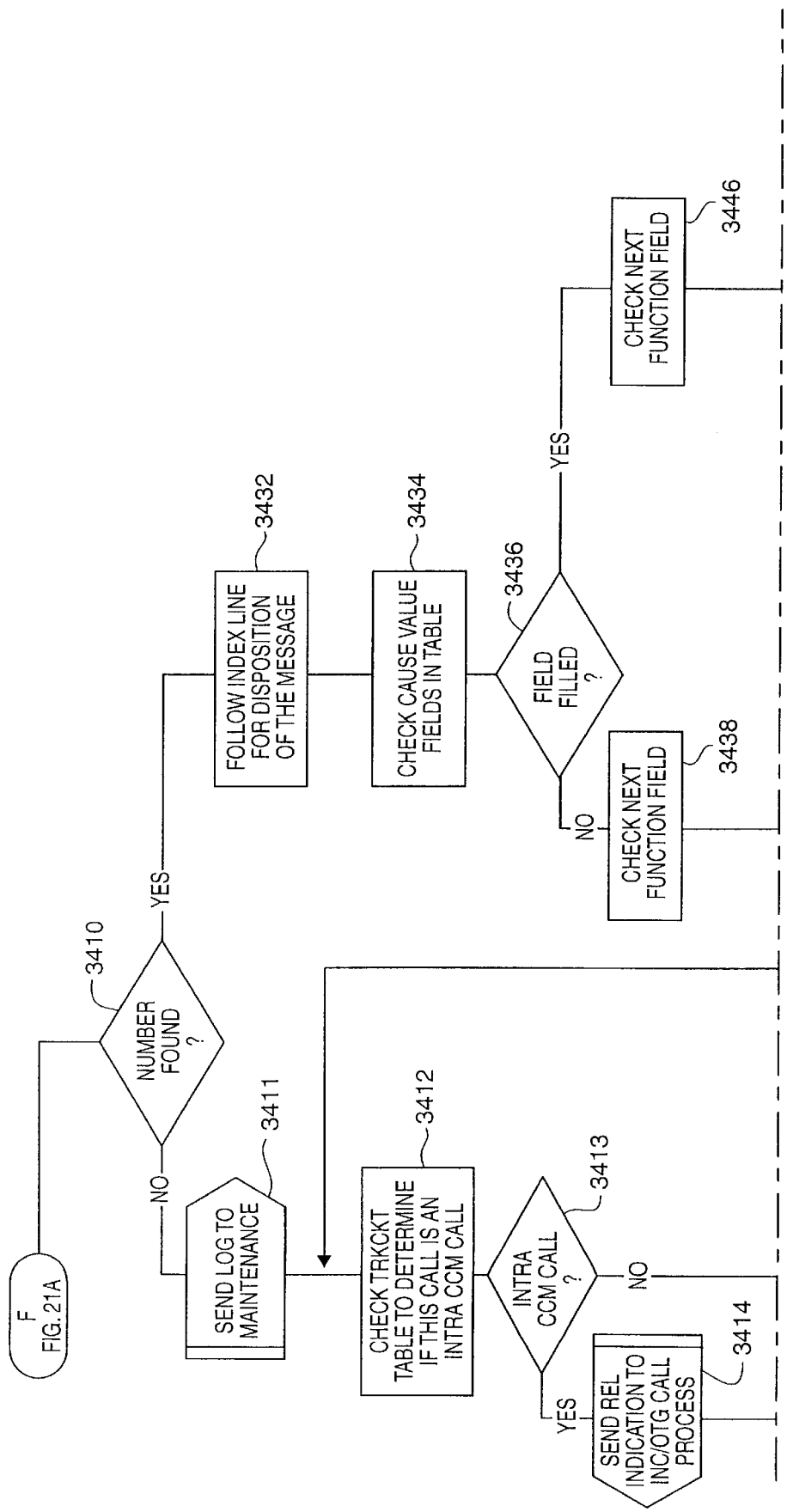
Figure 21D:
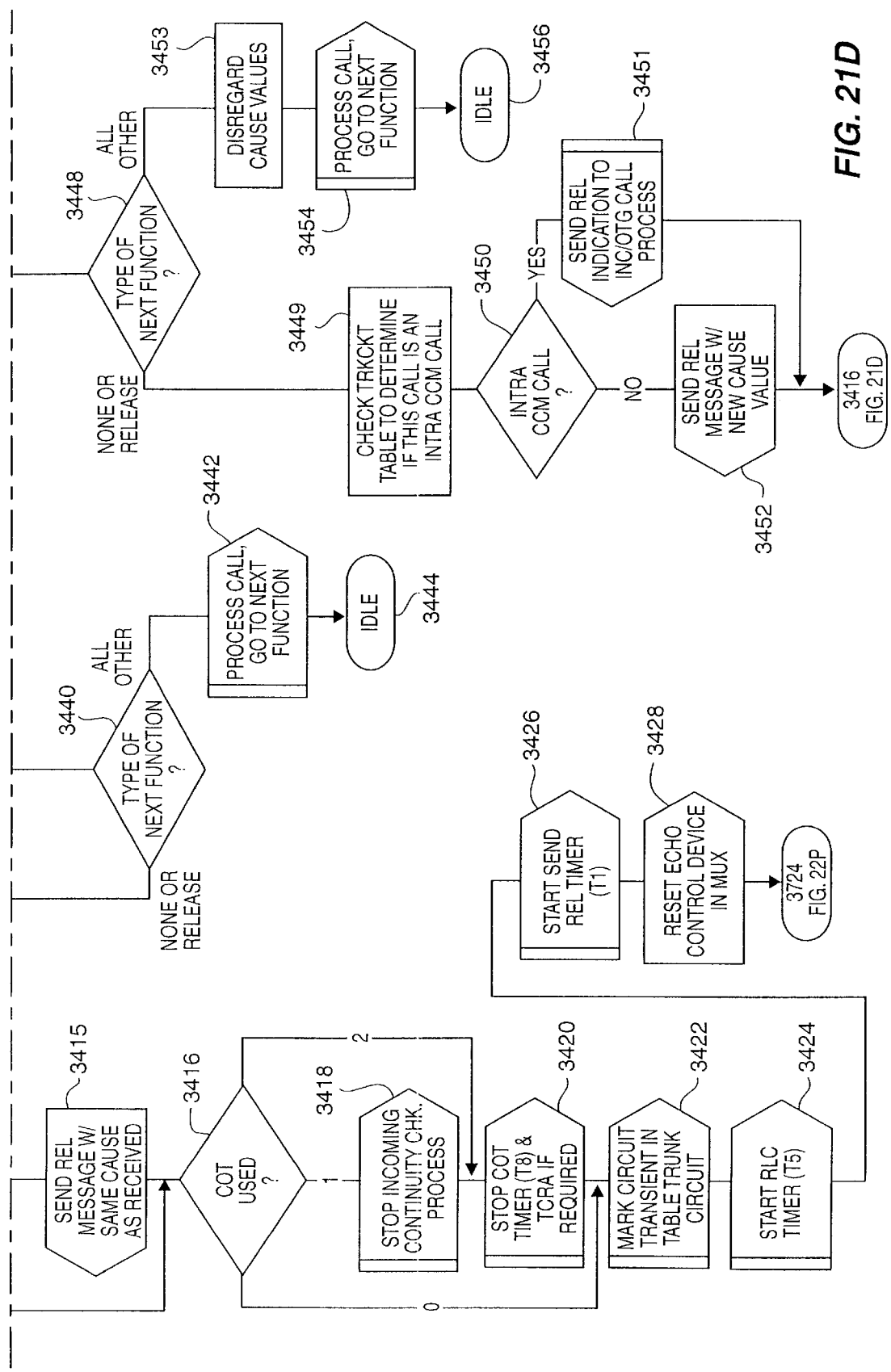

If the message originated within the CCM at 3356, then the index number is checked at 3410 (FIG. 21C). If a number is not found at 3410, then maintenance is informed at 3411 and it is determined if the call is intra-CCM at 3412 and 3413. If the call is intra-CCM at 3413, an internal REL is sent at 3414. If the call is not intra-CCM at 3413, an external REL with the same cause as was received is sent at 3415 (FIG. 21D). After 3414 or 3415, it is determined if a COT is used at 3416. If a 1 is present, the incoming continuity process is stopped at 3418 and the COT timer is stopped at 3420. If a 2 is present at 3416, the COT timer is stopped at 3420. After 3420 or if a 0 is present at 3416, the circuit is marked as transient at 3422. The RLC timer is started at 3424 and the send REL timer is started at 3426. Echo control is reset at 3428, and the originating process awaits an RLC at 3724. If a number is found at 3410, then the index line is followed at 3432 and cause values are checked in the table at 3434 and 3436. If the field is not filled at 3436, then next function is checked at 3438 and 3440. If the type of next function is nothing or release at 3440, then processing proceeds to 3412. All other types of next functions at 3440 are used at 3442 and idle is attained at 3444. If the field is filled at 3436, then next function is checked at 3446 and 3448. If the next function at 3448 is none or release, then it is determined if the call is intra-CCM at 3449 and 3450. If the call is intra-CCM at 3450, an internal REL is sent at 3451. If the call is not intra-CCM at 3450, an external REL with a new cause is sent at 3452. After 3451 or 3452, processing proceeds to 3416. All other types of next functions at 3448 have their cause values disregarded at 3453. Next function is used at 3454 and idle is attained at 3456.

Originating Process—Call Completion

Figure 22A:
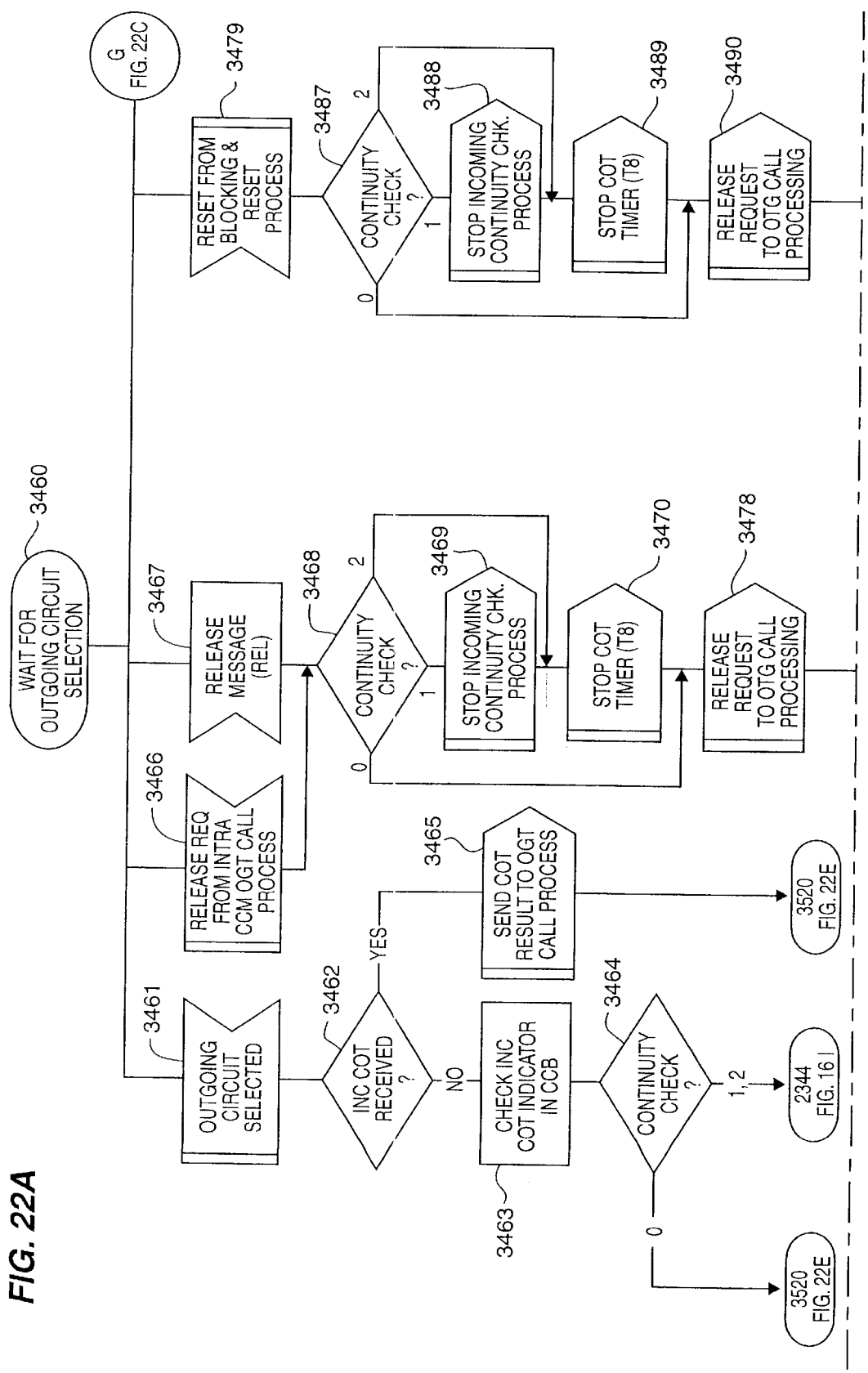
FIGS. 22A–22Q are SDL diagrams of logic used in a version of the invention.
Figure 22B:
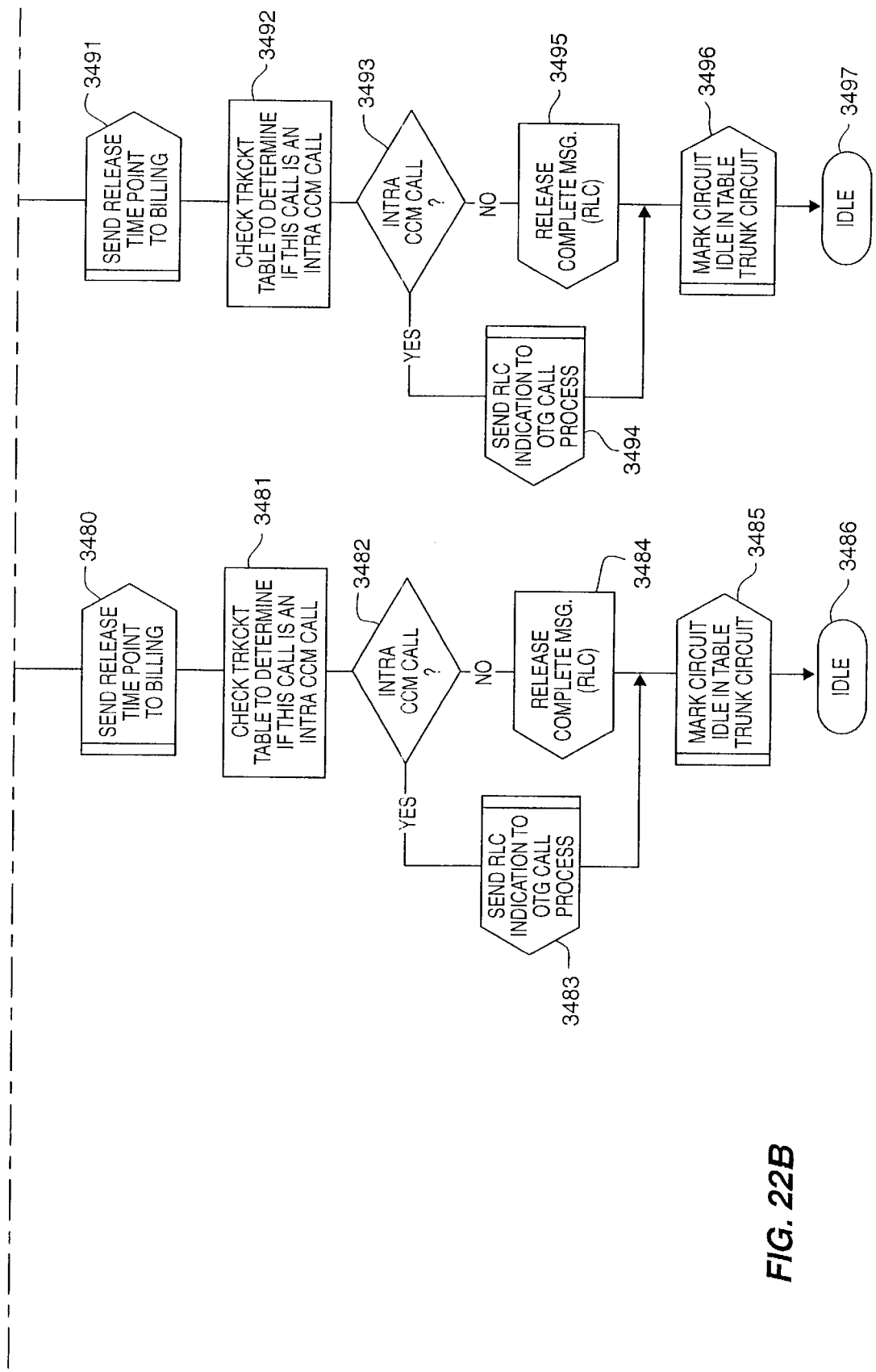
Figure 22C:
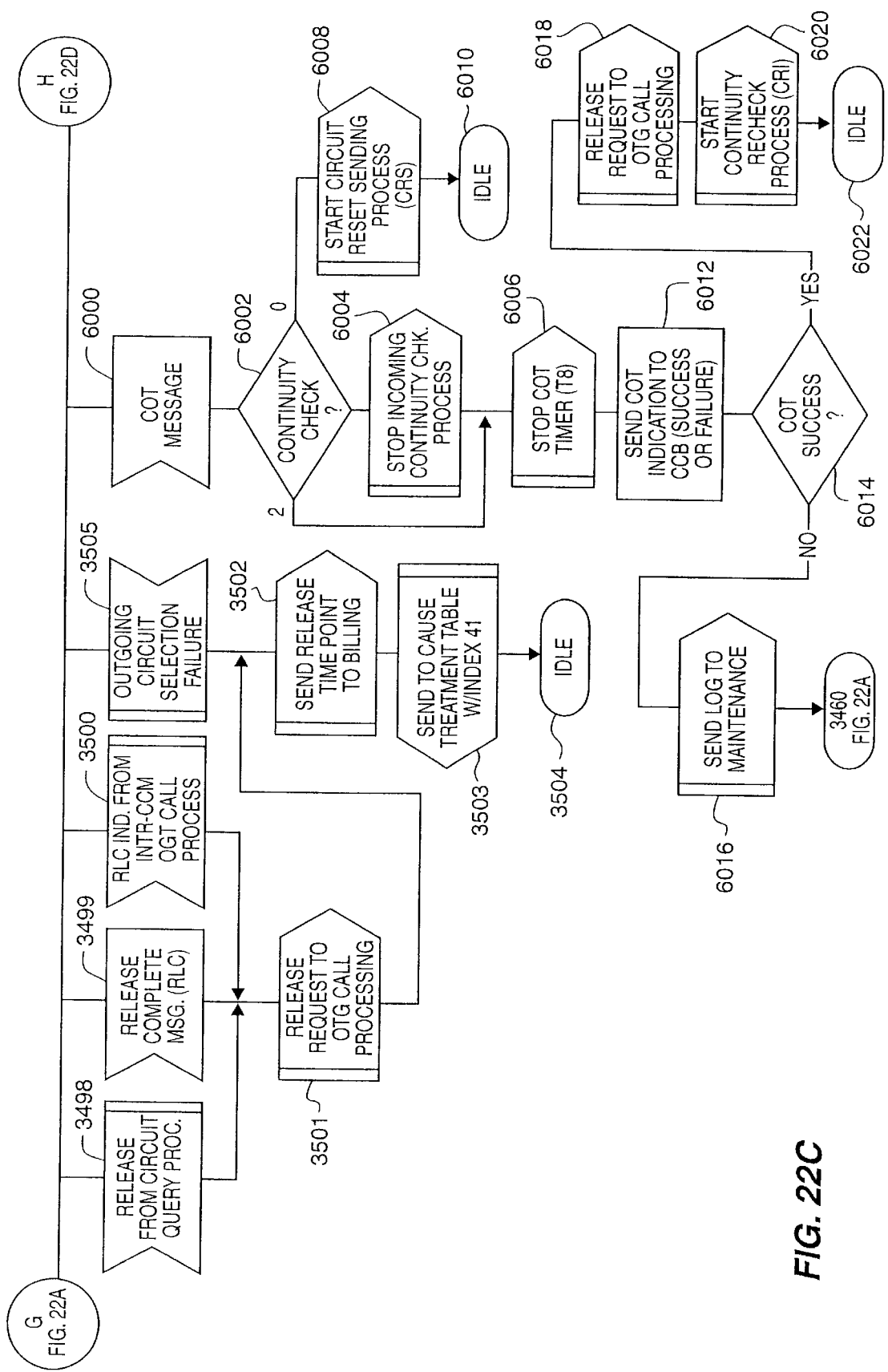
Figure 22D:
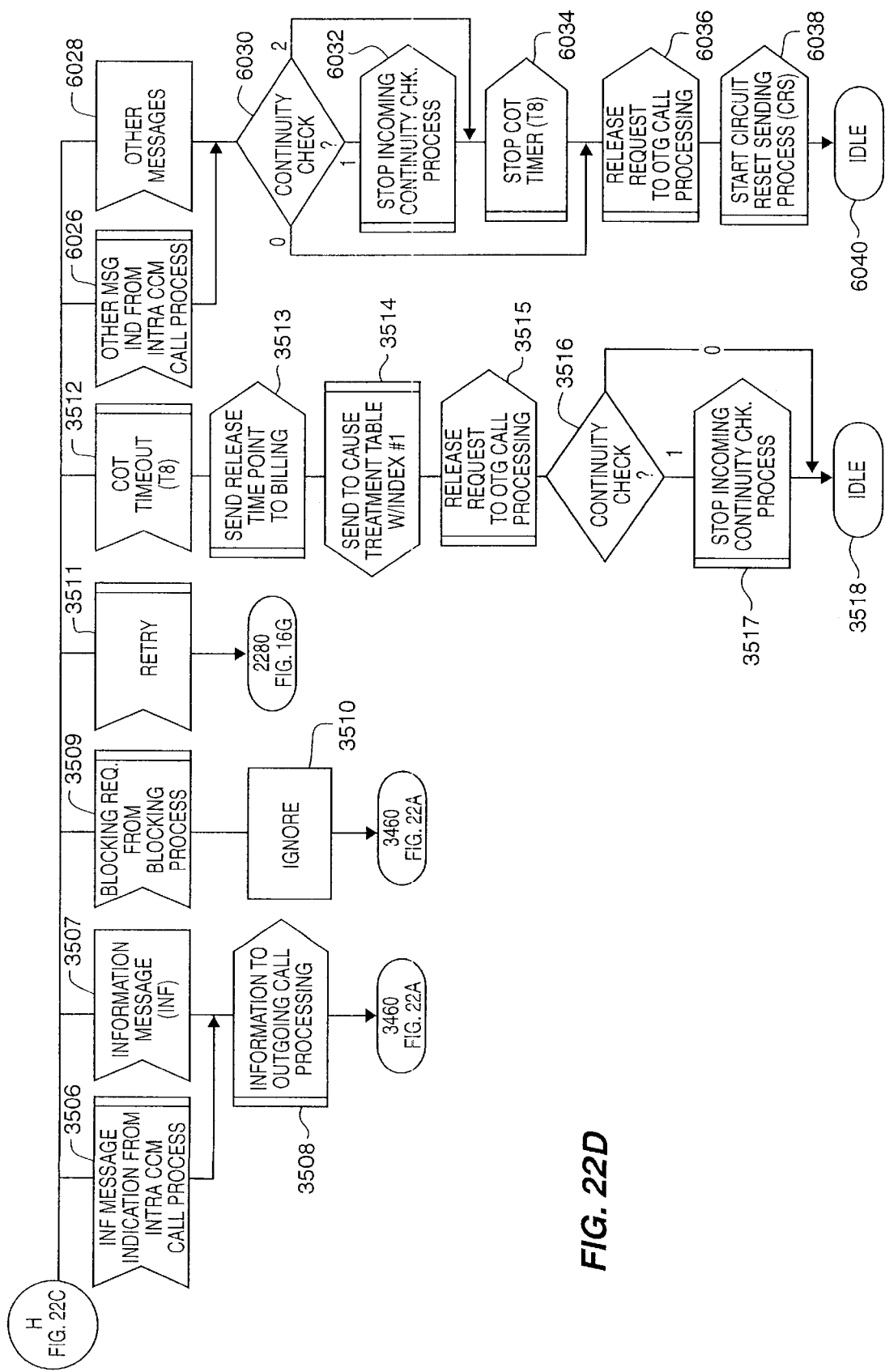
Figure 22F:
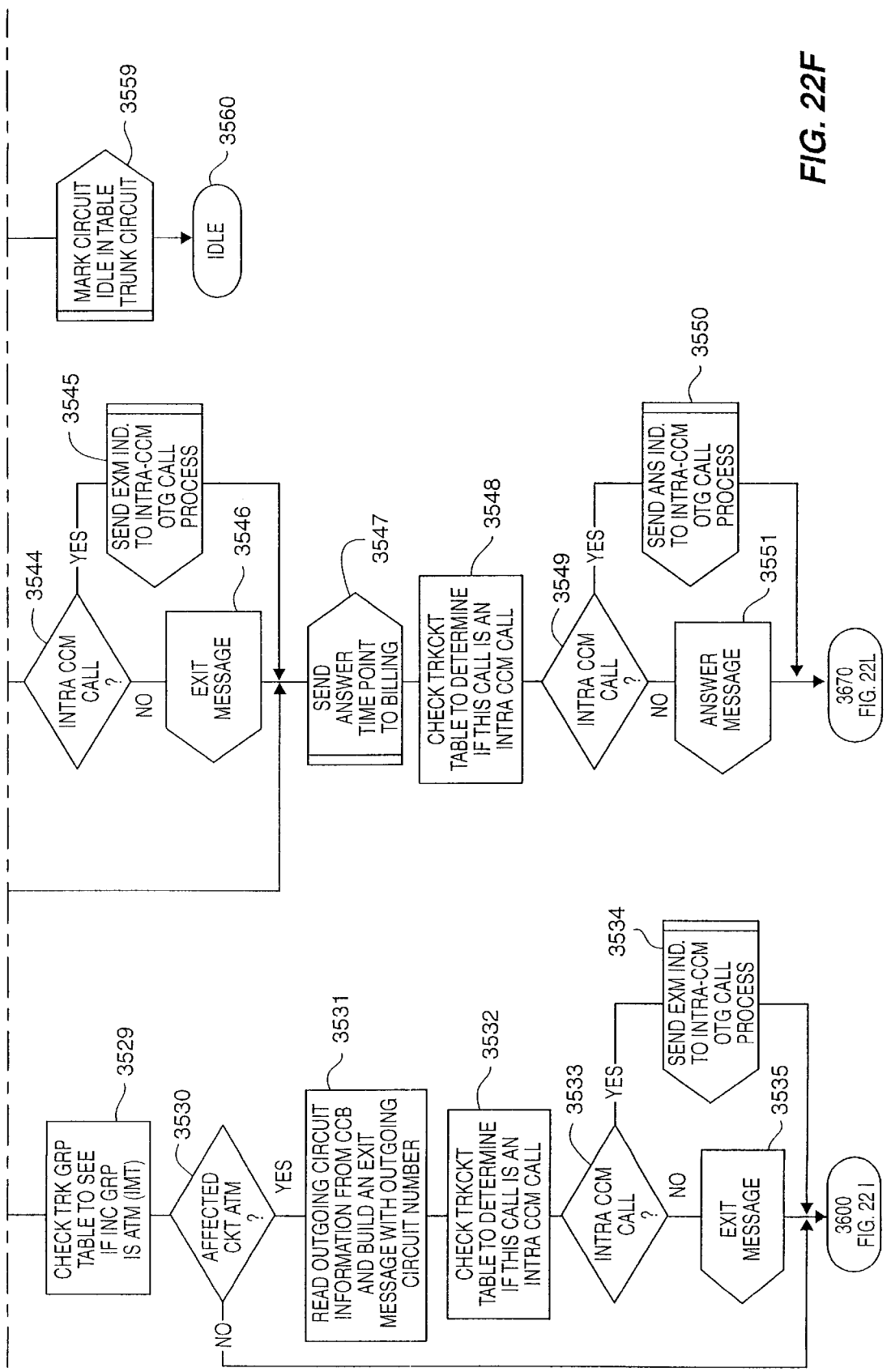
Figure 22G:
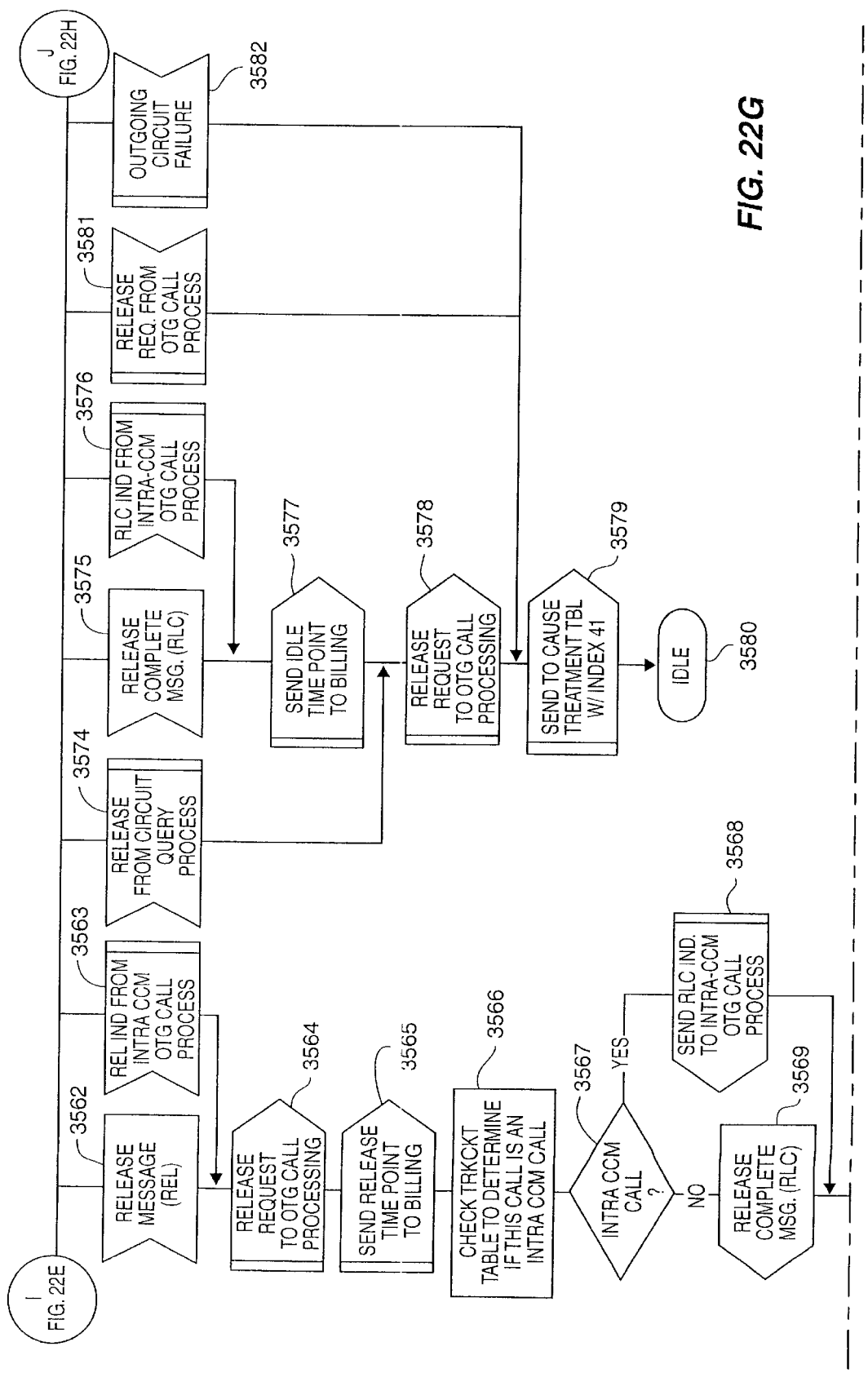
Figure 22H:
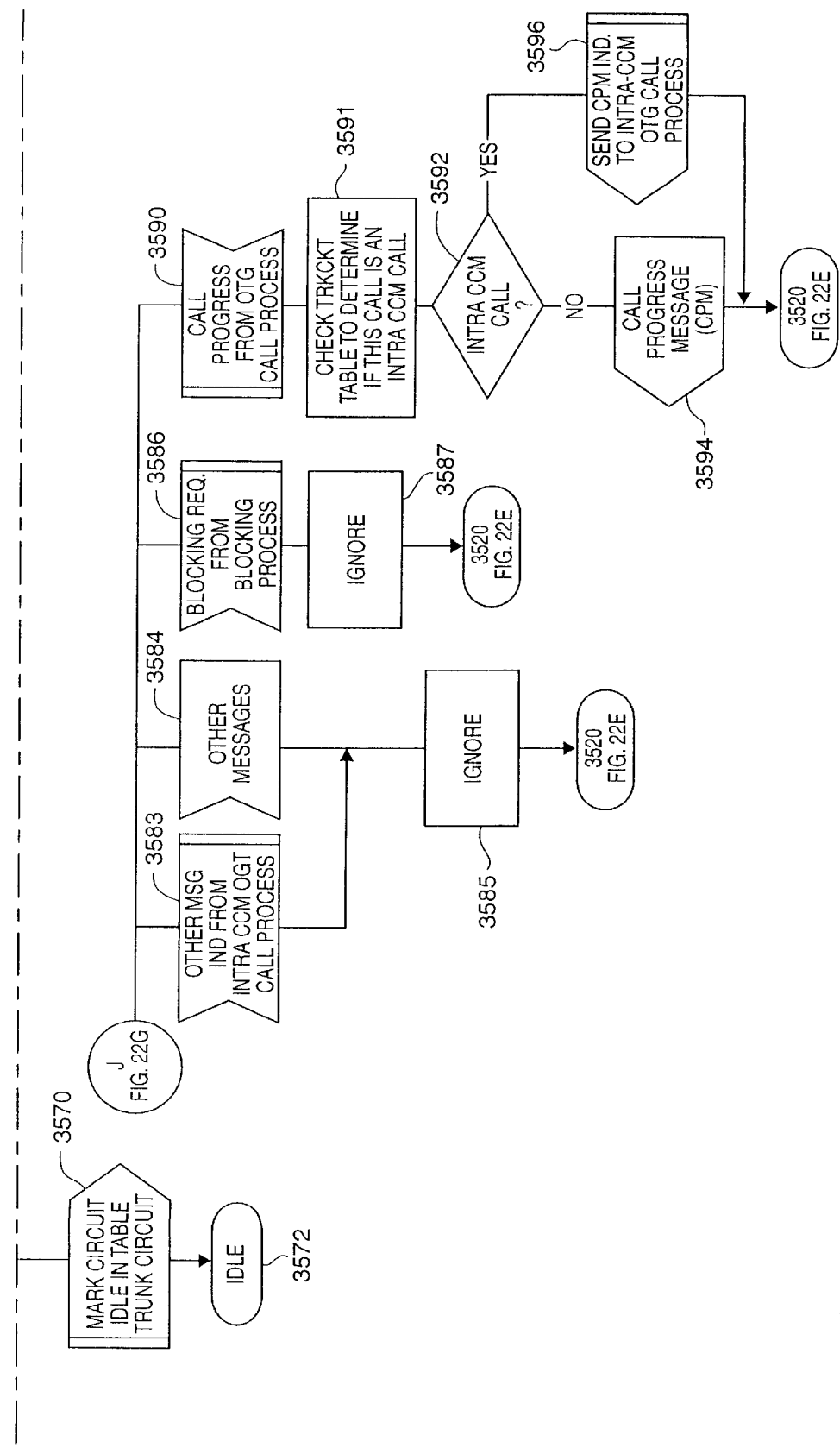
Figure 22I:
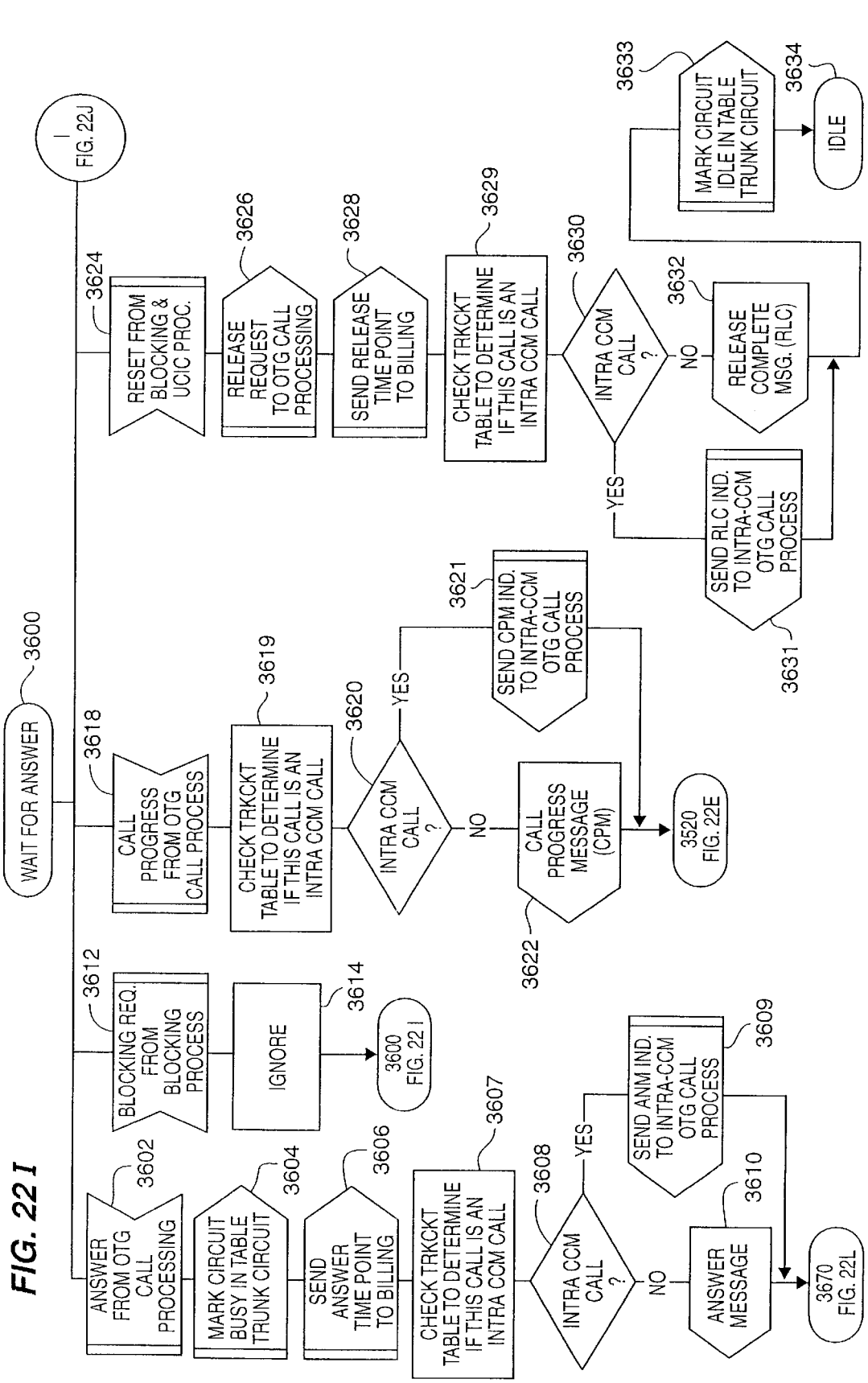
Figure 22J:
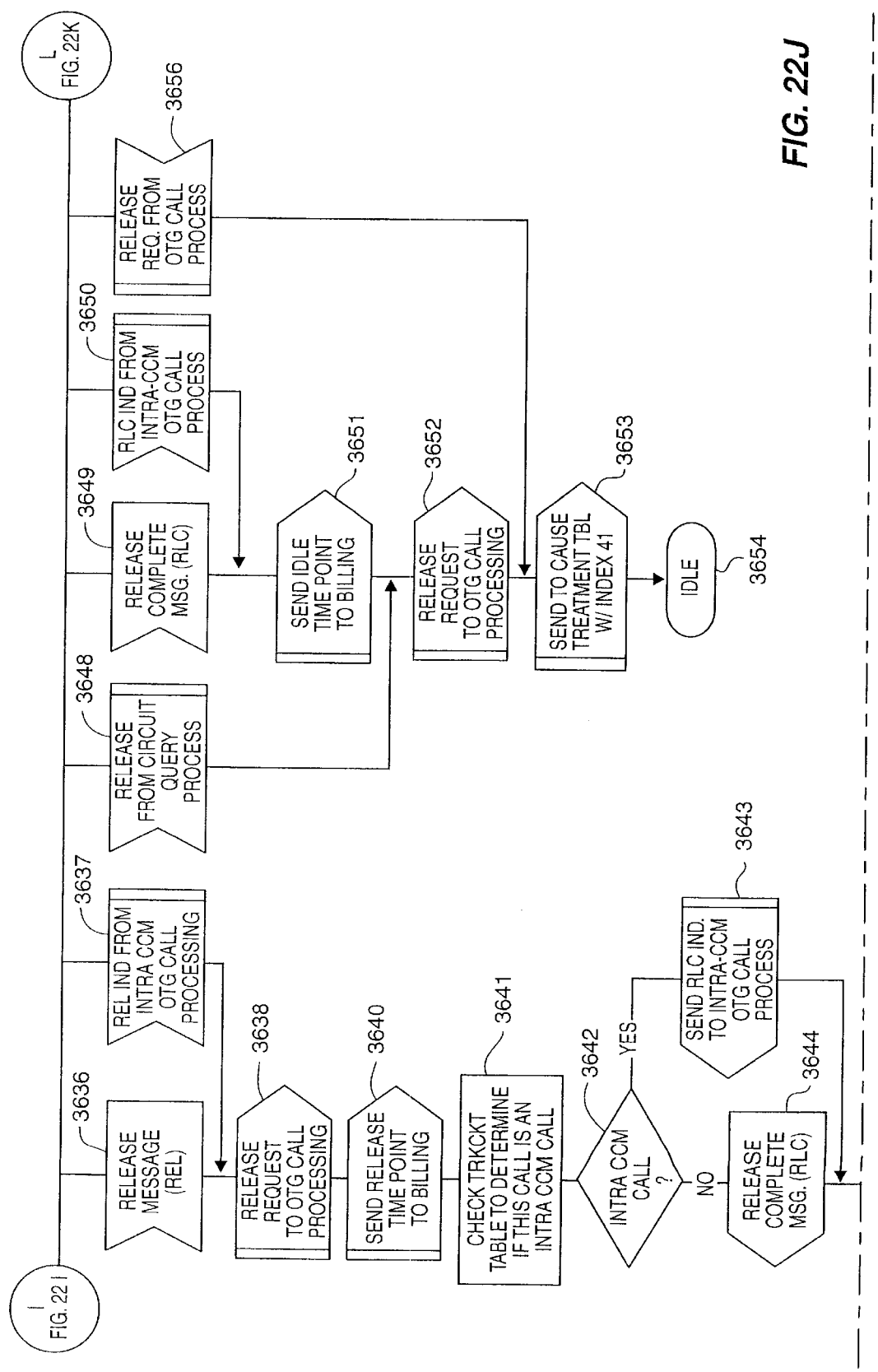
Figure 22K:
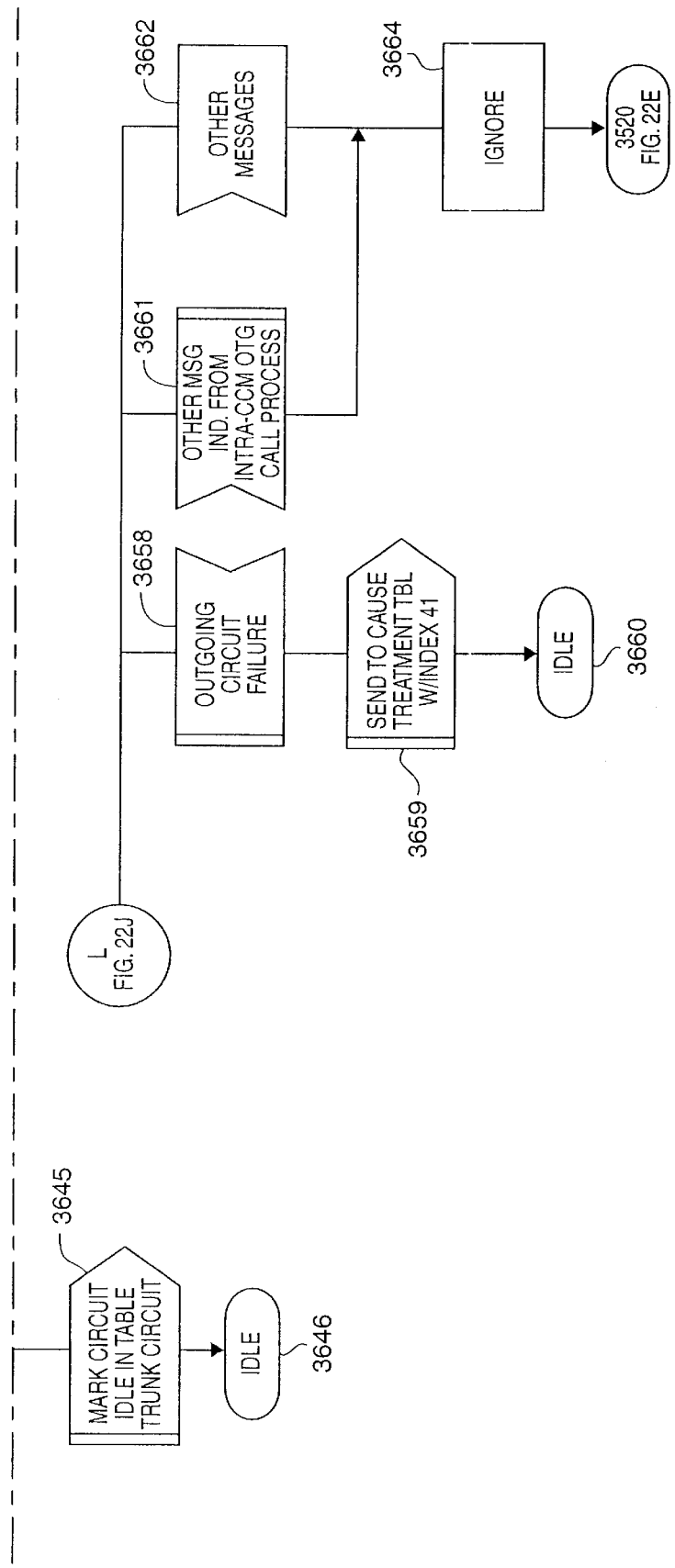
Figure 22L:
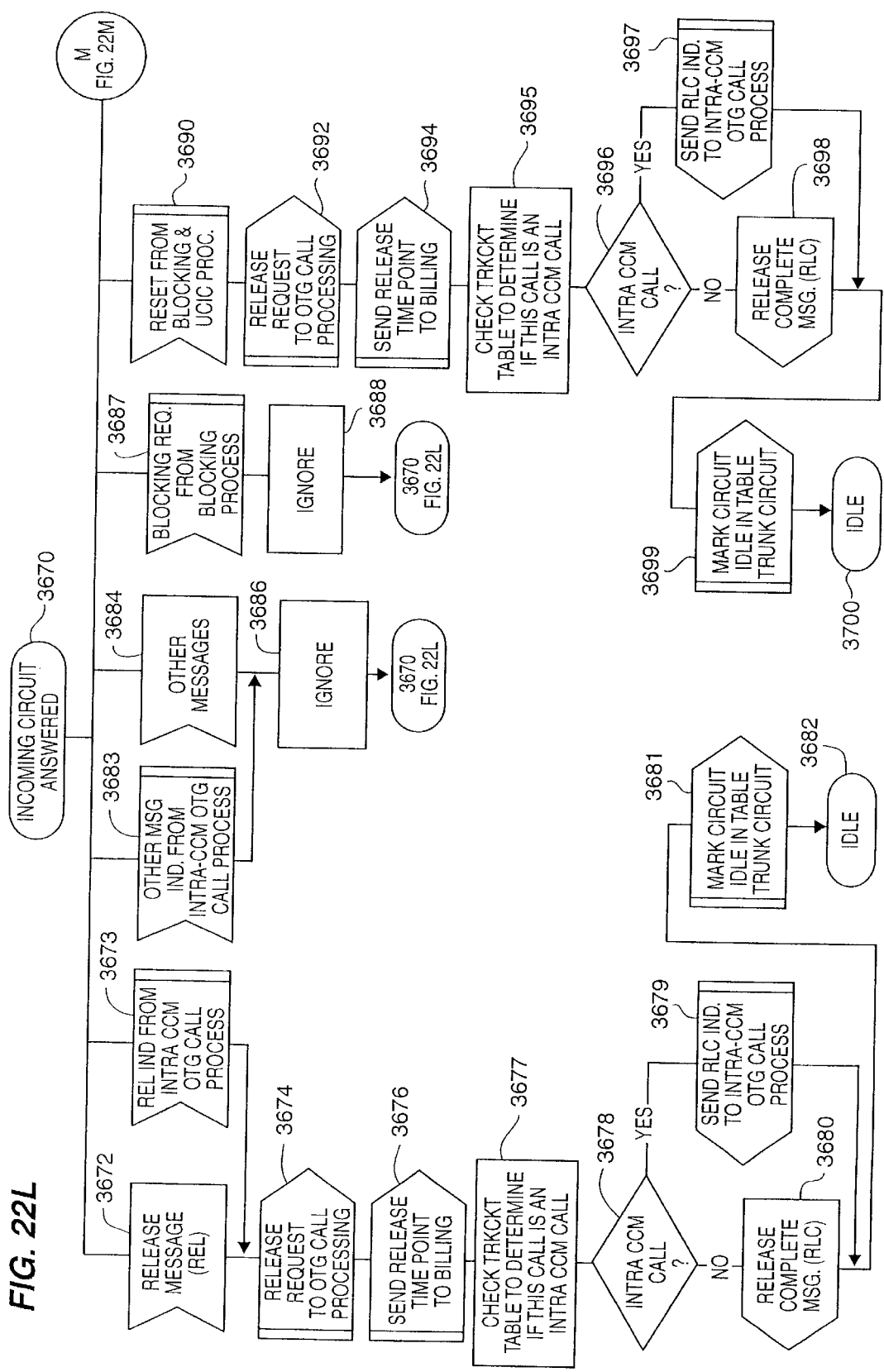
Figure 22M:
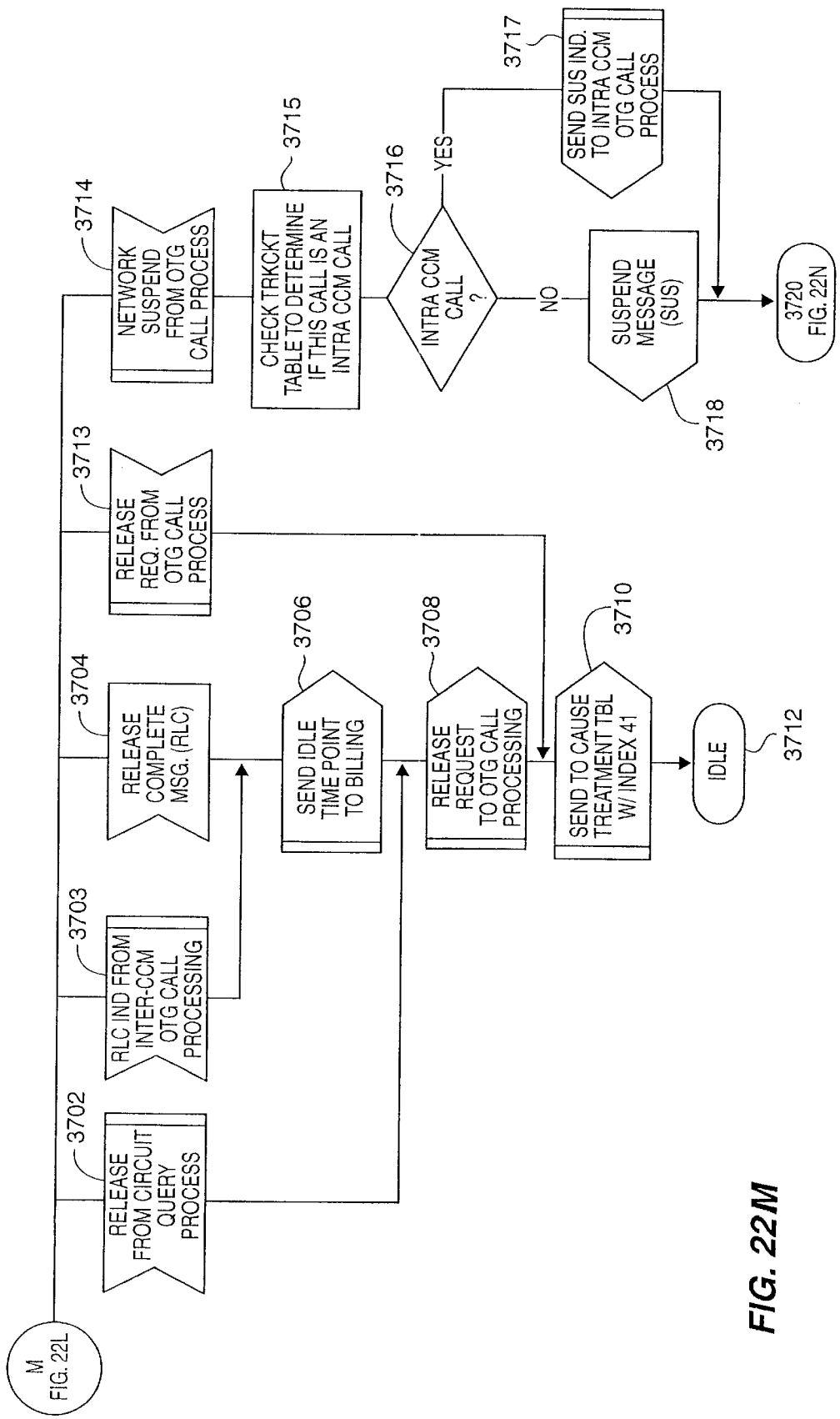
Figure 22:
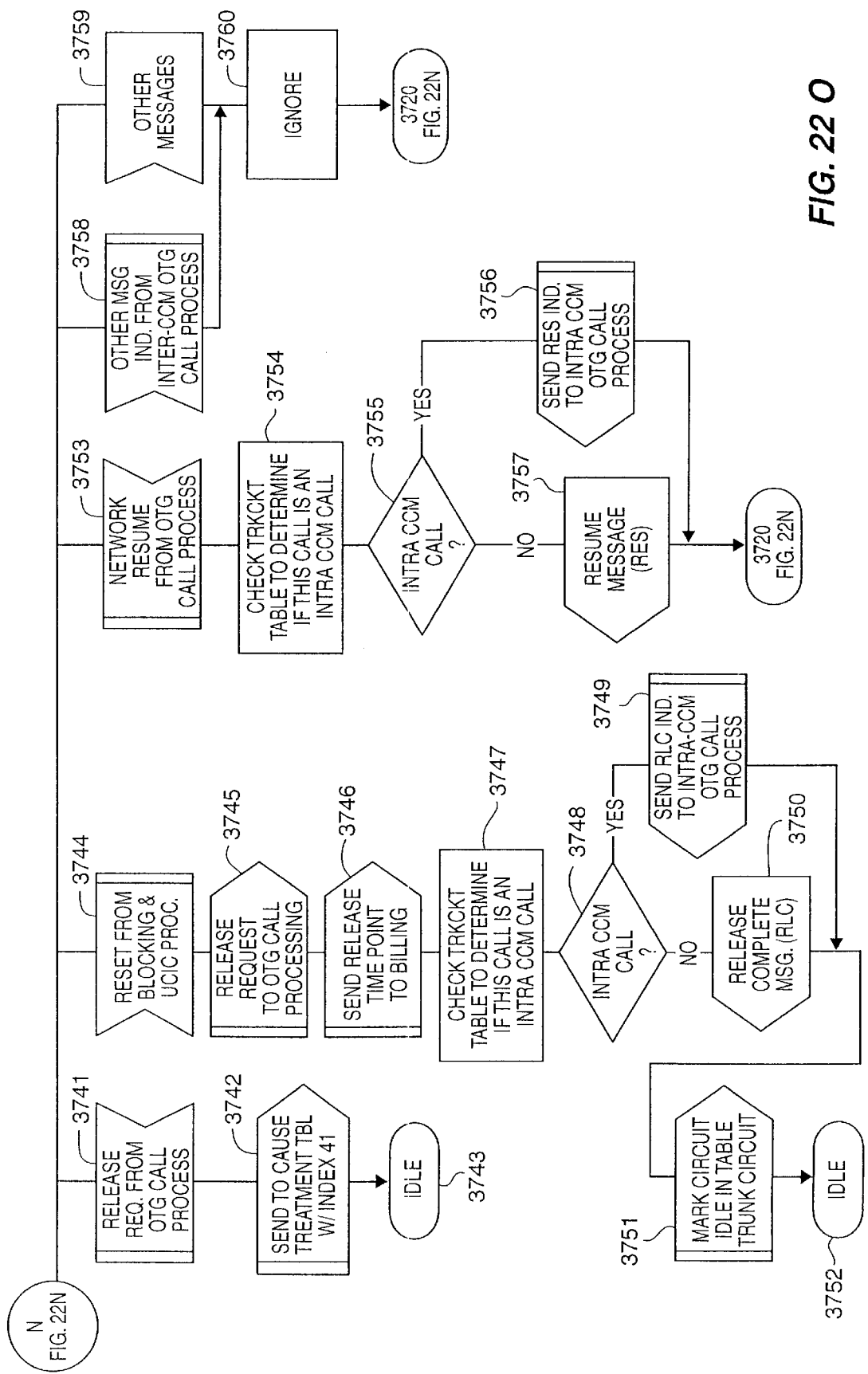
Figure 22P:
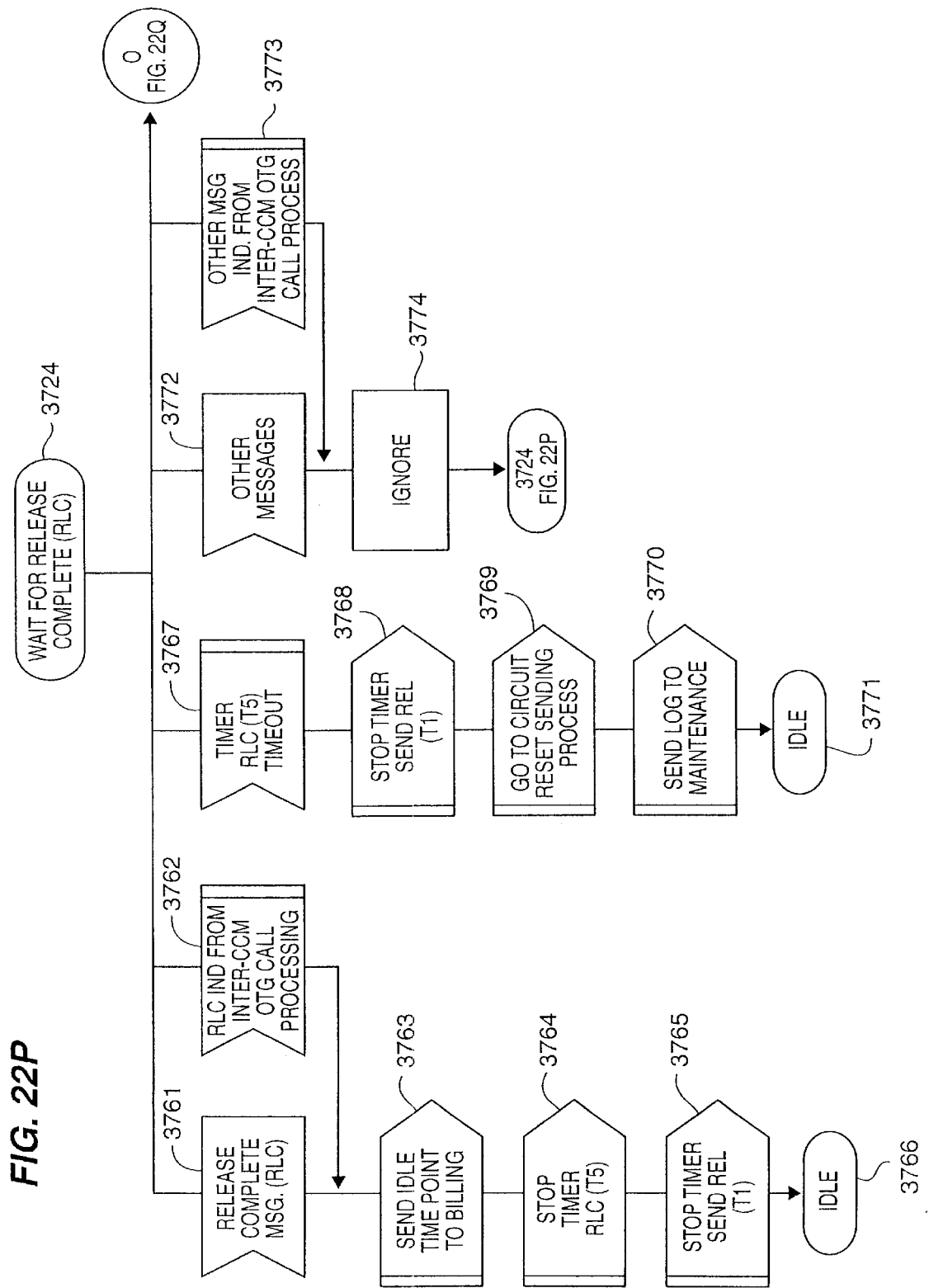
Figure 22Q:
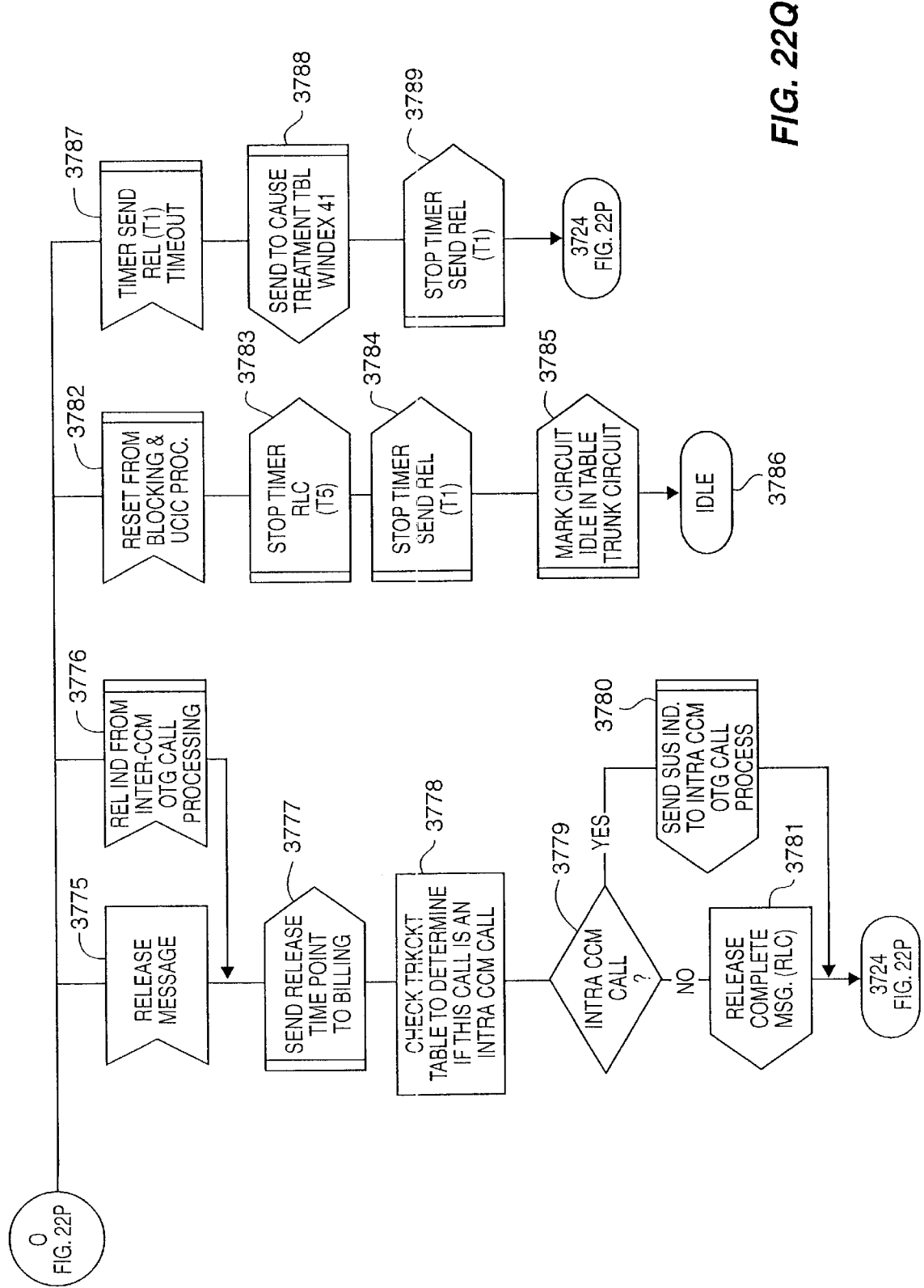

At various points above, the originating process handling the incoming side of the call may wait for the terminating process to take some action on the outgoing side of the call before call completion. Some examples are waiting for the terminating process to select an outgoing trunk group or receive an ACM, ANM, or RLC. The originating process may also receive an RLC from the incoming side of the call. FIGS. 22A–22Q depict this call completion processing by the originating process of the BCM.

On FIG. 22A at 3460, the originating process awaits outgoing circuit selection by the termination process. If an outgoing circuit is selected at 3461, it is determined if a COT has been received at 3462. If a COT has not been received, the CCB is checked for a COT indicator at 3463 and 3464. If a 0 is found (COT not required), the process proceeds to 3520. If a 1 or 2 is found at 3464 (COT required), processing proceeds to 2344. If a COT was received at 3462, the COT result is sent to the terminating process at 3465 and processing proceeds to 3520. If an internal REL is received at 3466 or an external REL is received at 3467, it is determined if a continuity check is required at 3468. If a continuity check is required on this circuit (1), the incoming continuity check process is stopped at 3469 and the stop COT timer is stopped at 3470. If a continuity check is required on the previous circuit (2), processing proceeds to 3470. After 3470 or if no continuity check is required (0), a release request is sent to the terminating process at 3478, and a release time point is sent to billing at 3480 (FIG. 22B). It is determined if the call is intra-CCM at 3481 and 3482. If the call is intra-CCM at 3482, an internal RLC is sent at 3483. If the call is not intra-CCM at 3482, an external RLC is sent at 3484. After 3483 or 3484, the circuit is marked idle in the trunk circuit table at 3485. Idle is attained at 3486. If a reset is received at 3479, it is determined if a continuity check is required at 3487. If a continuity check is required on this circuit (1), the incoming continuity check process is stopped at 3488 and the stop COT timer is stopped at 3489. If a continuity check is required on the previous circuit (2), processing proceeds to 3489. After 3489 or if no continuity check is required (0), then a release request is sent to the terminating process at 3490 and a release time point is sent to billing at 3491. It is determined if the call is intra-CCM at 3492 and 3493. If the call is intra-CCM at 3493, an internal RLC is sent at 3494. If the call is not intra-CCM at 3493, an external RLC is sent at 3495. After 3494 or 3495, the circuit is marked idle in the trunk circuit table at 3496. Idle is attained at 3497.

If a release is received from a circuit query at 3498 (FIG. 22C), or if an external RLC is received at 3499, or if an internal RLC is received at 3500, then a release request is sent to the terminating process at 3501 and a release time point is sent to billing at 3502. A message is sent to the treatment table with index 41 at 3503 and idle is attained at 3504. If circuit selection failure is received at 3505, then processing proceeds to 3502. If a COT is received at 6000, it is determined if a continuity check is required at 6002. If a continuity check is required on this circuit (1), the incoming continuity check process is stopped at 6004 and the stop COT timer is stopped at 6006. If a continuity check is required on the previous circuit (2), processing proceeds to 6006. If no continuity check is required (0), the circuit reset sending process is invoked at 6008 and idle is attained at 6010. After 6006, COT success or failure indication is sent to the CCB at 6012. If the COT is not a success at 6014, maintenance is informed at 6016 and the process returns to 3460. If the COT is a success at 6014, a release request is sent to the terminating process at 6018. The continuity recheck process is invoked at 6020 and idle is attained at 6022.

If an internal information message is received at 3506 (FIG. 22D) or an external information message is received at 3507, the message is sent to the terminating process at 3508 and the process returns to 3460. If a blocking request is received at 3509, it is ignored at 3510, and processing returns to 3460. If a retry message is received at 3511, processing proceeds to 2280. If a COT time-out is received at 3512, a release time point is sent to billing at 3513, and cause with index 41 is sent to the treatment table at 3514. At 3515, a release request is sent to the terminating process and it is determined if a continuity check is required at 3516. If a continuity check is required on this circuit (1), the incoming continuity check process is stopped at 3517 and the idle is attained at 3518. If no continuity check is required (0), idle is attained at 3518. If other internal messages are received at 6026 or if other external messages are received at 6028, it is determined if a continuity check is required at 6030. If a continuity check is required on this circuit (1), the incoming continuity check process is stopped at 6032 and the stop COT timer is stopped at 6034. If a continuity check is required on the previous circuit (2), processing proceeds to 6034. After 6034 or if no continuity check is required (0), a release request is sent to the terminating process at 6036. The continuity recheck process is invoked at 6038 and idle is attained at 6040.

At 3520 (FIG. 22E), the originating process awaits an ACM from the terminating process. If an ACM is received at 3522, the circuit is marked busy in the trunk circuit table at 3523. An ACM time point is sent to billing at 3524 and it is determined if the call is intra-CCM at 3525 and 3526. If the call is intra-CCM at 3526, an internal ACM is sent at 3527. If the call is not intra-CCM at 3526, an external ACM is sent at 3527. After 3526 or 3527, the trunk group table is checked to see if the incoming trunk group is an Inter Machine Trunk (IMT) at 3529 and 3530 (FIG. 22F). If it is not, processing proceeds to 3600. If it is an IMT, an exit message with the outgoing circuit number is built from the CCB at 3531. It is determined if the call is intra-CCM at 3532 and 3533. If the call is intra-CCM at 3533, an internal exit message is sent at 3534. If the call is not intra-CCM at 3533, an external exit message is sent at 3535. After 3534 or 3535, the process proceeds to 3600. If an answer message is received from the terminating process at 3538, the circuit is marked busy in the trunk circuit table at 3539. At 3540 and 3541, the trunk group table is checked to see if the incoming trunk group is an Inter Machine Trunk (IMT). If it is not an IMT at 3541, processing proceeds to 3547. If it is an IMT at 3541, an exit message with the outgoing circuit number is built from the CCB at 3542. It is determined if the call is intra-CCM at 3543 and 3544. If the call is intra-CCM at 3544, an internal exit message is sent at 3545. If the call is not intra-CCM at 3544, an external exit message is sent at 3546. After 3545 or 3546, an answer time point is sent to billing at 3547. It is determined if the call is intra-CCM at 3548 and 3549. If the call is intra-CCM at 3549, an internal ANM is sent at 3550. If the call is not intra-CCM at 3549, an external ANM is sent at 3551. After 3550 or 3551, the process then proceeds to 3670. If a reset is received at 2552, then a release request is sent to the terminating process at 3553 and a release time point is sent to billing at 3554. It is determined if the call is intra-CCM at 3555 and 3556. If the call is intra-CCM at 3556, an internal RLC is sent at 3557. If the call is not intra-CCM at 3556, an external RLC is sent at 3558. After 3557 or 3558, the circuit is marked idle in the trunk circuit table at 3559. Idle is attained at 3560.

If an external REL is received at 3562 (FIG. 22G) or an internal REL is received at 3563, a release request is sent to the terminating process at 3564, and a release time point is sent to billing at 3565. It is determined if the call is intra-CCM at 3566 and 3567. If the call is intra-CCM at 3567, an internal RLC is sent at 3568. If the call is not intra-CCM at 3567, an external RLC is sent at 3569. After 3568 or 3569, the circuit is marked idle in the trunk circuit table at 3570 (FIG. 22H). Idle is attained at 3572. If an external RLC is received at 3575 or an internal RLC is received at 3576, an idle time point is sent to billing at 3577 and a release request is sent to the terminating process at 3578. At 3579, a message is sent to the treatment table with cause 41 and idle is attained at 3580. If a release is received from a circuit query at 3574, processing proceeds to 3578. If a release request is received from the terminating process at 3581 or an outgoing circuit failure is received at 3582, then processing proceeds to 3579. If other internal messages are received at 3583 or other external messages are received at 3584, they are ignored at 3585 and processing returns to 3520. If a blocking request is received at 3586, it is ignored at 3587, and processing proceeds to 3520. If a call progress message is received from the terminating process at 3590, it is determined if the call is intra-CCM at 3591 and 3592. If the call is intra-CCM at 3592, an internal CPM is sent at 3593. If the call is not intra-CCM at 3592, an external CPM is sent at 3594. After 3593 or 3594, the process returns to 3520.

At 3600 (FIG. 22I), the originating process awaits an answer message from the terminating process. If an answer message is received from the terminating process at 3602, the circuit is marked busy in the trunk circuit table at 3604.

An answer time point is sent to billing at 3606 and it is determined if the call is intra-CCM at 3607 and 3608. If the call is intra-CCM at 3608, an internal ANM is sent at 3609. If the call is not intra-CCM at 3608, an external ANM is sent at 3610. After 3609 or 3610, the process then proceeds to 3670. If a blocking request is received at 3612, it is ignored at 3614, and processing proceeds to 3600. If a call progress message is received from the terminating process at 3618, it is determined if the call is intra-CCM at 3619 and 3620. If the call is intra-CCM at 3620, an internal CPM is sent at 3621. If the call is not intra-CCM at 3620, an external CPM is sent at 3622. After 3621 or 3622, the process returns to 3520. If a reset is received at 3624, then a release request is sent to the terminating process at 3626 and a release time point is sent to billing at 3628. It is determined if the call is intra-CCM at 3629 and 3630. If the call is intra-CCM at 3630, an internal RLC is sent at 3631. If the call is not intra-CCM at 3630, an external RLC is sent at 3632. After 3631 or 3632, the circuit is marked idle in the trunk circuit table at 3633. Idle is attained at 3634.

If an external REL is received at 3636 (FIG. 22J) or an internal REL is received at 3637, a release request is sent to the terminating process at 3638, and a release time point is sent to billing at 3640. It is determined if the call is intra-CCM at 3641 and 3642. If the call is intra-CCM at 3642, an internal RLC is sent at 3643. If the call is not intra-CCM at 3642, an external RLC is sent at 3644. After 3643 or 3644, the circuit is marked idle in the trunk circuit table at 3645 (FIG. 22K). Idle is attained at 3646. If a an external RLC is received at 3649 or an internal RLC is received at 3650, an idle time point is sent to billing at 3651 and a release request is sent to the terminating process at 3652. At 3553, a message is sent to the treatment table with cause 41 at 3653 and idle is attained at 3654. If a release is received from a circuit query at 3648, processing proceeds to 3652. If a release request is received from the terminating process at 3656, then processing proceeds to 3653. If an outgoing circuit failure is received at 3658, a message is sent to the treatment table with cause 41 at 3659 and idle is attained at 3660. If other internal messages are received at 3661 or other external messages are received at 3662, they are ignored at 3664 and processing returns to 3520.

At 3670 (FIG. 22L), the originating process has previously received an ANM indicating that the incoming circuit has been answered. If an external REL is received at 3672 or an internal REL is received at 3673, a release request is sent to the terminating process at 3674, and a release time point is sent to billing at 3676. It is determined if the call is intra-CCM at 3677 and 3678. If the call is intra-CCM at 3678, an internal RLC is sent at 3679. If the call is not intra-CCM at 3678, an external RLC is sent at 3680. After 3679 or 3680, the circuit is marked idle in the trunk circuit table at 3681. Idle is attained at 3682. If other internal messages are received at 3683 or other external messages are received at 3684, they are ignored at 3686 and processing returns to 3670. If a blocking request is received at 3687, it is ignored at 3688, and processing proceeds to 3670. If a reset is received at 3690, then a release request is sent to the terminating process at 3692 and a release time point is sent to billing at 3694. It is determined if the call is intra-CCM at 3695 and 3696. If the call is intra-CCM at 3696, an internal RLC is sent at 3697. If the call is not intra-CCM at 3696, an external RLC is sent at 3698. After 3697 or 3698, the circuit is marked idle in the trunk circuit table at 3699. Idle is attained at 3700.

If a release is received from a circuit query at 3702 (FIG. 22M), processing proceeds to 3708. If an internal RLC is received at 3703 or an external RLC is received at 3704, an idle time point is sent to billing at 3706 and a release request is sent to the terminating process at 3708. At 3710, a message is sent to the treatment table with cause 41 and idle is attained at 3712. If a release request is received from the terminating process at 3713, then processing proceeds to 3710. If a network suspend is received from the terminating process at 3714, it is determined if the call is intra-CCM at 3715 and 3716. If the call is intra-CCM at 3716, an internal SUS is sent at 3717. If the call is not intra-CCM at 3716, an external SUS is sent at 3718. After 3717 or 3718, processing proceeds to 3720.

At 3720 (FIG. 22N), the originating process has previously received an SUS indicating that the incoming circuit has been suspended. If an external REL is received at 3721 or an internal REL is received at 3722, a release request is sent to the terminating process at 3723, and a release time point is sent to billing at 3725. It is determined if the call is intra-CCM at 3726 and 3727. If the call is intra-CCM at 3727, an internal RLC is sent at 3728. If the call is not intra-CCM at 3727, an external RLC is sent at 3729. After 3728 or 3729, the circuit is marked idle in the trunk circuit table at 3730. Idle is attained at 3731. If a blocking request is received at 3732, it is ignored at 3733, and processing returns to 3720. If an external RLC is received at 3735 or an internal RLC is received at 3736, an idle time point is sent to billing at 3737 and a release request is sent to the terminating process at 3738. At 3739, a message is sent to the treatment table with cause 41 and idle is attained at 3740. If a release is received from a circuit query at 3733, processing proceeds to 3738.

If a release request is received from the terminating process at 3741 (FIG. 22O), then a message is sent to the treatment table with cause 41 at 3742 and idle is attained at 3743. If a reset is received at 3744, then a release request is sent to the terminating process at 3745 a release time point is sent to billing at 3746. It is determined if the call is intra-CCM at 3747 and 3748. If the call is intra-CCM at 3748, an internal RLC is sent at 3749. If the call is not intra-CCM at 3748, an external RLC is sent at 3750. After 3749 or 3750, the circuit is marked idle in the trunk circuit table at 3751. Idle is attained at 3752. If a Network Resume is received from the terminating process at 3753, it is determined if the call is intra-CCM at 3754 and 3755. If the call is intra-CCM at 3755, an internal RES is sent at 3756. If the call is not intra-CCM at 3755, an external RES is sent at 3757. After 3756 or 3757, processing proceeds to 3720. If other internal messages are received at 3758 or other external messages are received at 3759, they are ignored at 3760 and processing returns to 3720.

At 3724 (FIG. 22P), the originating process awaits an RLC. If an external RLC is received at 3761 or an internal RLC is received at 3762, an idle time point is sent to billing at 3763 and the RLC timer is stopped at 3764. At 3765, the send release timer is stopped. Idle is attained at 3766. If the RLC timer times out at 3767, the send release timer is stopped at 3768 and a message is sent to circuit reset at 3769. At 3770, maintenance is informed and idle is attained at 3771. If other external messages are received at 3772 or other internal messages are received at 3773, they are ignored at 3774 and the process returns to 3724. If an external REL is received at 3775 (FIG. 22Q) or an internal REL is received at 3776, a release time point is sent to billing at 3777. It is determined if the call is intra-CCM at 3778 and 3779. If the call is intra-CCM at 3779, an internal SUS is sent at 3780. If the call is not intra-CCM at 3779, an external SUS is sent at 3781. After 3780 or 3781, the process returns to 3724. If a reset is received at 3782, the RLC timer is stopped at 3783. At 3784, the send release timer is stopped and the circuit is marked idle in the trunk circuit table at 3785. Idle is attained at 3786. If the send REL timer times out at 3787, a message is sent to the treatment table with cause 41 at 3788. The send REL timer is set at 3789 and the process returns to 3724.

Trunk Circuit and Trunk Group Table Processing for Outgoing Calls

Figure 23A:
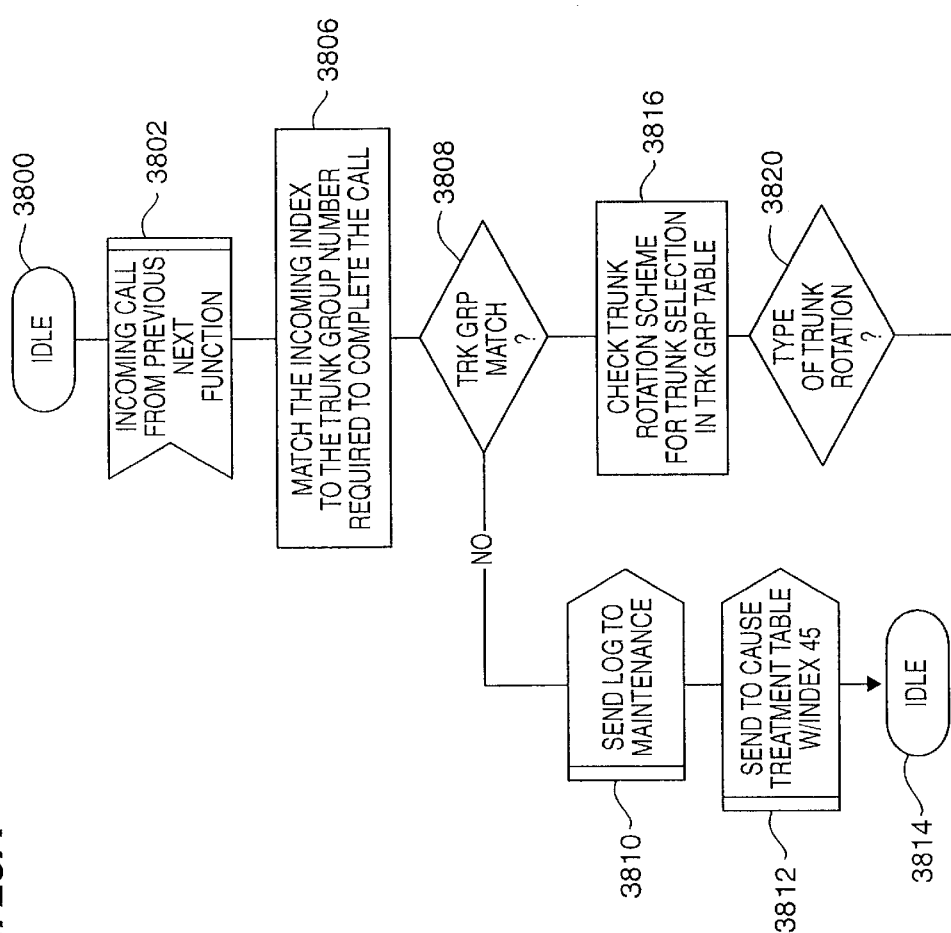
FIGS. 23A–23T are SDL diagrams of logic used in a version of the invention.
Figure 23B:
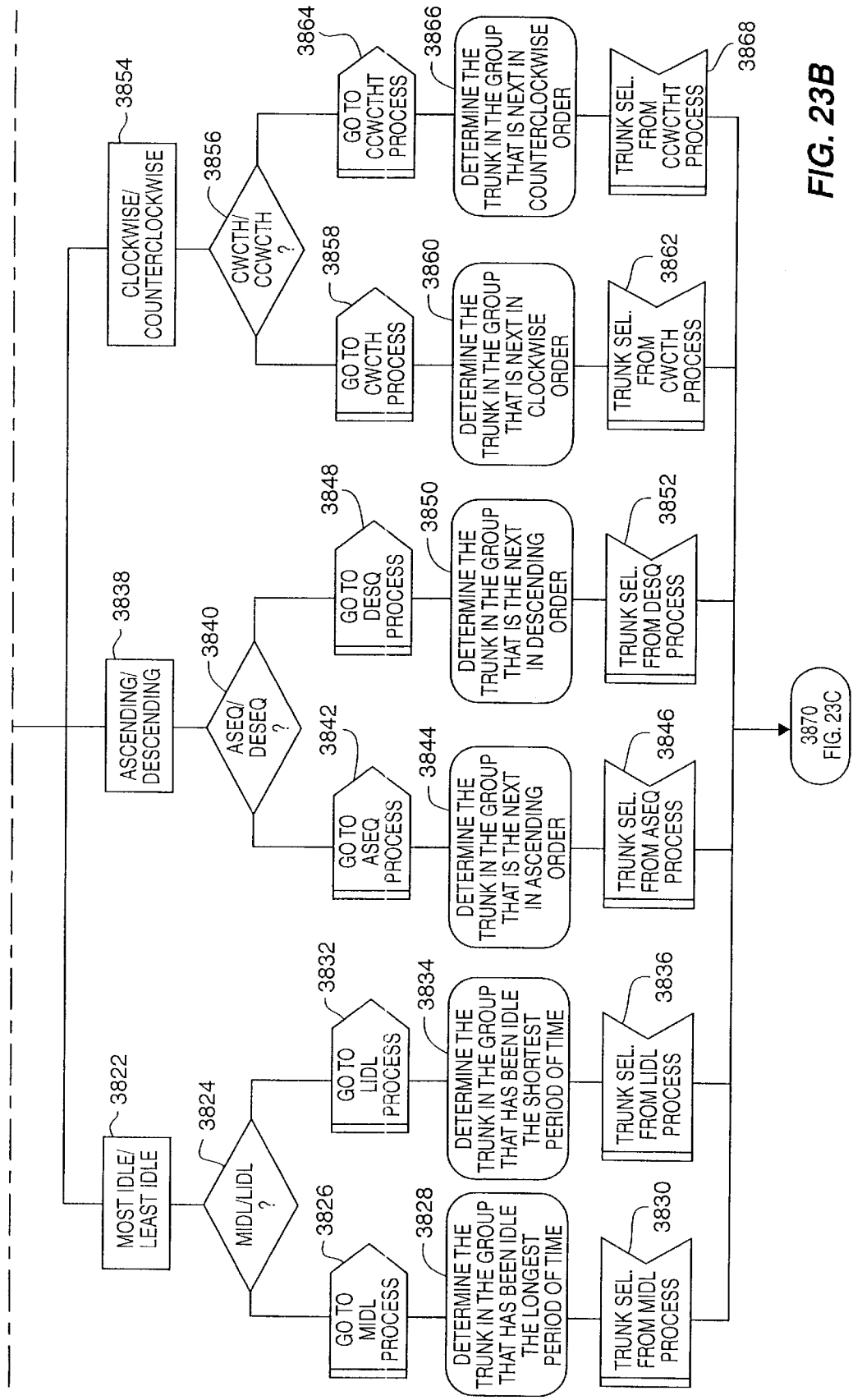
Figure 23C:
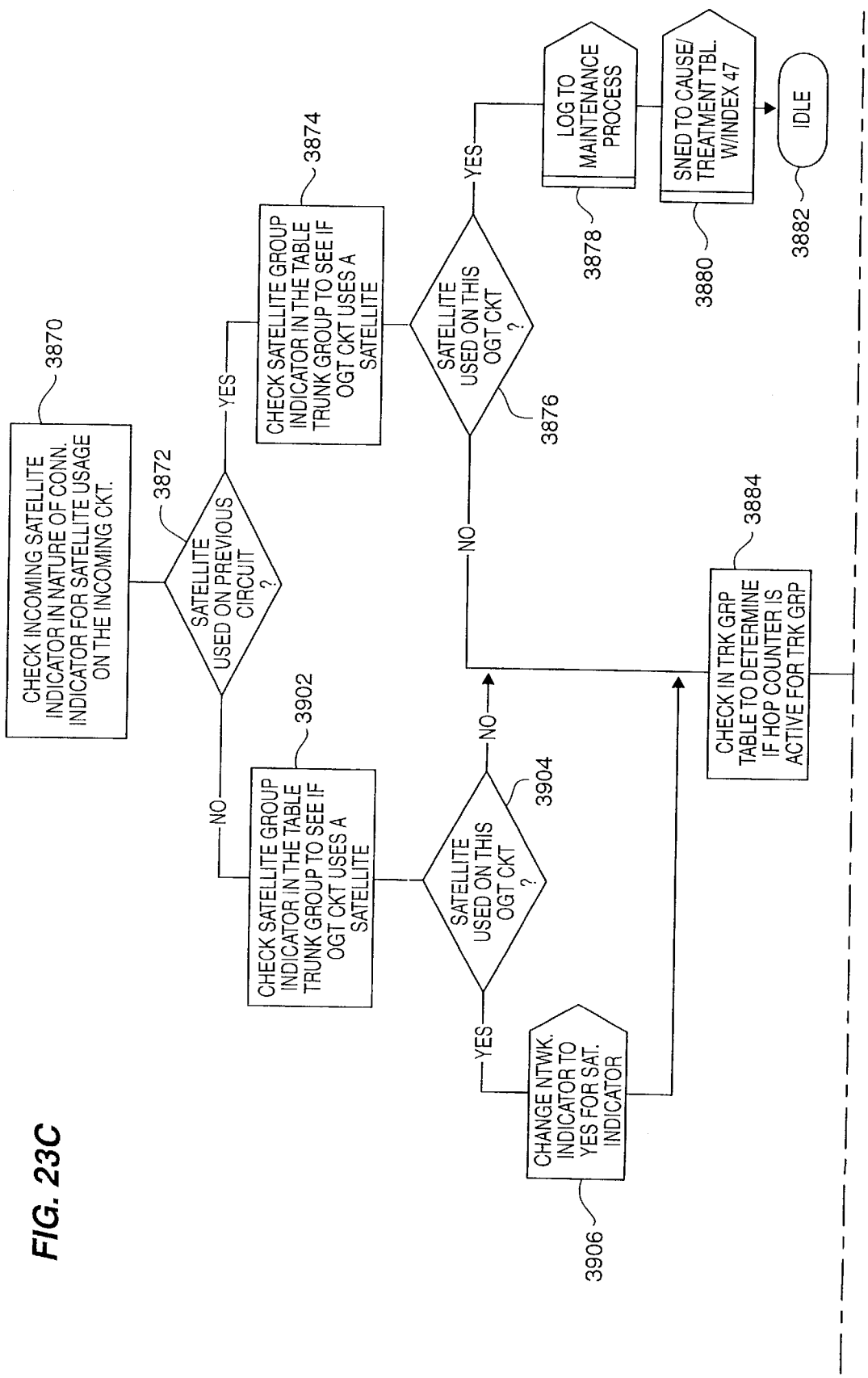
Figure 23D:
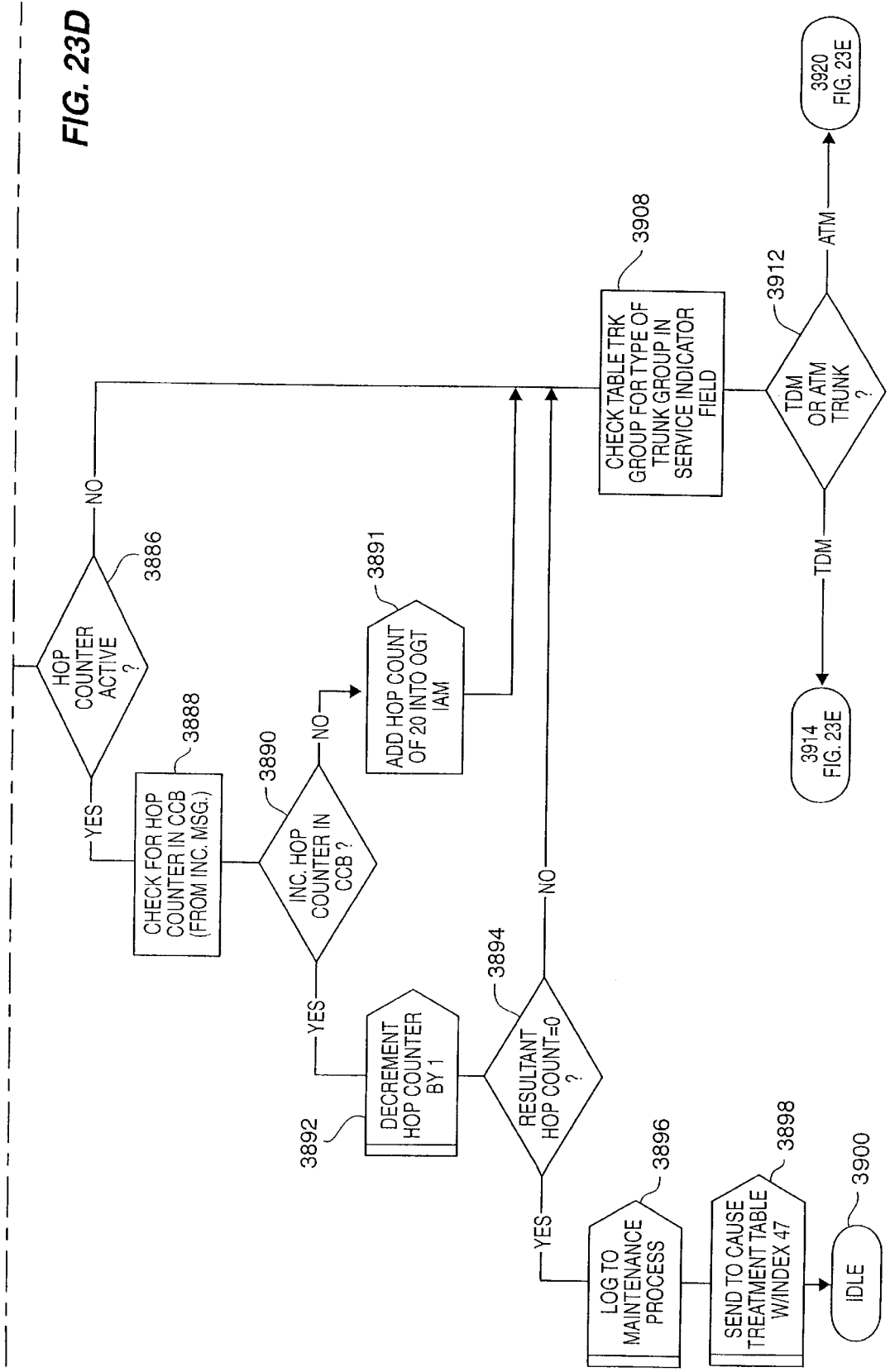
Figure 23E:
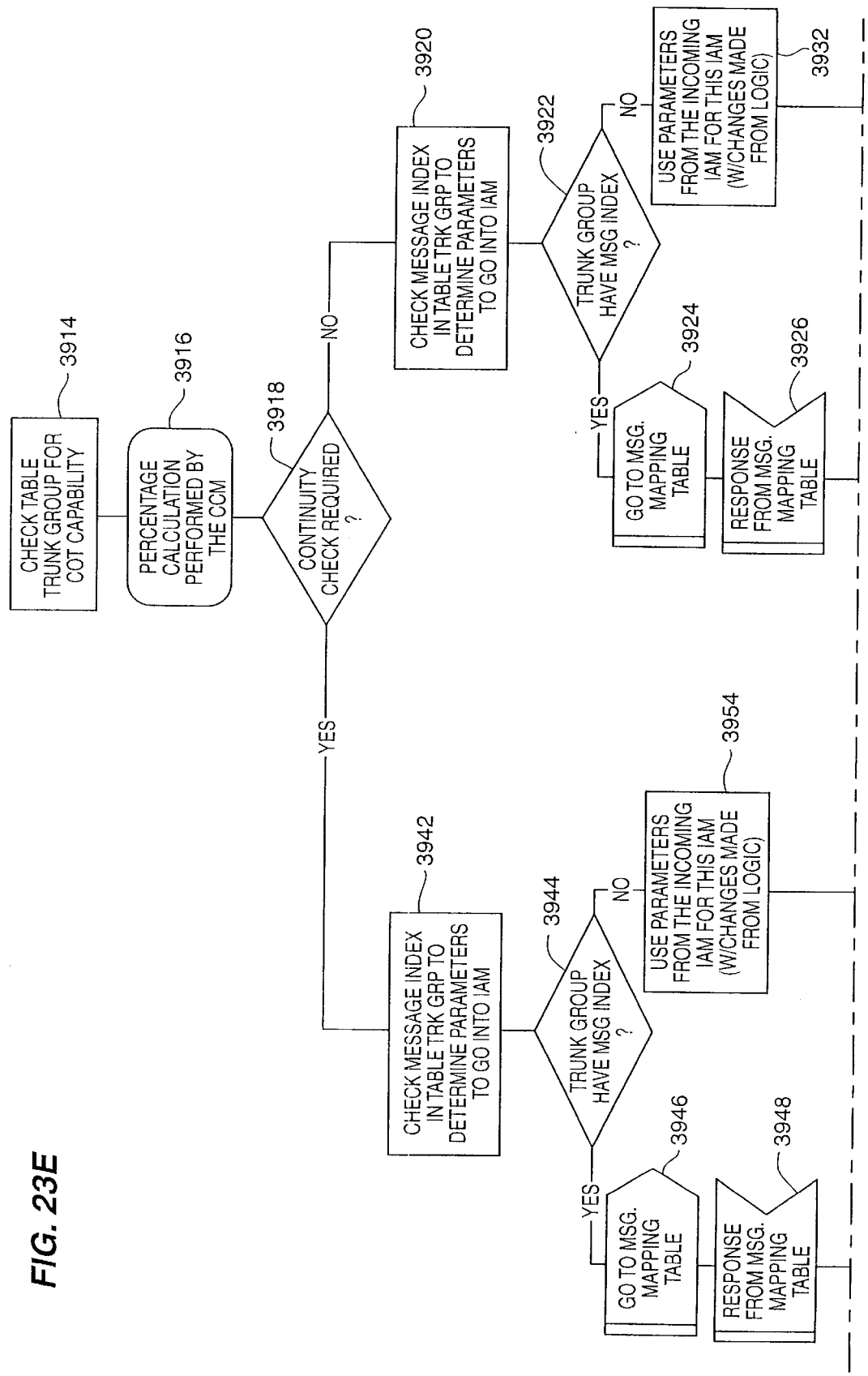
Figure 23F:
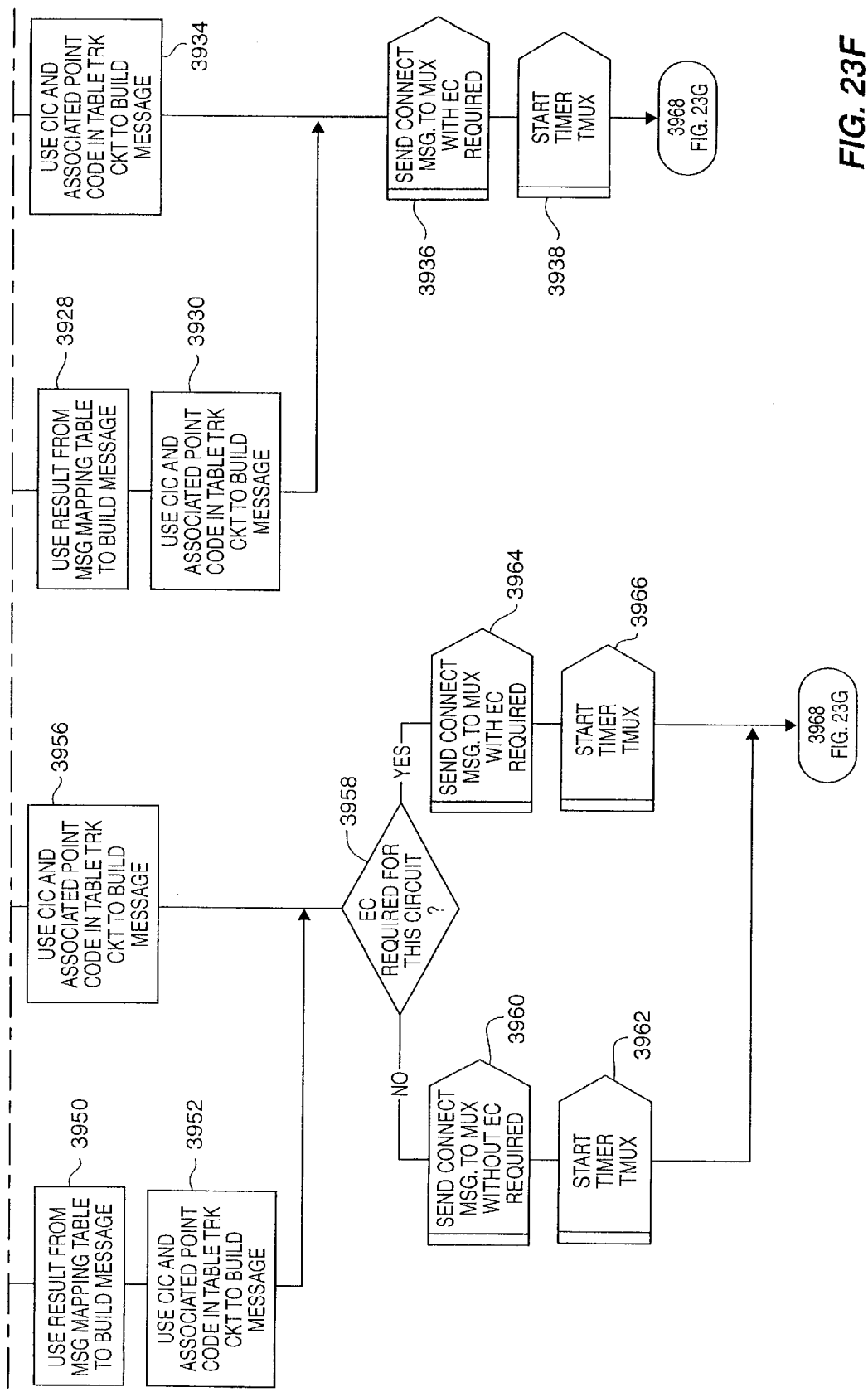
Figure 23G:
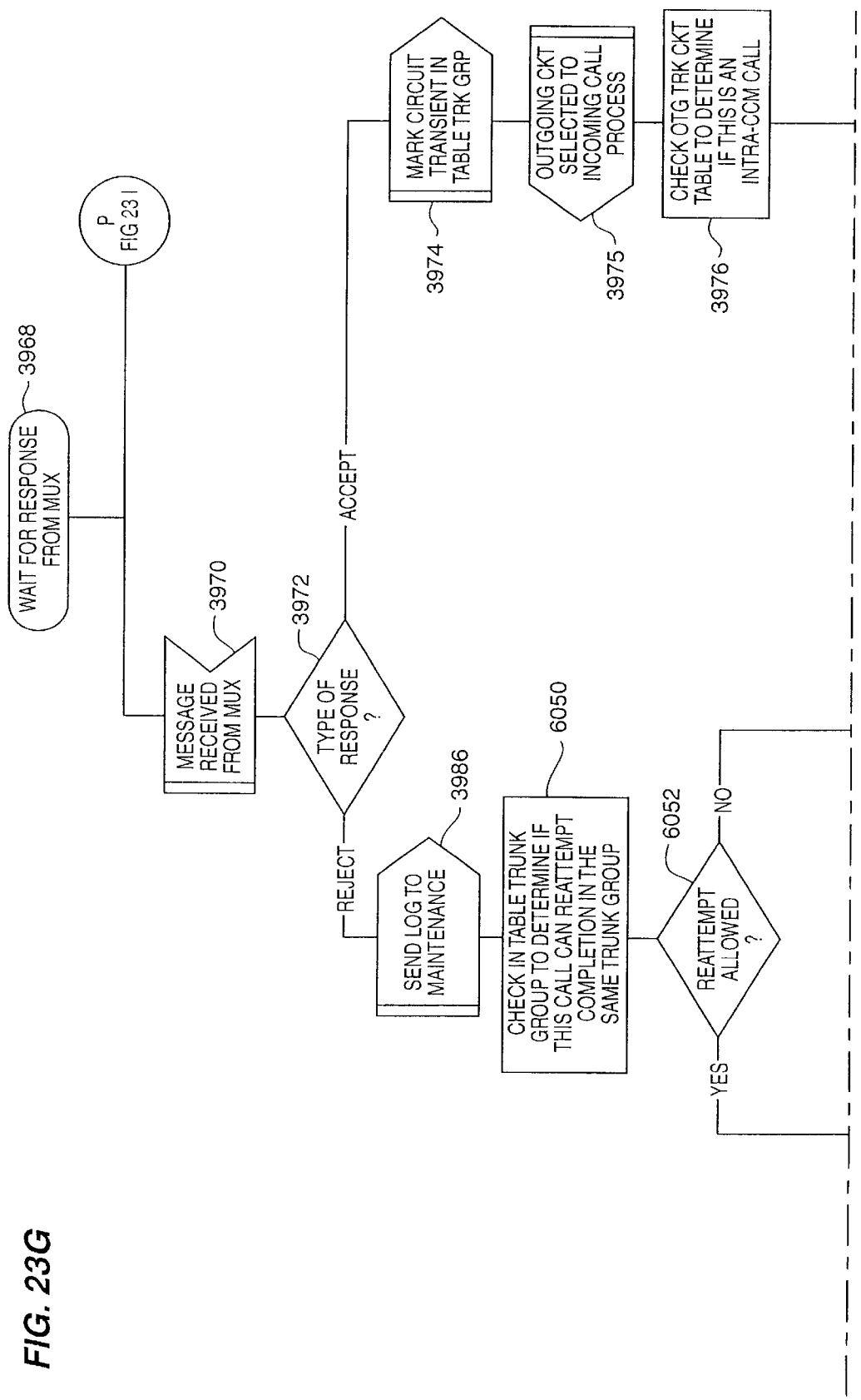
Figure 23H:
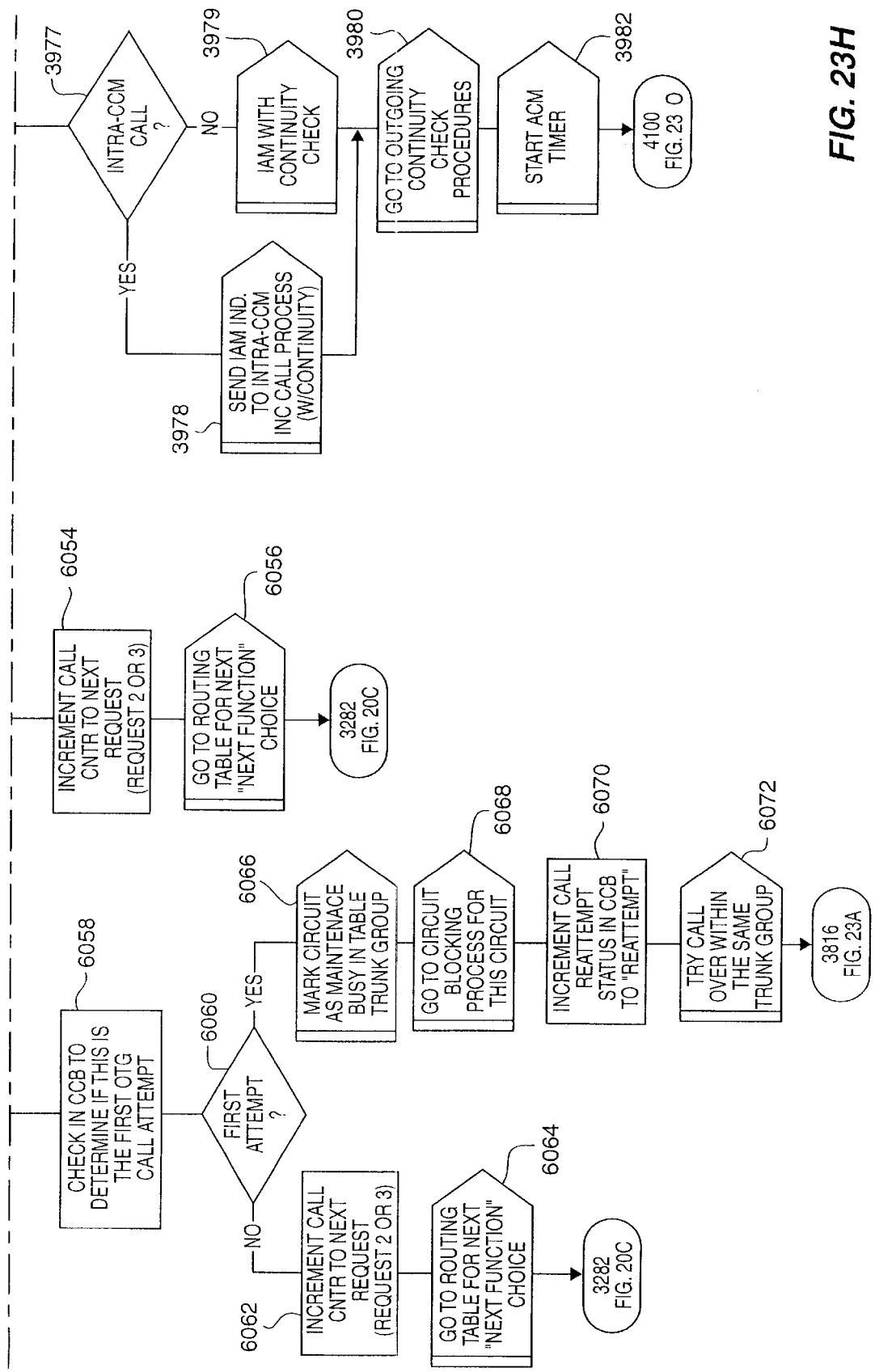
Figure 23I:
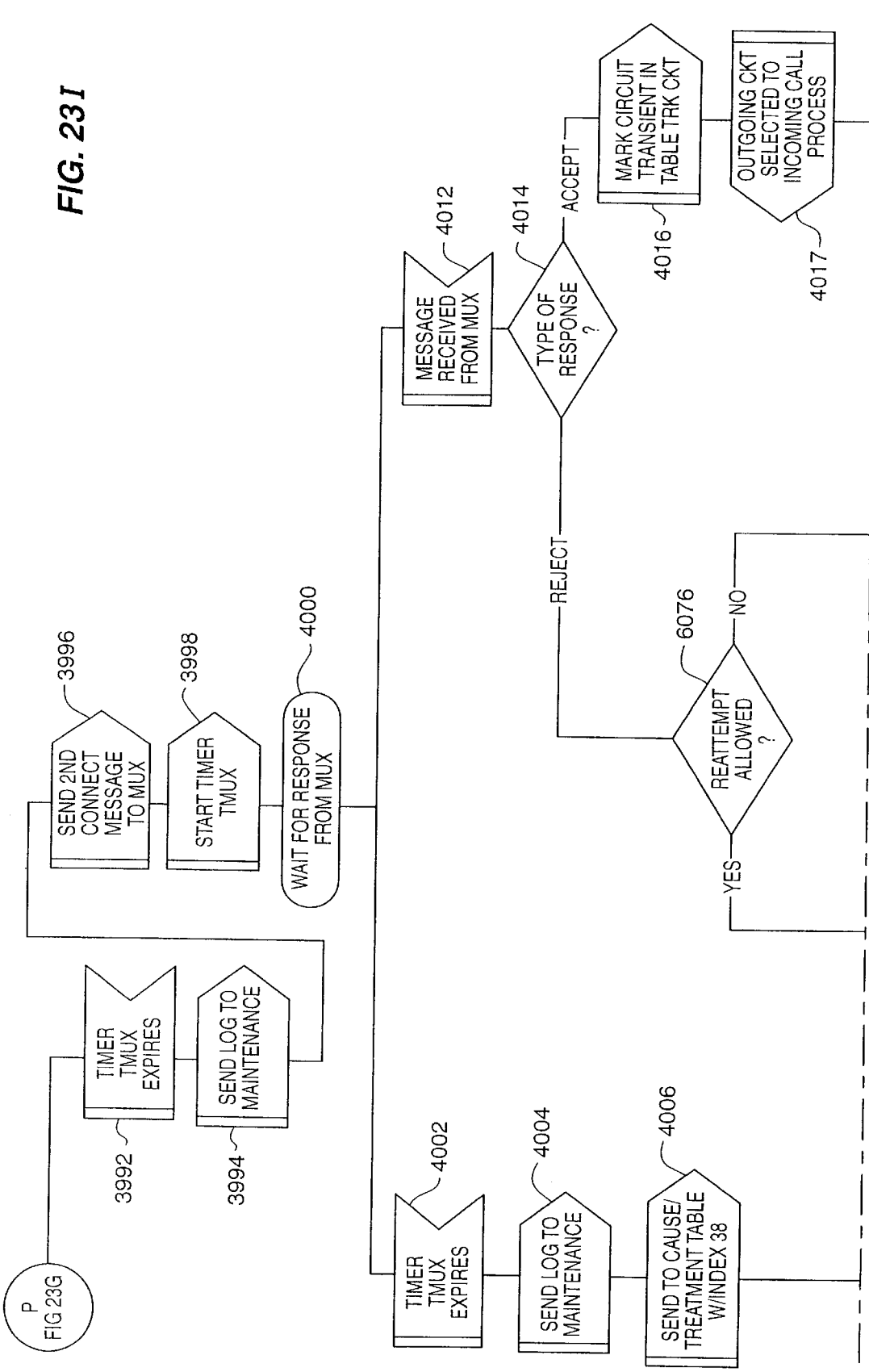
Figure 23J:
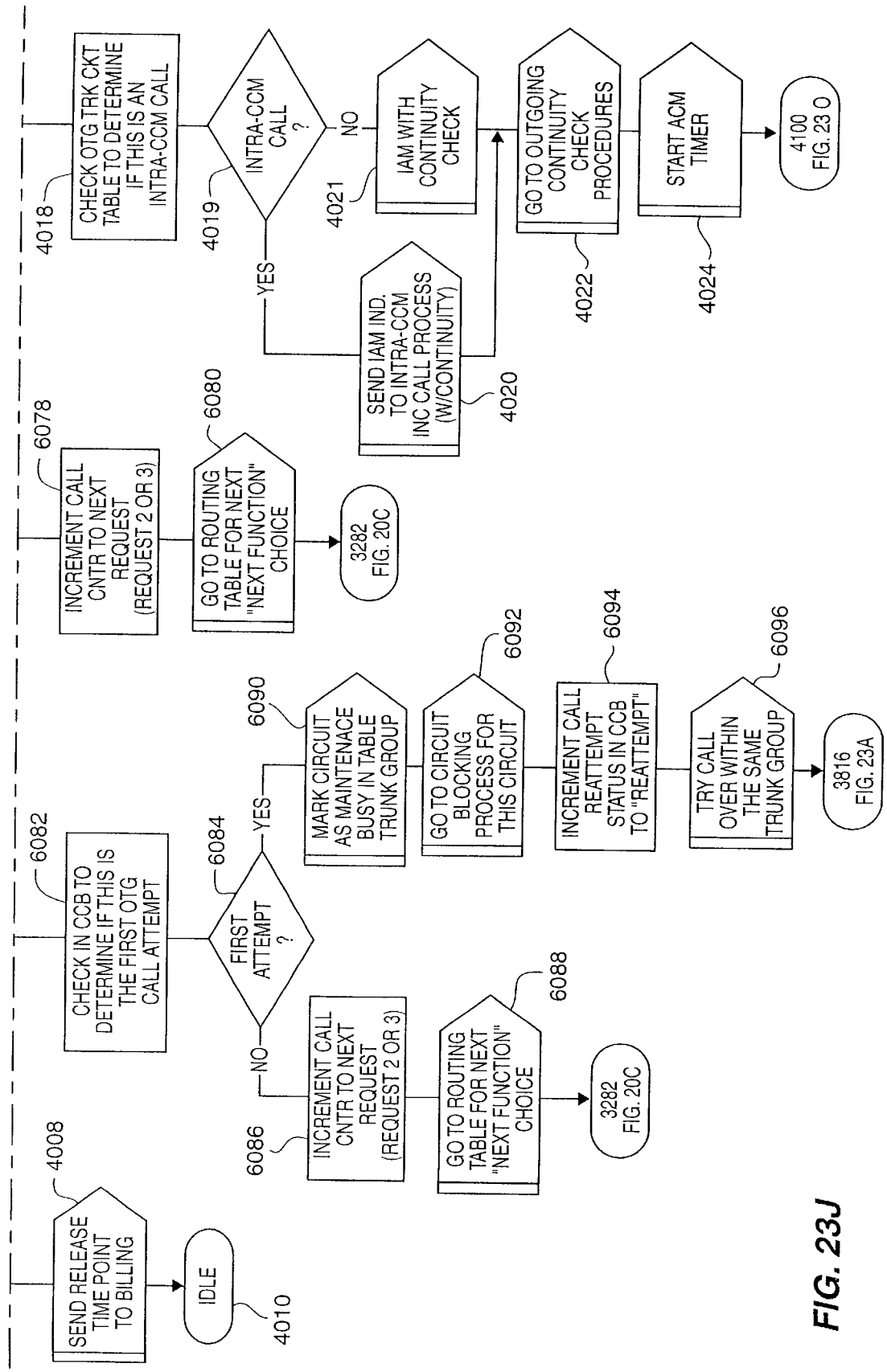
Figure 23K:
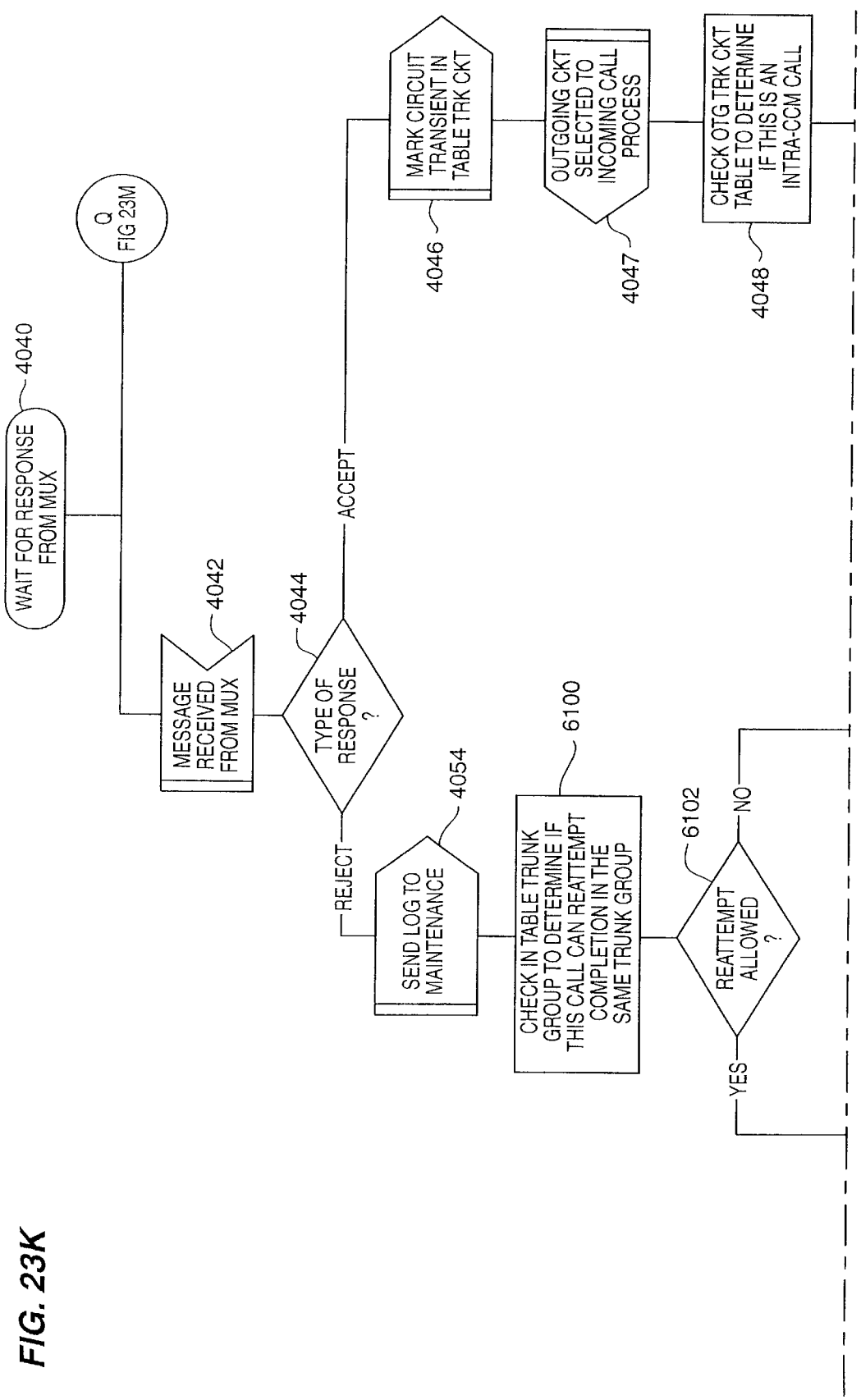
Figure 23L:
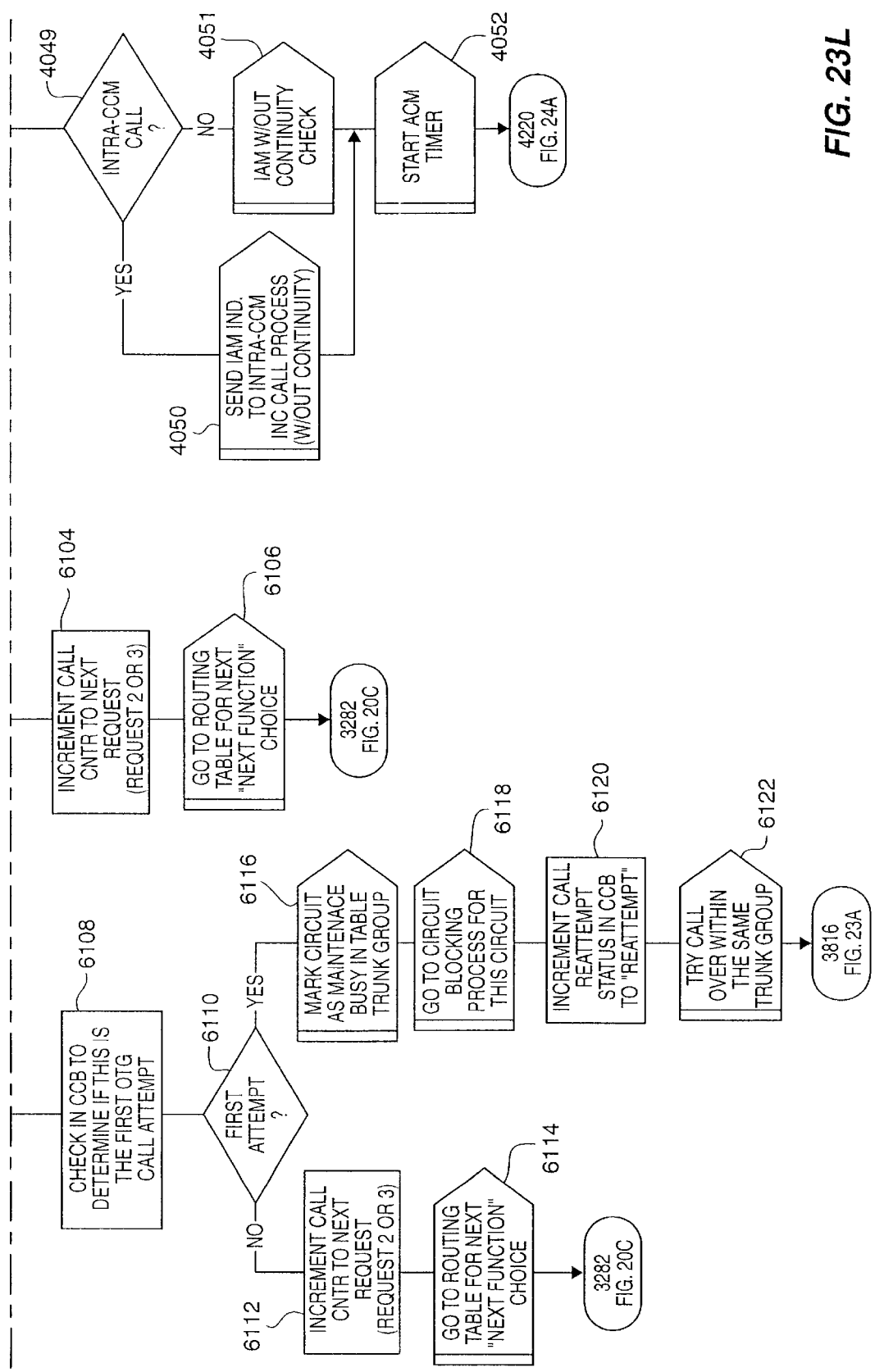
Figure 23M:
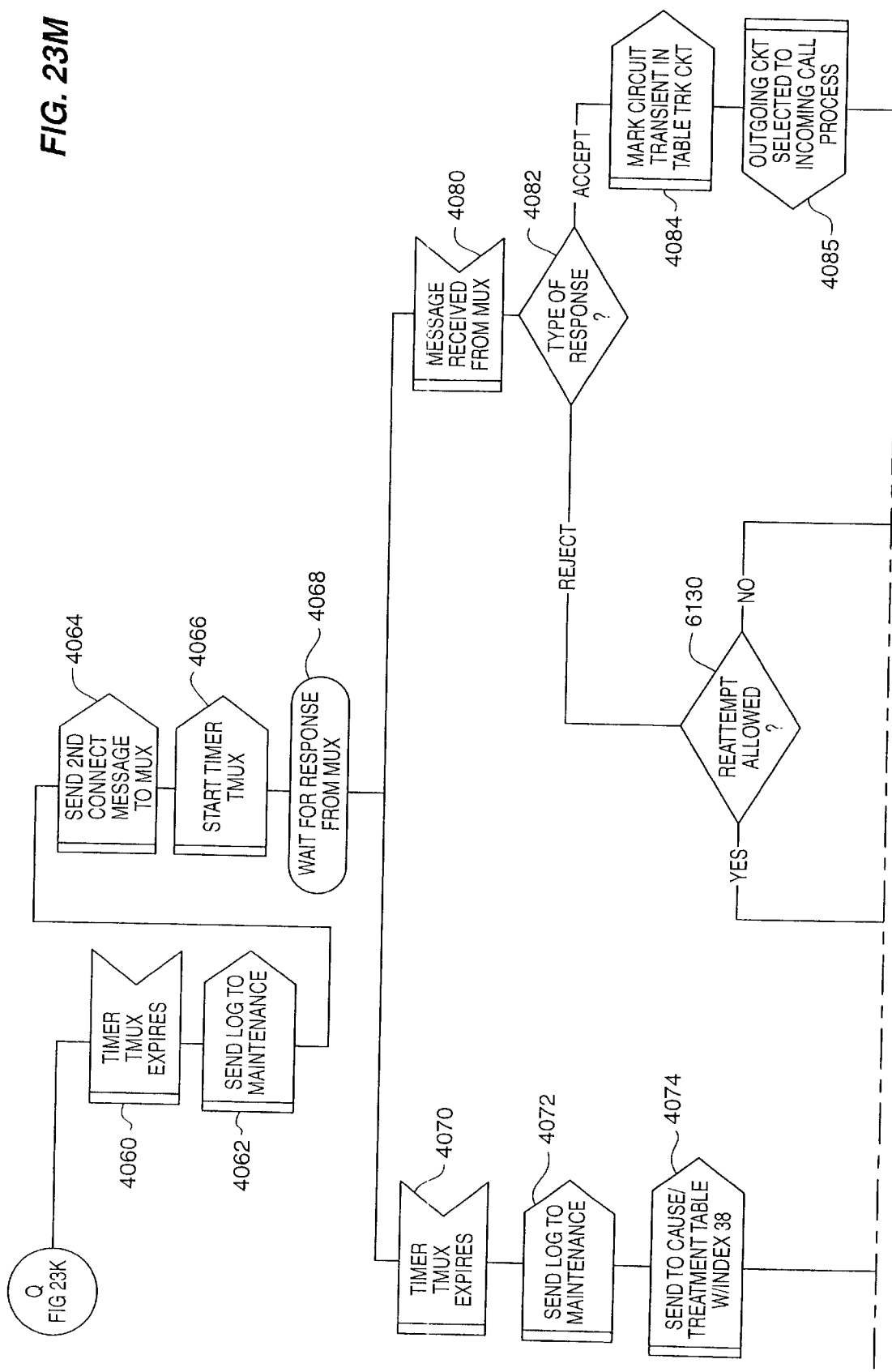
Figure 23N:
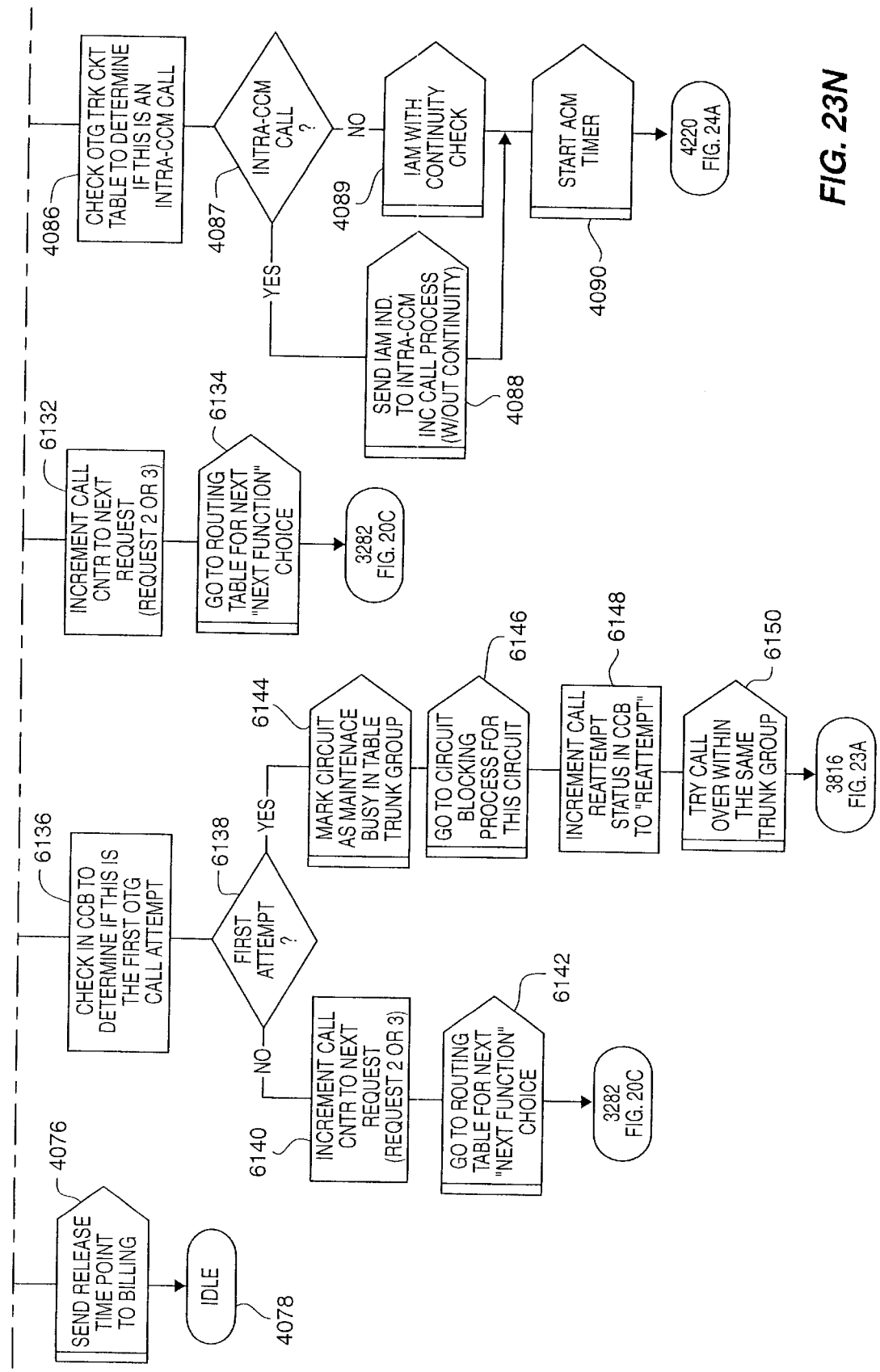
Figure 23:
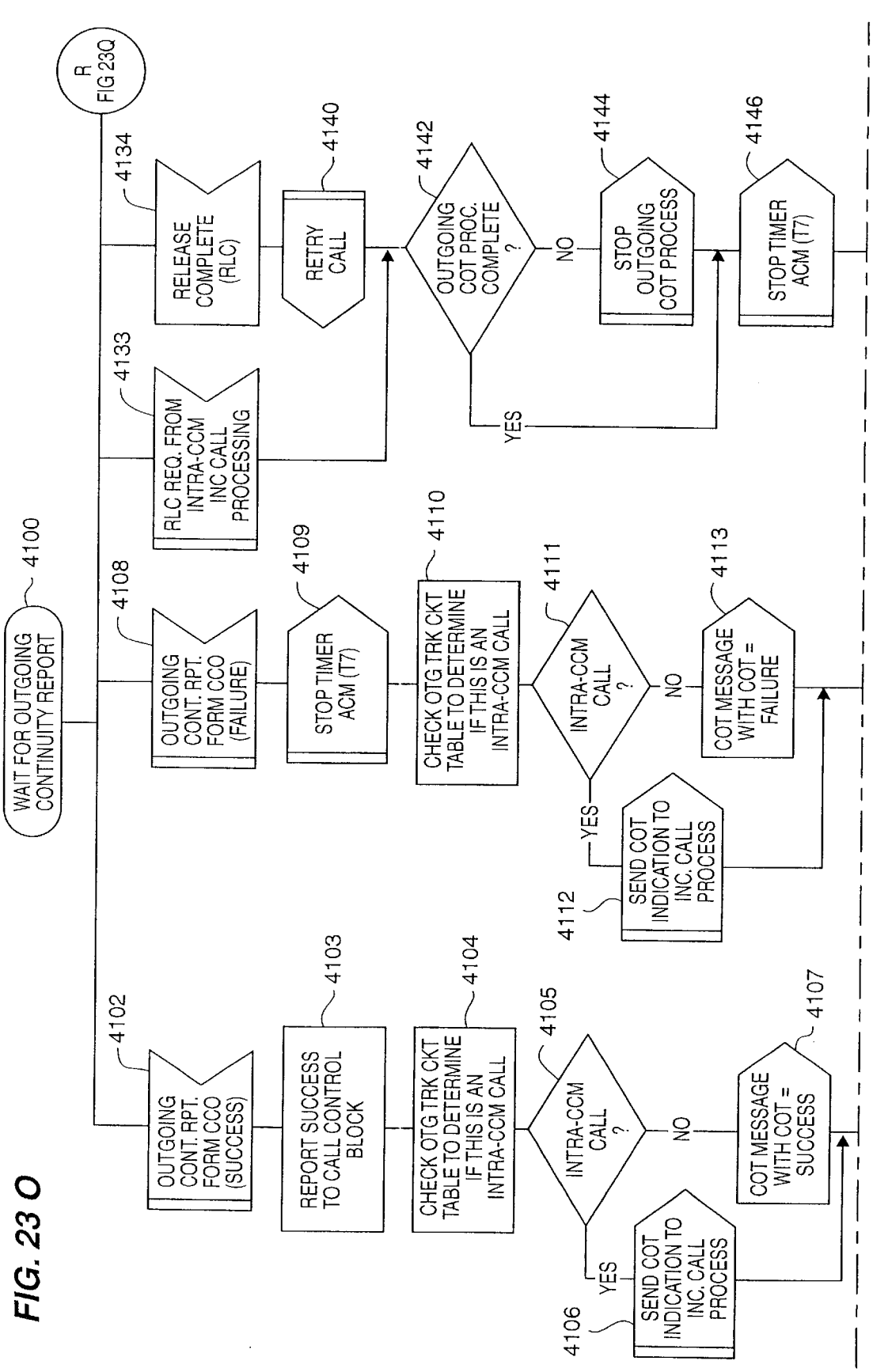
Figure 23P:
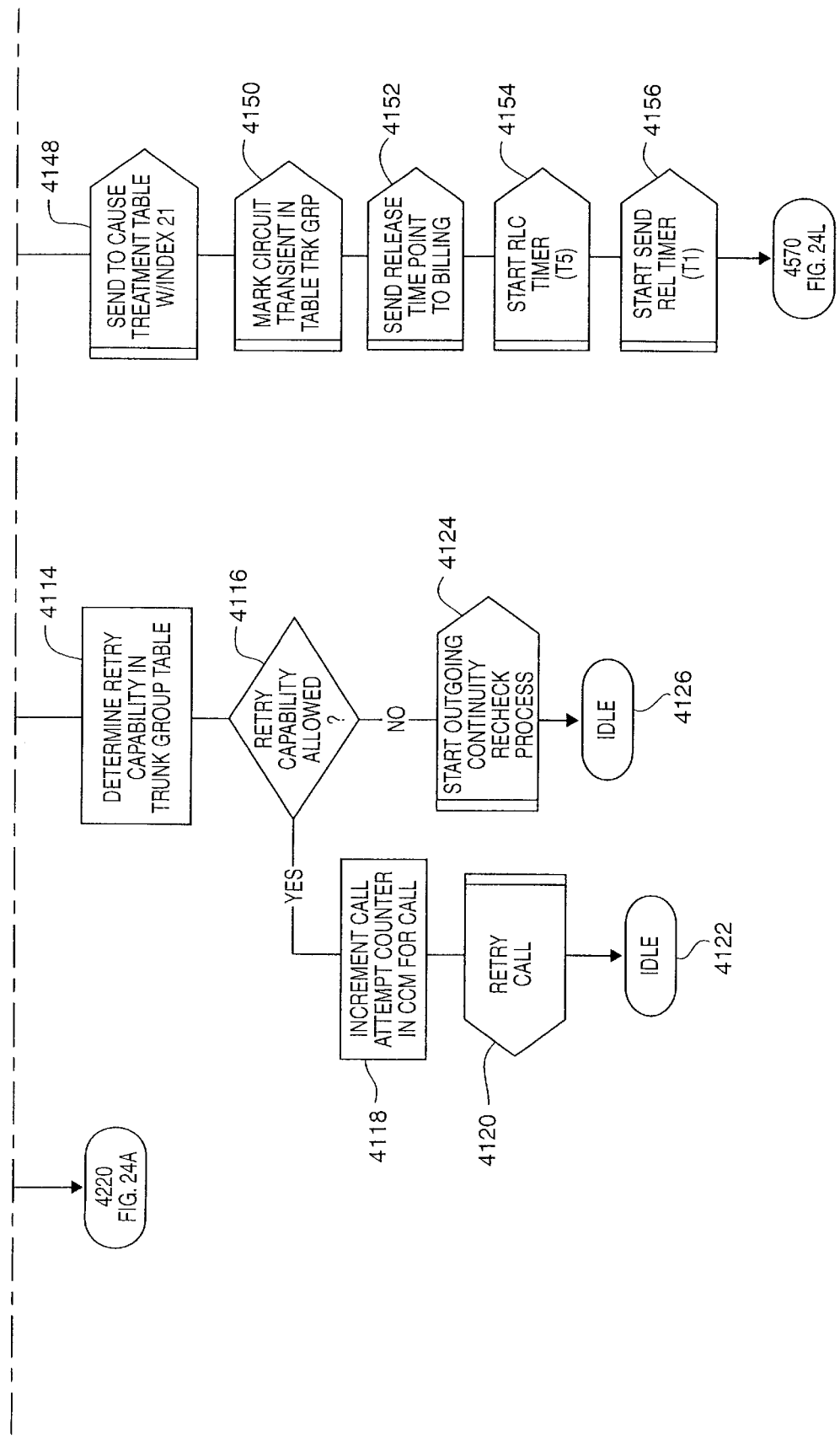
Figure 23Q:
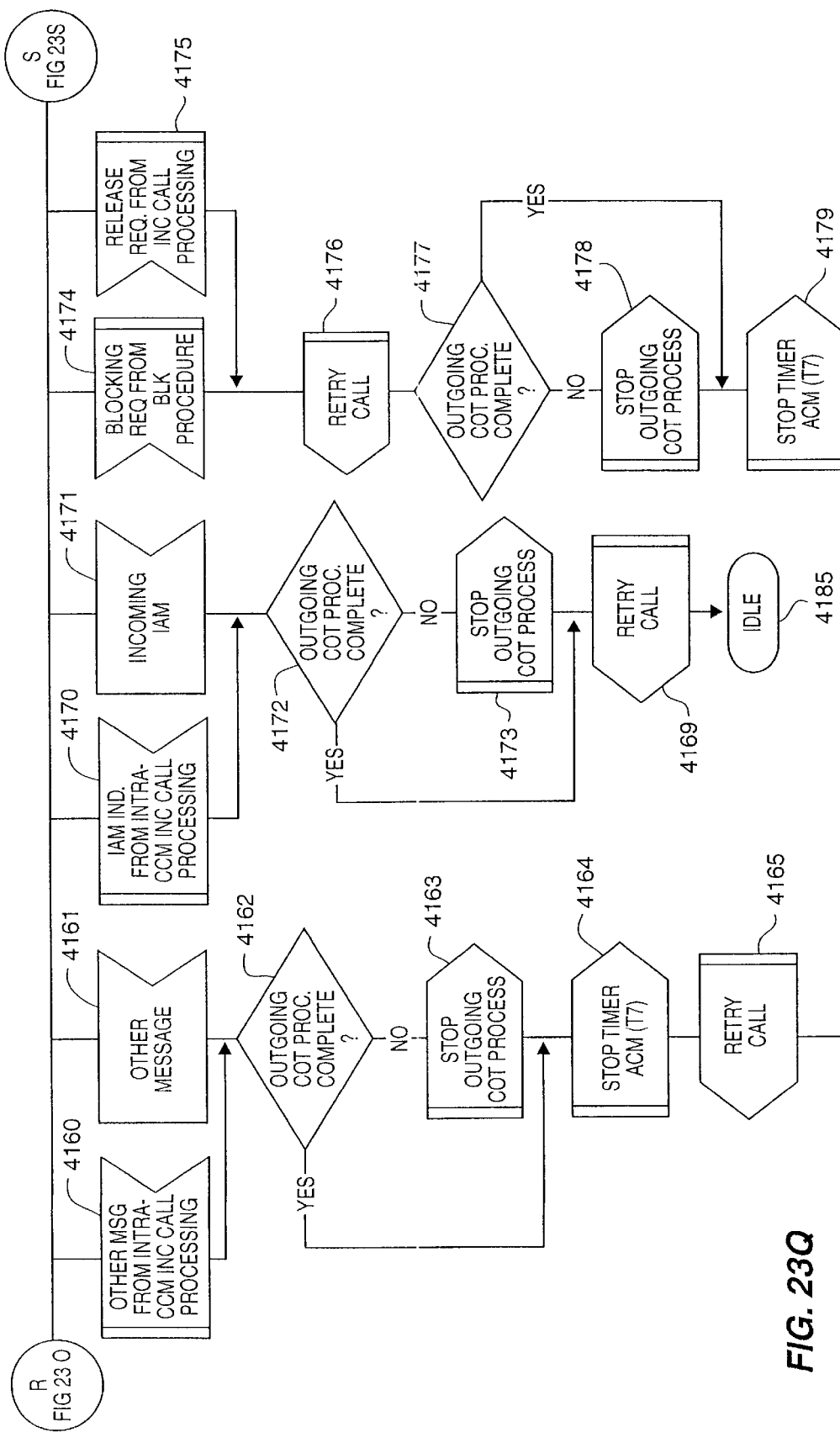
Figure 23R:
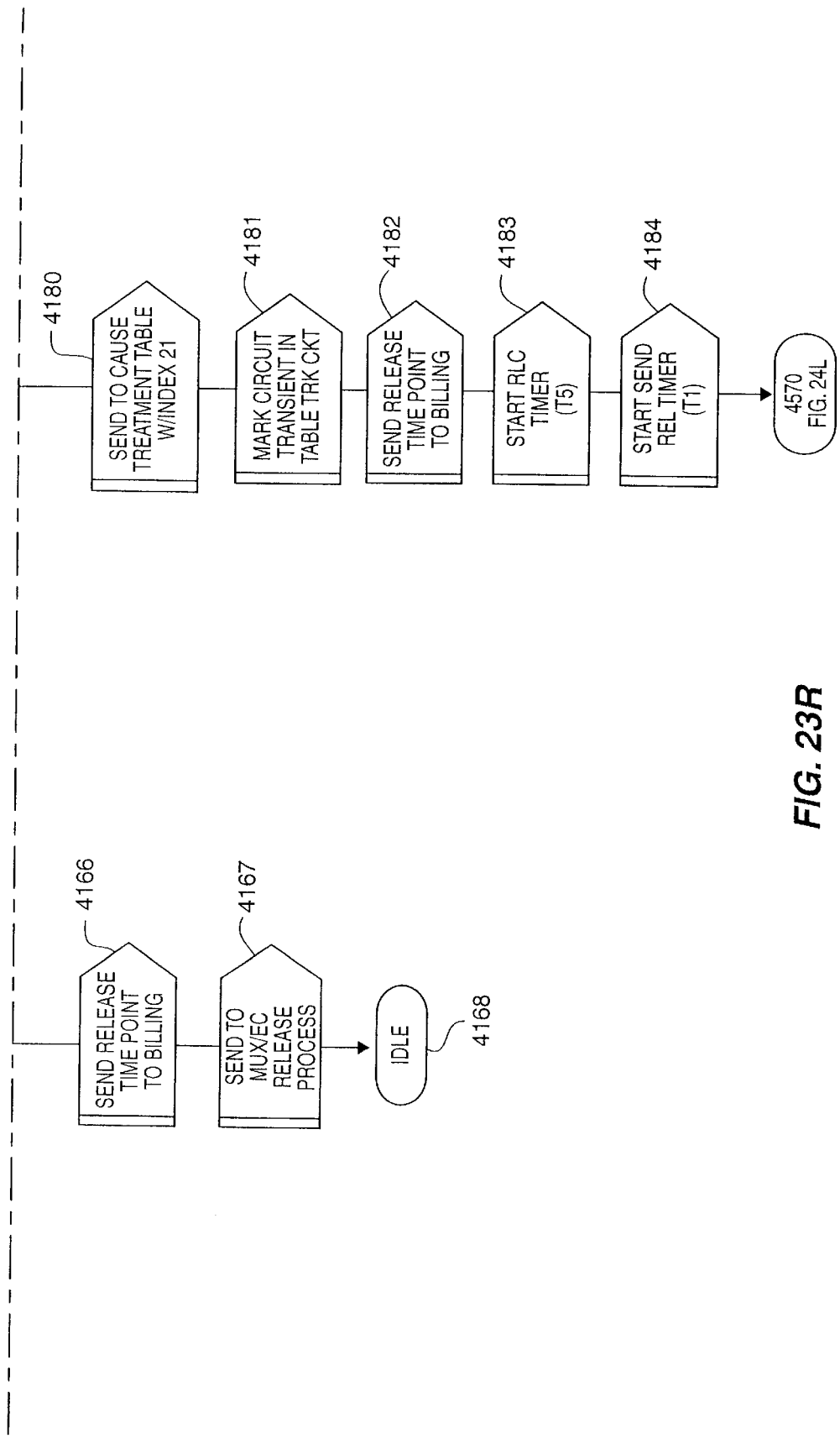
Figure 23S:
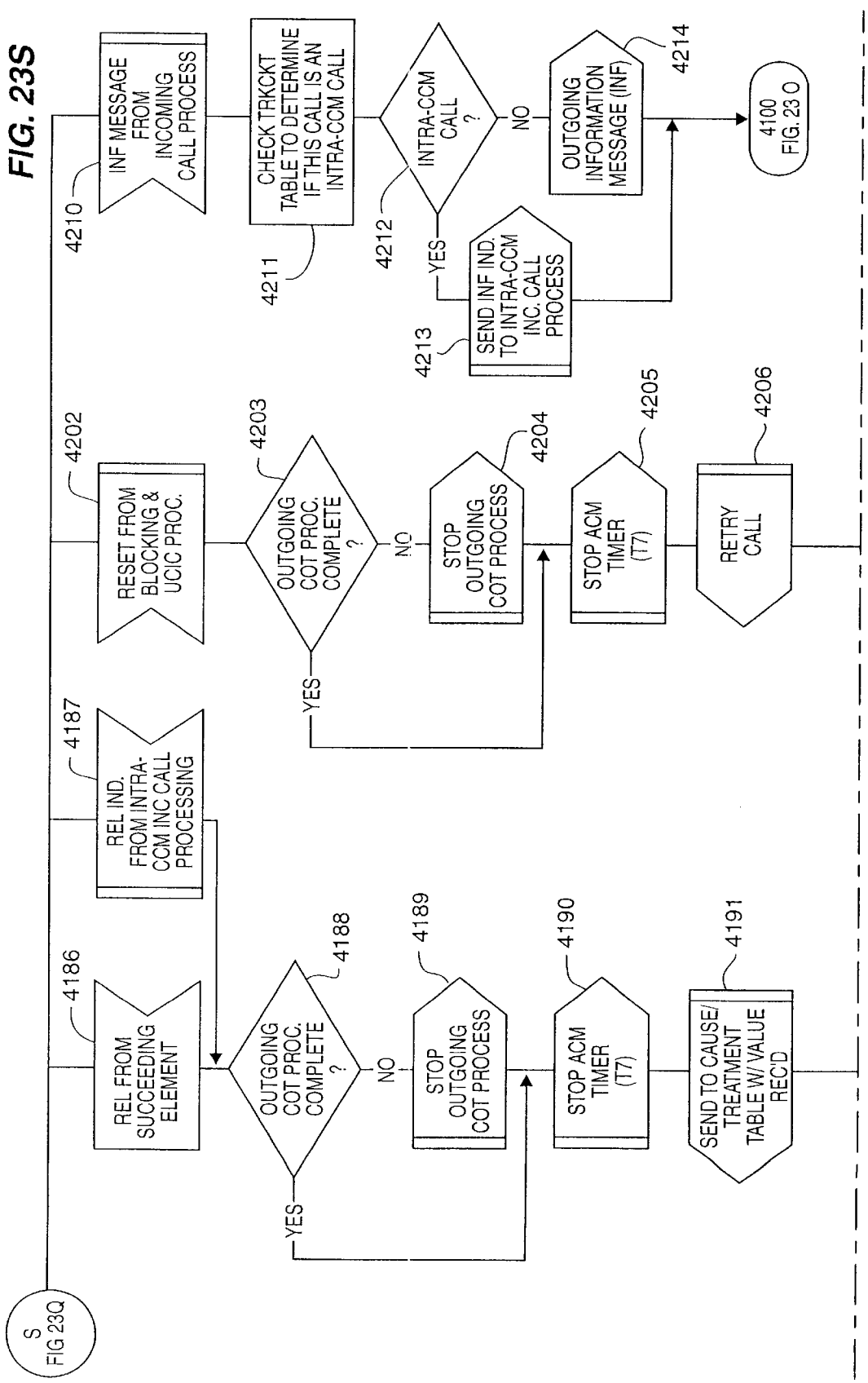
Figure 23T:
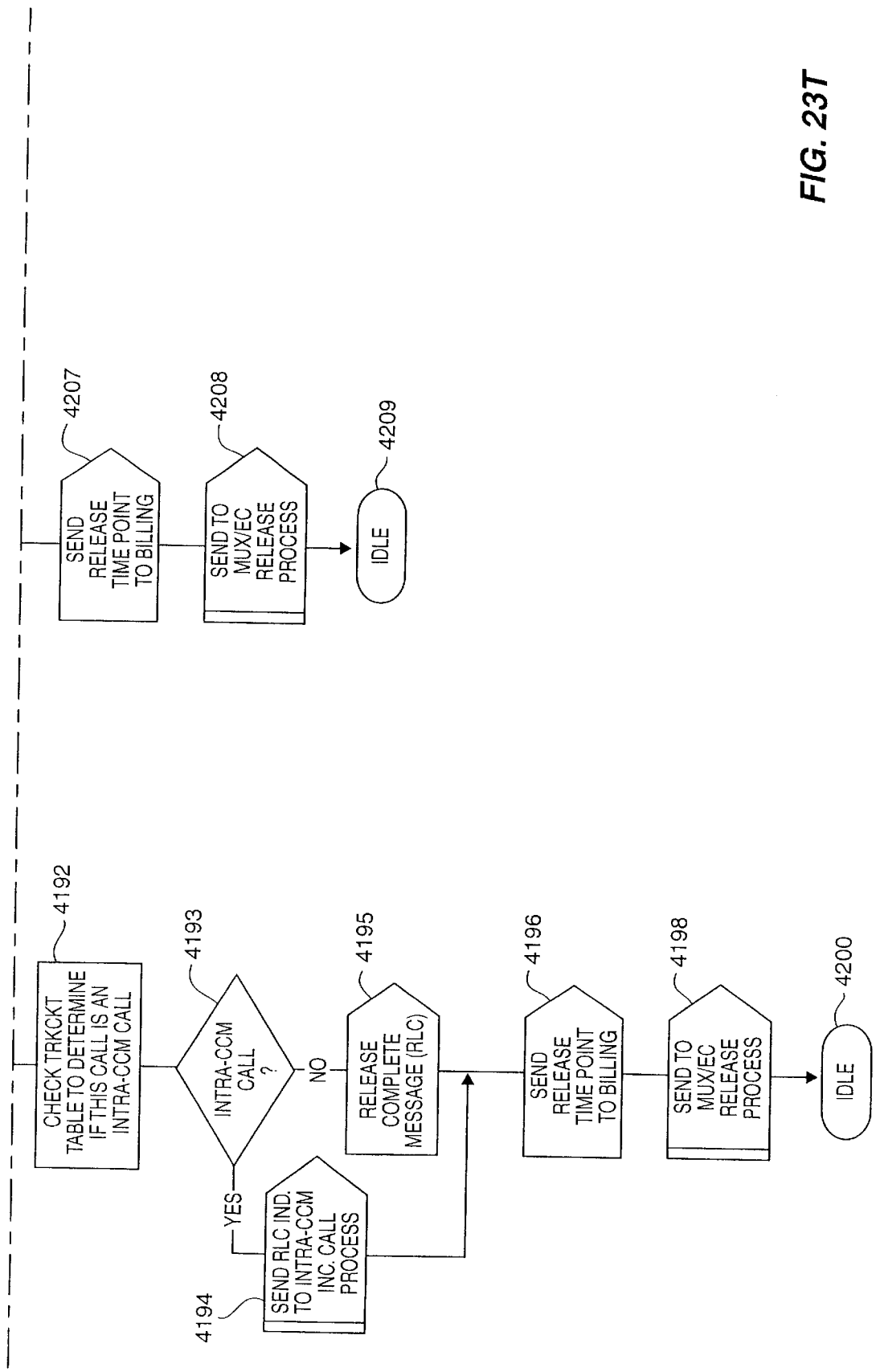

FIGS. 23A–23T depict trunk table processing by the terminating process of the BCM. On FIG. 23A at 3800, the terminating process is idle. The terminating process receives a next function for the trunk group table from the originating process at 3802. The index is matched at 3806 and 3808. If no match is found, maintenance is informed at 3810, a message is sent to the treatment table with cause 45 at 3812, and idle is attained at 3814. If a matching trunk group is found at 3808, the trunk group rotation scheme is checked at 3816 and determined at 3820. If the rotation is most idle (MIDL) at 3822 and 3824 (FIG. 23B), a message is sent to the most idle trunk selection process at 3826. This process will determine the trunk that has been idle the longest period of time at 3828 and return a trunk selection to the terminating process at 3830. The process then proceeds to 3870. If the rotation is least idle at 3822 and 3824, a message is sent to the least idle (LIDL) trunk selection process at 3832. This process will determine the trunk that has been idle the shortest period of time at 3834 and return a trunk selection to the terminating process at 3836. The process then proceeds to 3870. If the rotation is ascending (ASEQ) at 3838 and 3840, a message is sent to the ascending trunk selection process at 3842. This process will determine the trunk that is next in ascending order at 3844 and return a trunk selection to the terminating process at 3846. The process then proceeds to 3870. If the rotation is descending (DESEQ) at 3838 and 3840, a message is sent to the descending trunk selection process at 3848. This process will determine the trunk that is next in descending order at 3850 and return a trunk selection to the terminating process at 3852. The process then proceeds to 3870. If the rotation is clockwise (CWCTH) at 3854 and 3856, a message is sent to the clockwise trunk selection process at 3858. This process will determine the trunk that is next in clockwise order at 3860 and return a trunk selection to the terminating process at 3862. The process then proceeds to 3870. If the rotation is counter-clockwise at 3854 and 3856, a message is sent to the counter-clockwise (CCWCTH) trunk selection process at 3864. This process will determine the trunk that is next in counter-clockwise order at 3866 and return a trunk selection to the terminating process at 3868. The process then proceeds to 3870.

At 3870 (FIG. 23C), the satellite indicator is checked and if a satellite was used on the previous incoming circuit at 3872, the trunk group table is checked to determine if the selected trunk uses a satellite at 3874 and 3876. If a satellite would be used again, maintenance is informed at 3878, a message is sent to the treatment table with cause 47 at 3880, and idle is attained at 3882. If a satellite will not be used again at 3876, the hop counter is checked at 3884 and 3886 (FIG. 23D). If the hop counter is active, the CCB is checked at 3888 and 3890. If a hop counter is found in the CCB, it is decremented by one at 3892. If the hop counter is now zero at 3894, then maintenance is informed at 3896, a message is sent to the treatment table with cause 47 at 3898 and idle is attained at 3900. If a satellite was not used on the incoming circuit at 3872, then the trunk group table is checked to determine if the selected outgoing circuit (OGT) uses a satellite at 3902 and 3904. If a satellite would be used again at 3904, the network indicator is changed to indicate that a satellite has been used at 3906. After 3906 or if a satellite is not used at 3904, processing proceeds to 3884. If the determination at 3890 is negative, the IAM hop count is incremented by 20 at 3891 and processing proceeds to 3908. If the determinations at either 3886 or 3894 are negative, then processing proceeds to 3908. At 3908, the service indicator field is checked. At 3912, the type of trunk is determined.

If it is a TDM trunk (access), the trunk group is checked for COT capability at 3914 (FIG. 23E). Percentage calculations are performed at 3916 to determine if a continuity check is required at 3918. If the type of trunk is an ATM trunk (IMT) at 3912, or if a continuity check is not required at 3918, then IAM parameters are determined at 3920. If the trunk has a message index at 3922, then a message is sent to the message table at 3924 and the response is received at 3926. The response, the CIC, and the associated point codes are used to build the IAM at 3928 and 3930 (FIG. 23F). Processing then proceeds to 3936. If no index is found at 3922, then the incoming IAM, the CIC and associated point codes are used to build the IAM at 3932 and 3934. After 3930 or 3934, a message is sent to the mux and echo canceller with the circuit—VPI/VCI assignment at 3936 and a mux timer is set at 3938. If a continuity check is required at 3918, the IAM parameters are determined at 3942. If the trunk has a message index at 3944, then a message is sent to the message table at 3946 and the response is received at 3948. The response, the CIC, and the associated point codes are used to build the IAM at 3950 and 3952. Processing then proceeds to 3958. If no index is found at 3944, then the incoming IAM, the CIC and associated point codes are used to build the IAM at 3954 and 3956. After 3952 or 3956, echo control is assessed at 3958. If echo control is not needed, a message is sent to the mux with the circuit—VPI/VCI assignment at 3960 and a mux timer is set at 3962. Processing proceeds to 3968. If echo control is required at 3958, then a message is sent to the mux and echo canceller with the circuit—VPI/VCI assignment at 3964 and a mux timer is set at 3966.

The terminating process awaits a mux response at 3968 (FIG. 23G). If a message is received from the mux at 3970, the type of response is determined at 3972. If it is an acceptance, then the circuit is marked as transient at 3974 and a message that identifies the selected outgoing circuit is sent to the originating process at 3975. It is determined if the call is intra-CCM at 3976 and 3977. If the call is intra-CCM at 3977 (FIG. 23H), an internal IAM with continuity is sent at 3978. If the call is not intra-CCM at 3977, an external IAM with continuity is sent at 3979. After 3978 or 3979, a message is sent to invoke outgoing continuity procedures at 3980. At 3982 the ACM timer is set and the process proceeds to 4100. If the response at 3972 is a rejection, maintenance is informed at 3986. After 3986, reattempt within the same trunk group is checked at 6050 and 6052. If reattempt is not allowed at 6052, the call counter is incremented to the next request at 6054, next function is used at 6056, and processing proceeds to 3282. If reattempt is allowed at 6052, a first attempt is checked in the CCB at 6058 and 6060. If it is not a first attempt at 6060, the call counter is incremented to the next request at 6062, next function is used at 6064, and processing proceeds to 3282. If this is a first attempt at 6060, the circuit is marked as maintenance busy at 6066 and the circuit blocking process is invoked at 6068. Call reattempt is incremented in the CCB at 6070 and the call is retried over the same trunk group at 6072. Processing proceeds to 3816.

If the timer expires at 3992 (FIG. 23I), maintenance is informed at 3994 and a second message is sent to the mux with a different assignment at 3996. The mux timer is set at 3998 and a response is awaited at 4000. If the timer expires at 4002, maintenance is informed at 4004, a message is sent to the treatment table with cause 38 at 4006, a release point is sent to billing at 4008 (FIG. 23J), and idle is attained at 4010. If a message is received from the mux at 4012, the type of response is determined at 4014. If it is an acceptance, then the circuit is marked as transient at 4016 and a message that identifies the selected outgoing circuit is sent to the originating process at 4017. It is determined if the call is intra-CCM at 4018 and 4019. If the call is intra-CCM at 4019, an internal IAM with continuity is sent at 4020. If the call is not intra-CCM at 4019, an external IAM with continuity is sent at 4021. After 4020 or 4021, a message is sent to invoke outgoing continuity procedures at 4022. At 4024 the ACM timer is set and the process proceeds to 4100. If the response at 4014 is a rejection, reattempt within the same trunk group is checked at 6076. If reattempt is not allowed at 6076, the call counter is incremented to the next request at 6078, next function is used at 6080, and processing proceeds to 3282. If reattempt is allowed at 6076, a first attempt is checked in the CCB at 6082 and 6084. If it is not a first attempt at 6084, the call counter is incremented to the next request at 6086, next function is used at 6088, and processing proceeds to 3282. If this is a first attempt at 6084, the circuit is marked as maintenance busy at 6090 and the circuit blocking process is invoked at 6092. Call reattempt is incremented in the CCB at 6094 and the call is retried over the same trunk group at 6096. Processing proceeds to 3816.

The terminating process awaits a mux response at 4040 (FIG. 23K). If a message is received from the mux at 4042, the type of response is determined at 4044. If it is an acceptance, then the circuit is marked as transient at 4046 and a message that identifies the selected outgoing circuit is sent to the originating process at 4047. It is determined if the call is intra-CCM at 4048 and 4049. If the call is intra-CCM at 4049 (FIG. 23L), an internal IAM without continuity is sent at 4050. If the call is not intra-CCM at 4049, an external IAM without continuity is sent at 4051. After 4050 or 4051, the ACM timer is set at 4052 and the process proceeds to 4220. If the response at 4044 is a rejection, maintenance is informed at 4054. After 4054, reattempt within the same trunk group is checked at 6100 and 6102. If reattempt is not allowed at 6102, the call counter is incremented to the next request at 6104, next function is used at 6106, and processing proceeds to 3282. If reattempt is allowed at 6102, a first attempt is checked in the CCB at 6108 and 6110. If it is not a first attempt at 6110, the call counter is incremented to the next request at 6112, next function is used at 6114, and processing proceeds to 3282. If this is a first attempt at 6110, the circuit is marked as maintenance busy at 6116 and the circuit blocking process is invoked at 6118. Call reattempt is incremented in the CCB at 6120 and the call is retried over the same trunk group at 6122. Processing proceeds to 3816.

If the timer expires at 4060 (FIG. 23M), maintenance is informed at 4062 and a second message is sent to the mux with a different assignment at 4064. The mux timer is set at 4066 and a response is awaited at 4068. If the timer expires at 4070, maintenance is informed at 4072, a message is sent to the treatment table with cause 38 at 4074, a release point is sent to billing at 4076 (FIG. 23N), and idle is attained at 4078. If a message is received from the mux at 4080, the type of response is determined at 4082. If it is an acceptance, then the circuit is marked as transient at 4084 and a message that identifies the selected outgoing circuit is sent to the originating process at 4085. It is determined if the call is intra-CCM at 4086 and 4087. If the call is intra-CCM at 4087, an internal IAM without continuity is sent at 4088. If the call is not intra-CCM at 4087, an external IAM without continuity is sent at 4089. After 4088 or 4089, the ACM timer is set at 4090 and the process proceeds to 4220. If the response at 4082 is a rejection, reattempt within the same trunk group is checked at 6130. If reattempt is not allowed at 6130, the call counter is incremented to the next request at 6132, next function is used at 6134, and processing proceeds to 3282. If reattempt is allowed at 6130, a first attempt is checked in the CCB at 6136 and 6138. If it is not a first attempt at 6138, the call counter is incremented to the next request at 6140, next function is used at 6142, and processing proceeds to 3282. If this is a first attempt at 6138, the circuit is marked as maintenance busy at 6144 and the circuit blocking process is invoked at 6146. Call reattempt is incremented in the CCB at 6148 and the call is retried over the same trunk group at 6150. Processing proceeds to 3816.

At 4100 (FIG. 23O), the terminating process awaits an outgoing continuity report. If the report is a success (continuity check outgoing—CCO) at 4102, the CCB is updated at 4103. It is determined if the call is intra-CCM at 4104 and 4105. If the call is intra-CCM at 4105, an internal COT (success) is sent at 4106. If the call is not intra-CCM at 4105, an external COT (success) is sent at 4107. After 4106 or 4107, processing proceeds to 4220. If the report is a failure at 4108, the ACM timer is stopped at 4109, and it is determined if the call is intra-CCM at 4110 and 4111. If the call is intra-CCM at 4111, an internal COT (fail) is sent at 4112. If the call is not intra-CCM at 4111, an external COT (fail) is sent at 4113. After 4112 or 4113, a retry capability is assessed at 4114 (FIG. 23P), and if allowed at 4116, the call counter is incremented at 4118. A retry call message is sent to the originating process at 4120, and idle is attained at 4122. If retry is not allowed at 4116, the outgoing continuity recheck process is invoked with a message at 4124 and idle is attained at 4126. If an external RLC is received at 4134, a call retry request is sent 4140. After 4140, it is determined if the outgoing continuity procedure is complete at 4142. If not, the outgoing continuity procedure is stopped at 4144 and processing proceeds to 4146. If outgoing continuity procedures are complete at 4142, processing proceeds to 4146. The ACM timer is stopped at 4146 and a message is sent to the treatment table with cause 21 at 4148. The circuit is marked as transient at 4150 and a release time point is sent to billing at 4152. At 4154, an RLC timer is set, and at 4156, a set REL timer is set. Processing proceeds to 4570. If an internal RLC is received at 4133, processing proceeds to 4142.

If another internal message is received at 4160 (FIG. 23Q) or if another external message is received at 4161, it is determined if the outgoing continuity procedure is complete at 4162. If not, the outgoing continuity procedure is stopped at 4163 and processing proceeds to 4164. If outgoing continuity procedures are complete at 4162, processing proceeds to 4164. The ACM timer is stopped at 4164 and a message is sent to the originating process for call retry at 4165. A release time point is sent to billing at 4166 (FIG. 23R). At 4167, a message invokes the mux release process and idle is attained at 4168. If an internal IAM is received at 4170 or if an external IAM is received at 4171, it is determined if the outgoing continuity procedure is complete at 4172. If not, the outgoing continuity procedure is stopped at 4173. Call retry is attempted at 4169 and idle is attained at 4185. If a blocking request is received at 4174 or if a release request is received from the incoming process at 4175, a call retry request is sent 4176. After 4176, it is determined if the outgoing continuity procedure is complete at 4177. If not, the outgoing continuity procedure is stopped at 4178 and processing proceeds to 4179. If outgoing continuity procedures are complete at 4177, processing proceeds to 4179. The ACM timer is stopped at 4179 and a message is sent to the treatment table with cause 21 at 4180. The circuit is marked as transient at 4181 and a release time point is sent to billing at 4182. At 4183, an RLC timer is set, and at 4184, a set REL timer is set. Processing proceeds to 4570.

If an external REL is received from the succeeding network element at 4186 (FIG. 23S) or if an internal REL is received at 4187, it is determined if the outgoing continuity procedure is complete at 4188. If not, the outgoing continuity procedure is stopped at 4189 and processing proceeds to 4190. If outgoing continuity procedures are complete at 4188, processing proceeds to 4190. The ACM timer is stopped at 4190 and a message is sent to the treatment table with cause from the REL at 4191. It is determined if the call is intra-CCM at 4192 and 4193 (FIG. 23T). If the call is intra-CCM at 4193, an internal RLC is sent at 4194. If the call is not intra-CCM at 4193, an external RLC is sent at 4195. After 4194 or 4195, a release time point is sent to billing at 4196. At 4198, a message invokes mux/echo release procedures and idle is attained at 4200. If a blocking reset is received at 4202, it is determined if the outgoing continuity procedure is complete at 4203. If not, the outgoing continuity procedure is stopped at 4204 and processing proceeds to 4205. If outgoing continuity procedures are complete at 4203, processing proceeds to 4205. The ACM timer is stopped at 4205 and a message is sent to the originating process for call retry at 4206. A release time point is sent to billing at 4207. At 4208, a messages invokes mux/echo release procedures and idle is attained at 4209. If an information message is received from the originating process at 4210, it is determined if the call is intra-CCM at 4211 and 4212. If the call is intra-CCM at 4212, an internal INF is sent at 4213. If the call is not intra-CCM at 4212, an external INF is sent at 4214. After 4213 or 4214, processing proceeds back to 4100.

Terminating Process—Call Completion

At various points above, the terminating process handling the outgoing side of the call may wait for some message or action on the call before call completion. Some examples are waiting for an ACM, ANM, or RLC. FIGS. 24A–24M depict this call completion processing by the terminating process of the BCM.

Figure 24A:
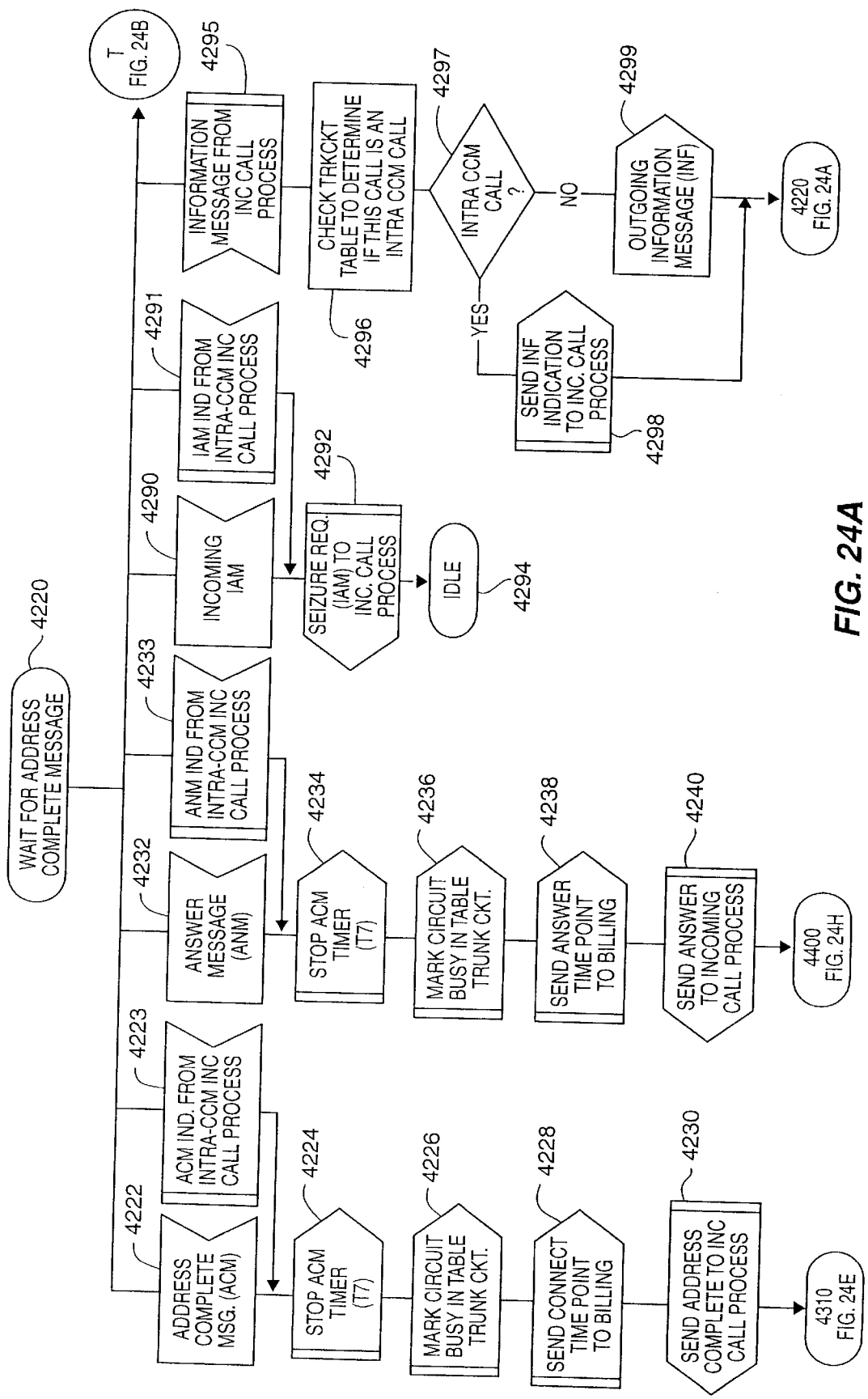
Figure 24B:
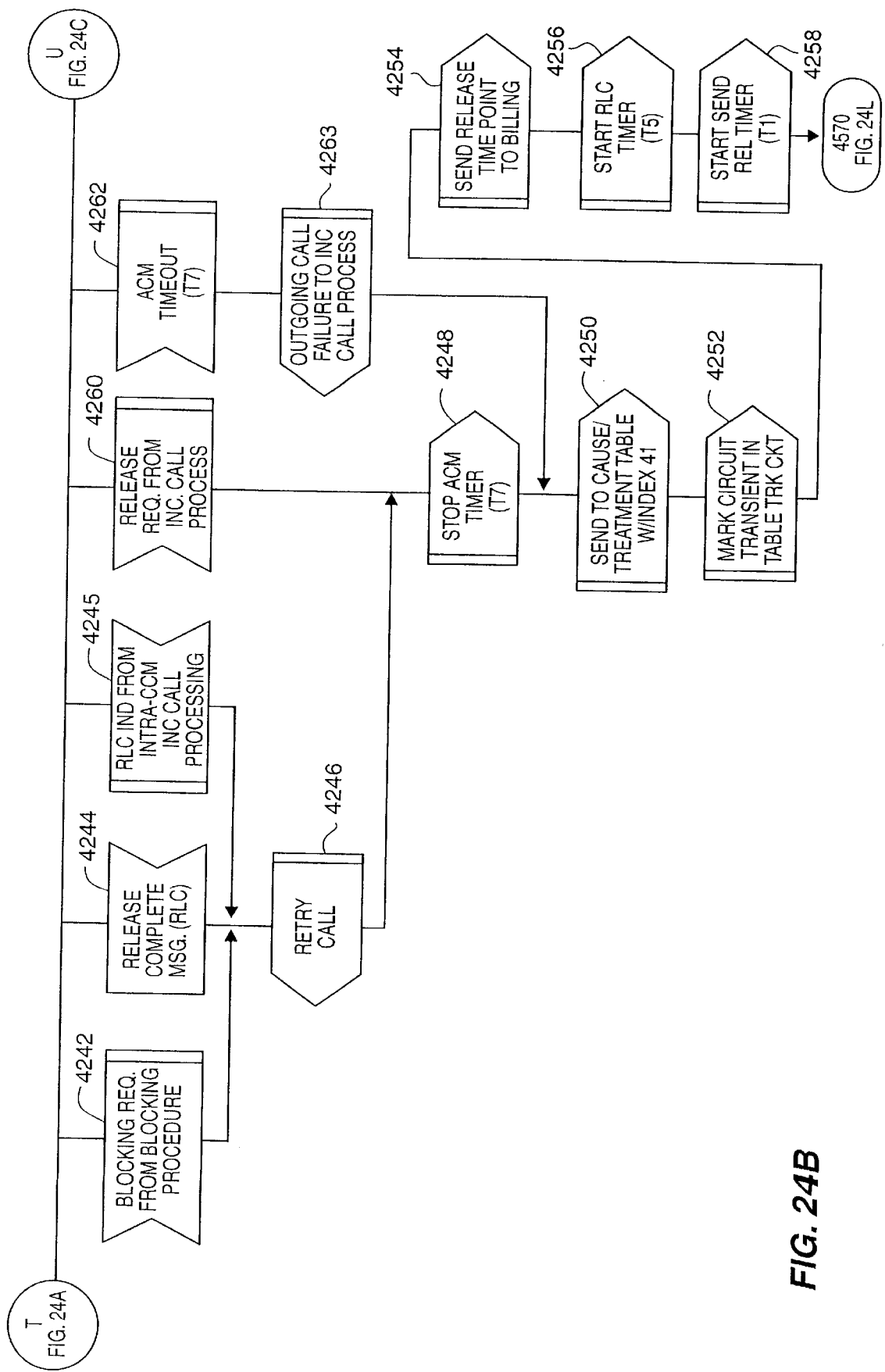
Figure 24C:
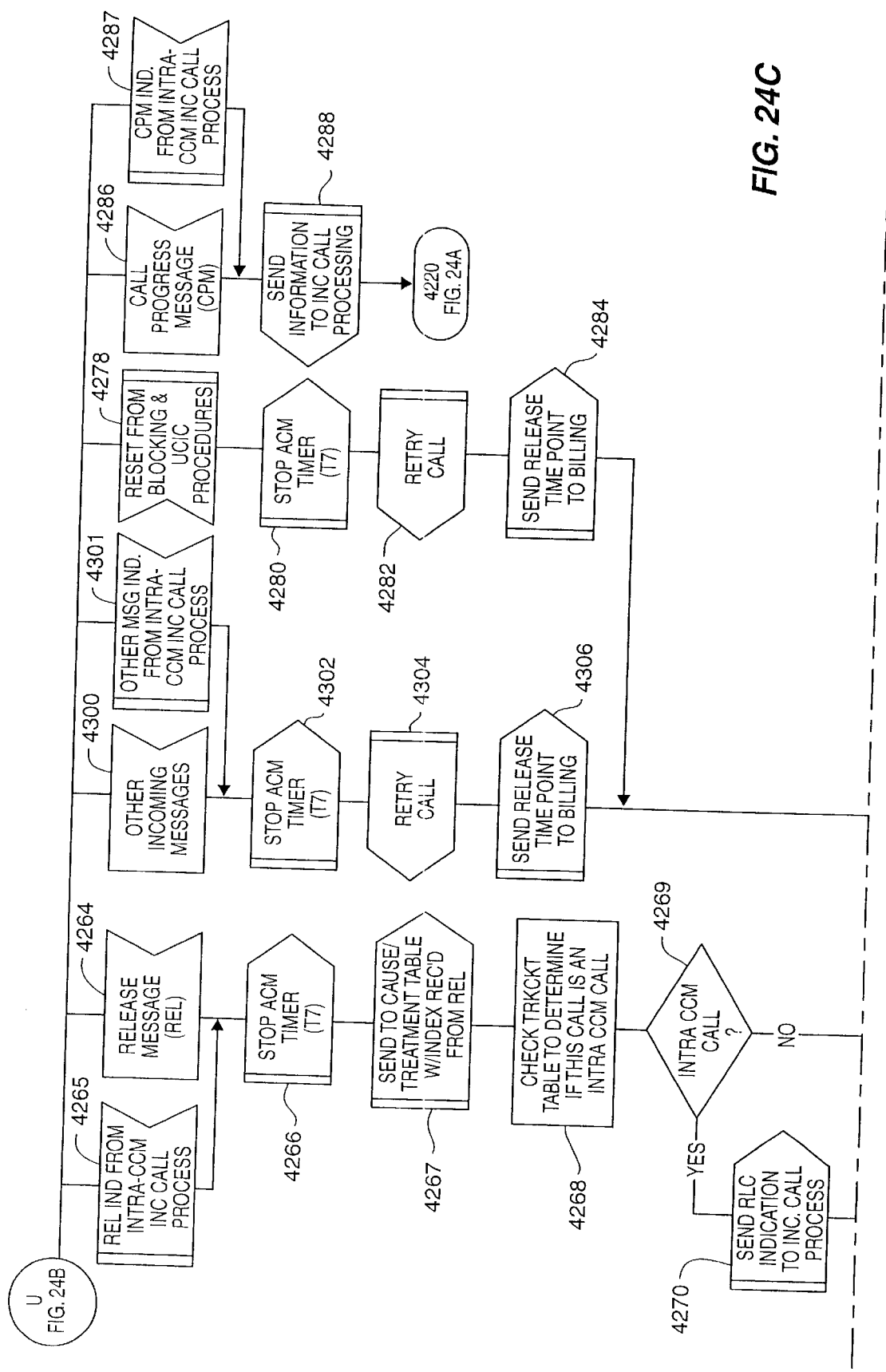

On FIG. 24A at 4220, the terminating process is waiting for an ACM. If an external ACM is received at 4222 or if an internal ACM is received at 4223, the ACM timer is stopped at 4224 and the circuit is marked busy at 4226. At 4228, the connect time point is sent to billing and the ACM is sent to the originating process at 4230. The process then proceeds to 4310. If an external ANM is received at 4232 or if an internal ANM is received at 4233, the ACM timer is stopped at 4234 and the circuit is marked busy at 4236. At 4238, the answer time point is sent to billing and the ANM is sent to the originating process at 4240. The process then proceeds to 4400.

If a blocking request is received at 4242 (FIG. 24B), if an external RLC is received at 4244 or if an internal RLC is received at 4245, a call retry message is sent to the originating process at 4246. At 4248, the ACM timer is stopped and a message is sent to the treatment table with index 41 at 4250. At 4252, the circuit is marked as transient and a release time point is sent to billing at 4254. At 4256 the RLC timer is started and at 4258 the send REL timer is started. The process proceeds to 4570. If a release request is received from the originating process at 4260, processing proceeds to 4248. If an ACM timer times out at 4262, a call failure message is sent to the originating process at 4263 and the process proceeds to 4250.

Figure 24D:
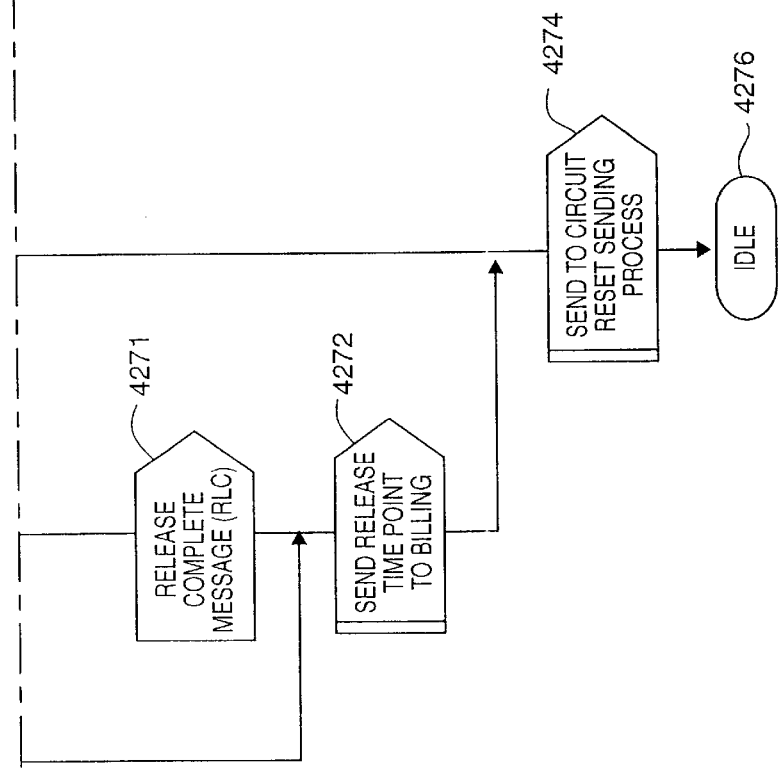
Figure 24F:
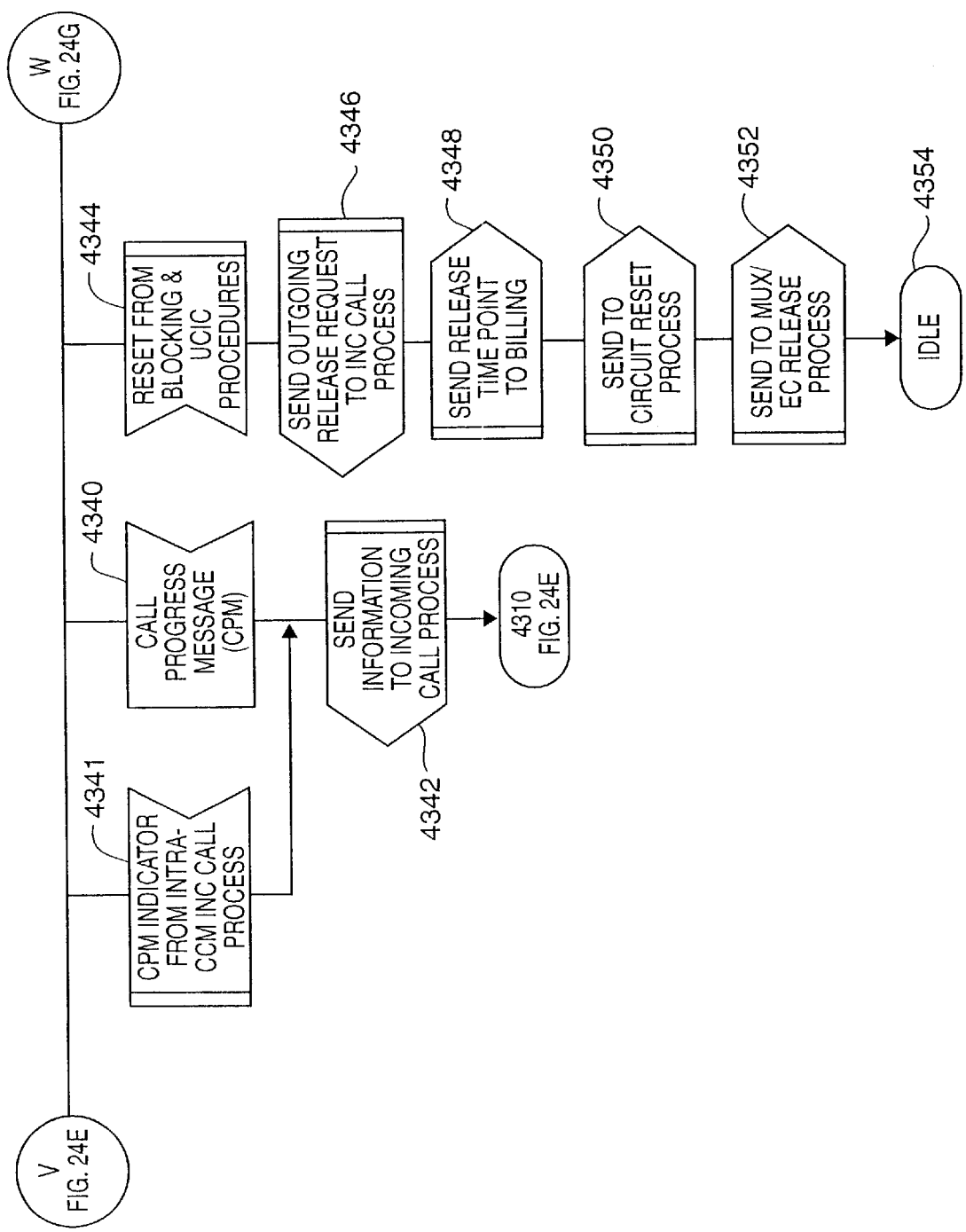
Figure 24G:
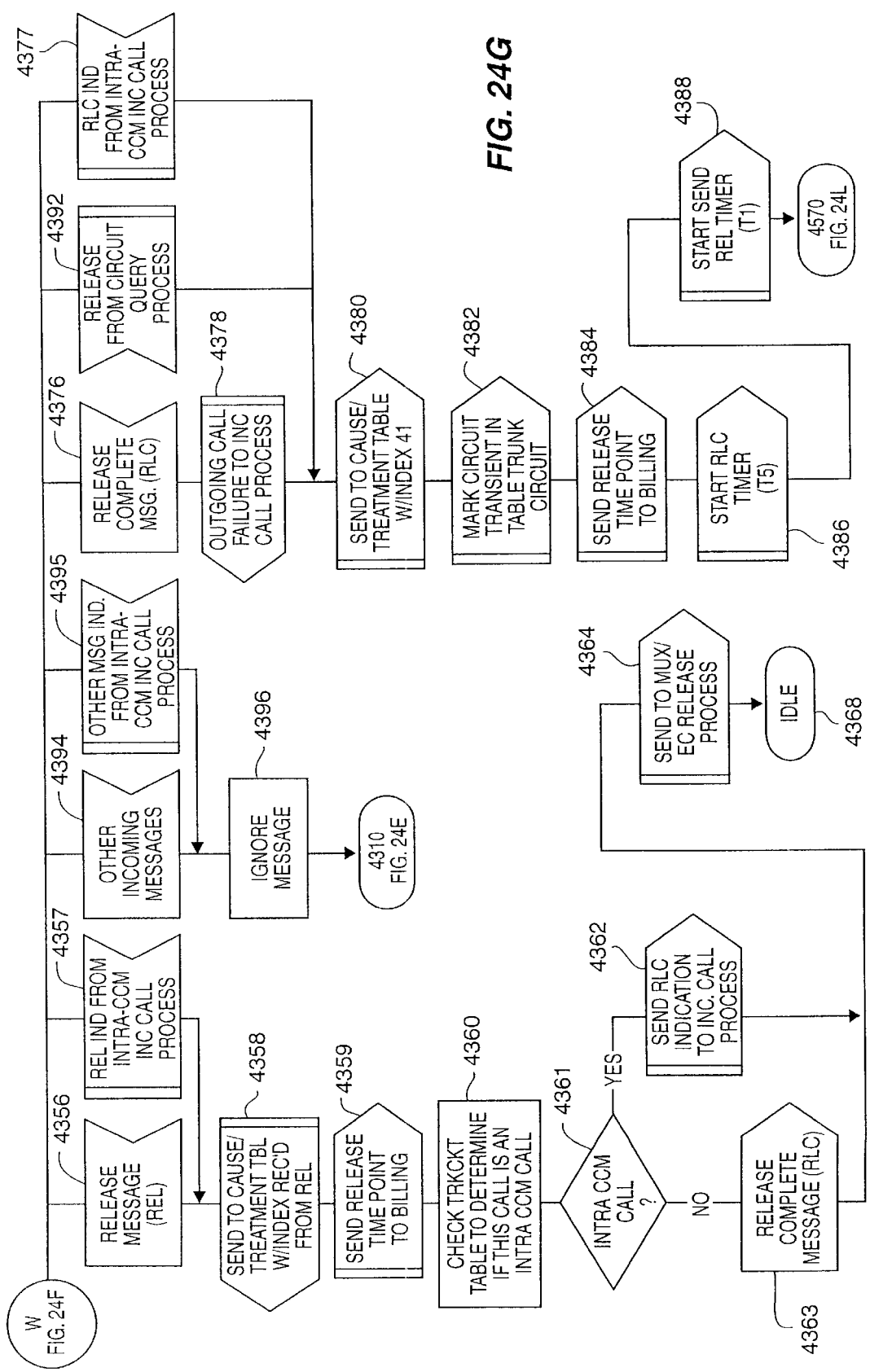
Figure 24H:
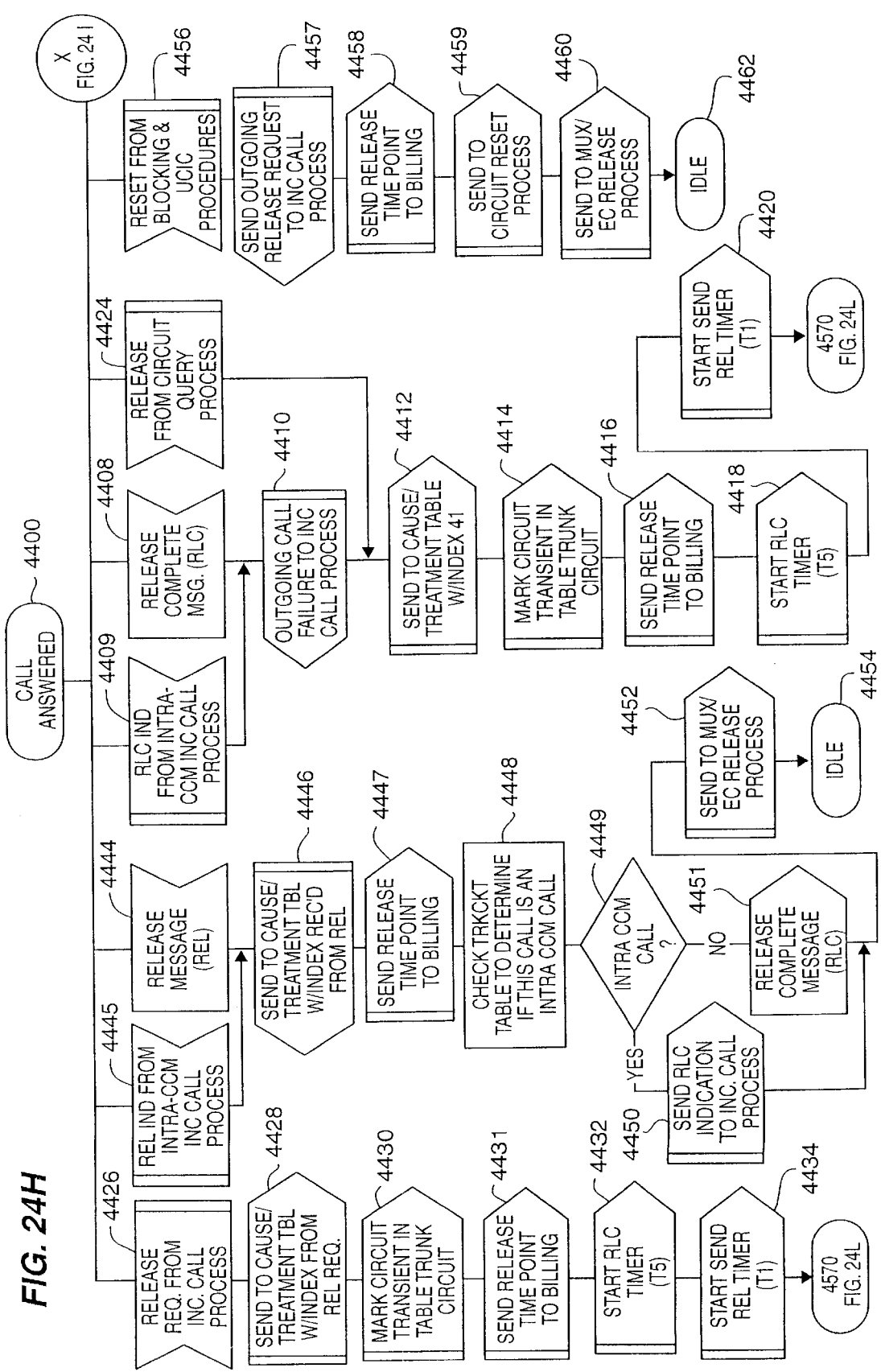
Figure 24I:
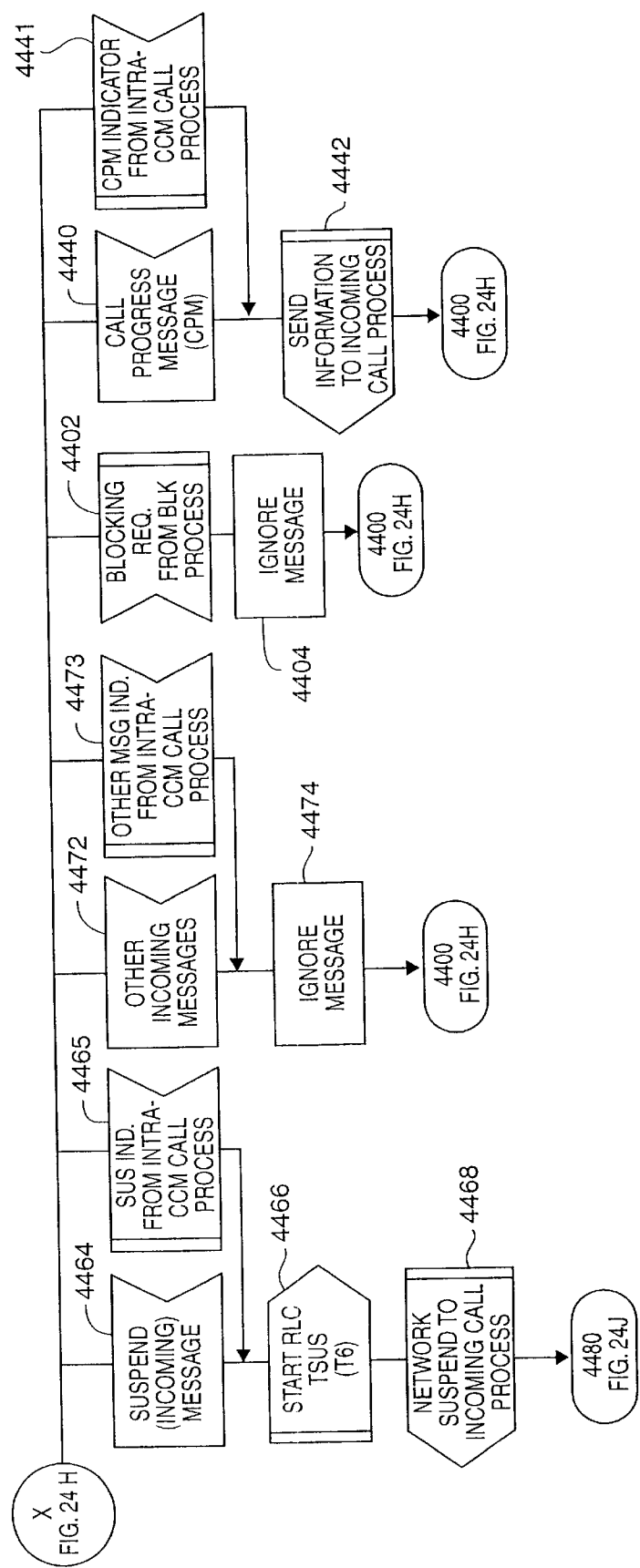
Figure 24J:
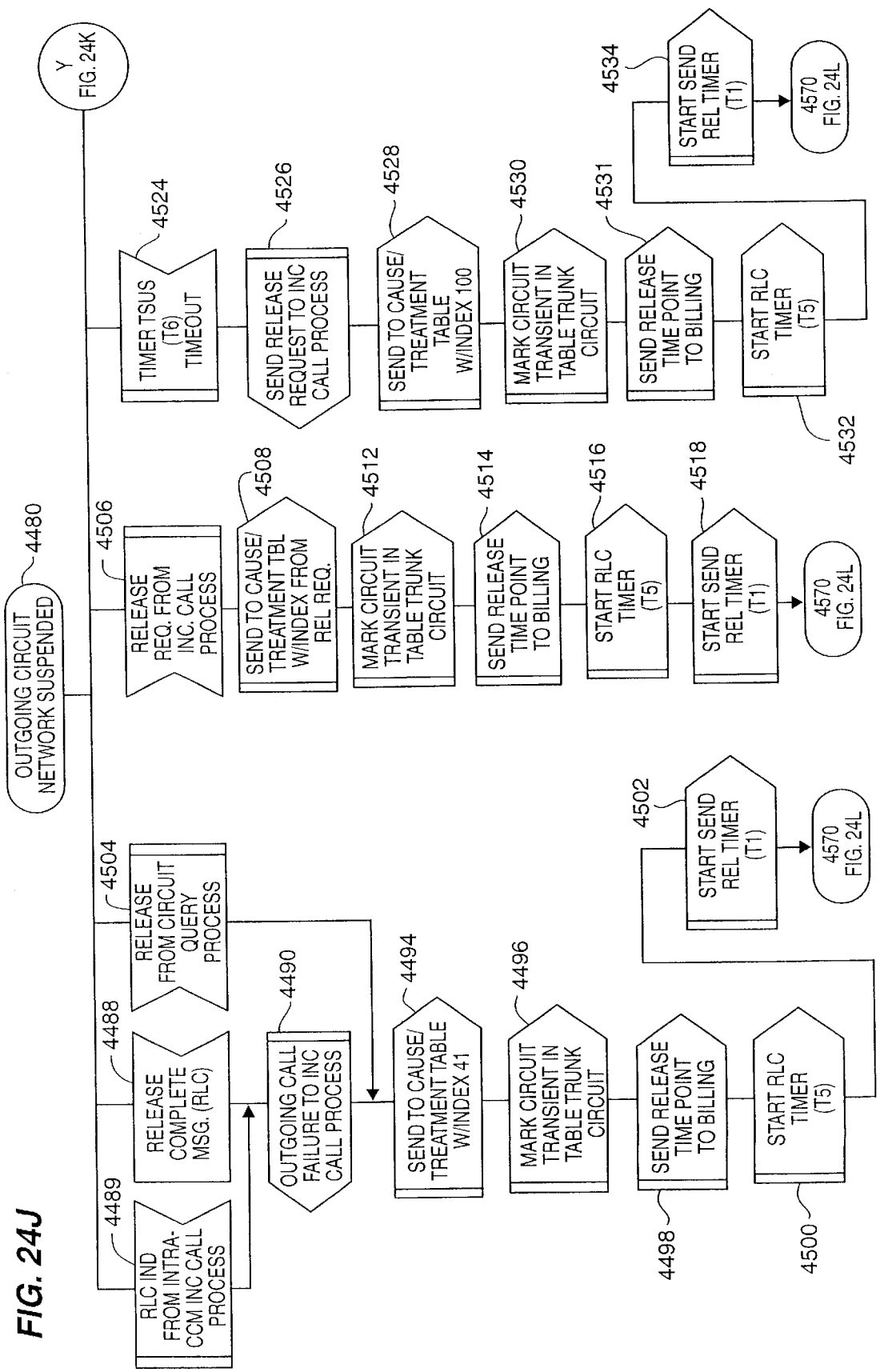
Figure 24K:
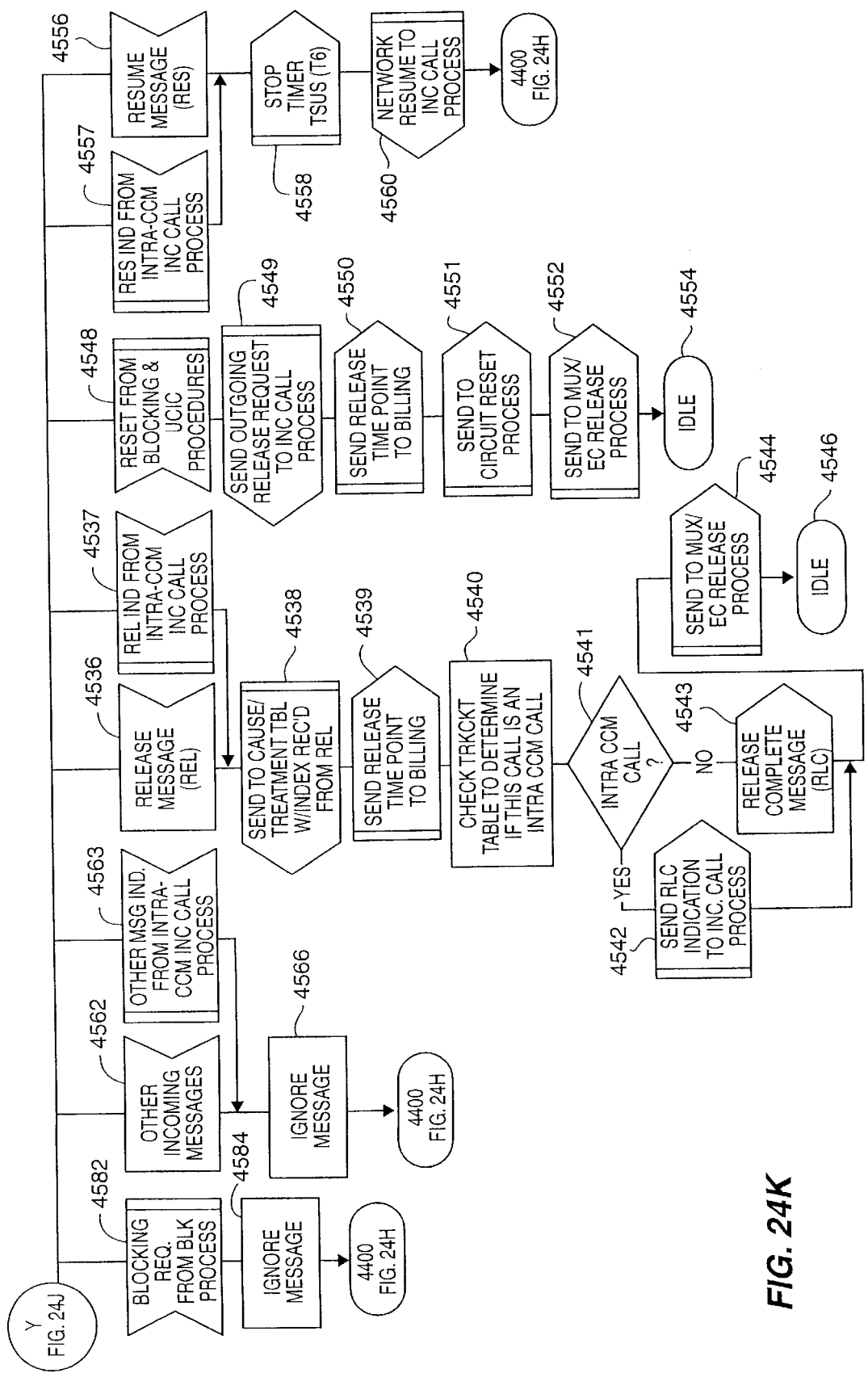
Figure 24L:
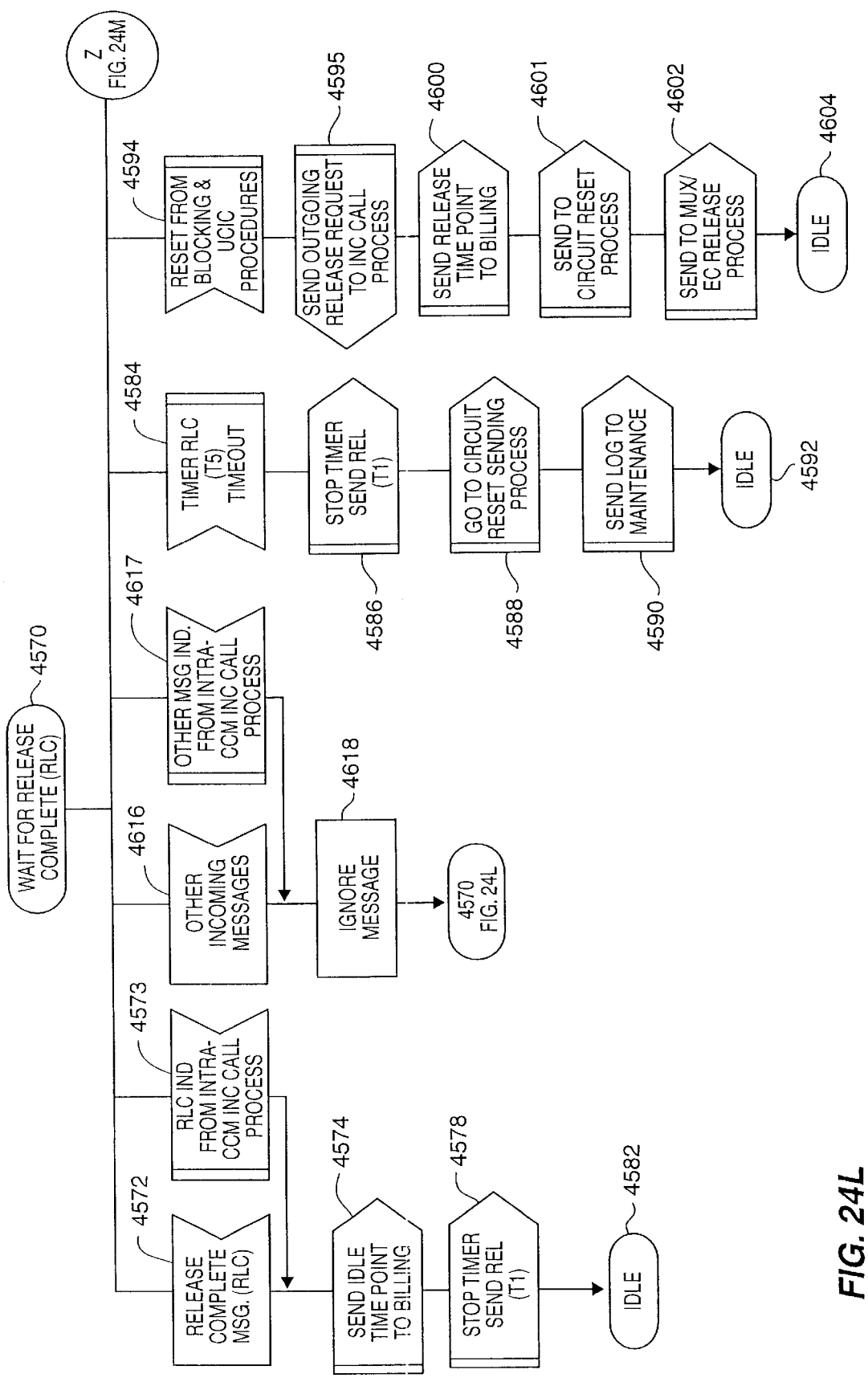
Figure 24M:
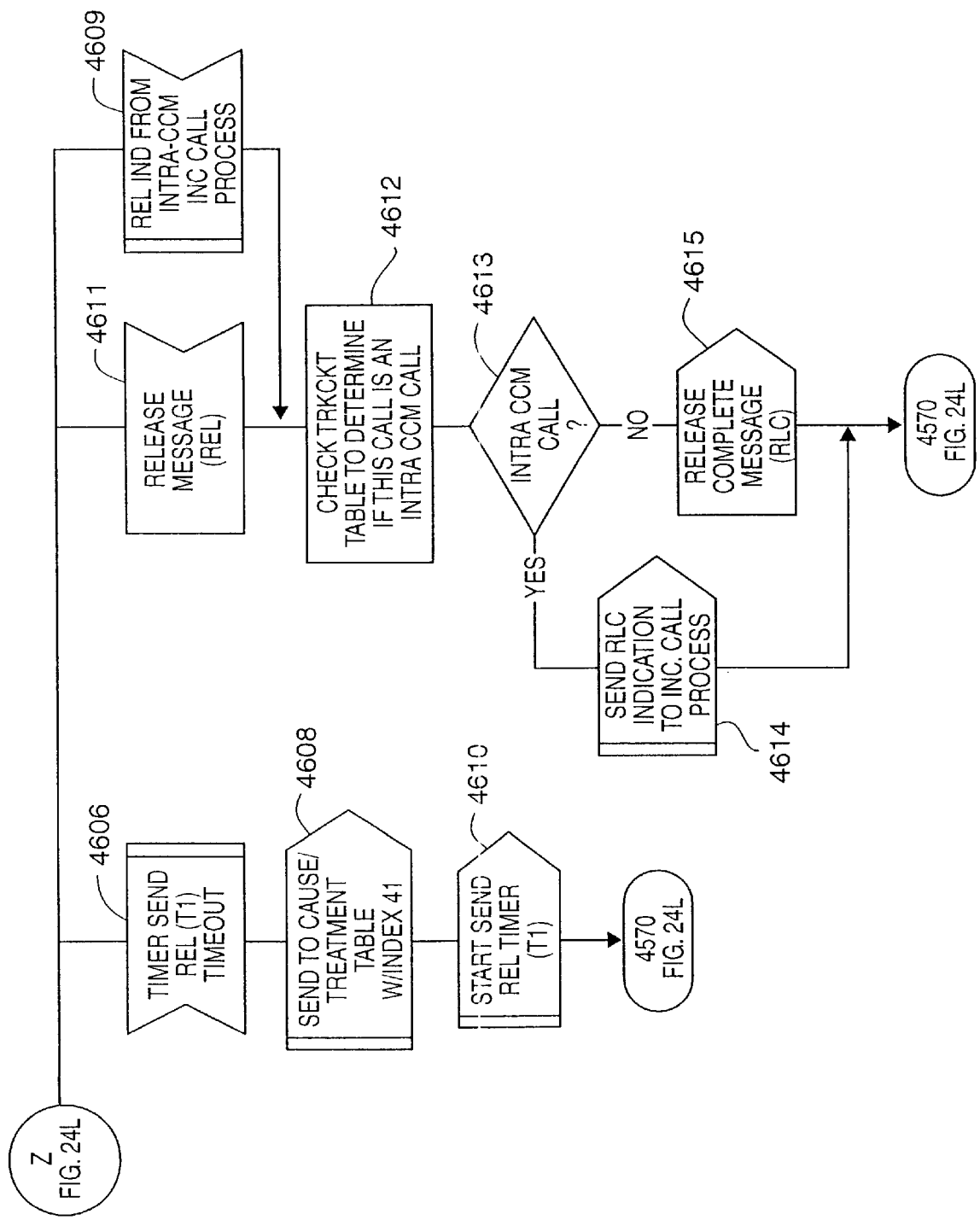

If an external REL is received at 4264 (FIG. 24C) or if an internal REL is received at 4265, the ACM timer is stopped at 4266 and a message is sent to the treatment table with the cause from the REL at 4267. It is determined if the call is intra-CCM at 4268 and 4269. If the call is intra-CCM at 4269, an internal RLC is sent at 4270. If the call is not intra-CCM at 4269, an external RLC is sent at 4271 (FIG. 24D). After 4270 or 4271, a release time point is sent to billing at 4272. At 4274, a message is sent to invoke the circuit reset process and idle is attained at 4276. If a reset from blocking is received at 4278, the ACM timer is stopped at 4280 and a call retry is sent to the originating process at 4282. A release time point is sent to billing at 4284 and the process proceeds to 4274. If an external CPM is received at 4286 or if an internal CPM is received at 4287, the information is sent to the originating process at 4288 and the process proceeds back to 4220. If an external IAM is received at 4290 or if an internal IAM is received at 4291, a seizure message is sent to the originating process at 4292 and idle is attained at 4294. If an INF message is received at 4295, it is determined if the call is intra-CCM at 4296 and 4297. If the call is intra-CCM at 4297, an internal INF is sent at 4298. If the call is not intra-CCM at 4297, an external INF is sent at 4299. After 4298 or 4299, the process proceeds back to 4220. If another external message is received at 4300 or if an internal ACM is received at 4301, the ACM timer is stopped at 4302 and a call retry is sent to the originating process at 4304. A release time point is sent to billing at 4306 and the process proceeds to 4274.

At 4310 (FIG. 24E), the terminating process is awaiting an ANM. If a blocking request is received at 4312, it is ignored at 4314, and the process proceeds back to 4310. If a release request is received from the originating process at 4318, a message is sent to the treatment table with the index from the release at 4320. At 4322, the circuit is marked transient and a release time point is sent to billing at 4324. The RLC timer is started at 4326 and the send REL timer is started at 4328. The process proceeds to 4570. If an external ANM is received at 4330 or if an internal ANM is received at 4331, an answer time point is sent to billing at 4332 and the ANM is forwarded to the originating process at 4334. The process proceeds to 4400. If an external EXM is received at 4336 or if an internal EXM is received at 4337, the EXM information is sent to billing at 4338 and the process returns to 4310. If an external CPM is received at 4340 (FIG. 24F) or if an internal CPM is received at 4341, the information is sent to the originating process at 4342 and the process returns to 4310. If reset from blocking is received at 4344, a release request is sent to the originating process at 4346 and a release time point is sent to billing at 4348. A message is sent to the circuit reset process at 4350 and a release message is sent to the mux/echo process at 4352. Idle is attained at 4354.

If an external REL is received at 4356 (FIG. 24G) or if an internal REL is received at 4357, a message is sent to the treatment table with the index from the REL at 4358 and a release time point is sent to billing at 4359. It is determined if the call is intra-CCM at 4360 and 4361. If the call is intra-CCM at 4361, an internal RLC is sent at 4362. If the call is not intra-CCM at 4361, an external INF is sent at 4363. After 4362 or 4363, a message is sent the mux/echo release process at 4364. Idle is attained 4368. If an external RLC is received at 4376, a call failure message is sent to the originating process at 4378. At 4380, a message is sent to the treatment table with index 41. At 4382, the circuit is marked as transient and a release time point is sent to billing at 4384. At 4386, the RLC timer is started and at 4388 the send REL timer is started. The process proceeds to 4570. If a release is received from the circuit query process at 4392 or if an internal RLC is received at 4393, the process proceeds to 4380. If other external messages are received at 4394 or if another internal message is received at 4395, they are ignored at 4396 and the process returns to 4310.

At 4400 (FIG. 24H), the call has been answered and is active. If a blocking request is received at 4402 (FIG. 24I), it is ignored at 4404, and the process proceeds back to 4400. If an external RLC is received at 4408 or if an internal RLC is received at 4409, a call failure message is sent to the originating process at 4410. At 4412, a message is sent to the treatment table with index 41. At 4414, the circuit is marked as transient, and a release time point is sent to billing at 4416. At 4418, the RLC timer is started and at 4420 the send REL timer is started. The process proceeds to 4570. If a release request is received from the circuit query process at 4424, processing proceeds to 4412. If a release request is received from the originating process at 4426, a message is sent to the treatment table with the index from the release at 4428. At 4430, the circuit is marked transient and a release time point is sent to billing at 4431. The RLC timer is started at 4432 and the send REL timer is started at 4434. The process proceeds to 4570. If an external CPM is received at 4440 or if an internal CPM is received at 4441, the information is sent to the originating process at 4442 and the process returns to 4400. If an external REL is received at 4444 or if an internal REL is received at 4445, a message is sent to the treatment table with the index from the REL at 4446 and a release time point is sent to billing at 4447. It is determined if the call is intra-CCM at 4448 and 4449. If the call is intra-CCM at 4449, an internal RLC is sent at 4450. If the call is not intra-CCM at 4449, an external RLC is sent at 4451. After 4450 or 4451, a message is sent the mux/echo release process at 4452. Idle is attained 4454. If reset from blocking is received at 4456, a release request is sent to the originating process at 4457, and a release time point is sent to billing at 4458. A message is sent to the circuit resent process at 4459 and a release message is sent to the mux/echo process at 4460 and idle is attained at 4462. If an external SUS message is received at 4464 or if an internal SUS is received at 4465, the SUS timer is set at 4466 and the SUS is forwarded to the originating process at 4468. The process proceeds to 4480. If other external messages are received at 4472 or if other internal messages are received at 4473, they are ignored at 4474 and the process returns to 4400.

At 4480 (FIG. 24J), the outgoing circuit has been suspended. If an external RLC is received at 4488 or if an internal RLC is received at 4489, a call failure message is sent to the originating process at 4490. At 4494 a message is sent to the treatment table with index 41. At 4496, the circuit is marked as transient, and a release time point is sent to billing at 4498. At 4500, the RLC timer is started and at 4502 the send REL timer is started. The process proceeds to 4570. If a release request is received from the circuit query process at 4504, the process proceeds to 4494. If a release request is received from the originating process at 4506, a message is sent to the treatment table with the index from the release at 4508. At 4512, the circuit is marked transient and a release time point is sent to billing at 4514. The RLC timer is started at 4516 and the send REL timer is started at 4518. The process proceeds to 4570. If the suspend timer times out at 4524, a release request is sent to the originating process at 4526 and a message is sent to the treatment table with index 100 at 4528. At 4530, the circuit is marked transient. The RLC timer is started at 4532 and the send REL timer is started at 4534. The process proceeds to 4570.

If a blocking request is received at 4582 (FIG. 24K), it is ignored at 4484, and the process proceeds back to 4400. If other external messages are received at 4562 or if other internal messages are received at 4563, they are ignored at 4566 and the process returns to 4400. If an external REL is received at 4536 or if an internal REL is received at 4537, a message is sent to the treatment table with the index from the REL at 4538 and a release time point is sent to billing at 4539. It is determined if the call is intra-CCM at 4540 and 4541. If the call is intra-CCM at 4541, an internal RLC is sent at 4542. If the call is not intra-CCM at 4541, an external RLC is sent at 4543. After 4542 or 4543, a message is sent the mux/echo release process at 4544. Idle is attained 4546. If reset from blocking is received at 4548, a release request is sent to the originating process at 4549, and a release time point is sent to billing at 4550. A message is sent to the circuit resent process at 4551. At 4552, a release message is sent to the mux/echo process and idle is attained at 4554. If an external RES message is received at 4556 or if an internal RES is received at 4557, the SUS timer is stopped at 4558 and the RES is forwarded to the originating process at 4560. The process proceeds back to 4400.

At 4570 (FIG. 24L), the terminating process awaits an RLC. If an external RLC is received at 4572 or if an internal RLC is received at 4573, an idle time point is sent to billing at 4574. At 4578, the send REL timer is stopped. Idle is attained at 4582 If the RLC timer times out at 4584, the send REL timer is stopped at 4586 and the circuit reset process is invoked at 4588. Maintenance is informed at 4590 and idle is attained at 4592. If reset from blocking is received at 4594, a release request is sent to the originating process at 4595, and a release time point is sent to billing at 4600. A message is sent to the circuit reset process at 4601. At 4602, a release message is sent to the mux/echo process and idle is attained at 4604. If the send REL timer times out at 4606 (FIG. 24M), a message is sent to the treatment table with index 41 at 4608. The send REL timer is started at 4610 and the process returns to 4570. If an internal REL is received at 4611 or if an internal REL is received at 4609, it is determined if the call is intra-CCM at 4612 and 4613. If the call is intra-CCM at 4613, an internal RLC is sent at 4614. If the call is not intra-CCM at 4613, an external RLC is sent at 4615. After 4614 or 4615, the process returns to 4570. If other external messages are received at 4616 or if other internal messages are received at 4617, they are ignored at 4618 and the process returns to 4570.

Miscellaneous Processes

In the description above, the BCM invoked following processes: glare handling, echo control, incoming circuit continuity check, automatic congestion control, circuit reset sending, outgoing trunk selection, outgoing circuit continuity check, and mux/echo release. FIGS. 25–32 depict these miscellaneous processes.

Figure 25A:
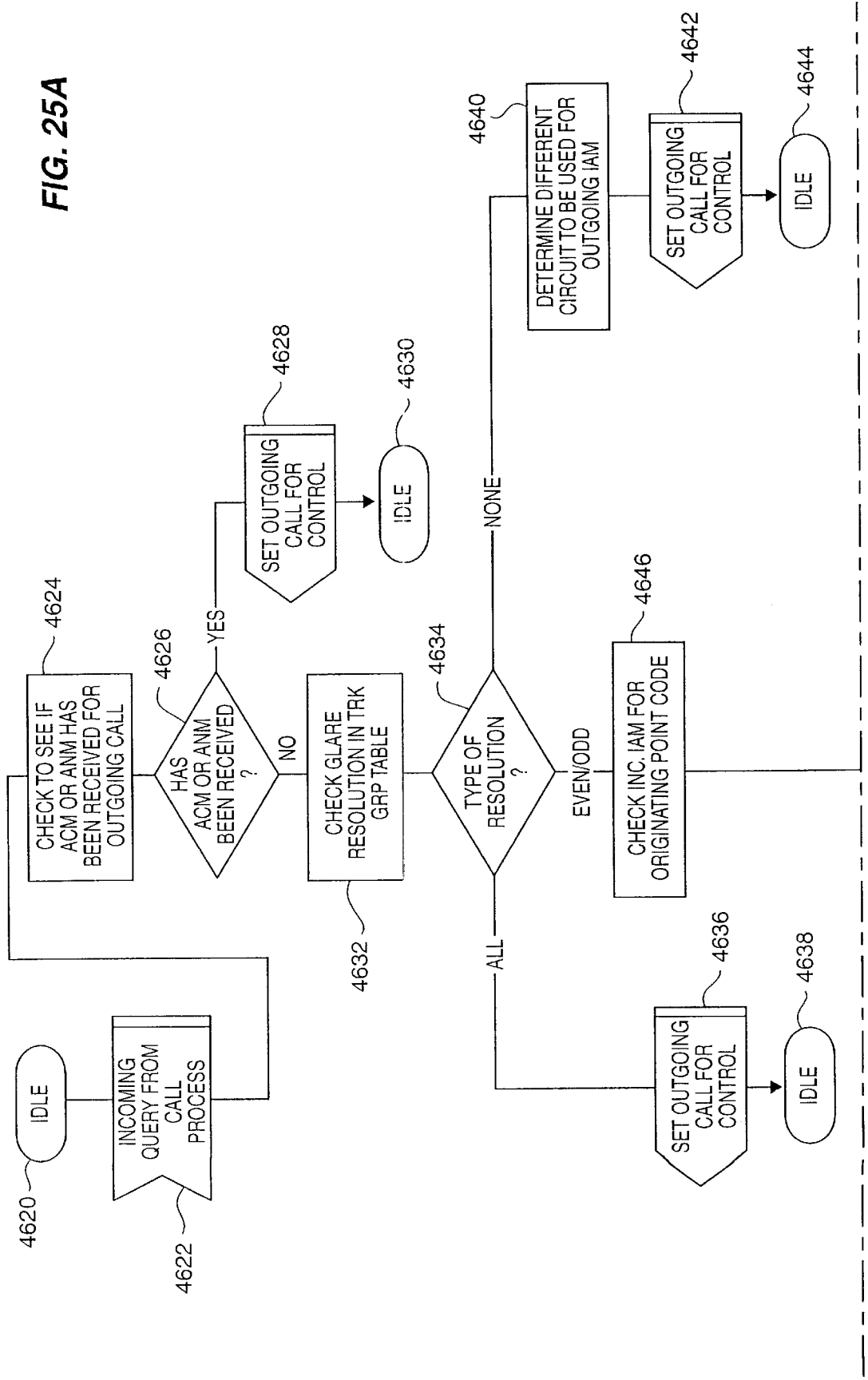
FIGS. 25A–25B is an SDL diagram of logic used in a version of the invention.
Figure 25B:
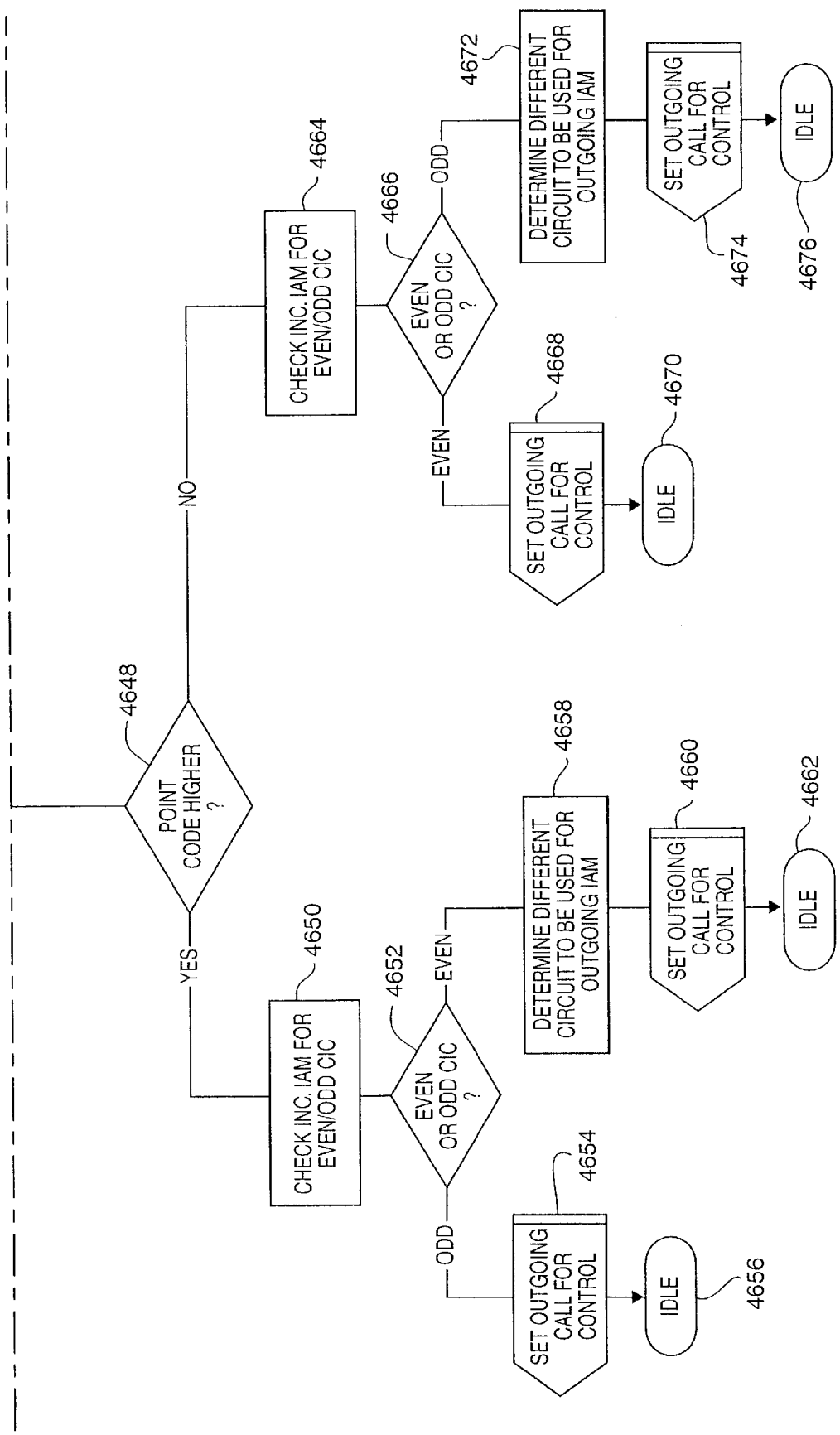

FIGS. 25A–25B depict the glare handling process. At 4620, the glare handling process is idle. At 4622 (FIG. 25A), a query from the BCM is received. At 4624 and 4626 a check is made to see if the ACM or ANM has been received. If so, control is asserted for the call at 4628 and idle is attained at 4630. If these messages have not been received at 4626, glare resolution is checked in the trunk circuit table at 4632 and 4634. If control is set at "all", control is asserted for the call at 4636 and idle is attained at 4638. If control is set at "none" at 4634, a different circuit to use is determined at 4640. Control for the new circuit is asserted for the call at 4642 and idle is attained at 4644. If the control is set at even/odd at 4634, the originating point code (OPC) of the IAM is checked at 4646 and compared to the CCM point code at 4648 (FIG. 25B). If the OPC of the IAM is higher than the CCM point code, the CIC in the IAM is checked to see if it is even or odd at 4648 and 4650. If it is odd, control is asserted for the call at 4654 and idle is attained at 4656. If the CIC is even, a different circuit to use is determined at 4658. Control for the new circuit is asserted for the call at 4660 and idle is attained at 4662. If the OPC of the LAM is not higher than the CCM point code at 4648, the CIC in the IAM is checked to see if it is even or odd at 4664 and 4666. If it is even, control is asserted for the call at 4668 and idle is attained at 4670. If the CIC is odd, a different circuit to use is determined at 4672. Control for the new circuit is asserted for the call at 4674 and idle is attained at 4676.

Figure 26A:
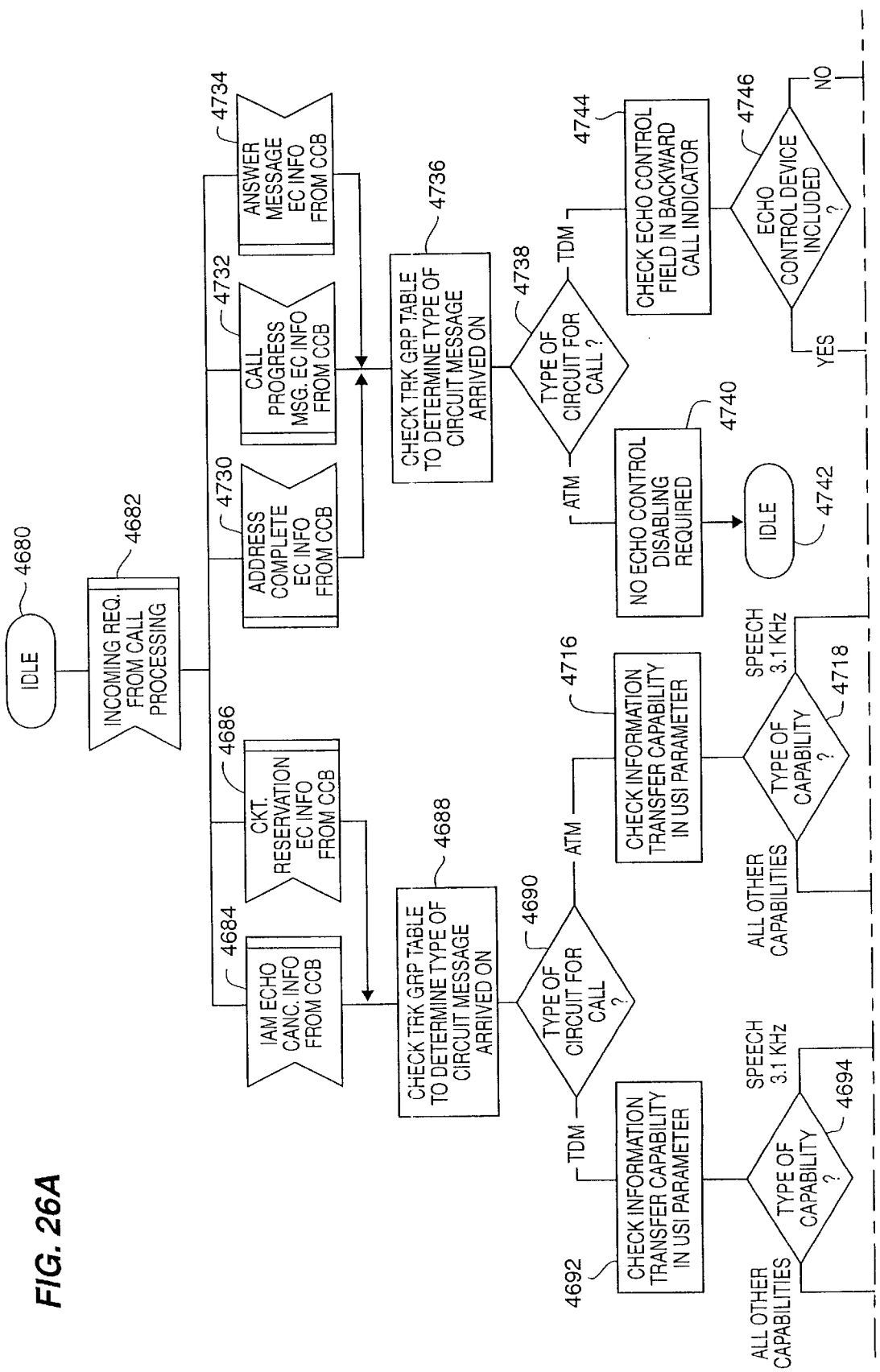
FIGS. 26A–26B is an SDL diagram of logic used in a version of the invention.
Figure 26B:
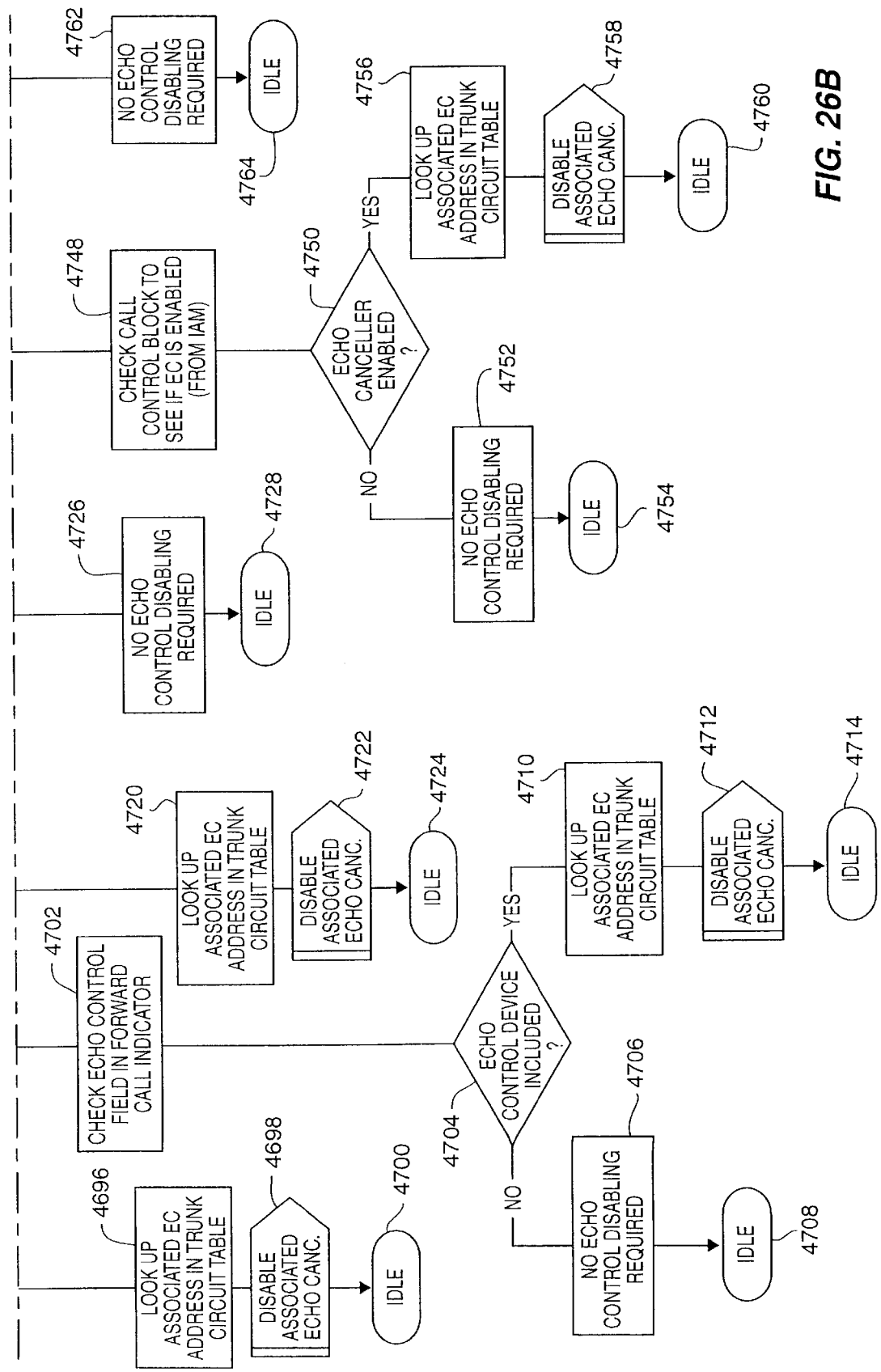

FIGS. 26A–26B depict the echo control process. At 4680 (FIG. 26A), the echo control process is idle, and a message from the BCM is received at 4682. If echo control information is received in an IAM at 4684 or a CRM at 4686, then the circuit type is checked at 4688 ad 4690. If the circuit is from a LEC (TDM), the information transfer capability is checked at 4692 and 4694. If it is not a 3.1 KHz call, the echo control address is accessed from the trunk circuit table at 4696 (FIG. 26B). The associated echo canceller is disabled at 4698 and idle is attained at 4700. If the call is a 3.1 KHz call at 4694, the echo control field in the forward call indicator is checked at 4702 and 4704. If an echo device is not included, no echo control disabling is required at 4706 and idle is attained at 4708. If an echo device is included, the echo control address is accessed from the trunk circuit table at 4710. The associated echo canceller is disabled at 4712 and idle is attained at 4714. If the circuit is from another CCM (ATM) at 4690, then the information transfer capability is checked at 4716 and 4718. If it is not a 3.1 KHz call, the echo control address is accessed from the trunk circuit table at 4720. The associated echo canceller is disabled at 4722 and idle is attained at 4724. If the call is a 3.1 KHz call at 4718, no echo control disabling is required at 4726 and idle is attained at 4728. If echo control information is received in an ACM at 4730, a CPM at 4732, or an ANM at 4734, then the circuit type is checked at 4736 and 4738. If the circuit is from another CCM (ATM), then no echo control disabling is required at 4740 and idle is attained at 4742. If the circuit is from a LEC (TDM), the echo control field in the backward call indicator is checked at 4744 and 4746. If an echo device is included, the CCB is checked to see if echo cancellation is enabled at 4748 and 4750. If is not enabled, no echo control disabling is required at 4752 and idle is attained at 4754. If echo cancellation is enabled at 4750, the echo control address is accessed from the trunk circuit table at 4756. The associated echo canceller is disabled at 4758 and idle is attained at 4760. If an echo device is not included at 4746, no echo control disabling is required at 4762 and idle is attained at 4764.

Figure 27B:
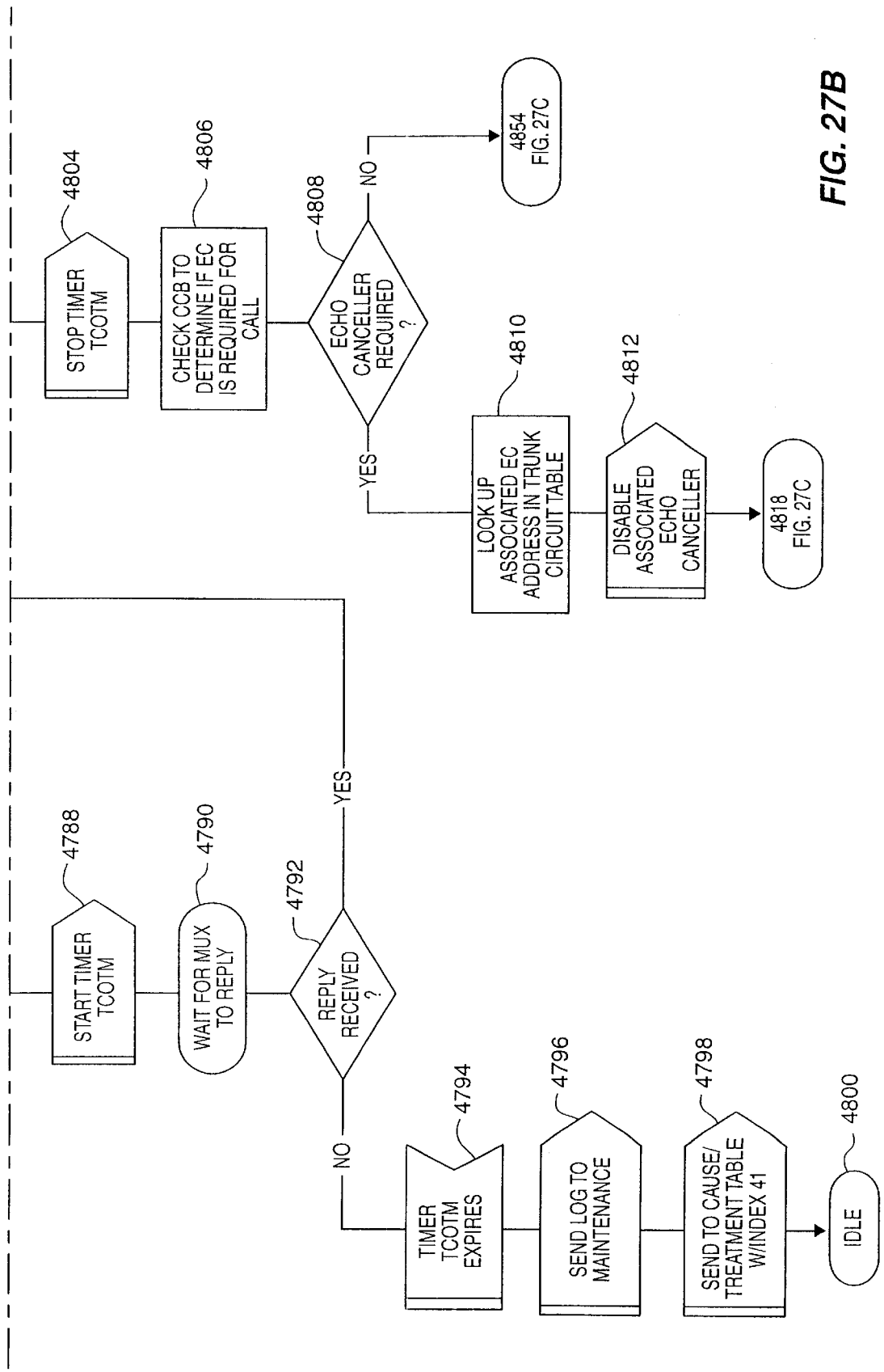
Figure 27C:
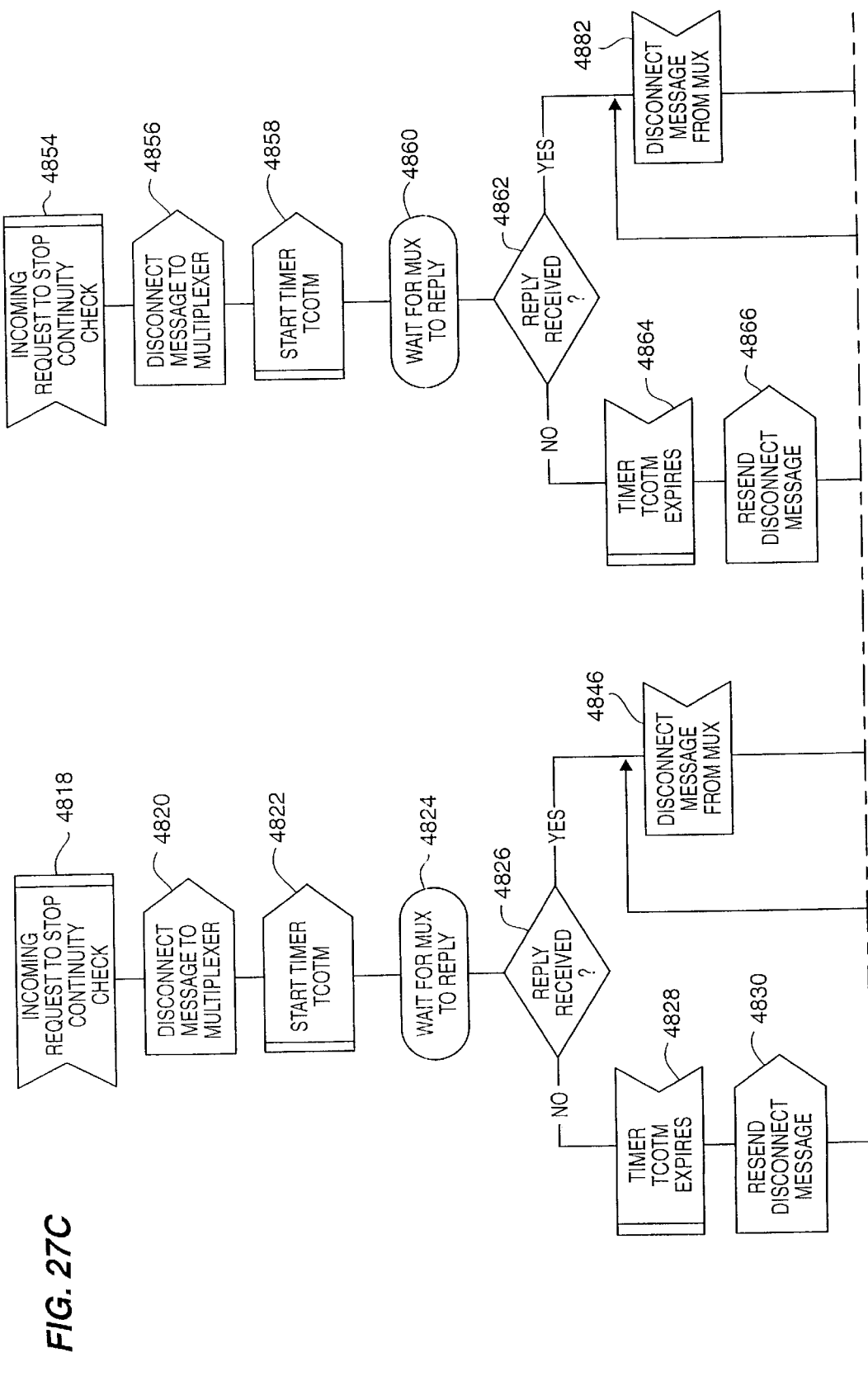

FIGS. 27A–27D depict the incoming continuity check process. On FIG. 27A at 4770, the continuity check process for an incoming call is idle and a message is received invoking the process at 4772. At 4774, the CCB is checked to determine the DS0 for the continuity check. At 4776, the mux is instructed to connect the DS0 to a loopback. The COT timer is set at 4778 and the process awaits a reply from the mux at 4780 and 4782. If the COT timer expires at 4784, the mux message is resent at 4786 and the timer is restarted at 4788 (FIG. 27B). The process awaits a reply from the mux at 4790 and 4792. If the COT timer expires at 4794, maintenance is informed at 4796, a message is sent to the treatment table with index 41 at 4798, and idle is attained at 4800. If a reply is received at 4782 or 4792, the message indicates that the loopback has been provided at 4802. The COT timer is stopped at 4804. At 4806 and 4808, the CCB is checked for echo control requirements. If echo control is required, the echo control address is accessed from the trunk circuit table at 4810. The associated echo canceller is disabled at 4812.

Figure 27D:
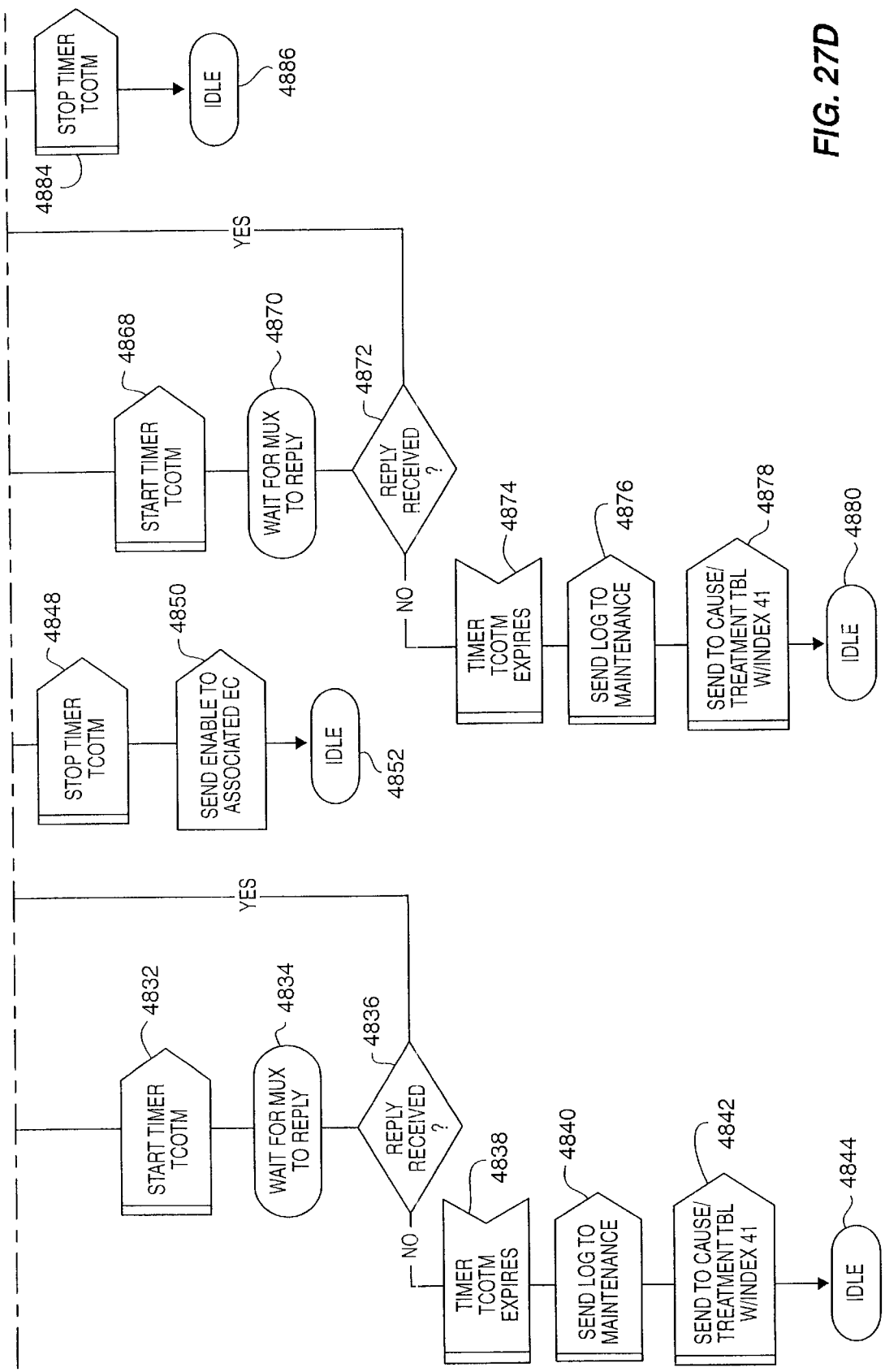

At 4818 (FIG. 27C), a message is received to stop the continuity check. At 4820, the mux is instructed to disconnect the loopback, a COT timer is started at 4822, and the process awaits a mux reply at 4824 and 4826. If the COT timer expires at 4828, the mux message is resent at 4830 and the timer is restarted at 4832 (FIG. 27D). The process awaits a reply from the mux at 4834 and 4836. If the COT timer expires at 4838, maintenance is informed at 4840, a message is sent to the treatment table with index 41 at 4842, and idle is attained at 4844. If a reply is received at 4826 or 4836, the message indicates that the loopback has been disconnected at 4846. The COT timer is stopped at 4848. The associated echo canceller is enabled at 4850. Idle is attained at 4852. At 4854, a message is received to stop the continuity check. At 4856, the mux is instructed to disconnect the loopback, a COT timer is started at 4858, and the process awaits a mux reply at 4860 and 4862. If the COT timer expires at 4864, the mux message is resent at 4866 and the timer is restarted at 4868. The process awaits a reply from the mux at 4870 and 4872. If the COT timer expires at 4874, maintenance is informed at 4876, a message is sent to the treatment table with index 41 at 4878, and idle is attained at 4880. If a reply is received at 4862 or 4872, the message indicates that the loopback has been disconnected at 4882. The COT timer is stopped at 4884. Idle is attained at 4886.

Figure 28A:
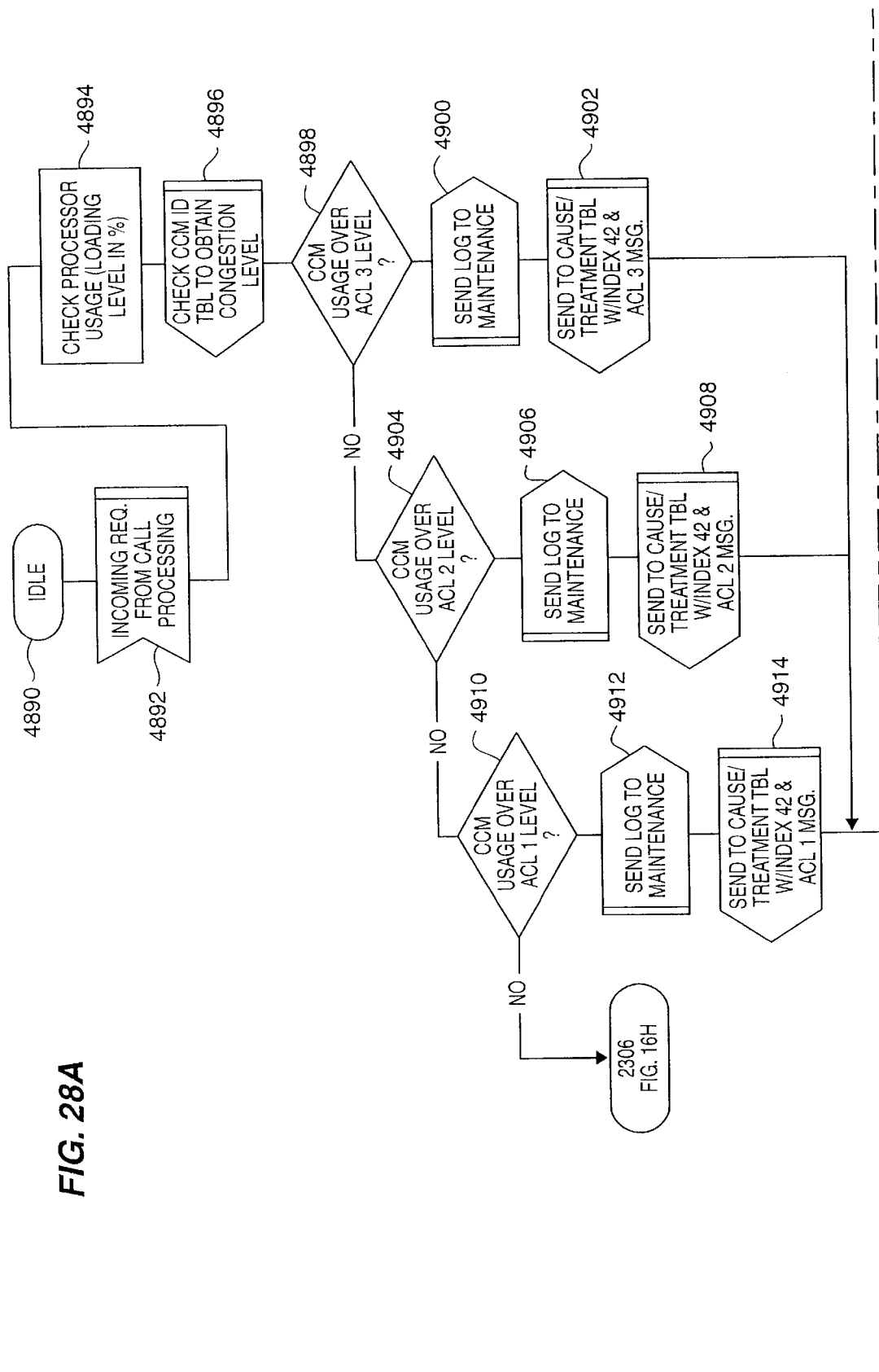
FIGS. 28A–28B is an SDL diagram of logic used in a version of the invention.
Figure 28B:
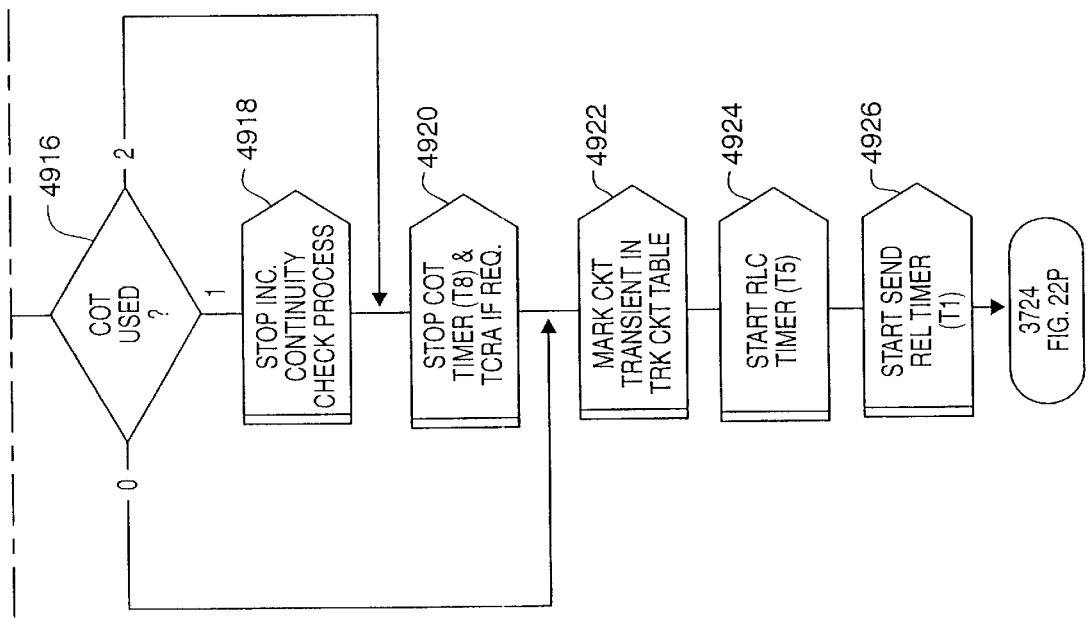

FIGS. 28A–28B depict the automatic congestion control process. The automatic congestion control process is idle at 4890 (FIG. 28A) and a message is received at 4892. At 4894, the CCM load is checked. At 4896, the CCM ID table is checked to obtain the CCM congestion level. At 4898, it is determined if the CCM load exceeds congestion level (ACL) 3. If so, maintenance is informed at 4900 and a REL with cause 42 is sent out at 4902. If not, it is determined if the CCM load exceeds congestion level 2 at 4904. If so, maintenance is informed at 4906 and an REL with cause 42 is sent out at 4908. If not, it is determined if the CCM load exceeds congestion level 1 at 4910. If so, maintenance is informed at 4912 and an REL with cause 42 is sent out at 4914. COT is checked at 4916 (FIG. 28B). If a 1 is present, the incoming continuity process is stopped at 4918 and the COT timer is stopped at 4920. If a 2 is present at 4916, the COT timer is stopped at 4920. After 4920 or if a 0 is present at 4916, the circuit is marked as transient at 4922. The RLC timer is started at 4924 and the send REL timer is started at 4926. The automatic congestion control process awaits an RLC at 3724. If CCM usage does not exceed congestion level 1 at 4910, the process proceeds to 2302.

Figure 29B:
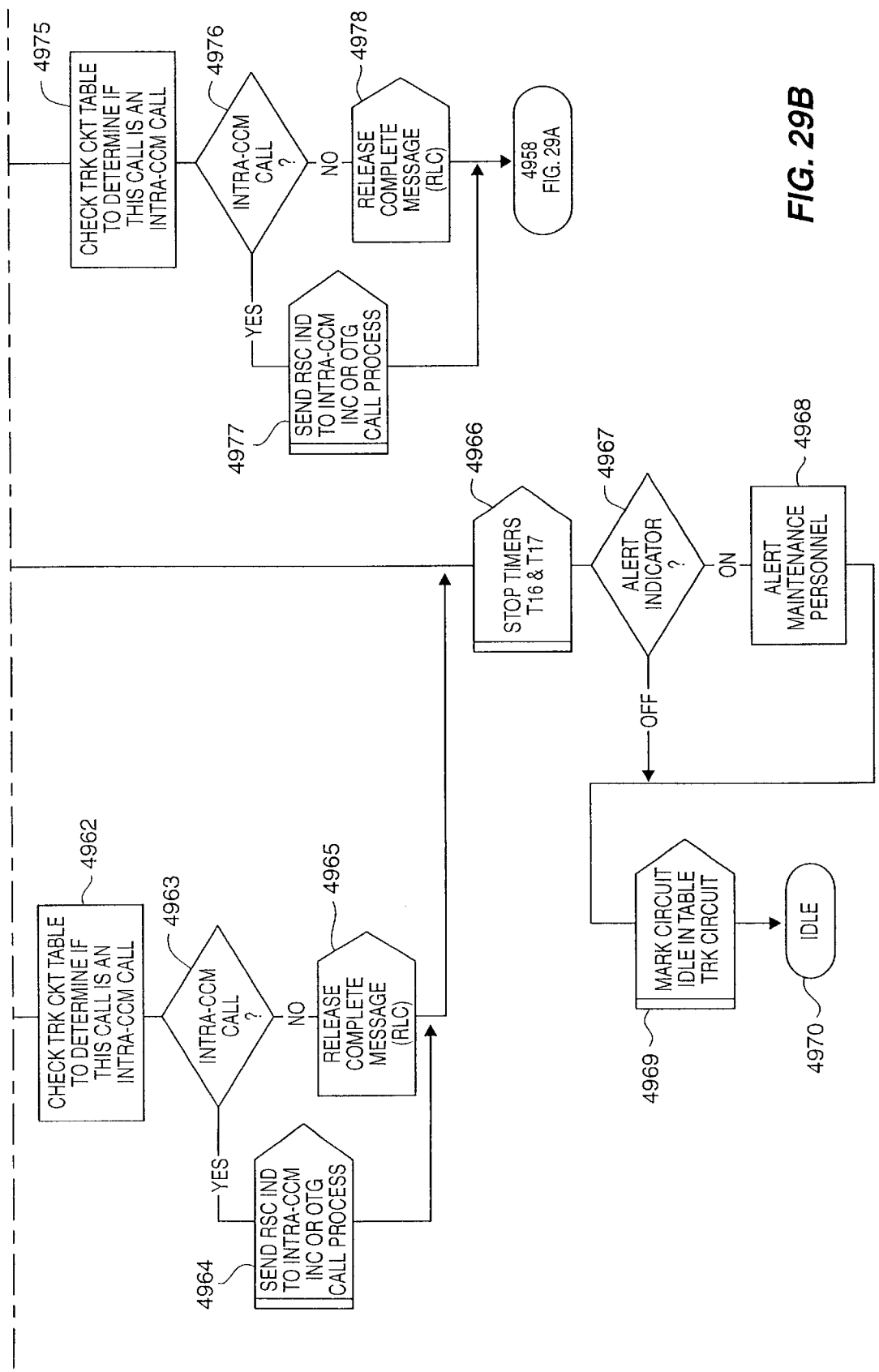
Figure 30A:
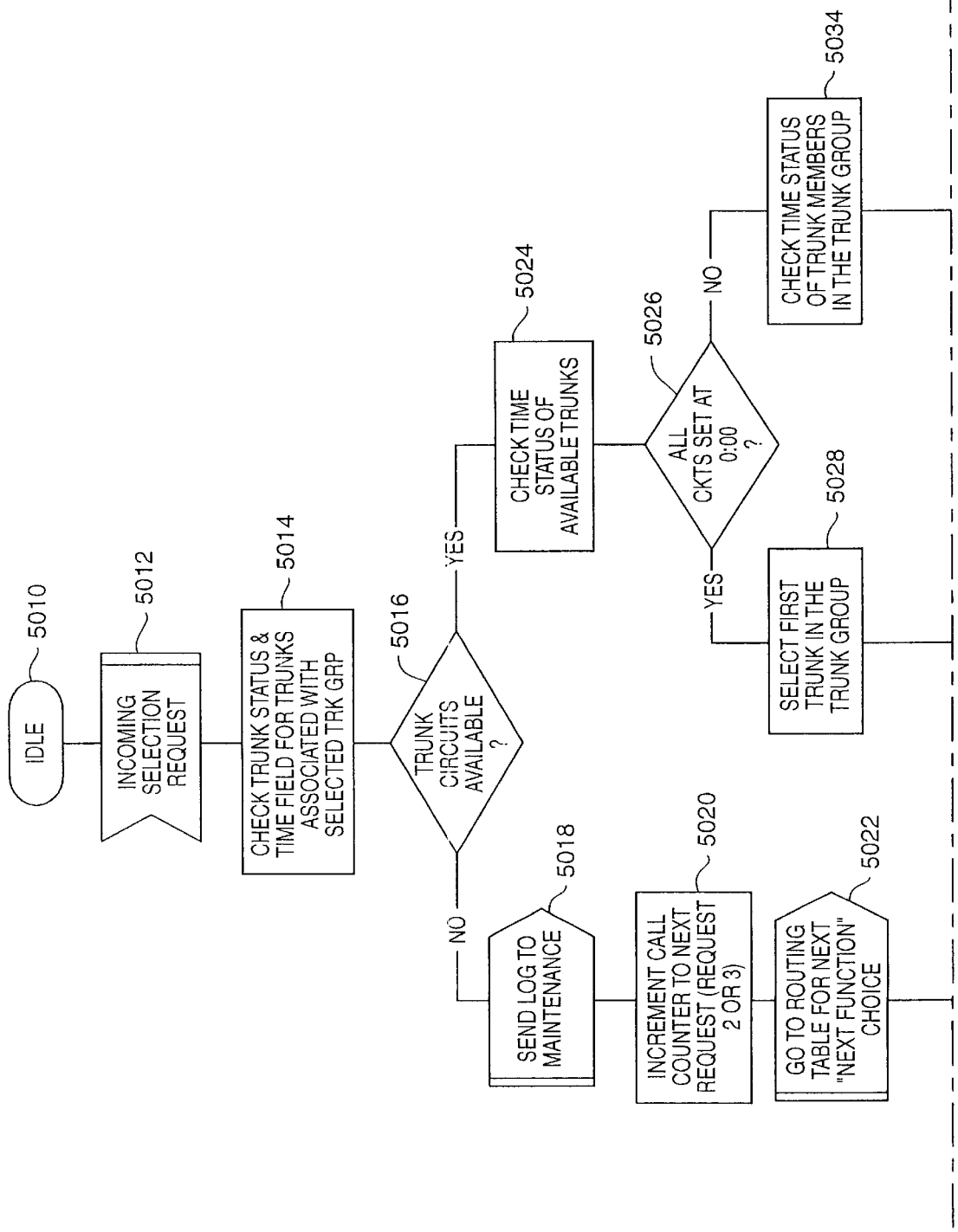
FIGS. 30A–30L are SDL diagrams of logic used in a version of the invention.
Figure 30B:
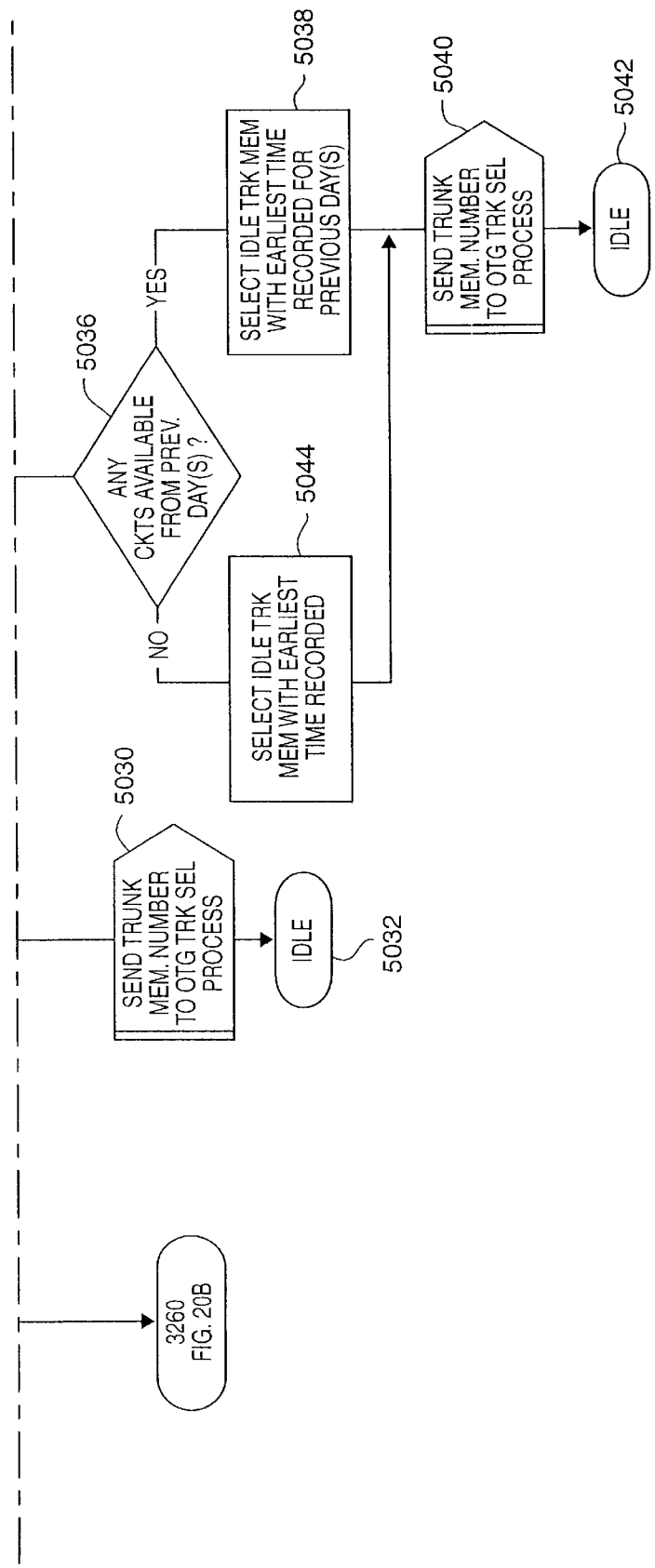
Figure 30C:
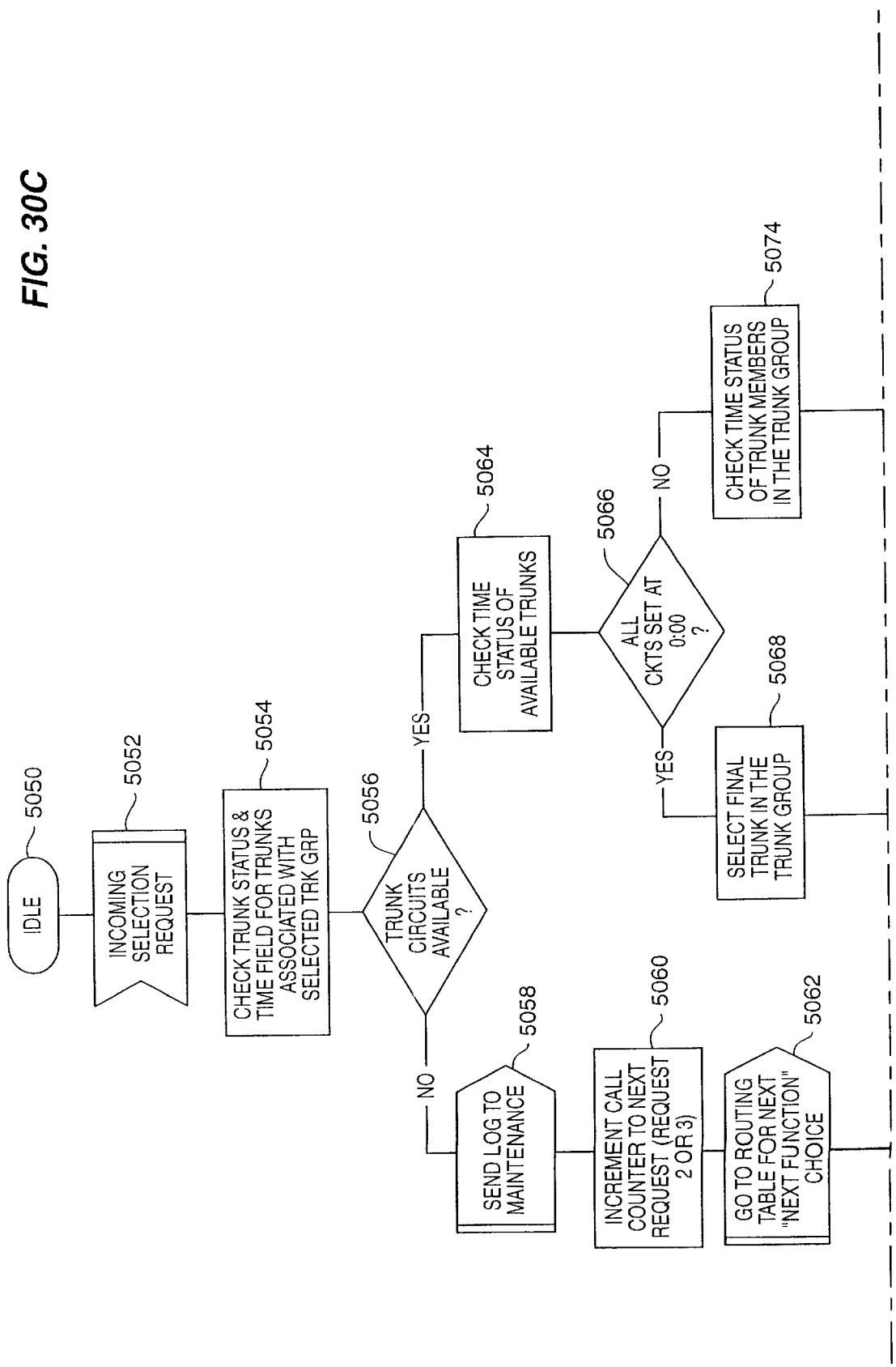
Figure 30D:
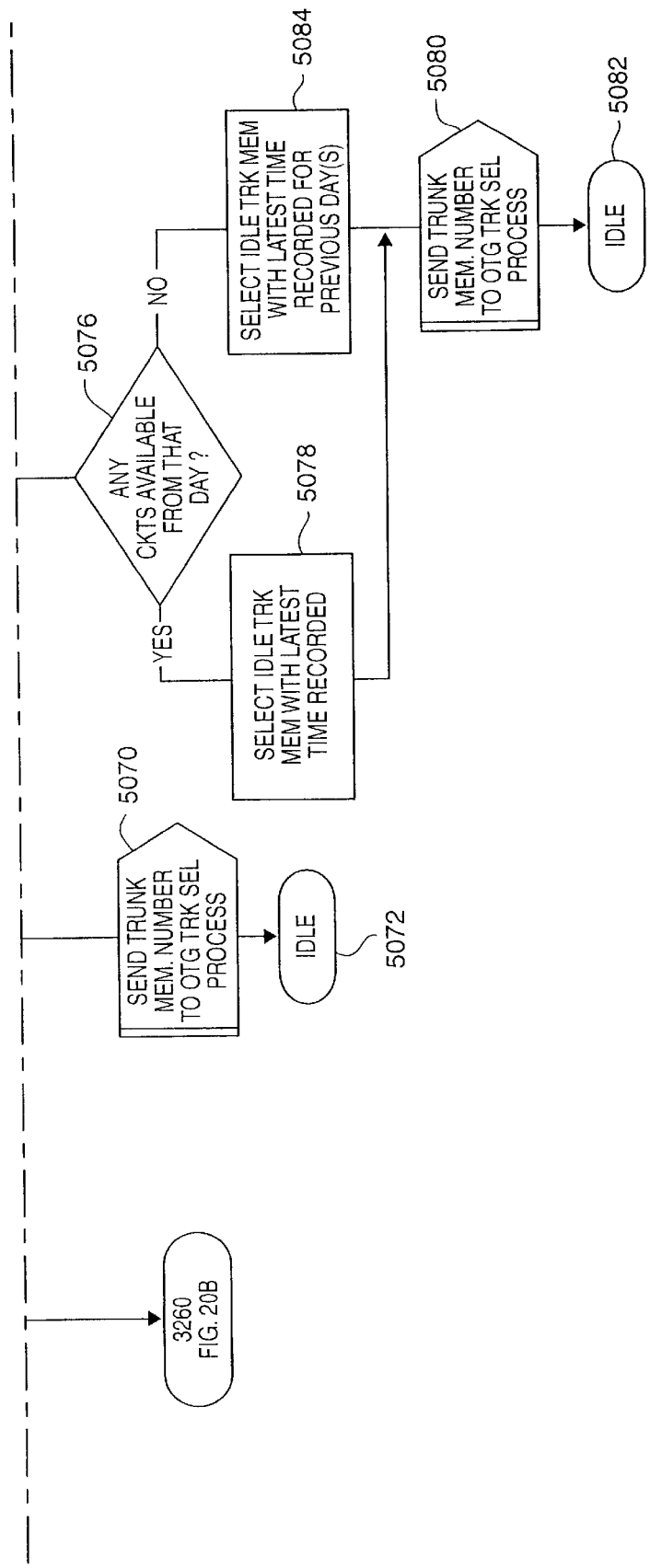
Figure 30E:
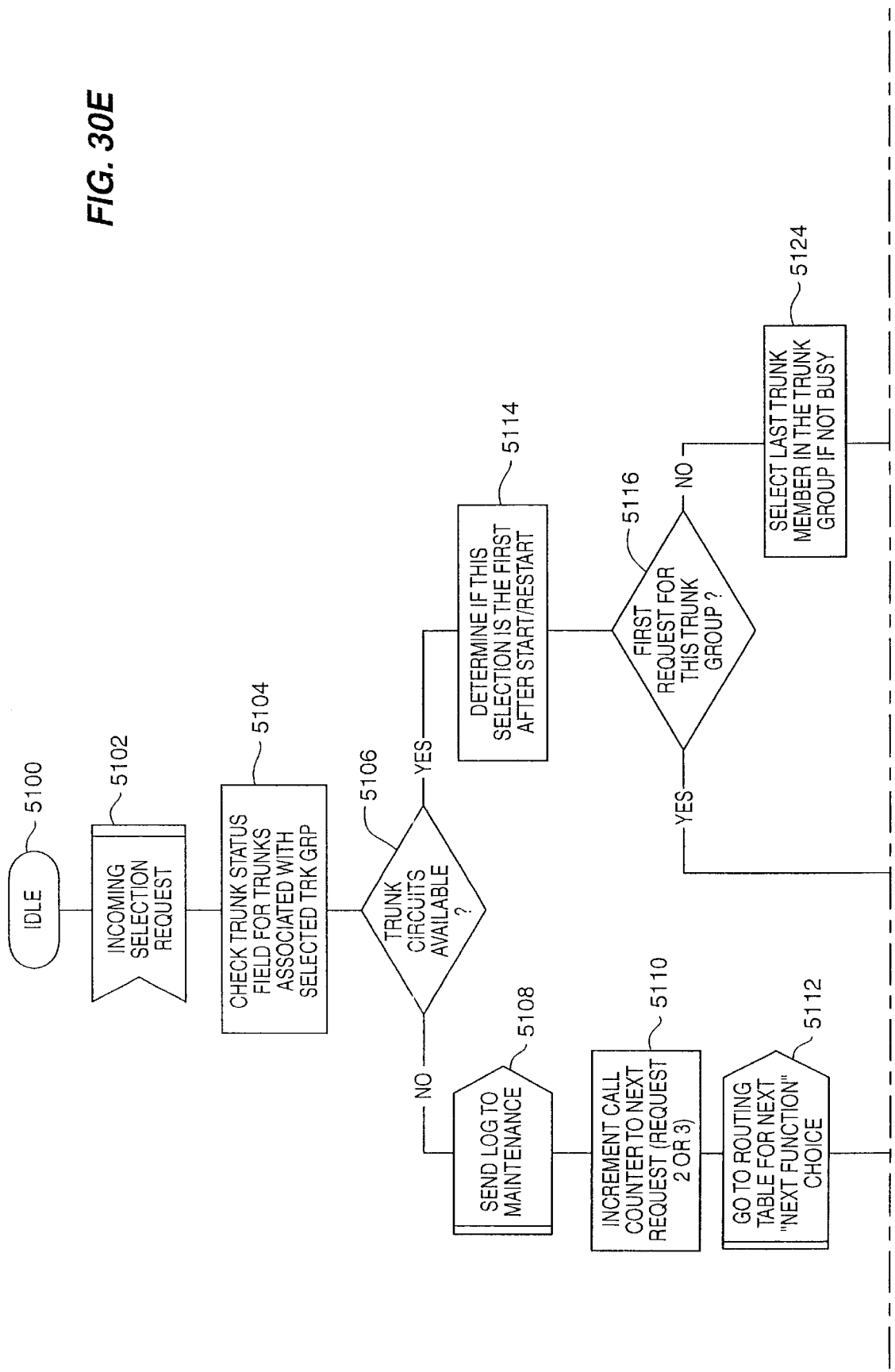
Figure 30F:
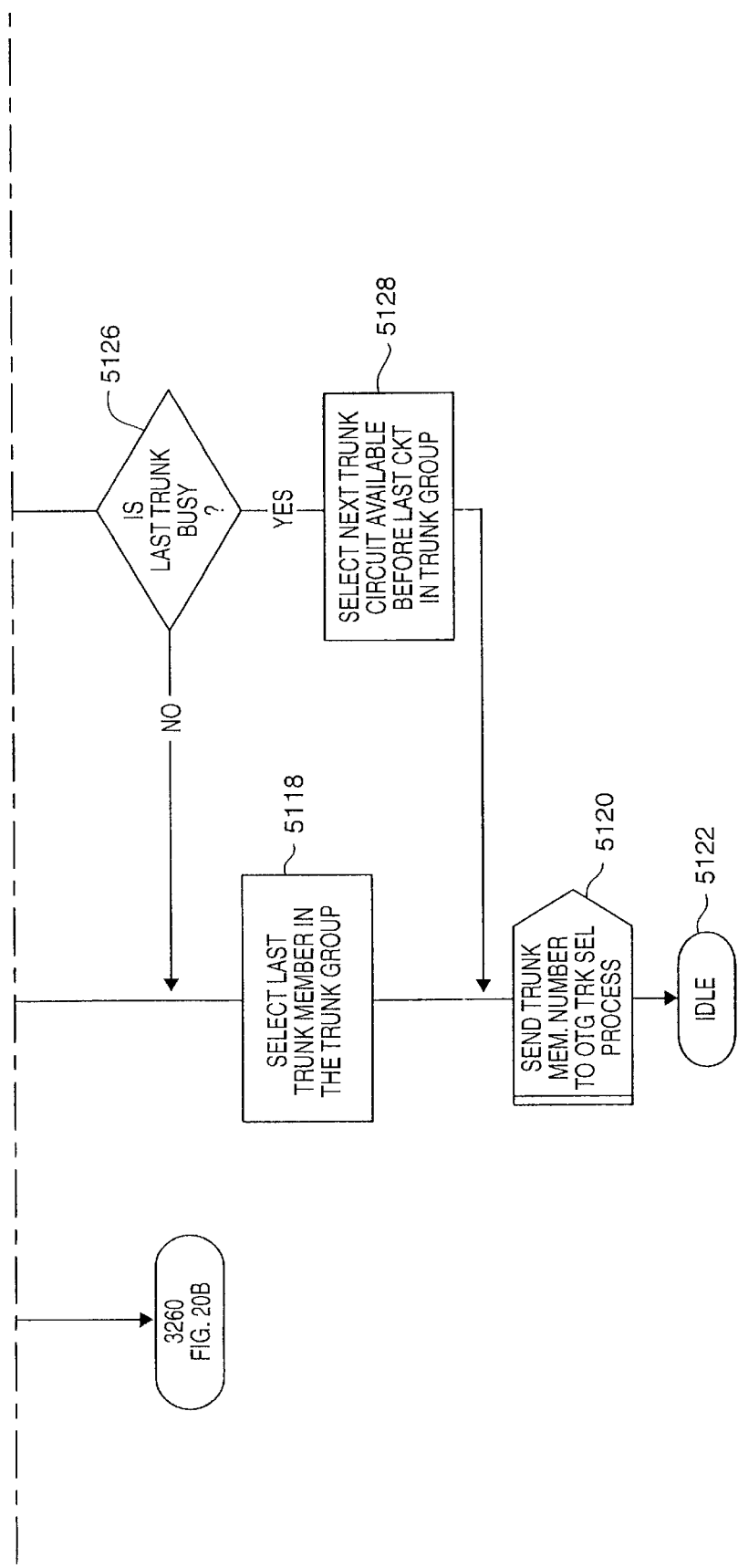
Figure 30G:
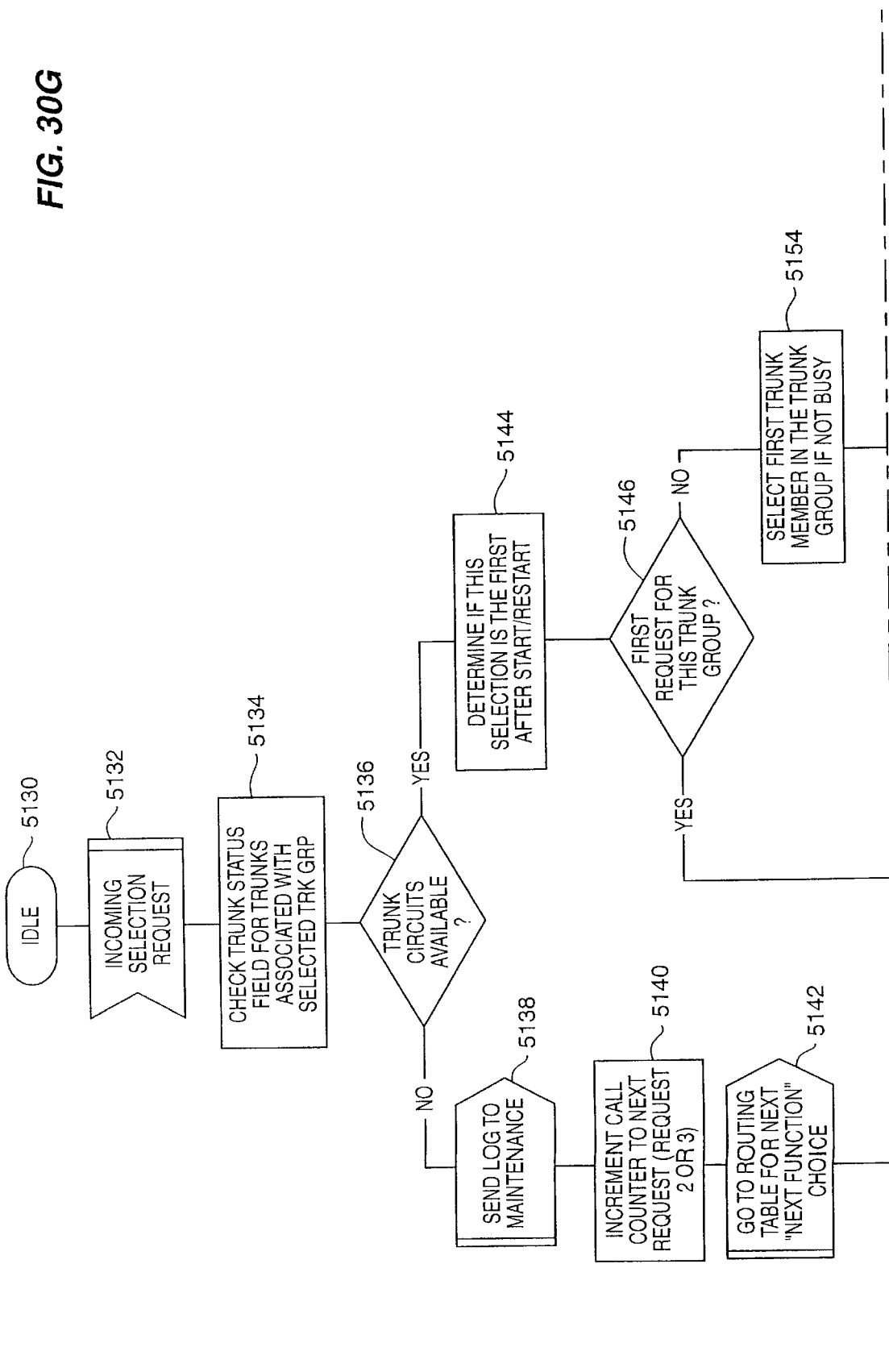
Figure 30H:
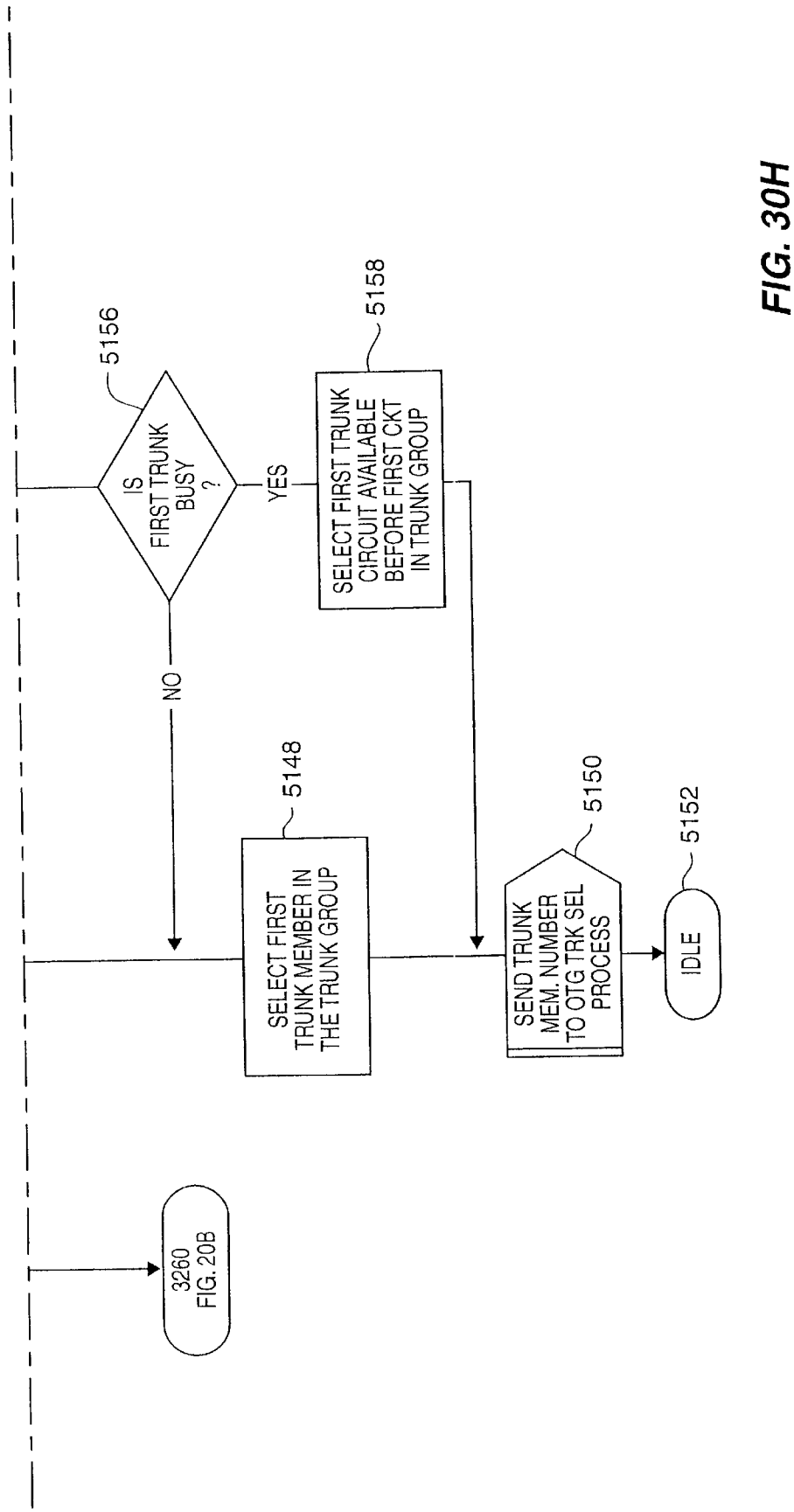
Figure 30:
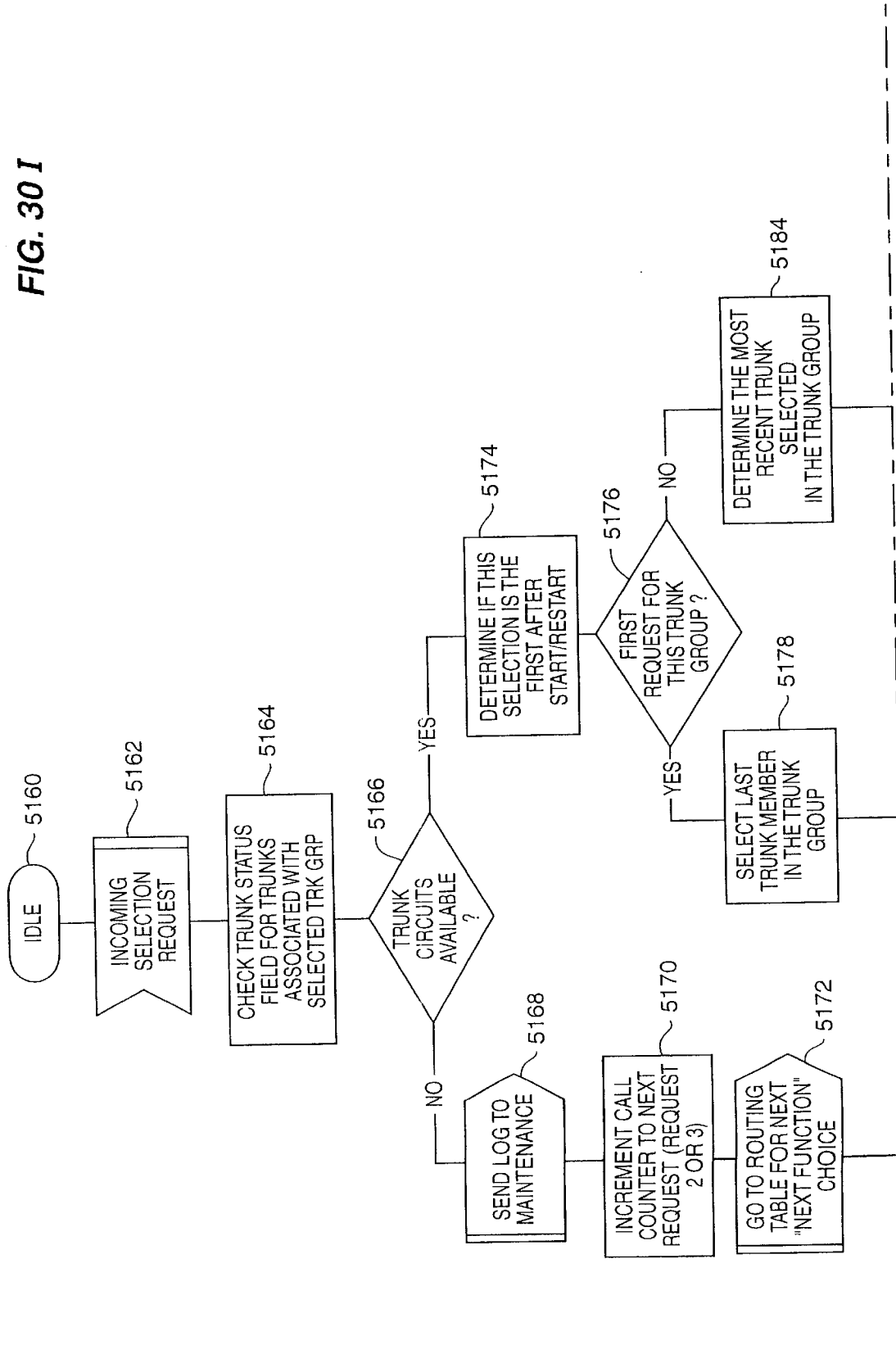
Figure 30J:
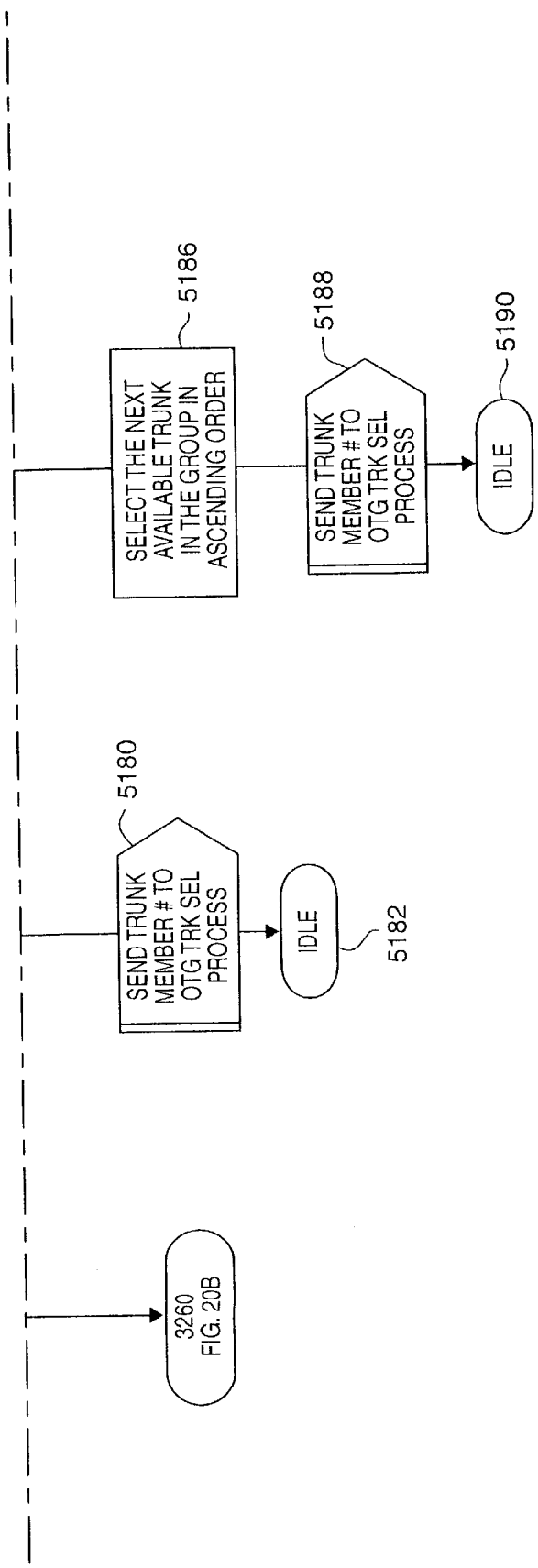
Figure 30K:
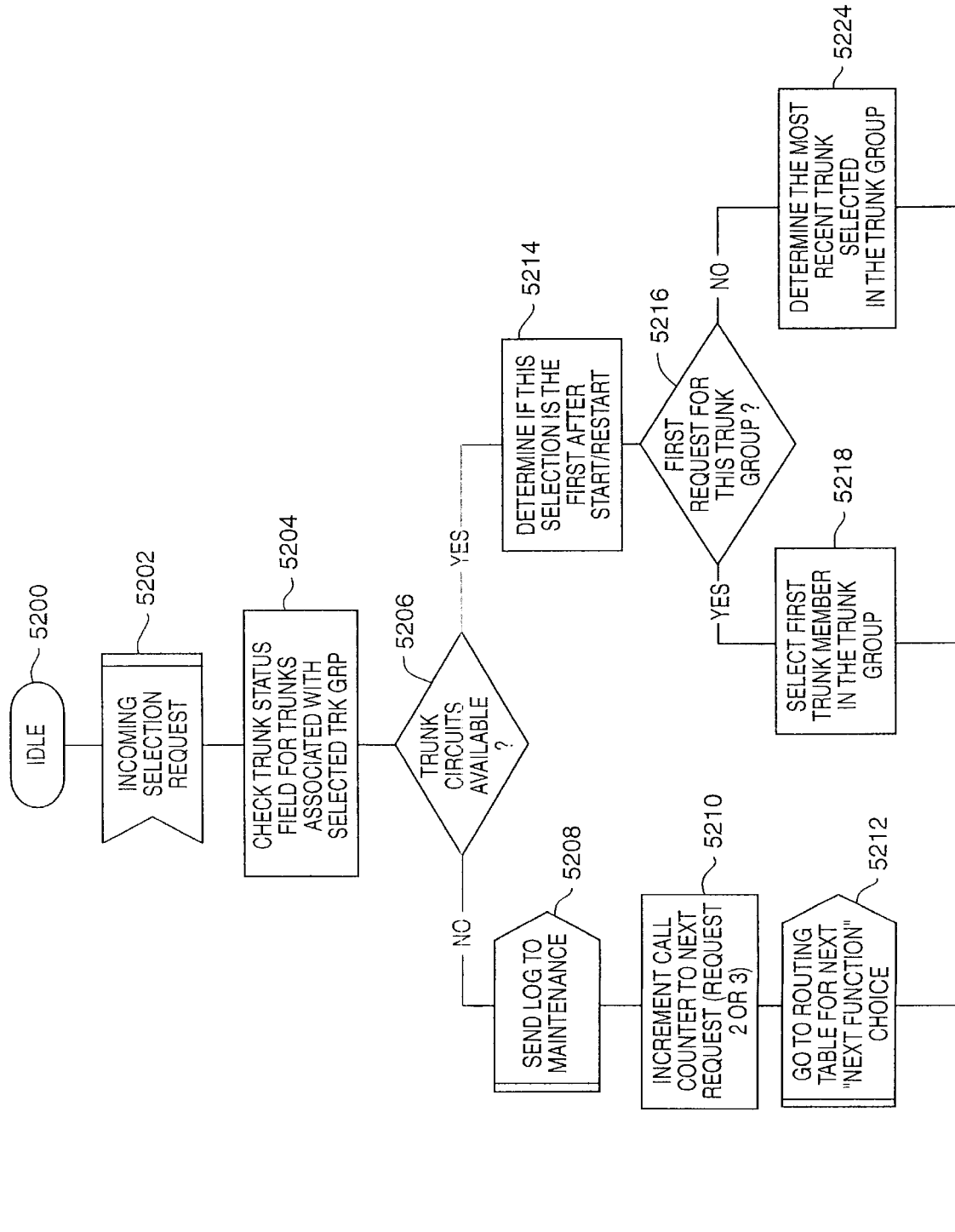
Figure 30L:
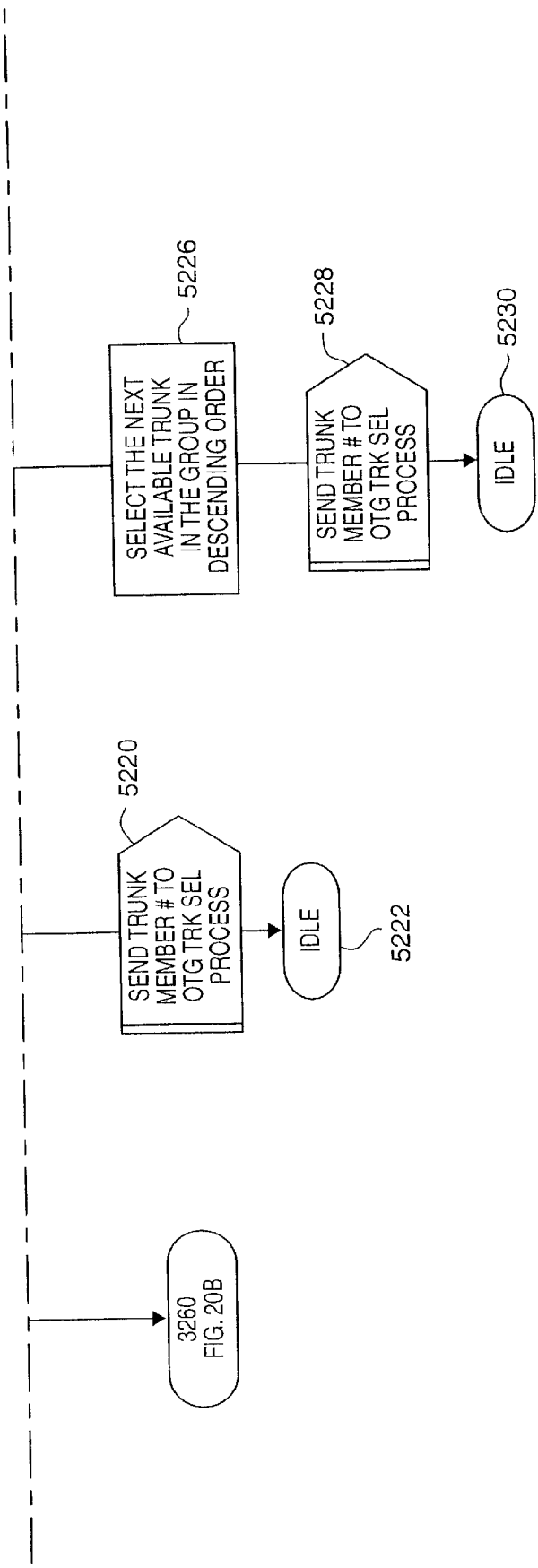
Figure 31A:
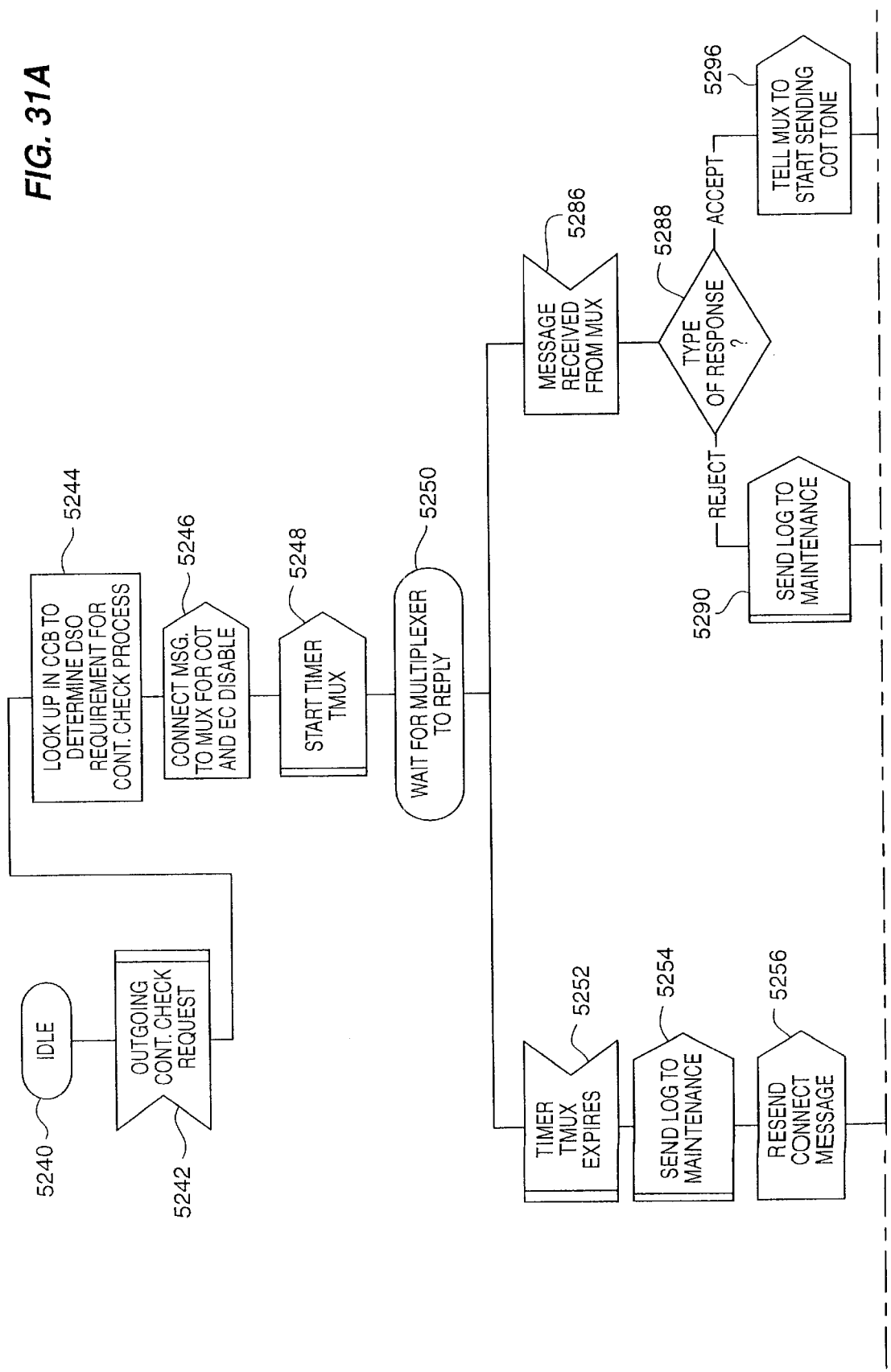
FIGS. 31A–31D are SDL diagrams of logic used in a version of the invention.
Figure 31B:
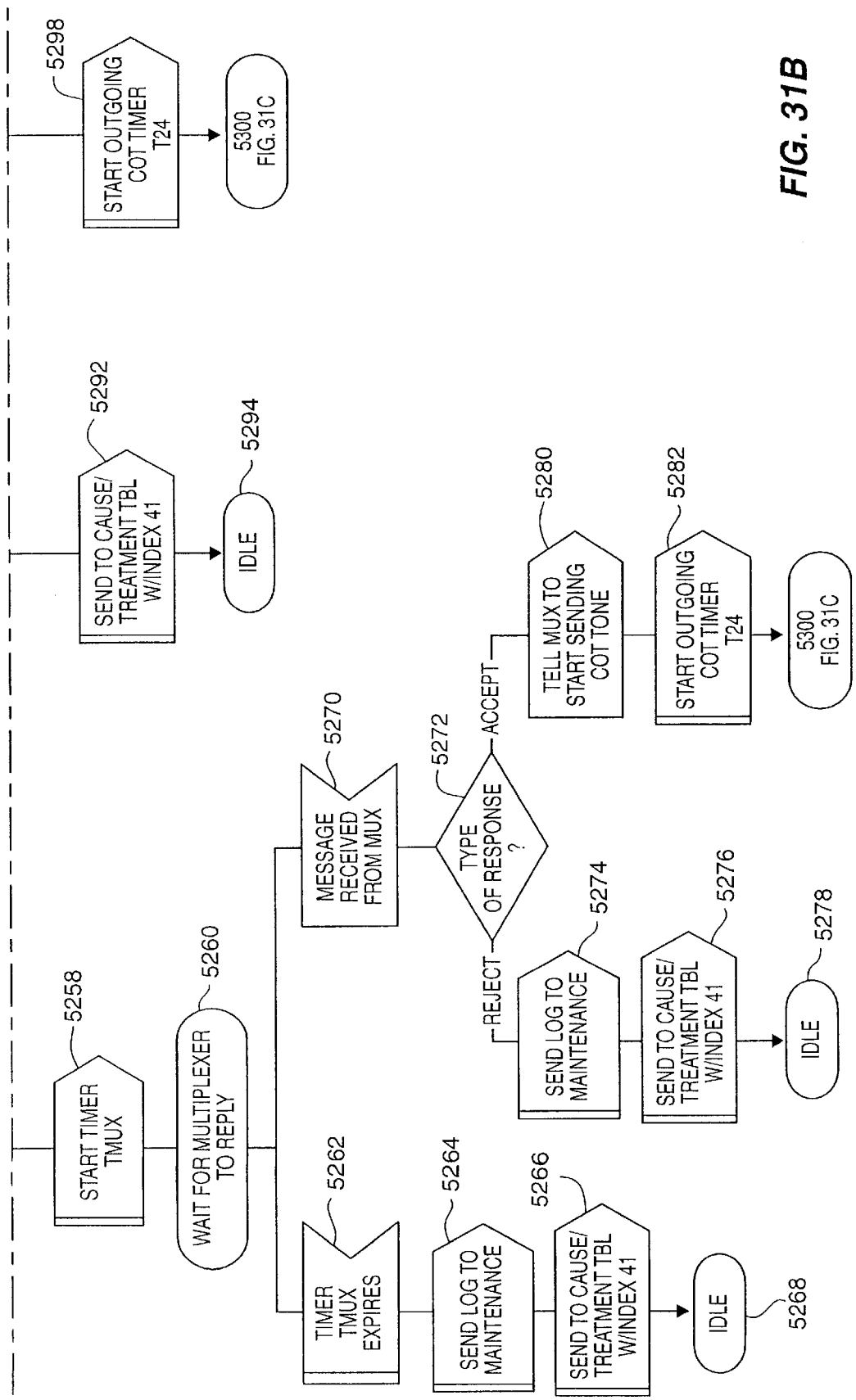
Figure 31C:
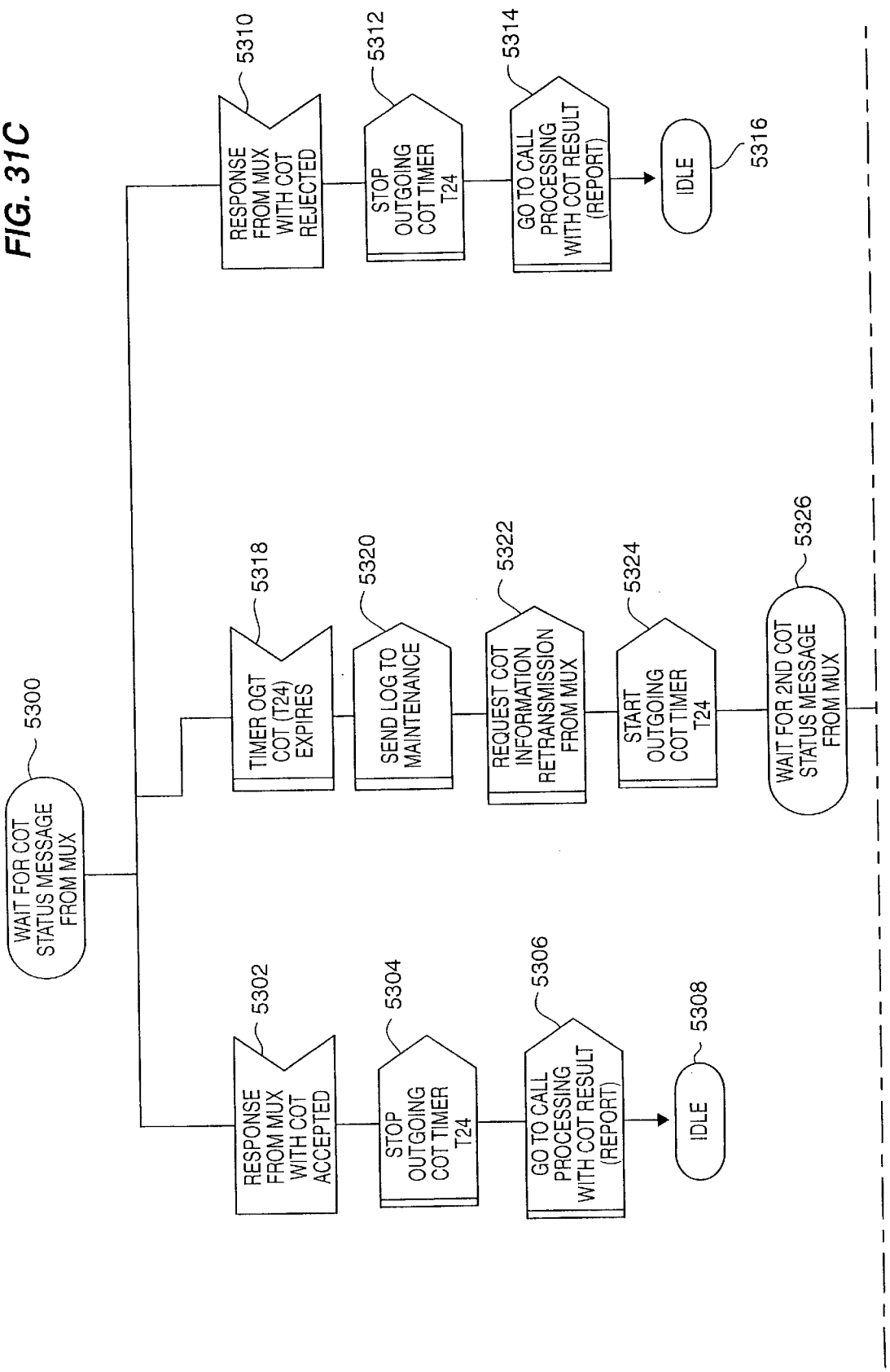
Figure 31D:
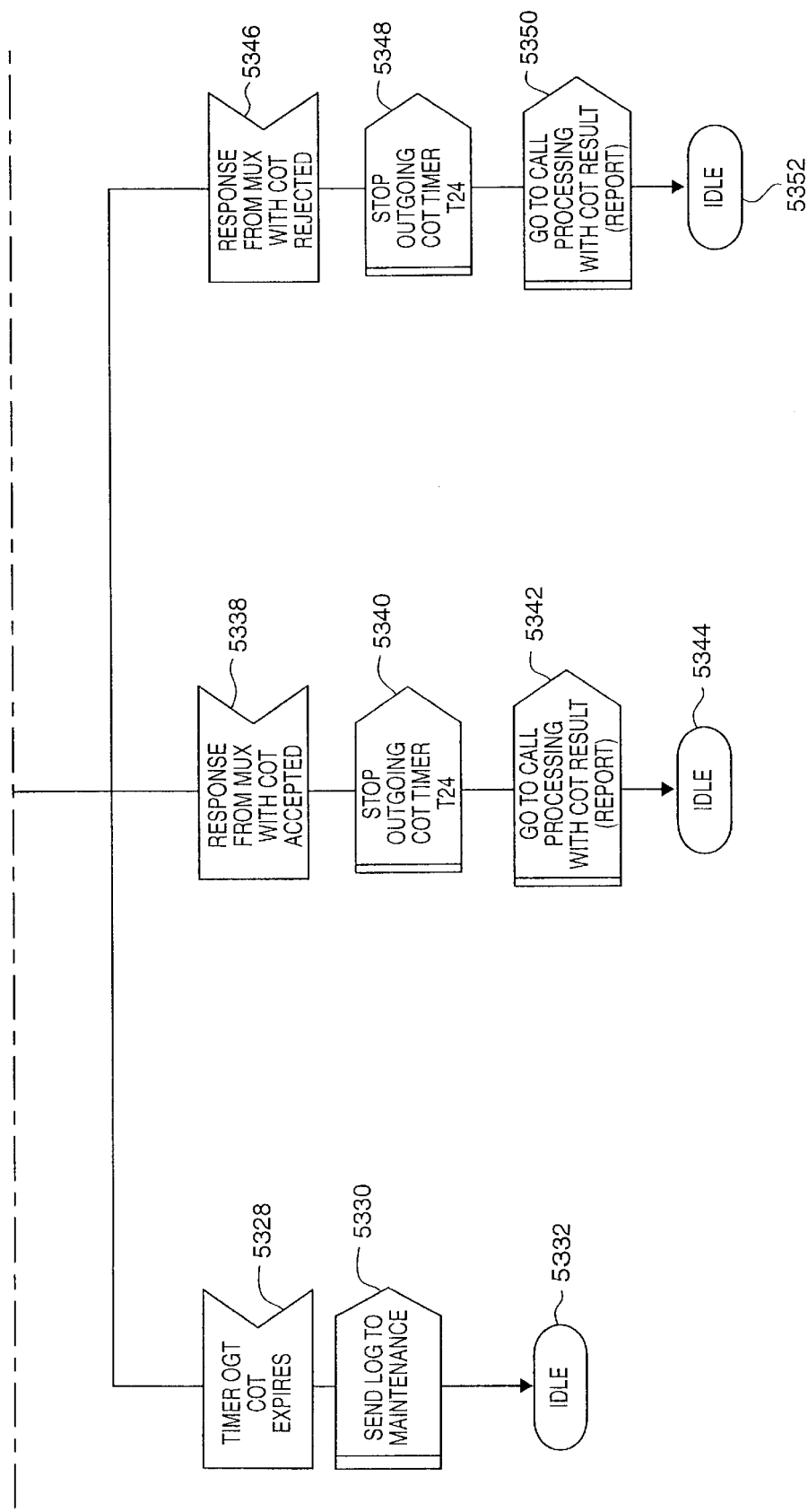

FIGS. 29A–29C depict the circuit reset sending process. On FIG. 29A at 4940, the circuit reset sending process is idle. If a message is received from the BCM, processing proceeds to 4948. At 4942, a message is received from the mux indicating loss of circuit status and at 4944, processing for the call is halted. At 4946, the mux is instructed to clear the circuit and reset. At 4948 the circuit is marked transient. It is determined if the call is intra-CCM at 4949 and 4950.

If the call is intra-CCM at 4950, an internal RSC is sent at 4951. If the call is not intra-CCM at 4950, an external RSC is sent at 4552. After 4951 or 4952, the T16 timer is started at 4953 and the T17 timer is started at 4956. The process awaits an RLC at 4958. If an internal RSC is received at 4960 or an external RSC is received at 4961, it is determined if the call is intra-CCM at 4962 and 4963 (FIG. 29B). If the call is intra-CCM at 4963, an internal RSC is sent at 4964. If the call is not intra-CCM at 4963, an external RSC is sent at 4965. After 4964 or 4965, timers T16 and T17 are stopped at 4966. At 4967, it is determined if the alert indicator is on or off. If it is on, maintenance is informed at 4968. After 4968 or if the alert indicator is off at 4967, the circuit is marked idle at 4969 and idle is attained at 4970. If an internal RLC is received at 4971 or an external RLC is received at 4972, processing proceeds to 4966. If an internal REL is received at 4973 or an external REL is received at 4974, it is determined if the call is intra-CCM at 4975 and 4976. If the call is intra-CCM at 4976, an internal RLC is sent at 4977. If the call is not intra-CCM at 4976, an external RLC is sent at 4978. After 4977 or 4978, processing proceeds to 4958.

If the T16 timer expires at 4979 (FIG. 29C), it is determined if the call is intra-CCM at 4980 and 4981. If the call is intra-CCM at 4981, an internal RSC is sent at 4982. If the call is not intra-CCM at 4981, an external RSC is sent at 4983. After 4982 or 4983, the T16 timer is started at 4984. The process then returns to 4958. If the T17 timer expires at 4985, timer T16 is stopped at 4986. At 4987, it is determined if the alert indicator is on or off. If it is on, the alert indicator is set at 4988 and maintenance is informed at 4989. After 4989 or if the alert indicator is off at 4987, it is determined if the call is intra-CCM at 4990 and 4991. If the call is intra-CCM at 4991, an internal RSC is sent at 4992. If the call is not intra-CCM at 4991, an external RSC is sent at 4993. After 4992 or 4993, the T17 timer is started at 4994. The process then returns to 4958.

FIGS. 30A–30L depict the trunk selection processes. On FIGS. 30A–30B at 5010, the "most idle" trunk selection process which selects the trunk that has been idle the longest is idle. At 5012, a message is received requesting circuit selection. At 5014, the status and time fields are checked for the circuits in the trunk group. If no circuits are available at 5016, maintenance is informed at 5018, and the call counter is incremented at 5020. At 5022, the next routing choice is used and the process proceeds to 3260. If trunk circuits are available at 5016, times are checked for the idle circuits in the group at 5024. If all circuits are set at 0:00 at 5026, the first trunk in the group is selected at 5028 and the selected circuit is provided to the terminating process at 5030. Idle is attained at 5032. If all circuits are not 0:00 at 5026, time status is checked at 5034. If any circuits are available from the previous day at 5036, the circuit with the earliest time on the previous day is selected at 5038. The selected circuit is provided to the terminating process at 5040 and idle is attained at 5042. If no circuits are available from the previous day at 5036, the circuit with the earliest time on that day is selected at 5044 and the process proceeds to 5040.

At 5050 (FIGS. 30C–30D), the "least idle" trunk selection process which selects the trunk that has been idle the shortest is idle. At 5052, a message is received requesting circuit selection. At 5054, the status and time fields are checked for the circuits in the trunk group. If no circuits are available at 5056, maintenance is informed at 5058, and the call counter is incremented at 5060. At 5062, the next routing choice is used and the process proceeds to 3260. If trunk circuits are available at 5056, times are checked for the idle circuits in the group at 5064. If all circuits are set at 0:00 at 5066, the last trunk in the group is selected at 5068 and the selected circuit is provided to the terminating process at 5070. Idle is attained at 5072. If all circuits are not 0:00 at 5066, time status is checked at 5074. If any circuits are available from the that day at 5076, the circuit with the latest time on the that day is selected at 5078. The selected circuit is provided to the terminating process at 5080 and idle is attained at 5082. If no circuits are available from the that day at 5076, the circuit with the latest time on the previous day is selected at 5084 and the process proceeds to 5080.

At 5100 (FIGS. 30E–30F), the "descending" trunk selection process which selects the lowest numbered idle trunk is idle. At 5102, a message is received requesting circuit selection. At 5104, the status fields are checked for the idle circuits in the trunk group. If no circuits are available at 5106, maintenance is informed at 5108, and the call counter is incremented at 5110. At 5112, the next routing choice is used and the process proceeds to 3260. If trunk circuits are available at 5106, it is determined if this is the first request for the trunk group at 5114 and 5116. If it is the first request at 5116, the last trunk in the group is selected at 5118 and the selected circuit is provided to the terminating process at 5120. Idle is attained at 5122. If this is not the first request at 5116, the last trunk in the group is selected at 5124. If the selected trunk is not busy at 5126, the process goes to 5118. If the selected circuit is busy at 5126, the next trunk available before the last trunk is selected at 5128 and the process proceeds to 5120.

At 5130 (FIGS. 30G–30H), the "ascending" trunk selection process which selects the highest numbered idle trunk is idle. At 5132, a message is received requesting circuit selection. At 5134, the status fields are checked for the idle circuits in the trunk group. If no circuits are available at 5136, maintenance is informed at 5138, and the call counter is incremented at 5140. At 5142, the next routing choice is used and the process proceeds to 3260. If trunk circuits are available at 5136, it is determined if this is the first request for the trunk group at 5144 and 5146. If it is the first request at 5146, the first trunk in the group is selected at 5148 and the selected circuit is provided to the terminating process at 5150. Idle is attained at 5152. If this is not the first request at 5146, the first trunk in the group is selected at 5154. If the selected trunk is not busy at 5156, the process goes to 5148. If the selected circuit is busy at 5156, the next trunk available after the first trunk is selected at 5158 and the process proceeds to 5150.

At 5160 (FIGS. 30I–30J), the "counter-clockwise" trunk selection process which selects trunks sequentially from high to low is idle. At 5162, a message is received requesting circuit selection. At 5164, the status fields are checked for the idle circuits in the trunk group. If no circuits are available at 5166, maintenance is informed at 5168, and the call counter is incremented at 5170. At 5172, the next routing choice is used and the process proceeds to 3260. If trunk circuits are available at 5166, it is determined if this is the first request for the trunk group at 5174 and 5176. If it is the first request at 5176, the last trunk in the group is selected at 5178 and the selected circuit is provided to the terminating process at 5180. Idle is attained at 5182. If this is not the first request at 5146, the most recent trunk selected from the group is determined at 5184. The next available trunk in descending order is selected at 5186. The selected circuit is provided to the terminating process at 5188. Idle is attained at 5190.

At 5200 (FIGS. 30K–30L), the "clockwise" trunk selection process which selects trunks sequentially from low to high is idle. At 5202, a message is received requesting circuit selection. At 5204, the status fields are checked for the idle circuits in the trunk group. If no circuits are available at 5206, maintenance is informed at 5208, and the call counter is incremented at 5210. At 5212, the next routing choice is used and the process proceeds to 3260. If trunk circuits are available at 5206, it is determined if this is the first request for the trunk group at 5214 and 5216. If it is the first request at 5216, the first trunk in the group is selected at 5218 and the selected circuit is provided to the terminating process at 5220. Idle is attained at 5222. If this is not the first request at 5216, the most recent trunk selected from the group is determined at 5224. The next available trunk in ascending order is selected at 5226. The selected circuit is provided to the terminating process at 5228. Idle is attained at 5230.

FIGS. 31A–31D depict the outgoing continuity check process. On FIG. 31A, the outgoing continuity check process is idle at 5240. At 5242, an outgoing continuity check message is received. At 5244, the CCB is consulted to determine the DS0 on the call. At 5246, the mux is instructed to set-up the continuity test and disable the associated echo canceller. At 5248, the mux timer is started and a reply is awaited at 5250. If mux timer expires at 5252, maintenance is informed at 5254 and the mux message is resent at 5256. At 5258 (FIG. 31B), the mux timer is restarted and a reply is awaited at 5260. If mux timer expires at 5262, maintenance is informed at 5264, a message is sent to the treatment table with index 41 at 5266 and idle is attained at 5268. If a message is received from the mux at 5270, the type of message is determined at 5272. If it is a reject message, maintenance is informed at 5274, a message is sent to the treatment table with index 41 at 5276 and idle is attained at 5278. If the message at 5272 is an accept message, the continuity tone is applied at 5280, the COT timer is started at 5282, and the process proceeds to 5300. If a message is received from the mux at 5286, the type of message is determined at 5288. If it is a reject message, maintenance is informed at 5290, a message is sent to the treatment table with index 41 at 5292 and idle is attained at 5294. If the message at 5288 is an accept message, the continuity tone is applied at 5296, the COT timer is started at 5298, and the process proceeds to 5300.

At 5300 (FIG. 31C), the process awaits a status message from the mux. If an acceptance message (indicating that the test is complete, the tone has been removed, and the echo canceller enabled) is received at 5302, the COT timer is stopped at 5304. A message indicating acceptance is sent to the BCM at 5306 and idle is attained at 5308. If a reject message (indicating that the test is complete, the tone has been removed, and the echo canceller enabled) is received at 5310, the COT timer is stopped at 5312. A message indicating rejection is sent to the BCM at 5314 and idle is attained at 5316. If the COT timer expires at 5318, maintenance is informed at 5320 and a COT information retransmission is requested from the mux at 5322. The COT timer is started at 5324 and a message from the mux is awaited at 5326. If timer COT expires at 5328 (FIG. 31D), maintenance is informed at 5330, and idle is attained at 5332. If an acceptance message (indicating that the test is complete, the tone has been removed, and the echo canceller enabled) is received at 5338, the COT timer is stopped at 5340. A message indicating acceptance is sent to the BCM at 5342 and idle is attained at 5344. If a rejection message (indicating that the test is complete, the tone has been removed, and the echo canceller enabled) is received at 5346, the COT timer is stopped at 5348. A message indicating rejection is sent to the BCM at 5350 and idle is attained at 5352.

Figure 32A:
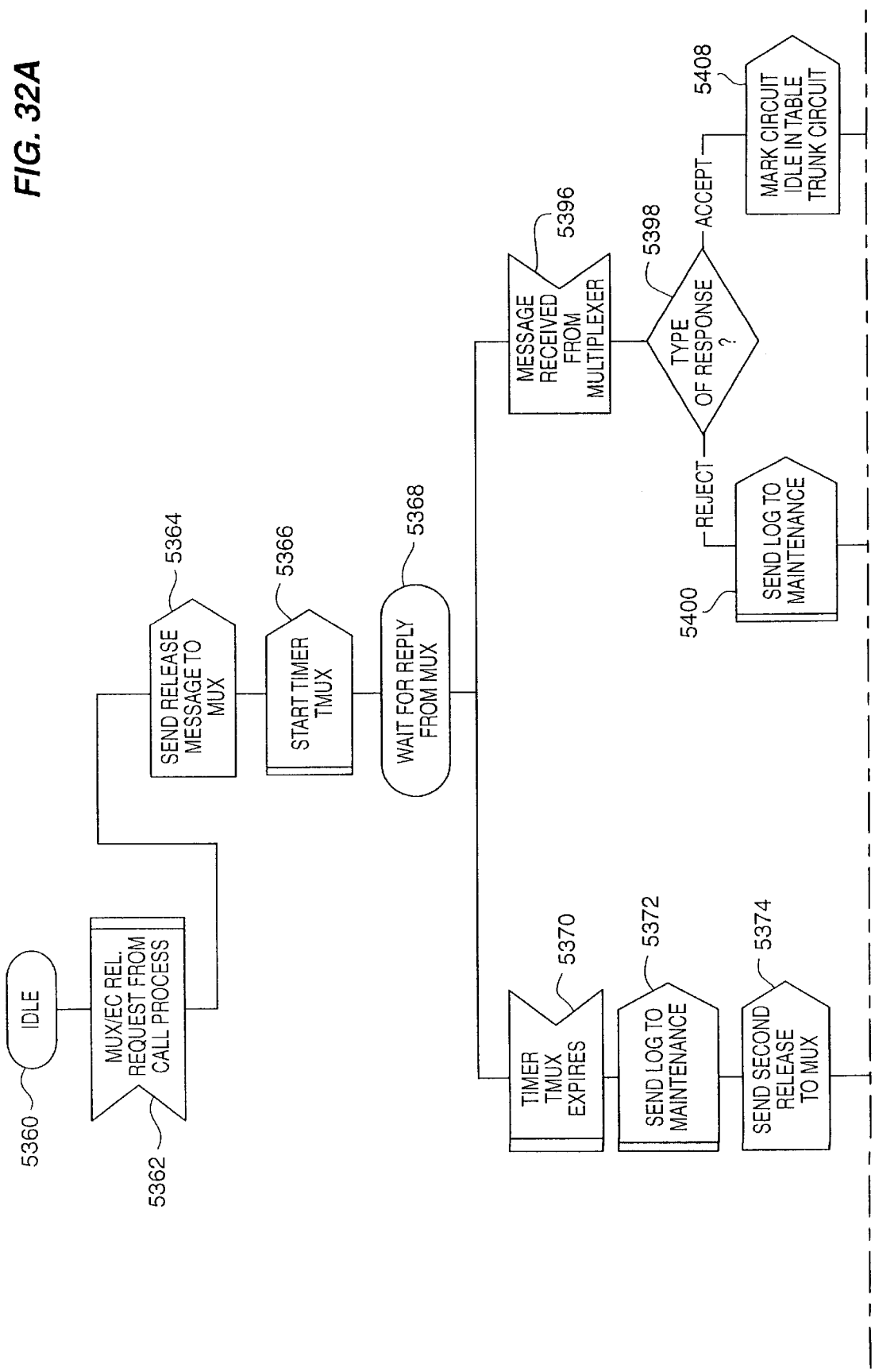
FIGS. 32A–32B are SDL diagrams of logic used in a version of the invention.
Figure 32B:
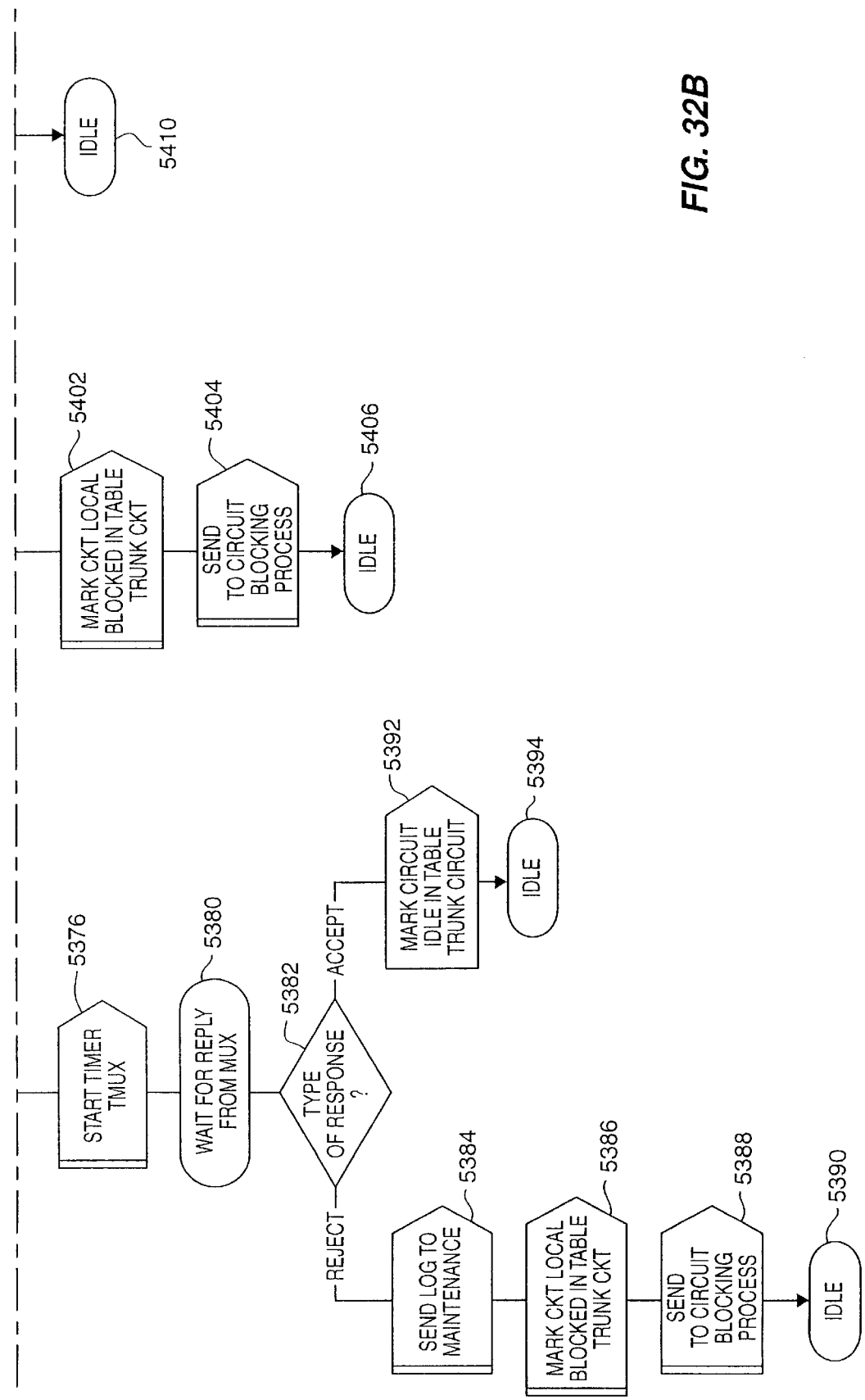

FIGS. 32A–32B depict+the mux/echo release process. The mux/echo release process is idle at 5360 (FIG. 32A). A message to release is received at 5362 and a message is sent to the mux at 5364. The mux timer is started at 5366 and a reply is awaited at 5368. If mux timer expires at 5370, maintenance is informed at 5372 and the mux message is resent at 5374. At 5376 (FIG. 32B), the mux timer is restarted and a reply is awaited at 5380. Mux response is determined at 5382. If the mux reply is a rejection, maintenance is informed at 5384. The circuit is marked as blocked in the trunk circuit table at 5386 and a message is sent to the blocking process at 5388. Idle is attained at 5390. If the message is an accept at 5382, the circuit is marked idle at 5392 and idle is attained at 5394. If a message is received from the mux at 5396, mux response is determined at 5398. If the mux reply is a rejection, maintenance is informed at 5400. The circuit is marked as blocked in the trunk circuit table at 5402 and a message is sent to the blocking process at 5404. Idle is attained at 5406. If the message is an accept at 5398, the circuit is marked idle at 5408 and idle is attained at 5410.

Those skilled in the art will appreciate variations in the above disclosure that do not depart from the scope of the invention. As such, the invention should be measured by the scope and meaning of the following claims.

We claim:

1. A product having software for identifying a communications connection when the software is executed by a computer system, the product comprising:

a connection data structure operational to store connection data;

an exception data structure operational to store exception data, wherein the connection data structure points to the exception data structure;

a caller number data structure operational to store caller number data, wherein the exception data structure points to the caller number data structure;

a called number data structure operational to store called number data, wherein the exception data structure and the caller number data structure point to the called number data structure;

a routing data structure operational to store routing data, wherein the exception data structure, the caller number data structure, and the called number data structure point to the routing data structure, and wherein the exception data structure, the caller number data structure, the called number data structure, and the routing data structure point to the connection data structure;

application software operational to progress through at least some of the data structures to identify the communications connection; and a computer storage medium operational to store the data structures and application software.

2. The product of claim 1 wherein the application software is operational to progress from the connection data structure to the exception data structure, from the exception data structure to the caller number data structure, from the caller number data structure to the called number data structure, from the called number data structure to the routing data structure, and from the routing data structure back to the connection data structure to identify the communications connection.

3. The product of claim 1 wherein the application software is operational to progress from the exception data structure back to the connection data structure to identify the communications connection.

4. The product of claim 1 wherein the application software is operational to progress from the caller number data structure back to the connection data structure to identify the communications connection.

5. The product of claim 1 wherein the application software is operational to progress from the called number data structure back to the connection data structure to identify the communications connection.

6. The product of claim 1 wherein the connection data structure includes trunk circuit information related to an originating trunk circuit and the communications connection and includes trunk group information related to an originating trunk group and the communications connection.

7. The product of claim 6 wherein trunk circuit information related to an originating trunk circuit in the connection data structure is entered using an originating point code.

8. The product of claim 1 wherein the connection data structure includes DS0 circuit identification codes.

9. The product of claim 1 wherein the connection data structure includes ATM virtual path identification and ATM virtual channel identification.

10. The product of claim 1 wherein the connection data structure includes group member codes.

11. The product of claim 1 wherein the connection data structure identifies originating circuit hardware.

12. The product of claim 1 wherein the connection data structure identifies an originating circuit echo canceller.

13. The product of claim 1 wherein the connection data structure includes echo control information from an echo suppressor indicator, echo control device indicator, and information transfer capability in a signaling message.

14. The product of claim 1 wherein the connection data structure includes a satellite indicator.

15. The product of claim 1 wherein the connection data structure includes a connection status.

16. The product of claim 1 wherein the connection data structure includes glare resolution information.

17. The product of claim 1 wherein the connection data structure includes continuity test information.

18. The product of claim 1 wherein the connection data structure includes a hop counter.

19. The product of claim 1 wherein the exception data structure includes a carrier selection identification.

20. The product of claim 1 wherein the exception data structure includes a called party number nature of address.

21. The product of claim 1 wherein the caller number data structure includes a calling party category.

22. The product of claim 1 wherein the caller number data structure includes a charge number nature of address.

23. The product of claim 1 wherein the caller number data structure includes originating line information.

24. The product of claim 1 wherein the routing number data structure includes transit network selection network identification information.

25. The product of claim 1 wherein the application software is operational to process a Signaling System #7 message to identify the communications connection.

26. The product of claim 1 wherein the application software is operational to process a Signaling System #7 Initial Address Message to identify the communications connection.

27. The product of claim 1 wherein the application software is operational to process a Signaling System #7 Address Complete Message.

28. The product of claim 1 wherein the application software is operational to process a Signaling System #7 Answer Message.

29. The product of claim 1 wherein the application software is operational to process a Signaling System #7 Release Message.

30. The product of claim 1 wherein the application software is operational to process a Signaling System #7 Release Complete Message.

31. The product of claim 1 wherein the application software is operational to process a Signaling System #7 Continuity Message.

32. The product of claim 1 wherein the application software is operational to generate a Signaling System #7 Initial Address Message that identifies the communications connection.

33. The product of claim 1 wherein the application software is operational to generate a Signaling System #7 Address Complete Message.

34. The product of claim 1 wherein the application software is operational to generate a Signaling System #7 Answer Message.

35. The product of claim 1 wherein the application software is operational to generate a Signaling System #7 Release Message.

36. The product of claim 1 wherein the application software is operational to generate a Signaling System #7 Release Complete Message.

37. The product of claim 1 wherein the application software is operational to generate a Signaling System #7 Continuity Message.

38. The product of claim 1 wherein the application software is operational to generate a ATM multiplexer control message indicating the communications connection.

39. The product of claim 1 wherein the application software is operational to generate an echo control message.

40. The product of claim 1 wherein the application software is operational to send originating line information to billing.

41. The product of claim 1 wherein the application software is operational to send a carrier selection parameter to billing.

42. The product of claim 1 wherein the communications connection is an Asynchronous Transfer Mode (ATM) connection.

43. The product of claim 1 wherein the communications connection is an Time Division Multiplex (TDM) connection.

44. The product of claim 1 wherein the communications connection is a DS0 connection.

45. The product of claim 1 further comprising a message data structure operational to store data to build SS7 messages, wherein the connection data structure points to the message data structure.

46. A product having software for selecting an Asynchronous Transfer Mode (ATM) connection in response to a Signaling System #7 (SS7) Initial Address Message (IAM) when the software is executed by a computer system, the product comprising:

a connection data structure operational to store connection data;

an exception data structure operational to store exception data, wherein the connection data structure points to the exception data structure;

a caller number data structure operational to store caller number data, wherein the exception data structure points to the caller number data structure;

a called number data structure operational to store called number data, wherein the exception data structure and the caller number data structure point to the called number data structure;

a routing data structure operational to store routing data, wherein the exception data structure, the caller number data structure, and the called number data structure point to the routing data structure, and wherein the exception data structure, the caller number data structure, the called number data structure, and the routing data structure point to the connection data structure;

application software operational to process information from the SS7 IAM to identify the ATM connection; and a computer storage medium operational to store the application software.

47. The product of claim 46 wherein:

the application software is operational to progress through at least some of the data structures to select the ATM connection; and the computer storage medium is operational to store the data structures.

48. The product of claim 46 wherein the application software is operational to progress from the connection data structure to the exception data structure, from the exception data structure to the caller number data structure, from the caller number data structure to the called number data structure, from the called number data structure to the routing data structure, and from the routing data structure back to the connection data structure to identify the communications connection.

49. The product of claim 46 wherein the application software is operational to progress from the exception data structure back to the connection data structure to identify the communications connection.

50. The product of claim 46 wherein the application software is operational to progress from the caller number data structure back to the connection data structure to identify the communications connection.

51. The product of claim 46 wherein the application software is operational to progress from the called number data structure back to the connection data structure to identify the communications connection.

52. The product of claim 46 wherein the connection data structure includes trunk circuit information related to an originating trunk circuit and the communications connection and includes trunk group information related to an originating trunk group and the communications connection.

53. The product of claim 52 wherein trunk circuit information related to an originating trunk circuit in the connection data structure is entered using an originating point code.

54. The product of claim 46 wherein the connection data structure includes DS0 circuit identification codes.

55. The product of claim 46 wherein the connection data structure includes ATM virtual path identification and ATM virtual channel identification.

56. The product of claim 46 wherein the connection data structure includes group member codes.

57. The product of claim 46 wherein the connection data structure identifies originating circuit hardware.

58. The product of claim 46 wherein the connection data structure identifies an originating circuit echo canceller.

59. The product of claim 46 wherein the connection data structure includes echo control information from an echo suppressor indicator, echo control device indicator, and information transfer capability in a signaling message.

60. The product of claim 46 wherein the connection data structure includes a satellite indicator.

61. The product of claim 46 wherein the connection data structure includes a connection status.

62. The product of claim 46 wherein the connection data structure includes glare resolution information.

63. The product of claim 46 wherein the connection data structure includes continuity test information.

64. The product of claim 46 wherein the connection data structure includes a hop counter.

65. The product of claim 46 wherein the exception data structure includes a carrier selection identification.

66. The product of claim 46 wherein the exception data structure includes a called party number nature of address.

67. The product of claim 46 wherein the caller number data structure includes a calling party category.

68. The product of claim 46 wherein the caller number data structure includes a charge number nature of address.

69. The product of claim 46 wherein the caller number data structure includes originating line information.

70. The product of claim 46 wherein the routing number data structure includes transit network selection network identification information.

71. The product of claim 46 wherein the application software is operational to process a Signaling System #7 Address Complete Message.

72. The product of claim 46 wherein the application software is operational to process a Signaling System #7 Answer Message.

73. The product of claim 46 wherein the application software is operational to process a Signaling System #7 Release Message.

74. The product of claim 46 wherein the application software is operational to process a Signaling System #7 Release Complete Message.

75. The product of claim 46 wherein the application software is operational to process a Signaling System #7 Continuity Message.

76. The product of claim 46 wherein the application software is operational to generate a Signaling System #7 Initial Address Message to identify the communications connection.

77. The product of claim 46 wherein the application software is operational to generate a Signaling System #7 Address Complete Message.

78. The product of claim 46 wherein the application software is operational to generate a Signaling System #7 Answer Message.

79. The product of claim 46 wherein the application software is operational to generate a Signaling System #7 Release Message.

80. The product of claim 46 wherein the application software is operational to generate a Signaling System #7 Release Complete Message.

81. The product of claim 46 wherein the application software is operational to generate a Signaling System #7 Continuity Message.

82. The product of claim 46 wherein the application software is operational to generate a ATM multiplexer control message indicating the communications connection.

83. The product of claim 46 wherein the application software is operational to generate an echo control message.

84. The product of claim 46 wherein the application software is operational to send originating line information to billing.

85. The product of claim 46 wherein the application software is operational to send a carrier selection parameter to billing.

86. The product of claim 46 further comprising a message data structure operational to store data to build SS7 messages, wherein the connection data structure points to the message data structure.

* * * * *